US009538493B2

(12) United States Patent
Dupray et al.

(10) Patent No.: US 9,538,493 B2
(45) Date of Patent: Jan. 3, 2017

(54) LOCATING A MOBILE STATION AND APPLICATIONS THEREFOR

(71) Applicant: Seed Spring, LLC, Dallas, TX (US)

(72) Inventors: Dennis J. Dupray, Golden, CO (US); Sheldon F. Goldberg, Las Vegas, NV (US); Frederick W. Leblanc, Jessup, MD (US); Charles L. Karr, Tuscaloosa, AL (US)

(73) Assignee: FineTrak, LLC, Coconut Creek, FL (US)

( * ) Notice: Subject to any disclaimer, the term of this patent is extended or adjusted under 35 U.S.C. 154(b) by 738 days.

(21) Appl. No.: 13/844,500

(22) Filed: Mar. 15, 2013

(65) Prior Publication Data

US 2013/0288692 A1    Oct. 31, 2013

Related U.S. Application Data

(63) Continuation-in-part of application No. 12/861,817, filed on Aug. 23, 2010, now Pat. No. 8,994,591.

(51) Int. Cl.
*G01S 3/02* (2006.01)
*G01S 3/14* (2006.01)
(Continued)

(52) U.S. Cl.
CPC ............ *H04W 64/00* (2013.01); *G01C 21/206* (2013.01); *G01S 1/026* (2013.01); *G01S 1/028* (2013.01);
(Continued)

(58) Field of Classification Search
CPC .................................. G01S 5/02; H04W 64/00
(Continued)

(56) References Cited

U.S. PATENT DOCUMENTS 3,630,079 A    12/1971   Hughes et al.
3,845,289 A    10/1974   French
(Continued)

FOREIGN PATENT DOCUMENTS

EP    0177203    4/1986
EP    0346461    12/1989
(Continued)

OTHER PUBLICATIONS

Notice of Allowance for U.S. Appl. No. 12/861,817, mailed Jul. 10, 2014.
(Continued)

*Primary Examiner* — Dao Phan

(57) ABSTRACT

A location system and applications therefor is disclosed for wireless telecommunication infrastructures. The system is an end-to-end solution having one or more location systems for outputting requested locations of handsets or mobile stations (MS) based on, e.g., CDMA, GSM, GPRS, TDMA or WIFI communication standards, for processing both local mobile station location requests and more global mobile station location requests via, e.g., Internet communication between a distributed network of location systems. The following applications may be enabled by the location system: 911 emergency calls, tracking, navigation, people and animal location including applications for confinement to and exclusion from certain areas, friend finder applications, and applications for allocating user desired resources based on the user's location.

13 Claims, 46 Drawing Sheets

WIRELESS LOCATION USING MULTIPLE CMRSs

(51) Int. Cl.
*H04W 64/00* (2009.01)
*G01C 21/20* (2006.01)
*G01S 1/02* (2010.01)
*G01S 5/00* (2006.01)
*G01S 5/02* (2010.01)
*G01S 1/04* (2006.01)
*G01S 5/06* (2006.01)
*H04W 4/22* (2009.01)
*H04W 76/00* (2009.01)
*H04W 88/06* (2009.01)

(52) U.S. Cl.
CPC ............. *G01S 5/0009* (2013.01); *G01S 5/02* (2013.01); *G01S 5/021* (2013.01); *G01S 5/0205* (2013.01); *G01S 5/0252* (2013.01); *G01S 5/0257* (2013.01); *G01S 1/045* (2013.01); *G01S 5/0018* (2013.01); *G01S 5/0054* (2013.01); *G01S 5/06* (2013.01); *G01S 2205/006* (2013.01); *G01S 2205/008* (2013.01); *H04W 4/22* (2013.01); *H04W 76/007* (2013.01); *H04W 88/06* (2013.01)

(58) Field of Classification Search
USPC .............. 342/450, 457, 463–465; 455/456.2, 455/456.6, 450
See application file for complete search history.

(56) References Cited

U.S. PATENT DOCUMENTS

| | | |
|---|---|---|
| 3,881,060 A | 4/1975 | Connell et al. |
| 3,886,553 A | 5/1975 | Bates |
| 4,023,176 A | 5/1977 | Currie et al. |
| 4,052,569 A | 10/1977 | Pirnie, III |
| 4,232,313 A | 11/1980 | Fleishman |
| 4,310,726 A | 1/1982 | Asmuth |
| 4,347,618 A | 8/1982 | Kavouras et al. |
| 4,402,049 A | 8/1983 | Gray |
| 4,438,439 A | 3/1984 | Shreve |
| 4,445,118 A | 4/1984 | Taylor et al. |
| 4,450,320 A | 5/1984 | Ostermann et al. |
| 4,459,667 A | 7/1984 | Takeuchi |
| 4,463,357 A | 7/1984 | MacDoran |
| 4,475,010 A | 10/1984 | Huensch et al. |
| 4,521,645 A | 6/1985 | Carroll |
| RE31,962 E | 7/1985 | Brodeur |
| 4,555,594 A | 11/1985 | Friedes et al. |
| 4,558,300 A | 12/1985 | Goldman |
| 4,630,057 A | 12/1986 | Martin |
| 4,636,795 A | 1/1987 | Dano |
| 4,651,156 A | 3/1987 | Martinez |
| 4,651,157 A | 3/1987 | Gray et al. |
| 4,660,037 A | 4/1987 | Nakamura |
| 4,670,758 A | 6/1987 | Campbell |
| 4,700,374 A | 10/1987 | Bini |
| 4,721,958 A | 1/1988 | Jenkin |
| 4,728,959 A | 3/1988 | Maloney et al. |
| 4,740,792 A | 4/1988 | Sagey et al. |
| 4,742,357 A | 5/1988 | Rackley |
| 4,743,913 A | 5/1988 | Takai |
| 4,750,197 A | 6/1988 | Denekamp et al. |
| 4,760,531 A | 7/1988 | Yasui et al. |
| 4,785,463 A | 11/1988 | Janc et al. |
| 4,791,572 A | 12/1988 | Green, III et al. |
| 4,799,062 A | 1/1989 | Sanderford, Jr. et al. |
| 4,806,940 A | 2/1989 | Harral et al. |
| 4,812,980 A | 3/1989 | Yamada et al. |
| 4,814,711 A | 3/1989 | Olsen et al. |
| 4,818,998 A | 4/1989 | Apsell et al. |
| 4,857,840 A | 8/1989 | Lanchais |
| 4,860,352 A | 8/1989 | Laurance et al. |
| 4,864,313 A | 9/1989 | Konneker |
| 4,866,450 A | 9/1989 | Chisholm |
| 4,870,576 A | 9/1989 | Tornetta |
| 4,876,550 A | 10/1989 | Kelly |
| 4,876,738 A | 10/1989 | Selby |
| 4,879,713 A | 11/1989 | Ichiyoshi |
| 4,888,593 A | 12/1989 | Friedman et al. |
| 4,891,650 A | 1/1990 | Sheffer |
| 4,891,761 A | 1/1990 | Gray et al. |
| 4,893,325 A | 1/1990 | Pankonen et al. |
| 4,903,212 A | 2/1990 | Yokouchi et al. |
| 4,908,629 A | 3/1990 | Apsell et al. |
| 4,914,689 A | 4/1990 | Quade et al. |
| 4,924,491 A | 5/1990 | Compton et al. |
| 4,952,772 A | 8/1990 | Zana |
| 4,990,922 A | 2/1991 | Young et al. |
| 4,992,796 A | 2/1991 | Apostolos |
| 4,995,071 A | 2/1991 | Weber et al. |
| 5,003,317 A | 3/1991 | Gray et al. |
| 5,008,679 A | 4/1991 | Effland et al. |
| 5,017,926 A | 5/1991 | Ames et al. |
| 5,022,067 A | 6/1991 | Hughes |
| 5,022,751 A | 6/1991 | Howard |
| 5,032,989 A | 7/1991 | Tornetta |
| 5,034,898 A | 7/1991 | Lu et al. |
| 5,043,736 A | 8/1991 | Darnell et al. |
| 5,045,852 A | 9/1991 | Mitchell et al. |
| 5,045,861 A | 9/1991 | Duffett-Smith |
| 5,046,088 A | 9/1991 | Margulies |
| 5,055,851 A | 10/1991 | Sheffer |
| 5,067,153 A | 11/1991 | Willie et al. |
| 5,077,788 A | 12/1991 | Cook et al. |
| 5,092,343 A | 3/1992 | Spitzer et al. |
| 5,099,245 A | 3/1992 | Sagey |
| 5,109,399 A | 4/1992 | Thompson |
| 5,111,209 A | 5/1992 | Toriyama |
| 5,119,101 A | 6/1992 | Barnard |
| 5,119,102 A | 6/1992 | Barnard |
| 5,119,104 A | 6/1992 | Heller |
| 5,136,686 A | 8/1992 | Koza |
| 5,142,590 A | 8/1992 | Carpenter et al. |
| 5,153,909 A | 10/1992 | Beckle et al. |
| 5,155,490 A | 10/1992 | Spradley, Jr. et al. |
| 5,155,688 A | 10/1992 | Tanaka et al. |
| 5,155,689 A | 10/1992 | Wortham |
| 5,161,180 A | 11/1992 | Chavous |
| 5,163,004 A | 11/1992 | Rentz |
| 5,166,694 A | 11/1992 | Russell et al. |
| 5,177,489 A | 1/1993 | Hatch |
| 5,184,347 A | 2/1993 | Farwell et al. |
| 5,185,786 A | 2/1993 | Zwick |
| 5,191,342 A | 3/1993 | Alsup et al. |
| 5,193,110 A | 3/1993 | Jones et al. |
| 5,202,829 A | 4/1993 | Geier |
| 5,208,756 A | 5/1993 | Song |
| 5,208,757 A | 5/1993 | Appriou et al. |
| 5,210,540 A | 5/1993 | Masumoto |
| 5,212,765 A | 5/1993 | Skeirik |
| 5,212,804 A | 5/1993 | Choate |
| 5,214,789 A | 5/1993 | George |
| 5,216,611 A | 6/1993 | McElreath |
| 5,218,367 A | 6/1993 | Sheffer et al. |
| 5,218,618 A | 6/1993 | Sagey |
| 5,218,716 A | 6/1993 | Comroe et al. |
| 5,220,509 A | 6/1993 | Takemura et al. |
| 5,223,844 A | 6/1993 | Mansell et al. |
| 5,225,842 A | 7/1993 | Brown et al. |
| 5,233,541 A | 8/1993 | Corwin et al. |
| 5,235,630 A | 8/1993 | Moody et al. |
| 5,235,633 A | 8/1993 | Dennison et al. |
| 5,239,570 A | 8/1993 | Koster et al. |
| 5,243,530 A | 9/1993 | Stanifer et al. |
| 5,245,651 A | 9/1993 | Takashima et al. |
| 5,251,273 A | 10/1993 | Betts et al. |
| 5,257,195 A | 10/1993 | Hirata |
| 5,260,711 A | 11/1993 | Sterzer |
| 5,268,958 A | 12/1993 | Nakano |
| 5,276,451 A | 1/1994 | Odagawa |
| 5,278,892 A | 1/1994 | Bolliger et al. |
| 5,280,295 A | 1/1994 | Kelley et al. |
| 5,280,472 A | 1/1994 | Gilhousen et al. |

(56) References Cited

U.S. PATENT DOCUMENTS

| | | |
|---|---|---|
| 5,282,261 A | 1/1994 | Skeirik |
| 5,293,318 A | 3/1994 | Fukushima |
| 5,293,642 A | 3/1994 | Lo |
| 5,293,645 A | 3/1994 | Sood |
| 5,295,180 A | 3/1994 | Vendetti et al. |
| 5,299,260 A | 3/1994 | Shaio |
| 5,311,195 A | 5/1994 | Mathis et al. |
| 5,311,569 A | 5/1994 | Brozovich et al. |
| 5,317,323 A | 5/1994 | Kennedy et al. |
| 5,319,374 A | 6/1994 | Desai et al. |
| 5,323,444 A | 6/1994 | Ertz et al. |
| 5,325,419 A | 6/1994 | Connolly et al. |
| 5,327,144 A | 7/1994 | Stilp et al. |
| 5,331,550 A | 7/1994 | Stafford et al. |
| 5,334,974 A | 8/1994 | Simms et al. |
| 5,334,986 A | 8/1994 | Fernhout |
| 5,337,343 A | 8/1994 | Stickney |
| 5,339,351 A | 8/1994 | Hoskinson et al. |
| 5,345,245 A | 9/1994 | Ishikawa et al. |
| 5,347,567 A | 9/1994 | Moody et al. |
| 5,347,568 A | 9/1994 | Moody et al. |
| 5,349,631 A | 9/1994 | Lee |
| 5,359,521 A | 10/1994 | Kyrtsos et al. |
| 5,363,110 A | 11/1994 | Inamiya |
| 5,365,447 A | 11/1994 | Dennis |
| 5,365,450 A | 11/1994 | Schuchman et al. |
| 5,365,516 A | 11/1994 | Jandrell |
| 5,365,544 A | 11/1994 | Schilling |
| 5,367,555 A | 11/1994 | Isoyama |
| 5,373,456 A | 12/1994 | Ferkinhoff et al. |
| 5,374,933 A | 12/1994 | Kao |
| 5,379,224 A | 1/1995 | Brown et al. |
| 5,388,145 A | 2/1995 | Mulrow et al. |
| 5,388,147 A | 2/1995 | Grimes |
| 5,388,259 A | 2/1995 | Fleischman et al. |
| 5,389,934 A | 2/1995 | Kass |
| 5,390,339 A | 2/1995 | Bruckert et al. |
| 5,392,052 A | 2/1995 | Eberwine |
| 5,392,329 A | 2/1995 | Adams et al. |
| 5,394,158 A | 2/1995 | Chia |
| 5,394,333 A | 2/1995 | Kao |
| 5,394,435 A | 2/1995 | Weerackody |
| 5,394,445 A | 2/1995 | Ball et al. |
| 5,395,366 A | 3/1995 | D'Andrea et al. |
| 5,396,548 A | 3/1995 | Bayerl et al. |
| 5,398,277 A | 3/1995 | Martin, Jr. et al. |
| 5,398,302 A | 3/1995 | Thrift |
| 5,402,520 A | 3/1995 | Schnitta |
| 5,408,586 A | 4/1995 | Skeirik |
| 5,408,588 A | 4/1995 | Ulug |
| 5,410,737 A | 4/1995 | Jones |
| 5,412,388 A | 5/1995 | Attwood |
| 5,412,708 A | 5/1995 | Katz |
| 5,420,594 A | 5/1995 | FitzGerald et al. |
| 5,420,914 A | 5/1995 | Blumhardt |
| 5,422,813 A | 6/1995 | Schuchman et al. |
| 5,423,067 A | 6/1995 | Manabe |
| 5,425,136 A | 6/1995 | Lo et al. |
| 5,426,745 A | 6/1995 | Baji et al. |
| 5,428,546 A | 6/1995 | Shah et al. |
| 5,430,654 A | 7/1995 | Kyrtsos et al. |
| 5,434,927 A | 7/1995 | Brady et al. |
| 5,434,950 A | 7/1995 | Kaallman |
| 5,438,517 A | 8/1995 | Sennott et al. |
| 5,438,644 A | 8/1995 | Fu |
| 5,442,349 A | 8/1995 | Inoue et al. |
| 5,444,451 A | 8/1995 | Johnson et al. |
| 5,448,618 A | 9/1995 | Sandlerman |
| 5,448,754 A | 9/1995 | Ho et al. |
| 5,452,211 A | 9/1995 | Kyrtsos et al. |
| 5,457,736 A | 10/1995 | Cain et al. |
| 5,467,282 A | 11/1995 | Dennis |
| 5,473,602 A | 12/1995 | McKenna et al. |
| 5,475,745 A | 12/1995 | Boyle |
| 5,477,458 A | 12/1995 | Loomis |
| 5,479,397 A | 12/1995 | Lee |
| 5,479,482 A | 12/1995 | Grimes |
| 5,485,163 A | 1/1996 | Singer et al. |
| 5,488,559 A | 1/1996 | Seymour |
| 5,490,073 A | 2/1996 | Kyrtsos |
| 5,506,864 A | 4/1996 | Schilling |
| 5,508,707 A | 4/1996 | LeBlanc et al. |
| 5,508,708 A | 4/1996 | Ghosh et al. |
| 5,509,055 A | 4/1996 | Ehrlich et al. |
| 5,510,798 A | 4/1996 | Bauer |
| 5,510,801 A | 4/1996 | Engelbrecht et al. |
| 5,511,109 A | 4/1996 | Hartley et al. |
| 5,512,903 A | 4/1996 | Schmidtke |
| 5,512,904 A | 4/1996 | Bennett |
| 5,512,908 A | 4/1996 | Herrick |
| 5,513,243 A | 4/1996 | Kage |
| 5,513,246 A | 4/1996 | Jonsson et al. |
| 5,515,285 A | 5/1996 | Garrett, Sr. et al. |
| 5,515,378 A | 5/1996 | Roy, III et al. |
| 5,515,419 A | 5/1996 | Sheffer |
| 5,517,419 A | 5/1996 | Lanckton et al. |
| 5,517,667 A | 5/1996 | Wang |
| 5,519,760 A | 5/1996 | Borkowski et al. |
| 5,526,001 A | 6/1996 | Rose et al. |
| 5,526,357 A | 6/1996 | Jandrell |
| 5,526,466 A | 6/1996 | Takizawa |
| 5,532,690 A | 7/1996 | Hertel |
| 5,533,100 A | 7/1996 | Bass et al. |
| 5,537,460 A | 7/1996 | Holliday, Jr. et al. |
| 5,541,845 A | 7/1996 | Klein |
| 5,546,092 A | 8/1996 | Kurokawa et al. |
| 5,546,445 A | 8/1996 | Dennison et al. |
| 5,552,772 A | 9/1996 | Janky et al. |
| 5,555,257 A | 9/1996 | Dent |
| 5,555,286 A | 9/1996 | Tendler |
| 5,555,503 A | 9/1996 | Kyrtsos et al. |
| 5,559,878 A | 9/1996 | Keys et al. |
| 5,561,704 A | 10/1996 | Salimando |
| 5,561,840 A | 10/1996 | Alvesalo et al. |
| 5,563,611 A | 10/1996 | McGann et al. |
| 5,563,931 A | 10/1996 | Bishop et al. |
| 5,564,079 A | 10/1996 | Olsson |
| 5,565,858 A | 10/1996 | Guthrie |
| 5,570,412 A | 10/1996 | LeBlanc |
| 5,572,218 A | 11/1996 | Cohen et al. |
| 5,574,648 A | 11/1996 | Pilley |
| 5,577,169 A | 11/1996 | Prezioso |
| 5,579,368 A | 11/1996 | van Berkum |
| 5,581,490 A | 12/1996 | Ferkinhoff et al. |
| 5,581,596 A | 12/1996 | Hogan |
| 5,583,513 A | 12/1996 | Cohen |
| 5,583,517 A | 12/1996 | Yokev et al. |
| 5,586,178 A | 12/1996 | Koenig et al. |
| 5,588,038 A | 12/1996 | Snyder |
| 5,592,180 A | 1/1997 | Yokev et al. |
| 5,594,425 A | 1/1997 | Ladner et al. |
| 5,594,650 A | 1/1997 | Shah et al. |
| 5,594,740 A | 1/1997 | LaDue |
| 5,594,782 A | 1/1997 | Zicker et al. |
| 5,596,332 A | 1/1997 | Coles et al. |
| 5,596,625 A | 1/1997 | LeBlanc |
| 5,598,460 A | 1/1997 | Tendler |
| 5,600,705 A | 2/1997 | Maenpaa |
| 5,600,706 A | 2/1997 | Dunn et al. |
| 5,602,903 A | 2/1997 | LeBlanc et al. |
| 5,604,765 A | 2/1997 | Bruno et al. |
| 5,608,410 A | 3/1997 | Stilp et al. |
| 5,608,854 A | 3/1997 | Labedz et al. |
| 5,610,815 A | 3/1997 | Gudat et al. |
| 5,610,972 A | 3/1997 | Emery et al. |
| 5,611,704 A | 3/1997 | Kamizono et al. |
| 5,612,703 A | 3/1997 | Mallinckrodt |
| 5,612,864 A | 3/1997 | Henderson |
| 5,613,041 A | 3/1997 | Keeler et al. |
| 5,613,205 A | 3/1997 | Dufour |
| 5,614,914 A | 3/1997 | Bolgiano et al. |
| 5,619,552 A | 4/1997 | Karppanen et al. |
| 5,621,848 A | 4/1997 | Wang |
| 5,625,668 A | 4/1997 | Loomis et al. |

(56) References Cited

U.S. PATENT DOCUMENTS

| | | |
|---|---|---|
| 5,625,748 A | 4/1997 | McDonough et al. |
| 5,627,549 A | 5/1997 | Park |
| 5,627,884 A | 5/1997 | Williams et al. |
| 5,629,707 A | 5/1997 | Heuvel et al. |
| 5,631,469 A | 5/1997 | Carrieri et al. |
| 5,631,656 A | 5/1997 | Hartman et al. |
| 5,635,953 A | 6/1997 | Hayami et al. |
| 5,638,486 A | 6/1997 | Wang et al. |
| 5,640,103 A | 6/1997 | Petsche et al. |
| 5,642,285 A | 6/1997 | Woo et al. |
| 5,646,630 A | 7/1997 | Sheynblat et al. |
| 5,646,857 A | 7/1997 | McBurney et al. |
| 5,646,987 A | 7/1997 | Gerber et al. |
| 5,649,065 A | 7/1997 | Lo et al. |
| 5,652,570 A | 7/1997 | Lepkofker |
| 5,652,788 A | 7/1997 | Hara |
| 5,657,025 A | 8/1997 | Ebner et al. |
| 5,657,487 A | 8/1997 | Doner |
| 5,663,734 A | 9/1997 | Krasner |
| 5,673,322 A | 9/1997 | Pepe et al. |
| 5,675,344 A | 10/1997 | Tong et al. |
| 5,675,788 A | 10/1997 | Husick et al. |
| 5,686,924 A | 11/1997 | Trimble et al. |
| 5,689,270 A | 11/1997 | Kelley et al. |
| 5,689,548 A | 11/1997 | Maupin et al. |
| 5,701,328 A | 12/1997 | Schuchman et al. |
| 5,710,758 A | 1/1998 | Soliman et al. |
| 5,710,918 A | 1/1998 | Lagarde et al. |
| 5,712,900 A | 1/1998 | Maupin et al. |
| 5,715,306 A | 2/1998 | Sunderman et al. |
| 5,717,406 A | 2/1998 | Sanderford et al. |
| 5,717,737 A | 2/1998 | Doviak et al. |
| 5,719,584 A | 2/1998 | Otto |
| 5,724,047 A | 3/1998 | Lioio et al. |
| 5,724,648 A | 3/1998 | Shaughnessy et al. |
| 5,724,660 A | 3/1998 | Kauser et al. |
| 5,727,057 A | 3/1998 | Emery et al. |
| 5,729,549 A | 3/1998 | Kostreski et al. |
| 5,732,074 A | 3/1998 | Spaur et al. |
| 5,732,354 A | 3/1998 | MacDonald |
| 5,736,964 A | 4/1998 | Ghosh et al. |
| 5,737,431 A | 4/1998 | Brandstein et al. |
| 5,740,049 A | 4/1998 | Kaise |
| 5,742,509 A | 4/1998 | Goldberg et al. |
| 5,742,905 A | 4/1998 | Pepe et al. |
| 5,754,955 A | 5/1998 | Ekbatani |
| 5,757,316 A | 5/1998 | Buchler |
| 5,761,278 A | 6/1998 | Pickett et al. |
| 5,764,756 A | 6/1998 | Onweller |
| 5,768,359 A | 6/1998 | DiPierro, Jr. et al. |
| 5,768,360 A | 6/1998 | Reynolds et al. |
| 5,771,280 A | 6/1998 | Johnson |
| 5,774,802 A | 6/1998 | Tell et al. |
| 5,774,805 A | 6/1998 | Zicker |
| 5,774,829 A | 6/1998 | Cisneros et al. |
| 5,774,869 A | 6/1998 | Toader |
| 5,786,773 A | 7/1998 | Murphy |
| 5,787,235 A | 7/1998 | Smith et al. |
| 5,787,354 A | 7/1998 | Gray et al. |
| 5,790,953 A | 8/1998 | Wang et al. |
| 5,790,974 A | 8/1998 | Tognazzini |
| 5,799,016 A | 8/1998 | Onweller |
| 5,799,061 A | 8/1998 | Melcher et al. |
| 5,802,454 A | 9/1998 | Goshay et al. |
| 5,802,518 A | 9/1998 | Karaev et al. |
| 5,805,670 A | 9/1998 | Pons et al. |
| 5,809,415 A | 9/1998 | Rossmann |
| 5,809,437 A | 9/1998 | Breed |
| 5,815,417 A | 9/1998 | Orr et al. |
| 5,815,538 A | 9/1998 | Grell et al. |
| 5,815,814 A | 9/1998 | Dennison et al. |
| RE35,916 E | 10/1998 | Dennison et al. |
| 5,819,273 A | 10/1998 | Vora et al. |
| 5,819,301 A | 10/1998 | Rowe et al. |
| 5,822,539 A | 10/1998 | van Hoff |
| 5,825,283 A | 10/1998 | Camhi |
| 5,831,977 A | 11/1998 | Dent |
| 5,832,059 A | 11/1998 | Aldred et al. |
| 5,832,367 A | 11/1998 | Bamburak et al. |
| 5,835,568 A | 11/1998 | Bass et al. |
| 5,835,857 A | 11/1998 | Otten |
| 5,835,907 A | 11/1998 | Newman |
| 5,838,562 A | 11/1998 | Gudat et al. |
| 5,841,396 A | 11/1998 | Krasner |
| 5,842,130 A | 11/1998 | Oprescu-Surcobe et al. |
| 5,844,522 A | 12/1998 | Sheffer et al. |
| 5,845,198 A | 12/1998 | Bamburak et al. |
| 5,845,267 A | 12/1998 | Ronen |
| 5,857,181 A | 1/1999 | Augenbraun et al. |
| 5,864,755 A | 1/1999 | King et al. |
| 5,867,495 A | 2/1999 | Elliott et al. |
| 5,867,799 A | 2/1999 | Lang et al. |
| 5,870,029 A | 2/1999 | Otto et al. |
| 5,872,539 A | 2/1999 | Mullen |
| 5,873,040 A | 2/1999 | Dunn et al. |
| 5,873,076 A | 2/1999 | Barr et al. |
| 5,875,394 A | 2/1999 | Daly et al. |
| 5,875,401 A | 2/1999 | Rochkind |
| 5,883,598 A | 3/1999 | Parl et al. |
| 5,884,216 A | 3/1999 | Shah et al. |
| 5,890,068 A | 3/1999 | Fattouche et al. |
| 5,892,441 A | 4/1999 | Woolley et al. |
| 5,892,454 A | 4/1999 | Schipper et al. |
| 5,893,091 A | 4/1999 | Hunt et al. |
| 5,894,266 A | 4/1999 | Wood, Jr. et al. |
| 5,895,436 A | 4/1999 | Savoie et al. |
| 5,898,757 A | 4/1999 | Buhler et al. |
| 5,901,358 A | 5/1999 | Petty et al. |
| 5,902,351 A | 5/1999 | Streit et al. |
| 5,903,844 A | 5/1999 | Bruckert et al. |
| 5,904,727 A | 5/1999 | Prabhakaran |
| 5,905,455 A | 5/1999 | Heger et al. |
| 5,906,655 A | 5/1999 | Fan |
| 5,913,170 A | 6/1999 | Wortham |
| 5,914,675 A | 6/1999 | Tognazzini |
| 5,917,405 A | 6/1999 | Joao |
| 5,917,449 A | 6/1999 | Sanderford et al. |
| 5,917,866 A | 6/1999 | Pon |
| 5,920,873 A | 7/1999 | Van Huben et al. |
| 5,922,040 A | 7/1999 | Prabhakaran |
| 5,923,286 A | 7/1999 | Divakaruni |
| 5,924,090 A | 7/1999 | Krellenstein |
| 5,926,133 A | 7/1999 | Green, Jr. |
| 5,929,806 A | 7/1999 | Birchler et al. |
| 5,930,717 A | 7/1999 | Yost et al. |
| 5,933,421 A | 8/1999 | Alamouti et al. |
| 5,933,822 A | 8/1999 | Braden-Harder et al. |
| 5,936,572 A | 8/1999 | Loomis et al. |
| 5,938,721 A | 8/1999 | Dussell et al. |
| 5,940,474 A | 8/1999 | Ruus |
| 5,943,014 A | 8/1999 | Gilhousen |
| 5,945,944 A | 8/1999 | Krasner |
| 5,945,948 A | 8/1999 | Buford et al. |
| 5,948,040 A | 9/1999 | DeLorme et al. |
| 5,949,815 A | 9/1999 | Pon |
| 5,952,969 A | 9/1999 | Hagerman et al. |
| 5,959,568 A | 9/1999 | Woolley |
| 5,959,580 A | 9/1999 | Maloney et al. |
| 5,960,337 A | 9/1999 | Brewster et al. |
| 5,963,866 A | 10/1999 | Palamara et al. |
| 5,966,658 A | 10/1999 | Kennedy, III et al. |
| 5,969,674 A | 10/1999 | von der Embse et al. |
| 5,973,643 A | 10/1999 | Hawkes et al. |
| 5,977,913 A | 11/1999 | Christ |
| 5,978,840 A | 11/1999 | Nguyen et al. |
| 5,982,324 A | 11/1999 | Watters et al. |
| 5,982,891 A | 11/1999 | Ginter et al. |
| 5,983,161 A | 11/1999 | Lemelson et al. |
| 5,983,214 A | 11/1999 | Lang et al. |
| 5,987,329 A | 11/1999 | Yost et al. |
| 5,999,124 A | 12/1999 | Sheynblat |
| 5,999,126 A | 12/1999 | Ito |
| 6,009,334 A | 12/1999 | Grubeck et al. |
| 6,011,841 A | 1/2000 | Isono |

(56) References Cited

U.S. PATENT DOCUMENTS

| | | |
|---|---|---|
| 6,011,844 A | 1/2000 | Uppaluru et al. |
| 6,012,013 A | 1/2000 | McBurney |
| 6,014,102 A | 1/2000 | Mitzlaff et al. |
| 6,014,555 A | 1/2000 | Tendler |
| 6,026,304 A | 2/2000 | Hilsenrath et al. |
| 6,026,345 A | 2/2000 | Shah et al. |
| 6,028,551 A | 2/2000 | Schoen et al. |
| 6,029,161 A | 2/2000 | Lang et al. |
| 6,031,490 A | 2/2000 | Forssen et al. |
| 6,034,635 A | 3/2000 | Gilhousen |
| 6,038,668 A | 3/2000 | Chipman et al. |
| 6,046,683 A | 4/2000 | Pidwerbetsky et al. |
| 6,047,192 A | 4/2000 | Maloney et al. |
| 6,054,928 A | 4/2000 | Lemelson et al. |
| 6,061,064 A | 5/2000 | Reichlen |
| 6,064,339 A | 5/2000 | Wax et al. |
| 6,064,722 A | 5/2000 | Clise et al. |
| 6,064,942 A | 5/2000 | Johnson et al. |
| 6,073,004 A | 6/2000 | Balachandran |
| 6,073,005 A | 6/2000 | Raith et al. |
| 6,075,853 A | 6/2000 | Boeckman et al. |
| 6,094,573 A | 7/2000 | Heinonen et al. |
| 6,097,958 A | 8/2000 | Bergen |
| 6,101,178 A | 8/2000 | Beal |
| 6,101,390 A | 8/2000 | Jayaraman et al. |
| 6,101,391 A | 8/2000 | Ishizuka et al. |
| 6,108,555 A | 8/2000 | Maloney et al. |
| 6,128,501 A | 10/2000 | Ffoulkes-Jones |
| 6,131,067 A | 10/2000 | Girerd et al. |
| 6,154,727 A | 11/2000 | Karp et al. |
| 6,157,621 A | 12/2000 | Brown et al. |
| 6,167,274 A | 12/2000 | Smith |
| 6,169,902 B1 | 1/2001 | Kawamoto |
| 6,173,166 B1 | 1/2001 | Whitecar |
| 6,185,282 B1 | 2/2001 | Boeckman et al. |
| 6,185,427 B1 | 2/2001 | Krasner et al. |
| 6,202,023 B1 | 3/2001 | Hancock et al. |
| 6,208,290 B1 | 3/2001 | Krasner |
| 6,208,721 B1 | 3/2001 | Feinberg et al. |
| 6,236,358 B1 | 5/2001 | Durst et al. |
| 6,236,365 B1 | 5/2001 | LeBlanc et al. |
| 6,240,285 B1 | 5/2001 | Blum et al. |
| 6,243,039 B1 | 6/2001 | Elliott |
| 6,243,587 B1 | 6/2001 | Dent et al. |
| 6,249,245 B1 | 6/2001 | Watters et al. |
| 6,249,252 B1 | 6/2001 | Dupray |
| 6,275,305 B1 | 8/2001 | Shimada |
| 6,275,773 B1 | 8/2001 | Lemelson et al. |
| 6,292,549 B1 | 9/2001 | Lung et al. |
| 6,292,799 B1 | 9/2001 | Peek et al. |
| 6,308,072 B1 | 10/2001 | Labedz et al. |
| 6,321,092 B1 | 11/2001 | Fitch et al. |
| 6,323,894 B1 | 11/2001 | Katz |
| 6,324,276 B1 | 11/2001 | Uppaluru et al. |
| 6,324,404 B1 | 11/2001 | Dennison et al. |
| 6,327,342 B1 | 12/2001 | Mobley et al. |
| 6,330,452 B1 | 12/2001 | Fattouche et al. |
| 6,349,134 B1 | 2/2002 | Katz |
| 6,363,254 B1 | 3/2002 | Jones et al. |
| 6,370,234 B1 | 4/2002 | Kroll |
| 6,381,324 B1 | 4/2002 | Shaffer et al. |
| 6,381,329 B1 | 4/2002 | Uppaluru et al. |
| 6,381,464 B1 | 4/2002 | Vannucci |
| 6,385,312 B1 | 5/2002 | Shaffer et al. |
| 6,385,541 B1 | 5/2002 | Blumberg et al. |
| 6,393,346 B1 | 5/2002 | Keith et al. |
| 6,408,307 B1 | 6/2002 | Semple et al. |
| 6,415,291 B2 | 7/2002 | Bouve et al. |
| 6,418,208 B1 | 7/2002 | Gundlach et al. |
| 6,430,411 B1 | 8/2002 | Lempio et al. |
| 6,434,223 B2 | 8/2002 | Katz |
| 6,445,784 B2 | 9/2002 | Uppaluru et al. |
| 6,459,782 B1 | 10/2002 | Bedrosian et al. |
| 6,477,362 B1 | 11/2002 | Raith et al. |
| 6,486,801 B1 | 11/2002 | Jones |
| 6,487,500 B2 | 11/2002 | Lemelson et al. |
| 6,490,450 B1 | 12/2002 | Batni et al. |
| 6,492,912 B1 | 12/2002 | Jones |
| 6,493,439 B2 | 12/2002 | Lung et al. |
| 6,510,383 B1 | 1/2003 | Jones |
| 6,512,415 B1 | 1/2003 | Katz |
| 6,519,463 B2 | 2/2003 | Tendler |
| 6,529,722 B1 | 3/2003 | Heinrich et al. |
| 6,539,077 B1 | 3/2003 | Ranalli et al. |
| 6,549,130 B1 | 4/2003 | Joao |
| 6,563,921 B1 | 5/2003 | Williams et al. |
| 6,570,967 B2 | 5/2003 | Katz |
| 6,570,975 B2 | 5/2003 | Shaffer et al. |
| 6,574,318 B1 | 6/2003 | Cannon et al. |
| 6,577,714 B1 | 6/2003 | Darcie et al. |
| 6,587,546 B2 | 7/2003 | Stumer et al. |
| 6,591,112 B1 | 7/2003 | Siccardo et al. |
| 6,608,892 B2 | 8/2003 | Shaffer et al. |
| 6,622,020 B1 | 9/2003 | Seki |
| 6,625,437 B1 | 9/2003 | Jampolsky et al. |
| 6,628,755 B2 | 9/2003 | Shimada et al. |
| 6,650,998 B1 | 11/2003 | Rutledge et al. |
| 6,661,884 B2 | 12/2003 | Shaffer et al. |
| 6,678,356 B2 | 1/2004 | Stumer et al. |
| 6,678,357 B2 | 1/2004 | Stumer et al. |
| 6,678,360 B1 | 1/2004 | Katz |
| 6,700,507 B2 | 3/2004 | Jones |
| 6,721,399 B2 | 4/2004 | Beyda |
| 6,724,860 B2 | 4/2004 | Stumer et al. |
| 6,741,927 B2 | 5/2004 | Jones |
| 6,744,857 B2 | 6/2004 | Stumer |
| 6,744,858 B2 | 6/2004 | Ryan et al. |
| 6,748,057 B2 | 6/2004 | Ranalli et al. |
| 6,748,226 B1 | 6/2004 | Wortham |
| 6,748,318 B1 | 6/2004 | Jones |
| 6,754,334 B2 | 6/2004 | Williams et al. |
| 6,757,359 B2 | 6/2004 | Stumer et al. |
| 6,760,601 B1 | 7/2004 | Suoknuuti et al. |
| 6,826,405 B2 | 11/2004 | Doviak et al. |
| 6,834,195 B2 | 12/2004 | Brandenberg et al. |
| 6,850,600 B1 | 2/2005 | Boeckman et al. |
| 6,868,139 B2 | 3/2005 | Stumer et al. |
| 6,888,936 B1 | 5/2005 | Groen et al. |
| 6,889,139 B2 | 5/2005 | Prabhakaran |
| 6,952,181 B2 | 10/2005 | Karr et al. |
| 6,952,645 B1 | 10/2005 | Jones |
| 6,980,631 B1 | 12/2005 | Danzl et al. |
| 6,980,636 B2 | 12/2005 | Fleischer, III et al. |
| 6,985,742 B1 | 1/2006 | Giniger et al. |
| 6,993,118 B2 | 1/2006 | Antonucci et al. |
| 6,996,219 B2 | 2/2006 | Rodriguez et al. |
| 6,999,779 B1 | 2/2006 | Hashimoto |
| 7,003,081 B2 | 2/2006 | Stumer et al. |
| 7,019,770 B1 | 3/2006 | Katz |
| 7,031,724 B2 | 4/2006 | Ross et al. |
| 7,050,818 B2 | 5/2006 | Tendler |
| 7,051,018 B2 | 5/2006 | Reed et al. |
| 7,054,432 B2 | 5/2006 | Sabinson et al. |
| 7,065,192 B2 | 6/2006 | Danzl et al. |
| 7,103,153 B2 | 9/2006 | Stumer et al. |
| 7,114,651 B2 | 10/2006 | Hjelmvik |
| 7,136,473 B2 | 11/2006 | Gruchala et al. |
| 7,136,474 B2 | 11/2006 | Shaffer et al. |
| 7,167,553 B2 | 1/2007 | Shaffer et al. |
| 7,177,397 B2 | 2/2007 | McCalmont et al. |
| 7,177,400 B2 | 2/2007 | Eisner et al. |
| 7,190,774 B2 | 3/2007 | McFarland |
| 7,274,332 B1 | 9/2007 | Dupray |
| 7,298,327 B2 | 11/2007 | Dupray et al. |
| 7,525,484 B2 | 4/2009 | Dupray et al. |
| 7,660,437 B2 | 2/2010 | Breed |
| 7,714,778 B2 | 5/2010 | Dupray |
| 7,764,231 B1 | 7/2010 | Dupray |
| 7,812,766 B2 | 10/2010 | LeBlanc et al. |
| 7,903,029 B2 | 3/2011 | Dupray |
| 8,032,153 B2 | 10/2011 | Karr et al. |
| 8,082,096 B2 | 12/2011 | Dupray |

(56) References Cited

U.S. PATENT DOCUMENTS

| | | |
|---|---|---|
| 8,135,413 B2 | 3/2012 | Dupray |
| 2003/0146871 A1 | 8/2003 | Dupray et al. |
| 2004/0198386 A1 | 10/2004 | Dupray |
| 2008/0167049 A1 | 7/2008 | Karr et al. |
| 2009/0048938 A1 | 2/2009 | Dupray |
| 2010/0063829 A1 | 3/2010 | Dupray |
| 2010/0234045 A1 | 9/2010 | Karr et al. |
| 2011/0244887 A1 | 10/2011 | Dupray |
| 2012/0058775 A1 | 3/2012 | Dupray et al. |
| 2012/0190380 A1 | 7/2012 | Dupray et al. |
| 2013/0281115 A1 | 10/2013 | Dupray et al. |
| 2013/0285855 A1 | 10/2013 | Dupray et al. |

FOREIGN PATENT DOCUMENTS

| | | |
|---|---|---|
| EP | 0546758 | 6/1993 |
| EP | 0592560 | 4/1994 |
| EP | 0689369 | 12/1995 |
| EP | 0748727 | 12/1996 |
| EP | 0762363 | 3/1997 |
| EP | 0781067 | 6/1997 |
| EP | 0810449 | 12/1997 |
| EP | 0811296 | 12/1997 |
| EP | 0860710 | 8/1998 |
| EP | 0870203 | 10/1998 |
| EP | 2541203 | 1/2013 |
| GB | 1605207 | 10/1983 |
| GB | 2155720 | 9/1985 |
| GB | 2180425 | 3/1987 |
| GB | 2291300 | 1/1996 |
| JP | 272258 | 6/1983 |
| JP | 62-284277 | 12/1987 |
| JP | 05-300081 | 11/1993 |
| JP | 06-003431 | 1/1994 |
| JP | 06-003433 | 1/1994 |
| JP | 06-066919 | 3/1994 |
| JP | 06-066920 | 3/1994 |
| JP | 06-148308 | 5/1994 |
| JP | 07-055912 | 3/1995 |
| JP | 08-184451 | 7/1996 |
| JP | 10-221106 | 8/1998 |
| JP | 11-064482 | 3/1999 |
| JP | 11-258325 | 9/1999 |
| JP | 11-289574 | 10/1999 |
| JP | 11-306491 | 11/1999 |
| WO | WO 92/02105 | 2/1992 |
| WO | WO 93/04453 | 3/1993 |
| WO | WO 94/01978 | 1/1994 |
| WO | WO 94/06221 | 3/1994 |
| WO | WO 94/11853 | 5/1994 |
| WO | WO 94/15412 | 7/1994 |
| WO | WO 94/27161 | 11/1994 |
| WO | WO 95/14335 | 5/1995 |
| WO | WO 95/18354 | 7/1995 |
| WO | WO 95/23981 | 9/1995 |
| WO | WO 96/14588 | 5/1996 |
| WO | WO 96/20542 | 7/1996 |
| WO | WO 97/01228 | 1/1997 |
| WO | WO 97/14054 | 4/1997 |
| WO | WO 97/22888 | 6/1997 |
| WO | WO 97/23785 | 7/1997 |
| WO | WO 97/24010 | 7/1997 |
| WO | WO 97/26750 | 7/1997 |
| WO | WO 97/28455 | 8/1997 |
| WO | WO 97/38326 | 10/1997 |
| WO | WO 97/38540 | 10/1997 |
| WO | WO 97/41654 | 11/1997 |
| WO | WO 98/00982 | 1/1998 |
| WO | WO 98/10307 | 3/1998 |
| WO | WO 98/25157 | 6/1998 |
| WO | WO 98/40837 | 9/1998 |
| WO | WO 01/44998 | 6/2001 |
| WO | WO 01/95642 | 12/2001 |
| WO | WO 02/065250 | 8/2002 |

OTHER PUBLICATIONS

U.S. Appl. No. 08/191,984, filed Feb. 4, 1994, Loomis.
U.S. Appl. No. 08/246,149, filed May 19, 1994, Lepkofker.
U.S. Appl. No. 08/355,901, filed Dec. 13, 1994, Schoen.
U.S. Appl. No. 60/017,269, filed May 13, 1996, Maloney.
U.S. Appl. No. 60/017,899, filed May 17, 1996, Maloney.
U.S. Appl. No. 60/035,691, filed Jan. 16, 1997, Maloney.
U.S. Appl. No. 60/038,037, filed Feb. 7, 1997, Christ.
U.S. Appl. No. 11/746,753, filed May 10, 2007, Dupray.
U.S. Appl. No. 13/843,204, filed Mar. 15, 2013, LeBlanc et al.
"A Unique Solution—Highway Master: Becoming the Mobile Communications System of Choice by Owner-Operators," Landline Magazine, Nov./Dec. 1994, pp. 30-32.
"A310/A300 Flight Management System Pilot's Guide," Honeywell, Inc., Dec. 1993, 441 pages.
"Argos: Basic Description of the Argos System," Argos, 7 pages, 1999.
"AVL FSD," OCS Technologies—DCP, Tampa Division, Jun. 10, 1993, 11 pages.
"AVL Markets: More Than Position Reporting," Phillips Business Information, Inc. Global Positioning & Navigation News, LexisNexis, Aug. 8, 1996, 3 pages.
"Finally, There is a Mobile Communication System for The Transportation Industry with a Real Ring to it," Highway Master Mobile Communication & Information Systems, 1993, 7 pages.
"GM Safety Technology," General Motors Corporation, 2000, 2 pages.
"Integrated software solutions for the criminal justice system," OCS Technologies Corporation, 1993, 4 pages.
"Location Systems and Technologies," 1994, Wireless Emergency Services JEM Report, Annex A pp. 42-46 and Appendix A pp. 1-2.
"Mid-Am installs voice communications," Milk & Liquid Food Transporter, May 1994, vol. 34(5), 1 page.
"Mid-America Dairymen Picks Highway Master," Refrigerated Transport, Mar. 1994, 1 page.
"Presenting the most advanced AVLS available," Magnavox Advanced Products and Systems Company, 1988, 6 pages.
"Services Beyond Airtime," Release concerning RadioCamera™, available at http:/www.uswcorp.com/laby.htm, printed Sep. 14, 1998, 10 pages.
"Successful test of satellite-based landing system may open new era in aircraft navigation," Business Editors/Aviation Writers, Oct. 19, 1994, 4 pages.
"The Measearch Engine Years: Fit the First," 1992, http://www.conman.org/people/spc/refs/search.hpl.html, pp. 1-3.
"TravTek Evaluation Plan," prepared by Farradyne Systems, Inc. for the Federal Highway Administration, Apr. 1991, 62 pages.
1990-91 Aviation System Capacity Plan, U.S. DOT and FAA, Dec. 1990, 323 pages.
AIM/FAR 1994: Airman's Information Manual / Federal Aviation Regulations, TAB AERO, Division of McGraw-Hill, 1994, pp. 89-91.
AJ Systems, "Final Report and GPS System Specification for Shipboard TACAN Replacement," submitted to Naval Air Development Center, Nov. 1991, 195 pages.
Antonio et al., "OmniTRACS: A Commercial Ku-Band Mobile Satellite Terminal and its Applicability to Military Mobile Terminals," IEEE Military Communications Conference, Oct. 1988, pp. 43.1.1-43.1.4.
Baldazo, "Navigating with a Web Compass: Quarterdeck Harnessess Leading-edge "Metasearch" Technology to Create a Smart Agent that Searches the Web and organizes the Results," BYTE, Mar. 1996, pp. 97-98.
Bass, Tim, "Intrusion Detection Systems and Multisensor Data Fusion: Creating Cyberspace Situational Awareness," Communications of the ACM, Apr. 2000, vol. 43, No. 4, pp. 100-105.
Beck et al., "Simulation Results on the Downlink of a Qualcomm-like DS-CDMA-System Over Multipath fading channels," Sep. 1994, pp. 1-7.

(56) References Cited

OTHER PUBLICATIONS

Beser, J. and B.W. Parkinson, "The Application of NAVSTAR Differential GPS in the Civilian Community," Navigation: Journal of the Institute of Navigation, Summer 1982, vol. 29(2), pp. 107-136.

Birkland, "Management Techniques: Track, Talk, Tell," Fleet Equipment, Jun. 1994, pp. 20-25.

Botafogo, "Cluster Analysis for Hypertext Systems," ACM-SIRIG, Jun. 1993, pp. 116-124.

Bowditch, N., The American Practical Navigator, Pub No. 9, 1995, pp. 174-175 and 187-188.

Bronson et al., "II-Morrow's Loran-C Based Vehicle Tracking System," Presented at NAV 85, Land Navigation and Location for Mobile Applications, Sep. 1985, 13 pages.

Brown, Henry E., "Navigation, Surveillance, and Communications Services within the Province of Ontario," Journal of The Institute of Navigation, vol. 35(4), Winter 1988-89, pp. 407-413.

Brumitt et al., "EasyLiving: Technologies for Intelligent Environments," 2000, pp. 1-12.

C.J. Driscoll & Associates, "Survey of Location Technologies to Support Mobile 9-1-1," Jul. 1994, 59 pages.

Caffery et al., "Overview of Radiolocation in CDMA Cellular Systems," IEEE Communications Magazine, Apr. 1998, pp. 38-45.

Caffery et al., "Radio Location in Urban CDMA Microcells," International Symposium on Personal, Indoor, and Mobil Radio Communications, Sep. 1995, 5 pages.

Caffery, J. et al., "Vehicle Location and Tracking for IVHS in CDMA Microcells," International Symposium on Personal, Indoor, and Mobile Radio Communications, Sep. 1994, pp. 1227-1231.

Callan, James P. et al., "Searching Distributed Collections With Inference Networks," 18th Annual International ACM SIGIR Conference on Research and Development in Information Retrieval, 1995.

Candler, "Tracking All Trucks: Many Companies are outfitting their fleets with advanced mobile communication technology," Nations Business, Dec. 1994, pp. 60-62.

Carroll, James V., "Availability Performance Comparisons of Combined Loran-C/GPS and Standalone GPS Approach Navigation Systems," IEEE Position Location and Navigation Symposium, Apr. 1994, pp. 77-83.

Carter et al., "Using Cellular Telephones for Automatic Vehicle Tracking," presented at NAV85, Land Navigation and Location for Mobile Applications, Sep. 1985, 10 pages.

Carter, David A., "Using Loran-C for Automatic Vehicle Monitoring," Journal of The Institute of Navigation, vol. 29(1), Spring 1982, pp. 80-88.

Cassidy, "Highway Master Goes Flat-Out in Communications Race," Transport Topics, Aug. 8, 1994, 2 pages.

Before the Federal Communications Commission, in the Matter of Revision of the Commission's Rules to Ensure Compatibility with Enhanced 911 Emergency Calling Systems; "Comments of Harris Government Communication Systems Division A Division of Harris Corporation," filed Sep. 25, 1996.

Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.

Before the Federal Communications Commission, in the Matter of Revision of the Commission's Rules to Ensure Compatibility with Enhanced 911 Emergency Calling Systems; "US West Comments," filed Jan. 9, 1995, 81 pages.

Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.

Before the Federal Communications Commission, in the Matter of Revision of the Commission's Rules to Ensure Compatibility with Enhanced 911 Emergency Calling Systems; ex parte communication from GeoTek Communications, Inc. received Apr. 14, 1997 by the Commission.

Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.

Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.

Before the Federal Communications Commission, in the Matter of Revision of the Commission's Rules to Ensure Compatibility with Enhanced 911 Emergency Calling Systems; ex parte communication from XYP0INT Corporation, Inc. received Jul. 28, 1997 by the Commission.

Cellular Community Bulletin: A report on wireless activities benefitting your constituents, "Cellular Technology used to Improve Truck Fleet Efficiency," Highway Master, Jan. 13, 1995, 1 page.

Chadwick, D. Jim, "Projected Navigation System Requirements for Intelligent Vehicle Highway Systems (IVHS)," The Institute of Navigation, Proceedings of ION GPS-94, Sep. 20-23, 1994, pp. 485-490.

Chambers et al., "A Comparison of Automatic Vehicle Tracking Systems," Journal of The Institute of Navigation, vol. 21(3), Fall 1974, pp. 208-222.

Chan et al., "Multipath Propagation Effects on a CDMA Cellular System," IEEE, 1994, pp. 848-855.

Cobb et al., "Precision Landing Tests with Improved Integrity Beacon Pseudolites," presented at ION GPS-95, Sep. 1995, 7 pages.

Comments of AT&T Corp., In the Matter of Revision of the Commission's Rules to Ensure Compatibility with Enhanced 911 Emergency Calling Systems, Jan. 9, 1995, 25 pages.

Comments of the Cellular Telecommunications Industry Association, In the Matter of Revision of the Commission's Rules to Ensure Compatibility with Enhanced 911 Emergency Calling Systems, Jan. 9, 1995, 26 pages.

Cortland, Laurence J., "Loran-C Vehicle Tracking in Detroit's Public Safety Dispatch System," Journal of The Institute of Navigation, vol. 36(3), Fall 1989, pp. 223-233.

Dailey, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.

Dailey, D.J., et al., "ITS Data Fusion," Final Research Report, Research Project T9903, Task 9, ATIS/ATMS Regional IVHS Demonstration, University of Washington, Apr. 1996.

Dartmouth College, "Soldiers, Agents and Wireless Networks: A Report on a Military Application," PAAM 2000.

Diesposti et al., "Benefits and Issues on the Integration of GPS with a Wireless Communications Link," 29th Annual Precise Time and Time Interval (PTTI) Meeting, Dec. 1997, pp. 391-398.

Douglas Vatier facsimile to Adam Hough re NC-25 GPS-Dead Reckoning Navigation System, Jan. 12, 1995, 7 pages.

Driscoll, "Wireless Caller Location Systems," GSP World Advanstar Communications, Inc., 1998, www.gpsworld.com/1198/1198driscol.html, pp. 1-8.

Dutta et al., "Modified Adaptive Multiuser Detector for DS-CDMA in Multipath Fading," Prior to Dec. 22, 1997, pp. 1-7.

E.J. Krakiwsky Telefax to Karl Poley at II Morrow, Inc. re Building a database of all existing Intelligent Vehicle Highway Systems (IVHS) navigation systems, Nov. 10, 1993, 3 pages.

E.J. Krakiwsky, "IVHS Navigation Systems DatabseTM," The University of Calgary, 1994, 6 pages.

(56) References Cited

OTHER PUBLICATIONS

E.O Frye, "GPS Signal Availability in Land Mobile Applications," Journal of The Institute of Navigation, vol. 36(3), Fall 1989, pp. 287-301.

Enge et al., "Combining Pseudoranges from GPS and Loran-C for Air Navigation," IEEE Position Location and Navigation Symposium, Mar. 1990, pp. 36-43.

Ergon Proprietary, "Performance Analyses Brief: Microminiature Emergency Locator Systems (MELS)," May 1996.

Evans, "New Satellites for Personal Communications," Scientific American, 1998, vol. 278(4), pp. 70-77.

FAA Advisory Circular 20-101C, "Airworthiness Approval of Omega/VLF Navigation Systems for Use in the U.S. National Airspace System (NAS) and Alaska," Sep. 12, 1988, 31 pages.

FAA Advisory Circular 20-121A, "Airworthiness Approval of Loran-C Navigation Systems for use in the U.S. National Airspace Systems (NAS) and Alaska," Aug. 24, 1988, 21 pages.

FAA Advisory Circular 20-130A, "Airworthiness Approval of Navigation or Flight Management Systems Integrating Multiple Navigation Sensors," Jun. 14, 1995, 50 pages.

FAA Advisory Circular 20-138, "Airworthiness Approval of Global Positioning System (GPS) Navigation Equipment for Use as a VFR and IFR Supplemental Navigation System," May 25, 1994, 33 pages.

FAA Advisory Circular 25-11, "Transport Category Airplane Electronic Display Systems," Jul. 17, 1987, 34 pages.

FAA Advisory Circular 25-15, "Approval of Flight Management Systems in Transport Category Airplanes," Nov. 20, 1989, 30 pages.

FAA Historical Chronology, 1926-1996, publication date unknown, 303 pages.

FAA, "ASR-9 System Field Maintenance," Operation Support, FAA, Nov. 2001, 410 pages.

Fechner et al., "A Hybrid Neural Network Architecture for Automatic Object Recognition," IEEE, 1994, pp. 187-194.

Federal Communications Commission, "Notice of Proposed Rule Making," In the Matter of Revision of the Commission's Rules to Ensure Compatibility with Enhanced 911 Emergency Calling Systems, released Oct. 19, 1994, 53 pages.

Federal Communications Commission, "Report and Order and Further Notice of Proposed Rulemaking," In the Matter of Revision of the Commission's Rules to Ensure Compatibility with Enhanced 911 Emergency Calling Systems, released Jul. 26, 1996, 98 pages.

Fernandez et al., "GPS Navigation Subsystem for Automatic Vehicle Location Systems," NAV 90, Land Navigation and Information Systems Conference, Sep. 18-20, 1990, 12 pages.

Frank, R.L., "Current Developments in Loran-C," Proceedings of the IEEE, Oct. 1983, vol. 71(10), pp. 1127-1142.

Freedman, A., The Computer Glossary: The Complete Illustrated Dictionary, 8th Edition, 1998, p. 177.

French et al., "A Comparison of IVHS Progress in the United States, Europe, and Japan," prepared by R.L. French & Associates, Dec. 31, 1998, 216 pages.

French, "The Evolving Roles of Vehicular Navigation," Journal of the Insitute of Navigation, Fall 1987, vol. 34(3), pp. 212-228.

French, R.L., "MAP Matching Origins Approaches and Applications," Proceedings of the Second International Symposium on Land Vehicle Navigation, Jul. 4-7, 1989, pp. 91-116.

Galijan et al., "Results of a Study Into the Utility of Carrier Phase GPS for Automated Highway Systems," The Institute of Navigation, Proceedings of ION GPS-94, Sep. 20-23, 1994, pp. 533-541.

Gallant, "Neural Network Learning and Expert Systems," The MIT Press, 1994, pp. 132-137.

Gaspard et al., "Position Assignment in Digital Cellular Mobile Radio Networks (e.g. GSM) derived from Measurements at the Protocol Interface," Prior to Dec. 27, 1997, pp. 1-5.

Giordano et al., "A Novel Location Based Service and Architecture," IEEE PIMRC '95, Sep. 1995, vol. 2, pp. 853-857.

Giordano et al., "Location Enhanced Cellular Information Services," 5th IEEE International Symposium on Personal, Indoor and Mobile Radio Communications, Sep. 18-23, 1994, pp. 1143-1145.

Gojanovich and Depaola, "The New Jersey Bell Network Proposal for Statewide Enhanced 9-1-1 Service," submitted on Nov. 20, 1989 to the Network Subcommittee of State of New Jersey 9-1-1 Commission, 34 pages.

Goldsmith et al., "A Measurement-Based Model for Predicting Coverage Areas of Urban Microcells," IEEE, 1993, pp. 1013-1023.

GPS World Newsletter, Apr. 11, 1994, pp. 1, 4.

GPS World Newsletter, Sep. 9, 1993, pp. 1, 4.

GPS World: News and Applications of the Global Positioning System, Intelligent Vehicles & Highways Special Supplement, Apr. 1994, 2 pages.

GPS World: News and Applications of the Global Positioning System, Jul. 1994, p. 57.

Harper, "Trucks Become 'Warehouses' for Inventory," The Wall Street Journal, Feb. 7, 1994, 1 page.

Highway Master Features & Benefits, Highway Master Mobile Communication & Information Systems, 1993, 2 pages.

Highway Master Features & Benefits, Highway Master Mobile Communication & Information Systems, 1995, 2 pages.

Highway Master Mobile Communication & Information Systems Fact Sheet, HighwayMaster Corp., Jan. 13, 1995, 2 pages.

Hills, "Terrestrial Wireless Networks," Scientific American, 1998, vol. 278(4), pp. 86-91.

Hojo et al., "Land-Mobile GPS Receiver," Proceedings of the 3rd International Technical Meeting of the Satellite Division of ION, Sep. 19-21, 1990, pp. 183-190.

Howe, D.A., "The Feasibility of Applying the Active TvTime System to Automatic Vehicle Location," Journal of the Institute of Navigation, vol. 21(1), Spring 1974, pp. 9-15.

Hunter et al., "Land Navigation and Fleet Management with GPS, Loran, and Dead Reckoning Sensors," IEEE Position Location and Navigation Symposium, Nov./Dec. 1988, pp. 54-60.

ICAO Circular, "Secondary Surveillance Radar Mode S Advisory Circular," Intl. Civil Aviation Org., Circular 174-AN/110, 1983, 44 pages.

Ichitsubo et al., "A Statistical Model for Microcellular Multipath Propagation Environment," Prior to Dec. 22, 1997, Wireless Systems Laboratories, pp. 1-6.

II Morrow, Inc. Press Release, "II Morrow's VTS finds new application," II Morrow, Inc., Oct. 13, 1986, 2 pages.

II Morrow, Inc. Press Release, "Kern County Adds Eyes," II Morrow, Inc., Mar. 10, 1986, 8 pages.

II Morrow, Inc. Press Release, "Los Alamos selects II Morrow's VTS," II Morrow, Inc., Sep. 9, 1986, 1 page.

II Morrow, Inc. Press Release, "Pinellas County Florida Chooses II Morrow," II Morrow, Inc., Sep. 4, 1986, 2 pages.

II Morrow, Inc. Press Release, "Punta Gorda Florida Adds Police Car Tracking System," II Morrow, Inc., Aug. 28, 1986, 2 pages.

II Morrow, Inc., "Fleet Management Solutions with GPS Technology," 1995, 2 pages.

II Morrow, Inc., "Maps are custom built using accurate government data!" 1985, 7 pages.

II Morrow, Inc., "The vision to take fleet management one step further," 1992, 8 pages.

II Morrow, Inc., "Vehicle Tracking System References," 1986, 6 pages.

Inman et al., "TravTek Evaluation Rental and Local User Study," U.S. Dept. of Transportation and Federal Highway Administration, Mar. 1996, 105 pages.

Inman et al., "TravTek Evaluation Yoked Driver Study," U.S. Dept. of Transportation and Federal Highway Administration, Oct. 1995, 101 pages.

Inman et al., "Trav-Tek System Architecture Evaluation," U.S. Dept. of Transportation and Federal Highway Administration, Jul. 1995, 156 pages.

Ishikawa et al., "Proposal of High Accuracy Positioning Service for Terrestrial Mobile Communication Systems by Using GPS Satellites," 1993, pp. 363-372.

Iwayama et al., "Cluster-Based Text Categorization: A Comparison of Category Search Strategies," ACM-SIGIR, 1995, pp. 273-279.

James Hume Facsimile to Jim McClellan re Sale of Magnavox Electronic Systems Co., Jul. 27, 1993, 2 pages.

(56) References Cited

OTHER PUBLICATIONS

Johnson, "Smart Technology Busting Out All Over Web," Electronic Engineering Times, Jun. 15, 1998, vol. 1012, pp. 1-6.
Juneja et al., "Location Services Using Cellular Digital Packet Data," 1996 IEEE Intl. Conference on Personal Wireless Communications, Feb. 1996, pp. 222-226.
Junius et al., "New Methods for Processing GSM Radio Measurement Data: Applications for Locating, Handover, and Network Management," Communication Network, 1994, Aachen University of Technology, pp. 338-342.
Junius et al., "New Methods for Processing GSM Radio Measurement Data: Applications for Locating, Handover, and Network Management," IEEE Vehicular Technology Conference, Jun. 1994, pp. 338-342.
Kaplan, E., "Understanding GPS: Principles and Applications," Artech House, 1996, 288 pages.
Kennedy et al., "Direction Finding and 'Smart Antennas' Using Software Radio Architectures," IEEE Communications Magazine, May 1995, pp. 62-68.
Kennemann, Olrik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.
Kerr, T., "Decentralized Filtering and Redundancy Management for Multisensor Navigation," IEEE Transactions on Aerospace and Electronic Systems, Jan. 1987, vol. AES-23(1), pp. 83-119.
Klass, Philip, "Industry Devisin GPS Receiver with Hyrid Navigation Adis," Avionics, Dec. 14, 1987, p. 121.
Koshima et al., "Personal locator services emerge," IEEE Spectrum, Feb. 2000, pp. 41-48.
Kosko, "Fuzzy Systems as Universal Approximators," IEEE, 1994, pp. 1329-1333.
Kugler et al., "Combined Use of GPS and Loran-C in Integrated Navigation Systems," IEEE, Satellite Systems for Mobile Communications and Navigation, May 13-15, 1996, pp. 7-11.
Kugler et al., "Combined Use of GPS and Loran-C in Integrated Navigation Systems," IEEE, Satellite Systems for Mobile Communications and Navigation, May 1996, pp. 161-168.
Lachapelle et al., "Analysis of GPS and Loran-C Performance for Land Vehicle Navigation in the Canadian Rockies," IEEE Aerospace and Electronic Systems Magazine, vol. 7(5), May 1992, pp. 504-508.
Lachapelle et al., "Analysis of Loran-C Performance in the Pemberton Area, B.C.," Canadian Aeronautics and Space Journal, vol. 28(2), Jun. 1992, pp. 52-61.
Lachapelle et al., "GPS/Loran-C: An Effective System Mix for Vehicular Navigation in Mountainous Areas," Navigation: Journal of the Institute of Navigation, vol. 40(1), Spring 1993, pp. 19-34.
Lappin, "Truckin," Wired, Jan. 1995, 6 pages.
Lawrence et al., "Northern Light Search Engine Leads the Pack—Others Fall Behind," Online Newsletter, May 1, 1998, vol. 19(5), pp. 1-2.
Lee et al., "Minimizing Position Error in a Car Navigation System by Using GPS and Dead-Reckoning," Journal of the Korean Society for Geospatial Information System, 1994, pp. 81-88.
Lee, "Trucking Takes the High Tech Road," Radio Resource Magazine, Jan./Feb. 1994, 9 pages.
Lee, W. C. Y., Mobile Cellular Communications, 2nd Ed., McGraw-Hill, 1995, 673 pages.
Loran, "Users Handbook 1992 Edition," U.S. Coast Guard, Radionavigation Division, 1992, 28 pages.
Low, "Comparison of Urban Propagation Models with CW-Measurements," IEEE Deutsche Bundespost Telekom, 1992, pp. 936-942.
Lt. Gene Norden, Irvine Police Department, Vehicle Tracking System, 1986, 3 pages.
Machalaba, "Long Haul: Trucking Firms Face Driver Shortage, Idling Some Rigs and Causing Delays for Shippers," The Wall Street Journal, Dec. 28, 1993, 2 pages.
Mammano et al., "Pathfinder System Design," First Vehicle Navigation & Information Systems Conference, Sep. 1989, pp. 484-488.
Marcelo, "Vehicle location system serves public safety agencies," Mobile Radio Technology, vol. 4(12), Dec. 1986, 5 pages.
Mardiraju et al., "Neural Networks for Robust Image Feature Classification: A Comparative Study," IEEE, 1994, pp. 423-430.
Meadow, "Text Information Retrieval Systems," Academic Press, 1992, pp. 204-209.
Maturino-Lozoya et al., "Pattern Recognition Techniques in Handoff and Service Area Determination," IEEE Vehicular Technology Conference, Jun. 1994, pp. 96-100.
Mele, "Mid-America Dairymen: Proves That it Pays—Committee approach finds cost justification for cellular system," Fleet Owner, 1994, 1 page.
Merriam Webster's Desk Dictionary, 3rd Edition, Merriam-Webster, Inc., 1995, p. 274.
Miller, RT, et al., "Protein fold recognition by sequence threading: tools and assessment techniques," Journal Announcement, Department of Biochemistry and Molecular Biology, University College, London, United Kingdom, Jan. 1996, 1 page.
Morris et al., "Omega Navigation System Course Book," National Technical Information Service of Springfield, Virginia, Jul. 1994, 60 pages.
Mynatt et al., "Designing Audio Aura," published in CHI '98 Conference Proceedings, 1998.
National Training Center Rotation—In the Field, The National Training Center Matures 1985-1995, pp. 181-225.
Ndili, Awele, "GPS Pseudolite Signal Design," The Institute of Navigation, Presented at ION-GPS-94, Sep. 1994, 8 pages.
Newton, "The Near-Term Potential of Doppler Location," John Hopkins APL Technical Digest, 1981, pp. 16-31.
Newton, H., Newton's Telecom Dictionary, 12th Edition, Feb. 1997, pp. 80, 154-155, 294-295, 381-383, 417, 612-613, 651, 655-657, 727-728.
Nicholas Flaskay OCS Technologies letter to Edward J. Krakiwsky re Automatic Vehicle Location product, Aug. 11, 1993, 2 pages.
Noh, Jac-Scon, "Position Location by Integration of GPS Receiver and Dead Reckoning Sensors," International Journal of Precision Engineering Korea, 1996, pp. 443-447.
Notess, "Internet Search Engine Update," Online, Jul. 1, 1998, vol. v22:nr, pp. 1-3.
Okawa et al., "PLRS Development Testing," IEEE AES Magazine, 1988, vol. 3(8), pp. 10-15.
Orphanoudakis, C.E. et al., "I2 Cnet: Content-Based Similarity Search in Geographically Distributed Repositories of Medical Images," Computerized Medical Imaging and Graphics, 1996, vol. 20(4), pp. 193-207.
Parish, "Case Studies of market Research for Three Transportation Communication Products," U.S. Department of Transportation Research and Special Programs Administration, Mar. 1994, 70 pages.
Parviainen et al., "Mobile Information Systems Impact Study," Ontario Ministry of Transportation, Aug. 1988, 236 pages.
Pelton, "Telecommunications for the 21st Century," Scientific American, 1998, vol. 278(4), pp. 80-85.
Perlstein et al., "Designing and implementing automatic vehicle location," Mobile Radio Technology, Jan. 1989, 6 pages.
Perlstein, "Automatic Vehicle Location Systems: A Tool for Computer Aided Despatch Systems of the Future," IEEE, 1989, pp. 186-193.
Perry, Tekla S., "In Search of the Future of Air Traffic Control," IEEE Spectrum, Aug. 1997, pp. 18-35.
Peterson et al., "Evaluation of Radionavigation Systems in an Urban Environment," Proceedings of The Institute of Navigation 1995 National Technical Meeting, Jan. 18-20, 1995, pp. 293-302.
Pilley et al., "Airport Navigation and Surveillance Using GPS and ADS," Institute of Navigation, ION GPS-91, Sep. 12, 1991, pp. 363-371.
Pop et al., "Site Engineering for Indoor Wireless Spread Spectrum Communications," Jun. 2001, 3 pages.
Post, Kendall E., "Real-Time Linear Ensemble Averaging LORAN Receiver Architecture," The Institute of Navigation, Proceedings of the 45th Annual Meeting, Jun. 1989, pp. 67-75.

(56) References Cited

OTHER PUBLICATIONS

Powell, C., "The Decca Navigator system for ship and aircraft use," Proceedings of the IEEE, Part B: Radio and Electronic Engineering, Mar. 1958, vol. 105(9), pp. 225-234.

Press Release re Benefits of the HighwayMaster Mobile Communication and Information System, Highway Master Mobile Communication & Information Systems, Dec. 16, 1994, 2 pages.

Press Release re Bill Saunders named HighwayMaster Corp. Chief Executive Officer, Highway Master Mobile Communication & Information Systems, Jan. 13, 1995, 2 pages.

Press Release re Bill Saunders to speak at the Cellular Telecommunications Industry Conference regarding the New Frontier: Wireless Data Applications, Highway Master Mobile Communication & Information Systems, Jan. 11, 1995, 2 pages.

Press Release re Global Positioning System (Satellite) vehicle location tracking is now available with the HighwayMaster Mobile Communication and Information System, Highway Master Mobile Communication & Information Systems, Jan. 6, 1995, 4 pages.

Press Release re Gordon Quick named HighwayMaster Corp., Chief Operating Officer, Highway Master Mobile Communication & Information Systems, Jan. 12, 1995, 2 pages.

Press Release, "Lafayette Parish adds Vehicle Tracking," II Morrow, Inc., Sep. 8, 1986, 2 pages.

Private Pilot Manual, Jeppesen Sanderson, 1988, pp. 2-32, 2-52.

Ramanathan et al., "A Survey of Routing Techniques for Mobile Communications Networks," Mobile Networks and Applications, Oct. 1996, vol. 1(2), pp. 1-31.

Rappaport et al., "Position Location Using Wireless Communications on Highways of the Future," IEEE Communications Magazine, Oct. 1996, pp. 33-41.

Riley et al., "Vehicle Tracking System for Salem, Oregon Police Department," The Institute of Navigation Proceedings of the National Technical Meeting, Jan. 21-23, 1986, pp. 89-94.

Rizzo et al., "Integration of Location Services in the Open Distributed Office," Technical Report 14-94, Computing Laboratory, University of Kent, Cantebury, United Kingdom, Aug. 1994, pp. 1-14.

Romano, "Traffic Fatalities Show Drop," The New York Times, Feb. 3, 1991, 2 pages.

Rothblatt, Martin, "The First GPS Satellite Radio Optimized for Automatic Vehicle Location," Proceedings of the 47th Annual Meeting of The Institute of Navigation, Jun. 1991, pp. 261-263.

Salcic, "AGPCS—An Automatic GSM-based Positioning and Communication System," Proceedings of GeoComputation 1997 & SIRC 1997, Aug. 1997, pp. 15-22.

Saldin et al., "Magnavox Automatic Vehicle Location Pilot System for the Toronto Department of Ambulance Services," IEE Vehicle Navigation & Information Systems Conference, Sep. 11-13, 1989, pp. 194-201.

Santo, Brian, "Enables Reliable Autopilot Aircraft Touchdowns—Landing system based on GPS," Electronic Engineering Times, Nov. 14, 1994, 3 pages.

Schlachta et al., "Interoperability versus Integration of Omega and GPS," The Journal of Navigation, vol. 43(2), May 1990, pp. 229-237.

Schopp, Michael, "User Modelling and Performance Evaluation of Distributed Location Management for Personal Communications Services," Proceedings of the 15th International Teletraffic Congress (ITC) 15, Washington, D.C., 1997, S. 23-34.

Sena, "Computer-aided dispatching: digital maps aid emergency response and fleet management," Computer Graphics World, May 1990, vol. 13(5), pp. 34-42.

Skoblicki, "Automatic Vehicle Location (AVL) Using GPS Enhance Dead Reckoning," International Conference on Vehicle Navigation & Information Systems, Oct. 22, 1991, 9 pages.

Smith, Jr., "Passive Location of Mobile Cellular Telephone Terminals," IEEE, CH3031-2/91/0000-0221, 1991, pp. 221-225.

Sousa et al., "Delay Spread Measurements for the Digital Cellular Channel in Toronto," IEEE, 1994, pp. 837-847.

Stansell, T.A., "Civil GPS from a Future Perspective," Proceedings of the IEEE, Oct. 1983, vol. 71(10), pp. 1187-1192.

Stein et al., "Pseudolite-Aided GPS: a Comparison," IEEE Position, Location, and Navigation Symposium, 1988, pp. 329-333.

Stewart, John M., "Vehicle Location and Position Monitoring System Using Satellite Navigation and Cellular Telephone," Jun. 1993, 15 pages.

Striglis et al., "A Multistage RAKE Receiver for Improved Capacity of CDMA Systems," IEEE Vehicular Technology Conference, 1994, pp. 1-5.

Stutzmann et al., "Moving Beyond Wireless Voice Systems," Scientific American, 1998, vol. 278(4), pp. 92-93.

Swanson et al., "The Omega Navigation System," Navigation, Spring 1965, vol. 12(1), pp. 24-35.

Tanabe et al., "Experimental Validation of GPS-INS-STAR Hybrid Navigation System for Space Autonomy," Acta Astronautica, vol. 21(5), 1990, pp. 295-308.

Taylor, "TravTek—Information and Services Center," Vehicle Navigation & Information Systems Conference Proceedings, Oct. 1991, 12 pages.

The American Heritage College Dictionary, 3rd Edition, Houghton Mifflin Co., 1993, p. 485.

The Intelligent Highway, European Transport Telematics Update, vol. 4(18), Mar. 18, 1994, 3 pages.

The New Shorter Oxford English Dictionary, 4th Edition, Oxford University Press, 1993, p. 894.

Thrall, "Advantages of Interoperability to the Prudent Navigator," Proceedings of the 48th Annual Meeting of The Institute of Navigation, Dayton, OH, Jun. 1992, pp. 47-50.

TR45 Emergency Services Joints Experts Meeting Report, Telecommunications Industry Association, Aug. 28, 1994, 25 pages.

Trimble FleetVision, Land Navigation and Information Systems, Presented at 1990 Conference of the Royal Institute of Naviation, Warwick 1990, 8 pages.

Van Aerde et al., "TravTek Evaluation Modeling Study," U.S. Dept. of Transportation and Federal Highway Administration, Mar. 1996, 134 pages.

Van Graas et al., "Multisensor Signal Processing Techniques (Hybrid GPS/LORAN-C with RAIM)," U.S. Dept. of Transportation and Federal Aviation Administration, Sep. 1991, 95 pages.

Van Graas, "Hybrid GPS/Loran-C: A Next-Generation of Sole Means Air Navigation," Dissertation presented to the faculty of the College of Engineering and Technology of Ohio University, Ohio University Library, Nov. 1988, 185 pages.

Van Willigen et al., "Eurofix: GNSS Augmented Loran-C & Loran-C Augmented GNSS," Proceedings of the 1995 National Technical Meeting of The Institute of Navigation, Jan. 18-20, 1995, pp. 337-344.

Waid et al., "Relative GPS Using DME/TACAN Data Link," The Institute of Navigation, Proceedings of ION GPS-94, Sep. 20-23, 1994, pp. 851-861.

Wang Baldonado et al., "SenseMaker: An Information-Exploration Interface Supporting the Contextual Evolution of a User's Interests," ACM-CHI, 1997, pp. 11-18.

Weiss et al., "HyPursuit: A Hierarcical Network Search Engine that Exploits Content-Link Hypertext Clustering," Hypertext, 1996, pp. 180-193.

Weseman, John F., "Loran-C: Present and Future," Journal of The Institute of Navigation, vol. 29(1), Spring 1982, pp. 7-21.

Whitcomb, "Using Low Cost Magnetic Sensors on Magnetically Hostile Land Vehicles," IEEE Plans, Nov. 29-Dec. 2, 1988, pp. 34-35.

Widnall, W.S., "JTIDS Relative Navigation With Measurement Sharing: Design and Performance," IEEE Transactions on Aerospace and Electronic Systems, Mar. 1986, vol. AES-22(2), pp. 146-154.

Wilson, Jr., et al., "A Lagrangian Drifter with Inexpensive Wide Area Differential GPS Positioning," Oceans 96 MTS/IEEE Conference Proceedings, Sep. 1996, pp. 851-856.

Winick, A.B. and D.M. Brandewie, "VOR/DME System Improvements," Proceedings of the IEEE, Mar. 1970, vol. 58(3), pp. 430-437.

Wittenben et al., "A Low Cost Noncoherent Receiver with Adaptive Antenna Combining for High Speed Wireless Lans," Prior to Dec. 22, 1997, ASCOM Systec AG, pp. 1-4.

(56) References Cited

OTHER PUBLICATIONS

Wolfle et al., "Field Strength Prediction in Indoor Environments with Neural Networks," Prior to Dec. 22, 1997, pp. 1-5.
Wylie et al., "The Non-Line of Sight Problem in Mobile Location Estimation," Proc. IEEE ICUPC, Cambridge, Mass, USA, Sep.-Oct. 1996, vol. 2, pp. 827-831.
Communication from U.S. Patent and Trademark Office, Re: U.S. Appl. No. 08/355,901, Advisory Action, dated: Aug. 11, 1998.
Communication from U.S. Patent and Trademark Office, Re: U.S. Appl. No. 08/355,901, Advisory Action, dated: Nov. 4, 1998.
Communication from U.S. Patent and Trademark Office, Re: U.S. Appl. No. 08/355,901, Advisory Action, dated: Oct. 9, 1998.
Communication from U.S. Patent and Trademark Office, Re: U.S. Appl. No. 08/355,901, Advisory Action, dated: Sep. 9, 1998.
Communication from U.S. Patent and Trademark Office, Re: U.S. Appl. No. 08/355,901, Examiner Interview Summary Record, dated: Aug. 13, 1996.
Communication from U.S. Patent and Trademark Office, Re: U.S. Appl. No. 08/355,901, Office Action Summary, dated: Jun. 24, 1998.
Communication from U.S. Patent and Trademark Office, Re: U.S. Appl. No. 08/355,901, Office Action Summary, dated: Mar. 14, 1997.
Communication from U.S. Patent and Trademark Office, Re: U.S. Appl. No. 08/355,901, Office Action Summary, dated: Mar. 17, 1998.
Communication from U.S. Patent and Trademark Office, Re: U.S. Appl. No. 08/355,901, 1996.
Communication from U.S. Patent and Trademark Office, Re: U.S. Appl. No. 08/355,901, Response from Examiner regarding communication filed Dec. 26, 1995, dated Jul. 23, 1996.
Official Action for U.S. Appl. No. 09/820,584, mailed Jan. 4, 2002.
Notice of Allowance for U.S. Appl. No. 09/820,584, mailed Jul. 29, 2002.
Notice of Allowance for U.S. Appl. No. 09/820,584, mailed Dec. 18, 2002.
Notice of Allowance for U.S. Appl. No. 09/820,584, mailed Jan. 7, 2003.
Notice of Allowance for U.S. Appl. No. 09/820,584, mailed May 30, 2003.
Notice of Allowance for U.S. Appl. No. 09/820,584, mailed Oct. 10, 2003.
Official Action for U.S. Appl. No. 09/820,584, mailed Mar. 8, 2004.
Official Action for U.S. Appl. No. 09/820,584, mailed Oct. 21, 2004.
Official Action for U.S. Appl. No. 11/069,441, mailed Oct. 10, 2006.
Official Action for U.S. Appl. No. 11/069,441, mailed Jul. 7, 2007.
Official Action for U.S. Appl. No. 11/069,441, mailed Mar. 6, 2008.
Notice of Allowance for U.S. Appl. No. 11/069,441, mailed Sep. 26, 2008.
Official Action for U.S. Appl. No. 11/069,441, mailed Mar. 5, 2009.
Notice of Allowance for U.S. Appl. No. 11/069,441, mailed Sep. 4, 2009.
Notice of Allowance for U.S. Appl. No. 11/069,441, mailed Feb. 5, 2010.
Notice of Allowance for U.S. Appl. No. 11/069,441, mailed Aug. 18, 5, 2010.
Official Action for U.S. Appl. No. 12/861,817, mailed Oct. 26, 2011.
Official Action for U.S. Appl. No. 12/861,817, mailed Oct. 1, 2012.
Official Action for U.S. Appl. No. 12/861,817, mailed Sep. 10, 2013.
"GPS Interface Control Document ICD-GPS-200," IRN-200B-PR001, Jul. 1, 1992 revision, reprinted Feb. 1995, 109 pages.
Boucher, Neil J., "Cellular Radio Handbook," Quantum Publishing, 1990, 91 pages.
Marshall, Catherin R., "The U S West Intelligent Services Research Laboratory," CHI '90 Proceedings, Apr. 1990, pp. 383-384.
Parkinson, B.W. and P. Axelrad, eds., "Global Positioning System: Theory and Applications," vol. 163 Progress in Astronautics and Aeronautics, AIAA, 1996, 236 pages.
Parkinson, Bradford W. and James Spilker, Jr., eds., "Global Positioning System: Theory and Applications," vol. 164 Progress in Astronautics and Aeronautics, AIAA, 1996, 221 pages.
Complaint for Declaratory Judgment and Jury Demand filed Sep. 27, 2011, in the United States District Court for the District of Colorado at Case No. 11-cv-02519-WYD-MJW, 9 pages.
Defendant TracBeam, L.L.C.'s Motion to Dismiss Under Fed. R. Civ. P. 12(b)(1) filed Oct. 24, 2011, in the United States District Court for the District of Colorado at Case No. 11-cv-02519-WYD-MJW, including exhibits, 87 pages.
Plaintiff Telecommunication Systems, Inc.'s Opposition to Defendant TracBeam, L.L.C.'s Motion to Dismiss under Fed. R. Civ. P. 12(b)(1) filed Nov. 15, 2011, in the United States District Court for the District of Colorado at Case No. 11-cv-02519-WYD-MJW, 14 pages.
Declaration of Sid V. Pandit in Support of Plaintiff Telecommunication Systems, Inc.'s Opposition to Defendant TracBeam, L.L.C.'s Motion to Dismiss Under Fed. R. Civ. P. 12(b)(I) filed Nov. 15, 2011, in the United States District Court for the District of Colorado at Case No. 11-cv-02519-WYD-MJW, 60 pages.
Defendants' First Set of Common Interrogatories to Plaintiff, filed in Case No. 6:11-cv-00096-LED, U.S. District Court for the Eastern District of Texas, Tyler Division, on Nov. 2, 2011, 20 pages.
Plaintiff TracBeam, L.L.C.'s Disclosure of Asserted Claims and Infringement Contentions under Patent Rule 3-1 filed in Case No. 6:11-cv-00096-LED, U.S. District Court for the Eastern District of Texas, Tyler Division, Sep. 16, 2011, 8 pages.
Plaintiff's Responses to Defendants' First Set of Common Interrogatories filed in Case No. 6:11-cv-00096-LED, U.S. District Court for the Eastern District of Texas, Marshall Division, on Dec. 5, 2011, 21 pages.
Appendices A and B to TracBeam's Objections and Responses to Defendants' First Set of Common Interrogatories, filed in Case No. 6:11-cv-00096-LED, U.S. District Court for the Eastern District of Texas, Marshall Division, Dec. 5, 2011, 118.
Defendants' Invalidity Contentions, filed in the United States District Court for the Eastern District of Texas, Tyler Division, at Case No. 6:11-cv-00096-LED, on Dec. 16, 2011, including Appendices A-Q and Exhibits 1-18.
Plaintiff TracBeam, L.L.C.'s Disclosure of Asserted Claims and Infringement Contentions under Patent Rule 3-1 to Location Labs filed Case No. 6:11-cv-00096-LED, U.S. District Court for the Eastern District of Texas, Tyler Division, on Mar. 16, 2012, 8 pages.
Order Denying Motion to Dismiss issued by the United States District Court for the Eastern District of Texas, Tyler Division at Case No. 6:11-cv-96, on Mar. 27, 2012, 6 pages.
Plaintiff TracBeam, L.L.C.'s Motion to Strike Portions of Defendants' Invalidity Contentions, filed in the United States District Court for the Eastern District of Texas, Tyler Division, at Case No. 6:11-cv-00096-LED, on Apr. 6, 2012, 17 pages.
Intervenor Location Labs' Motion to Dismiss TracBeam's Allegations for Failure to State A Claim for Willful Infringement, filed in the United States District Court for the Eastern District of Texas, Tyler Division, at Case No. 6:11-cv-00096-LED, on Apr. 9, 2012, 18 pages.
Defendant AT&T Inc.'s Answer to Plaintiff's First Amended Complaint for Patent Infringement, filed in the United States District Court for the Eastern District of Texas, Tyler Division, at Case No. 6:11-cv-00096-LED, on Apr. 10, 2012, 15 pages.
Defendant AT&T Mobility LLC's Answer and Counterclaims to Plaintiff's First Amended Complaint for Patent Infringement, filed in the United States District Court for the Eastern District of Texas, Tyler Division, at Case No. 6:11-cv-00096-LED, on Apr. 10, 2012, 19 pages.
Defendants' Supplemental Invalidity Contentions, filed in the United States District Court for the Eastern District of Texas, Tyler Division, at Case No. 6:11-cv-00096-LED, on Apr. 17, 2012, with Exhibits 19-23, 837 pages.
Defendant Cellco Partnership's Answer to First Amended Complaint and Demand for Jury Trial, filed in the United States District Court for the Eastern District of Texas, Tyler Division, at Case No. 6:11-cv-00096-LED, on Apr. 10, 2012, 19 pages.

(56) References Cited

OTHER PUBLICATIONS

Defendant Cellco Partnership's Motion to Strike Plaintiff's Infringement Contentions, filed in the United States District Court for the Eastern District of Texas, Tyler Division, at Case No. 6:11-cv-00096-LED, on Apr. 19, 2012, 23 pages.
Declaration of Martin M. Noonen in Support of Defendant Cellco Partnership's Motion to Strike Plaintiff's Infringement Contentions filed in the United States District Court for the Eastern District of Texas, Tyler Division, at Case No. 6:11-cv-00096-LED, on Apr. 19, 2012, with Exhibits 1-13, 268 pages.
Defendant Google's Motion to Sever, filed in the United States District Court for the Eastern District of Texas, Tyler Division, at Case No. 6:11-cv-00096-LED, on Apr. 17, 2012, 21 pages.
Declaration of Christopher Schenck in Support of Defendant Google, Inc.'s Motion to Sever, filed in the United States District Court for the Eastern District of Texas, Tyler Division, at Case No. 6:11-cv-00096-LED, on Apr. 17, 2012, with Exhibits A-M, 137 pages.
Defendants' Opposition to Plaintiff's Motion to Strike Portions of Defendants' Invalidity Contentions, filed in the United States District Court for the Eastern District of Texas, Tyler Division, at Case No. 6:11-cv-00096-LED, on Apr. 23, 2012, with Exhibits A-E, 844 pages.
Consolidated Defendant's Invalidity Contentions, filed in the United States District Court for the Eastern District of Texas, Tyler Division, at Case No. 6:11-cv-00096-LED, on May 1, 2012, with Appendices A-Q and Exhibits 1-23, 3988 pages.
Location Labs' Patent Local Rule 3-3 Invalidity Contentions, filed in the United States District Court for the Eastern District of Texas, Tyler Division, at Case No. 6:11-cv-00096-LED, on Apr. 30, 2012, with Appendices A-Q and Exhibits 1-23, 4067 pages.
Location Labs' Preliminary Proposed Claim Constructions [Pursuant to Ed. Tex. Patent Rule 4.2], filed in the United States District Court for the Eastern District of Texas, Tyler Division, at Case No. 6:11-cv-00096-LED, on Jun. 18, 2012, with Exhibits A, 14 pages.
The Carrier Defendants' Preliminary Proposed Constructions and Identification of Extrinsic Evidence [Patent Rule 4-2], filed in the United States District Court for the Eastern District of Texas, Tyler Division, at Case No. 6:11-cv-00096-LED, on Jun. 18, 2012, 29 pages.
Defendant Google, Inc.'s Preliminary Proposed Constructions and Identification of Extrinsic Evidence [Patent Rule 4-2], filed in the United States District Court for the Eastern District of Texas, Tyler Division, at Case No. 6:11-cv-00096-LED, on Jun. 18, 2012, with Exhibits A-B, 24 pages.
Defendants' Motion for Partial Summary Judgment of Invalidity Based on Indefiniteness filed in the United States District Court for the Eastern District of Texas, Tyler Division, at Case No. 6:11-cv-00096-LED, on Sep. 25, 2012, 22 pages.
Declaration of Jon V. Swenson in Support of Defendants' Motion for Partial Summary Judgment of Invalidity Based on Indefiniteness filed in the United States District Court for the Eastern District of Texas, Tyler Division, at Case No. 6:11-cv-00096-LED, on Sep. 25, 2012, 22 pages.
Defendants' Responsive Claim Construction Brief filed in the United States District Court for the Eastern District of Texas, Tyler Division, at Case Nos. 6:11-cv-00096-LED and 6:12-cv-00058-LED, on Oct. 4, 2012, 58 pages.
Declaration of Jon V. Swenson in Support of Defendants' Responsive Claim Construction Brief filed in the United States District Court for the Eastern District of Texas, Tyler Division, at Case Nos. 6:11-cv-00096-LED and 6:12-cv-00058-LED, on Oct. 4, 2012, 202 pages.
Declaration of Vijay K. Madisetti, Ph.D. In Support of Defendants' Responsive Claim Construction Brief filed in the United States District Court for the Eastern District of Texas, Tyler Division, at Case Nos. 6:11-cv-00096-LED and 6:12-cv-00058-LED, on Oct. 4, 2012, 192 pages.
Defendants' Supplemental Invalidity Contentions with Exhibits A-Q filed in Case Nos. 6:11-cv-00096-LED, U.S. District Court for the Eastern District of Texas, Tyler Division, on Nov. 1, 2012, 535 pages.
Memorandum Opinion and Order ("Markman Order") issued in Case No. 6:11-cv-00096-LED by the United States District Court for the Eastern District of Texas, Tyler Division, on Jan. 23, 2013, 39 pages.
Plaintiff TracBeam's Second Supplemental Response to Defendants' Common Interrogatory Nos. 2 filed in Case Nos. 6:11-cv-00096-LED and 6:13-cv-00093-LED, U.S. District Court for the Eastern District of Texas, Tyler Division, May 21, 2013, 25 pages.
Report of William Michelson, Ph.D., Concerning Validity of Claims 1, 7, 25, 106, and 215 of U.S. Pat. No. 7,764,231 and Claims 51, 56, and 67 of U.S. Pat. No. 7,525,484 dated May 24, 2013, 379 pages.
Expert Report of The Honorable Gerald J. Mossinghoff dated May 24, 2013, 32 pages.
Supplemental Report of William Michelson, Ph.D., Concerning the Invalidity of U.S. Pat. No. 7,764,231 and U.S. Pat. No. 7,525,484 for Improper Inventorship dated Jun. 7, 2013, 13 pages.
Supplemental Expert Report of Michael S. Braasch Regarding Invalidity of Asserted Claims of U.S. Pat. No. 7,764,231 and U.S. Pat. No. 7,525,484 for Improper Inventorship dated Jun. 7, 2013, 31 pages.
Deposition of Dennis Dupray held in Case Nos. 6:11-cv-00096-LED and 6:13-cv-00093-LED, U.S. District Court for the Eastern District of Texas, Tyler Division, Feb. 20, 2013, 225 pages.
Deposition of Charles Karr held in Case No. 6:11-cv-00096-LED, U.S. District Court for the Eastern District of Texas, Marshall Division, Mar. 12, 2013, 243 pages.
Mateja, Jim, "Cadillac Offers a High-tech Guardian Angel," Chicago Tribune, Apr. 21, 1996, 4 pages.
Deposition of Frederick Warren LeBlanc (Redacted) held in Case No. 6:11-cv-00096-LED, U.S. District Court for the Eastern District of Texas, Marshall Division, Mar. 13, 2013, 125 pages.
Deposition of Dennis Dupray (Redacted vol. I) held in Case Nos. 6:11-cv-00096-LED and 6:13-cv-00093-LED, U.S. District Court for the Eastern District of Texas, Tyler Division, Feb. 20, 2013, 225 pages.
Deposition of Dennis Dupray (Redacted vol. II) held in Case Nos. 6:11-cv-00096-LED and 6:13-cv-00093-LED, U.S. District Court for the Eastern District of Texas, Tyler Division, Feb. 21, 2013, 100 pages.
Deposition of Dennis Dupray (Redacted vol. III) held in Case Nos. 6:11-cv-00096-LED and 6:13-cv-00093-LED, U.S. District Court for the Eastern District of Texas, Tyler Division, Feb. 22, 2013, 43 pages.
Deposition of Dennis Dupray (Redacted vol. IV) held in Case Nos. 6:11-cv-00096-LED and 6:13-cv-00093-LED, U.S. District Court for the Eastern District of Texas, Tyler Division, May 29, 2013, 50 pages.
Deposition of Dennis Dupray (Redacted vol. V) held in Case Nos. 6:11-cv-00096-LED and 6:13-cv-00093-LED, U.S. District Court for the Eastern District of Texas, Tyler Division, Aug. 19, 2013, 66 pages.
Deposition of Corey K. Ford held in Case No. 6:13-CV-93-LED, U.S. District Court for the Eastern District of Texas, Marshall Division, Apr. 16, 2013, 68 pages.
Official Action for U.S. Appl. No. 12/861,817, mailed Mar. 24, 2014.

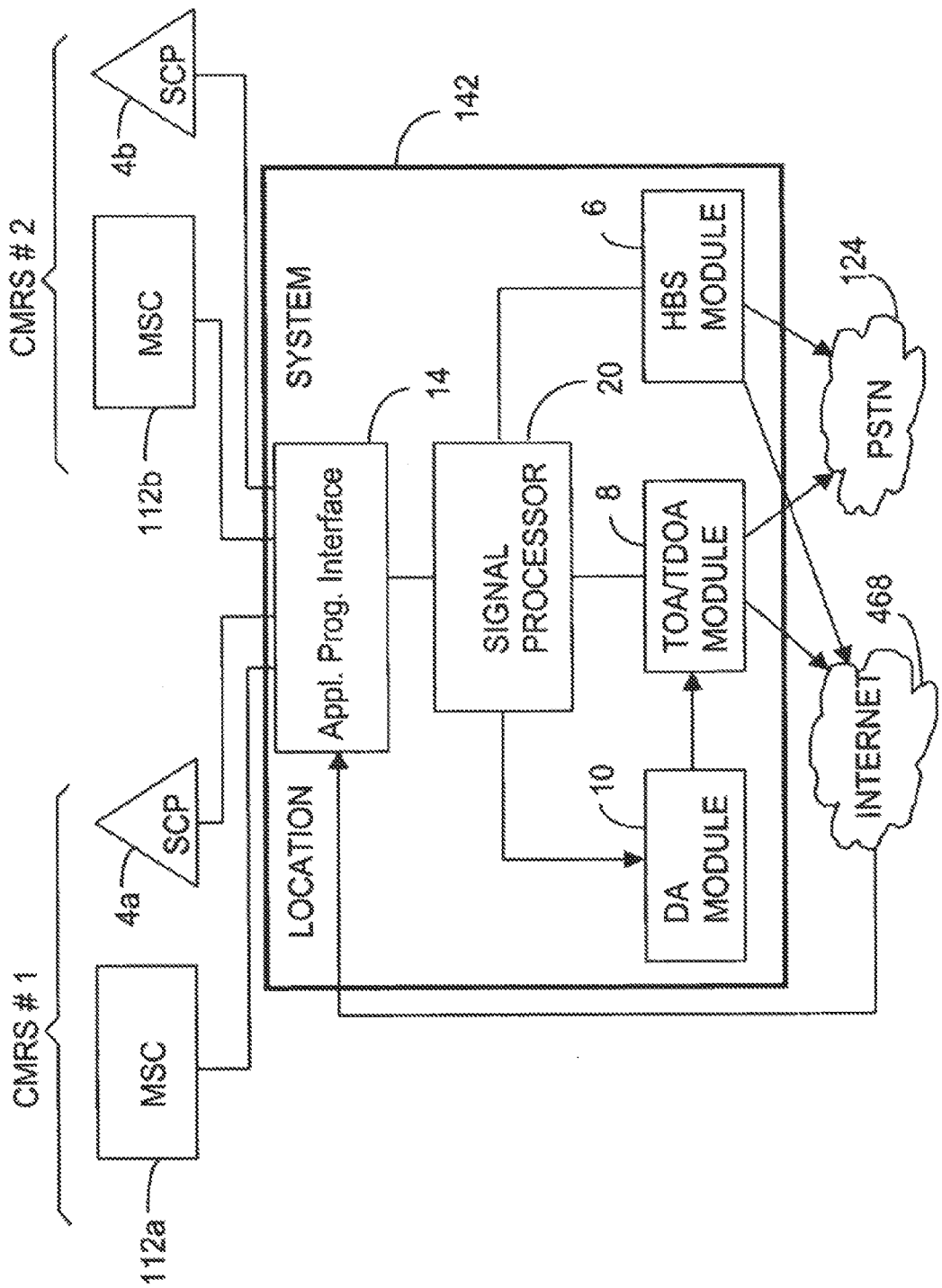
FIG. 1: WIRELESS LOCATION USING MULTIPLE CMRSs

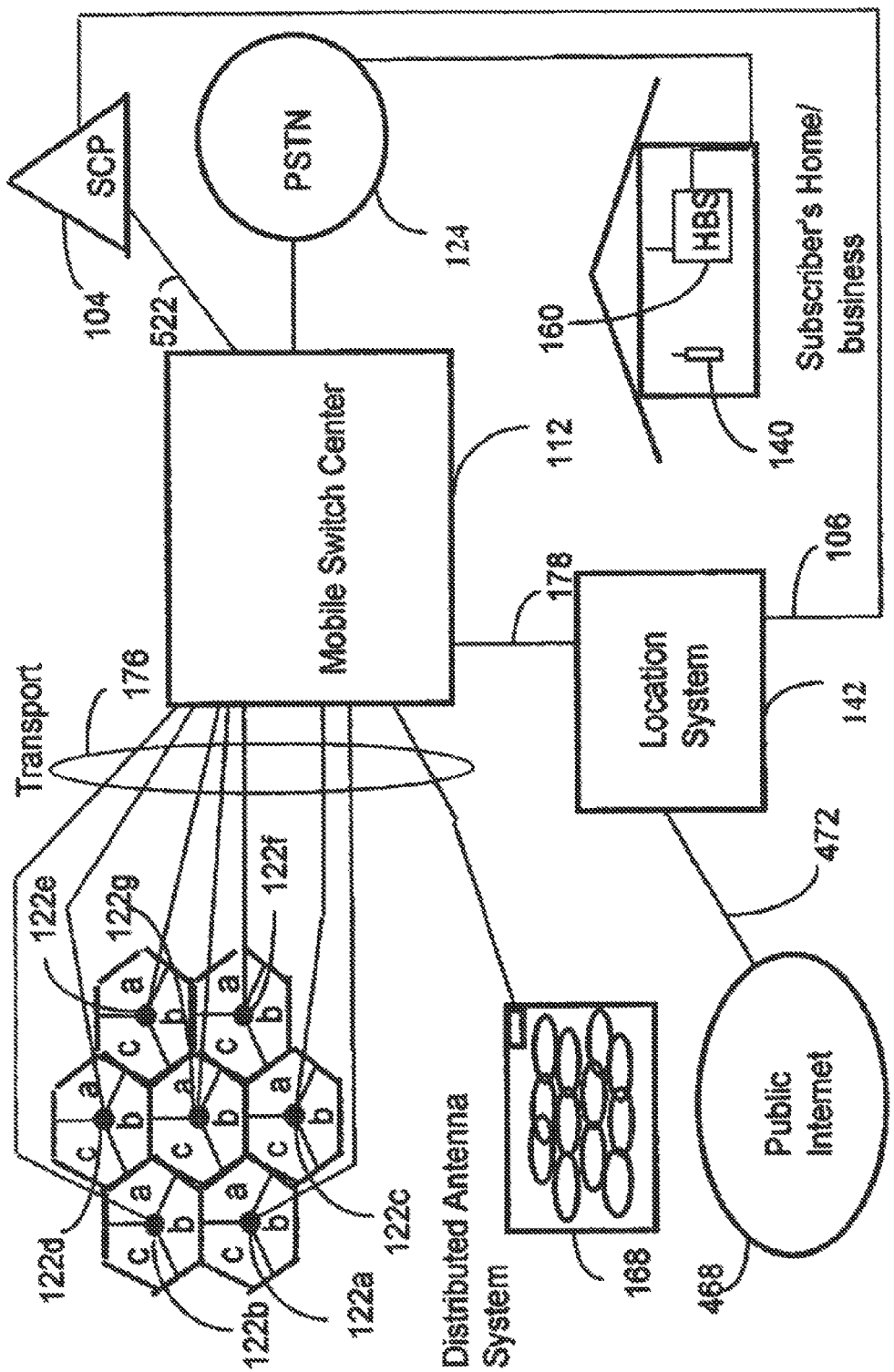
Fig. 2: WIRELESS LOCATION INTELLIGENT NETWORK ARCHITECTURE

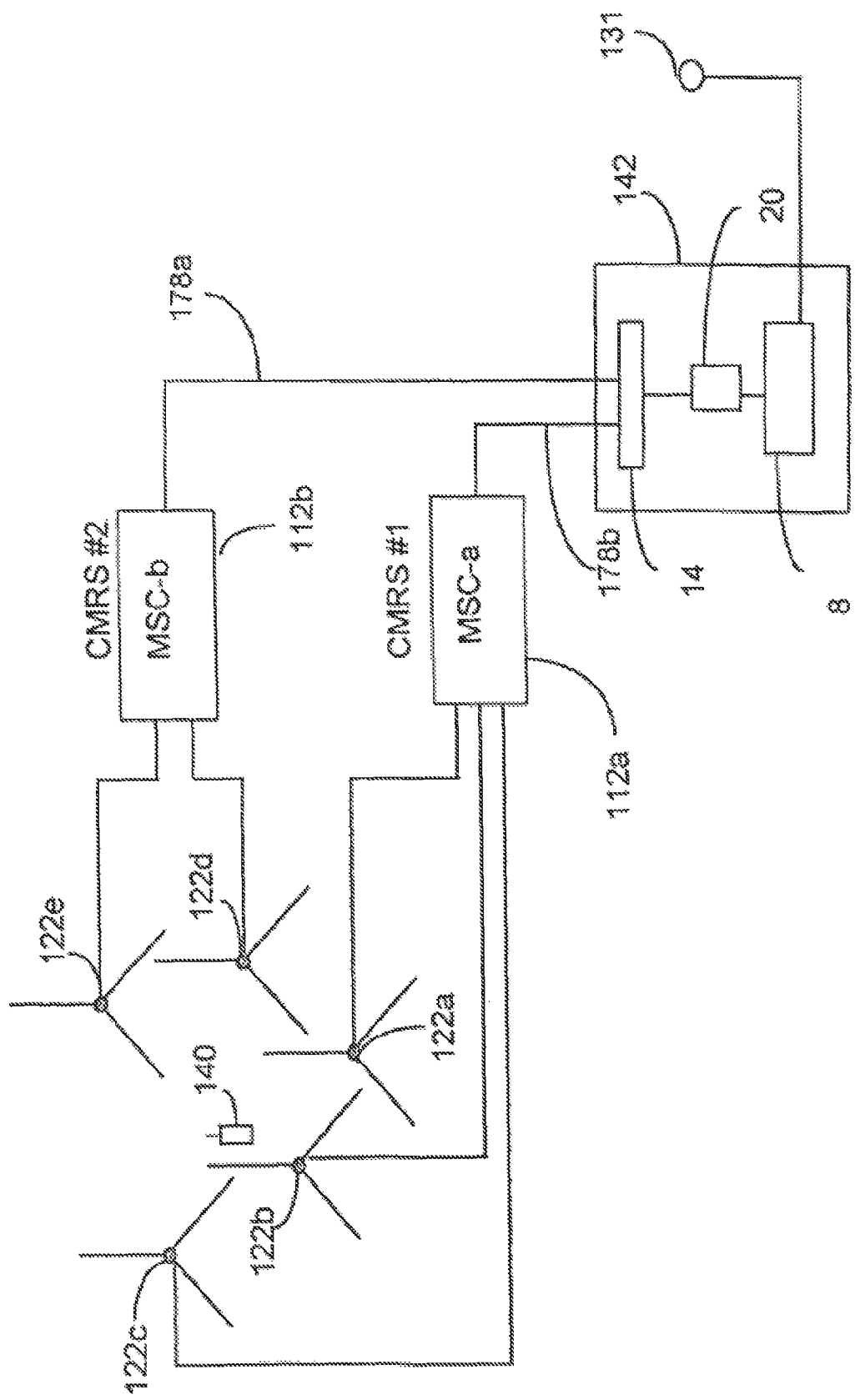

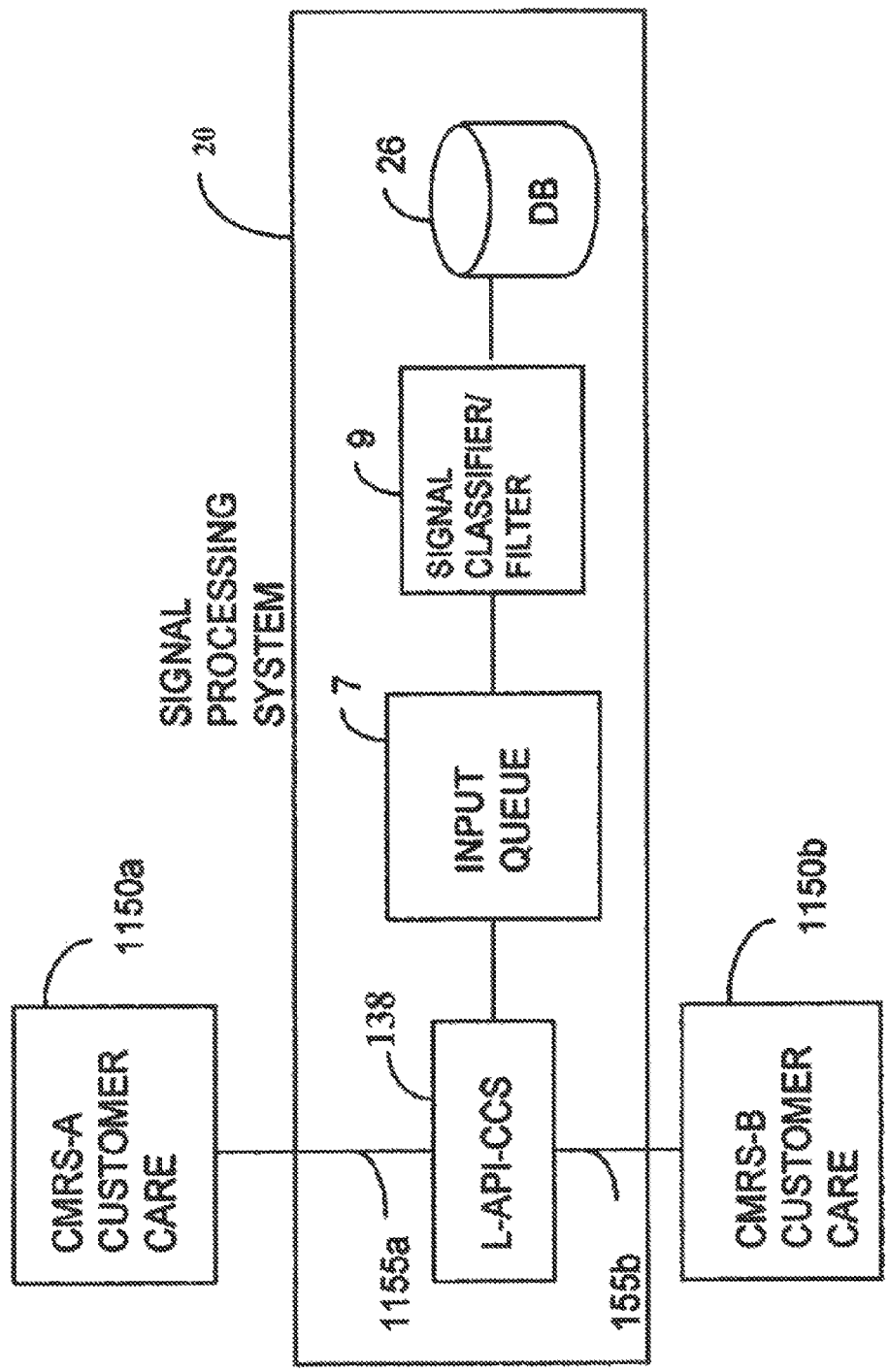
FIG. 4: LOCATION PROVISIONING VIA MULTIPLE CMRS

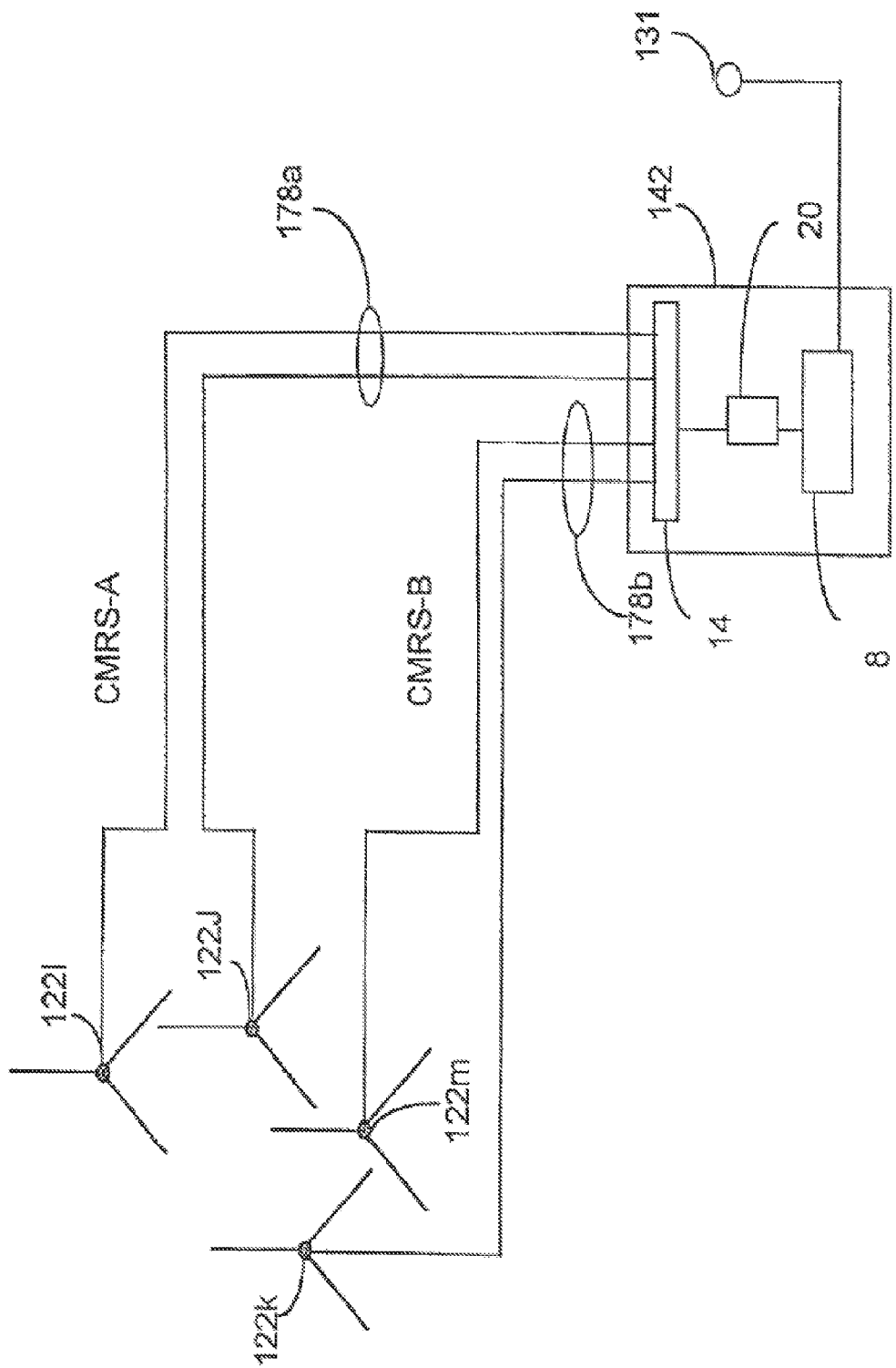
FIG. 5: LOCATION CENTER BASE STATION ACCESS, MULTIPLE CMRS

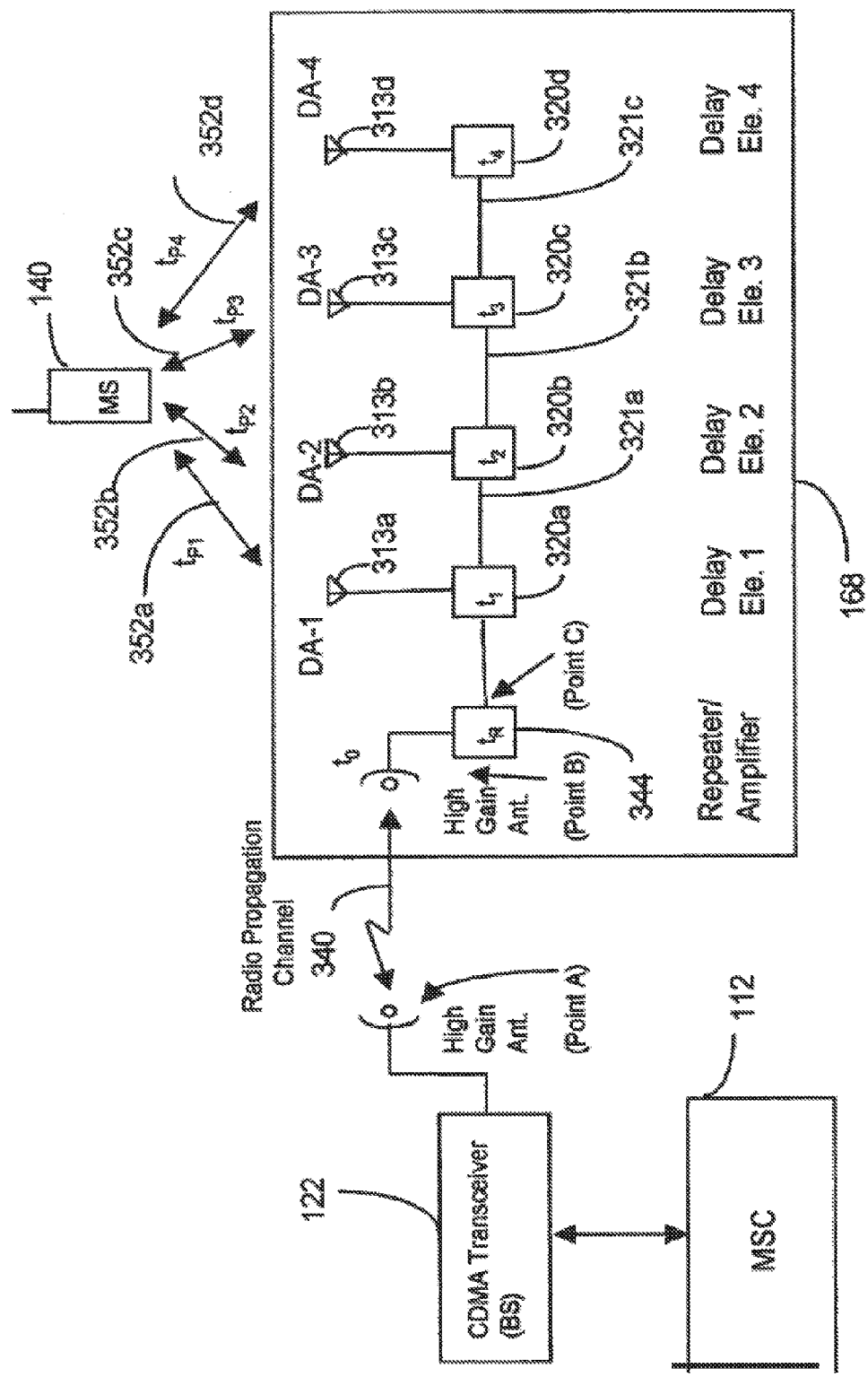
FIG. 6: DISTRIBUTED ANTENNA DELAY CHARACTERIZATION

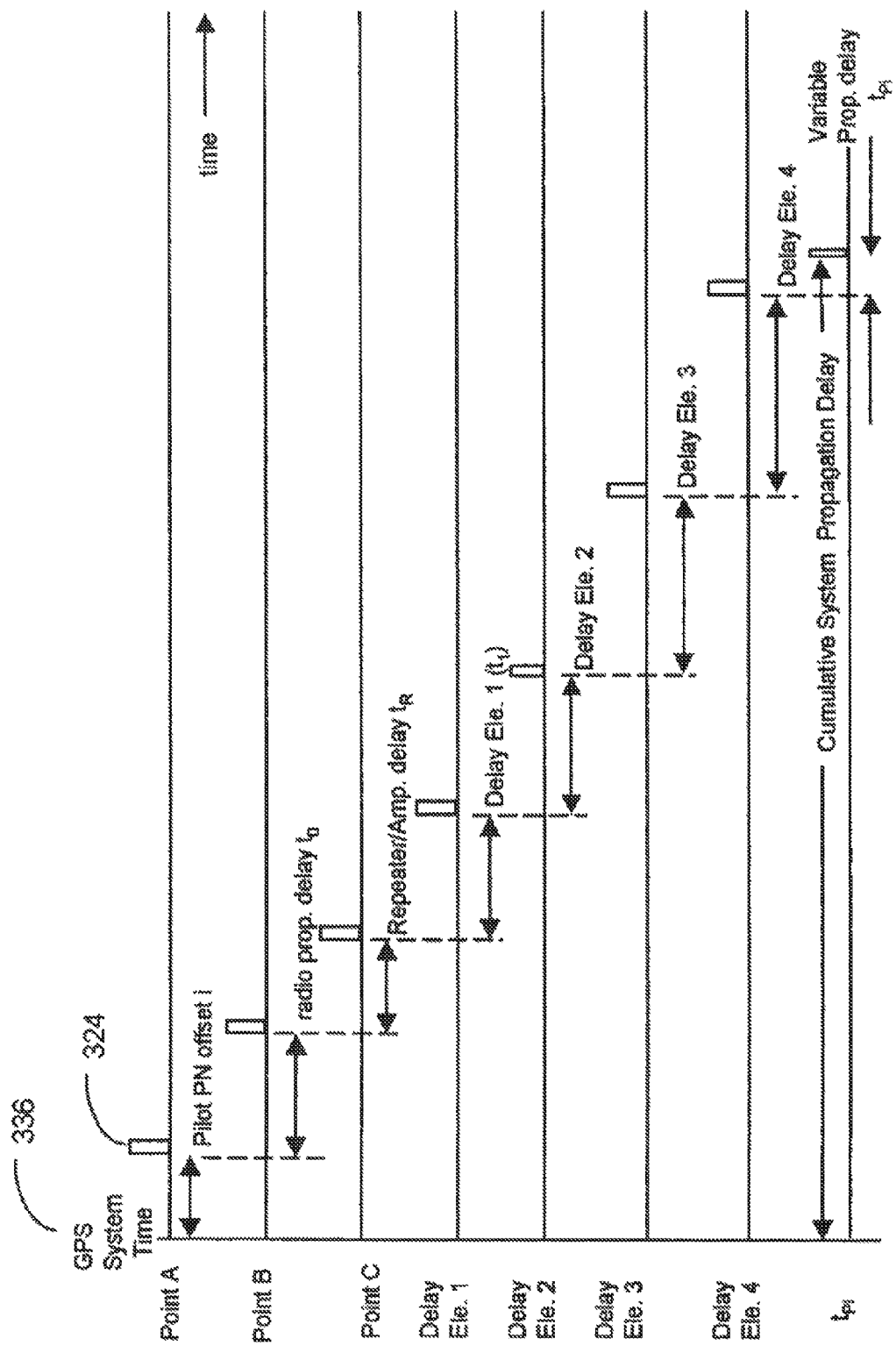
Fig. 7: DA System Timing Diagram

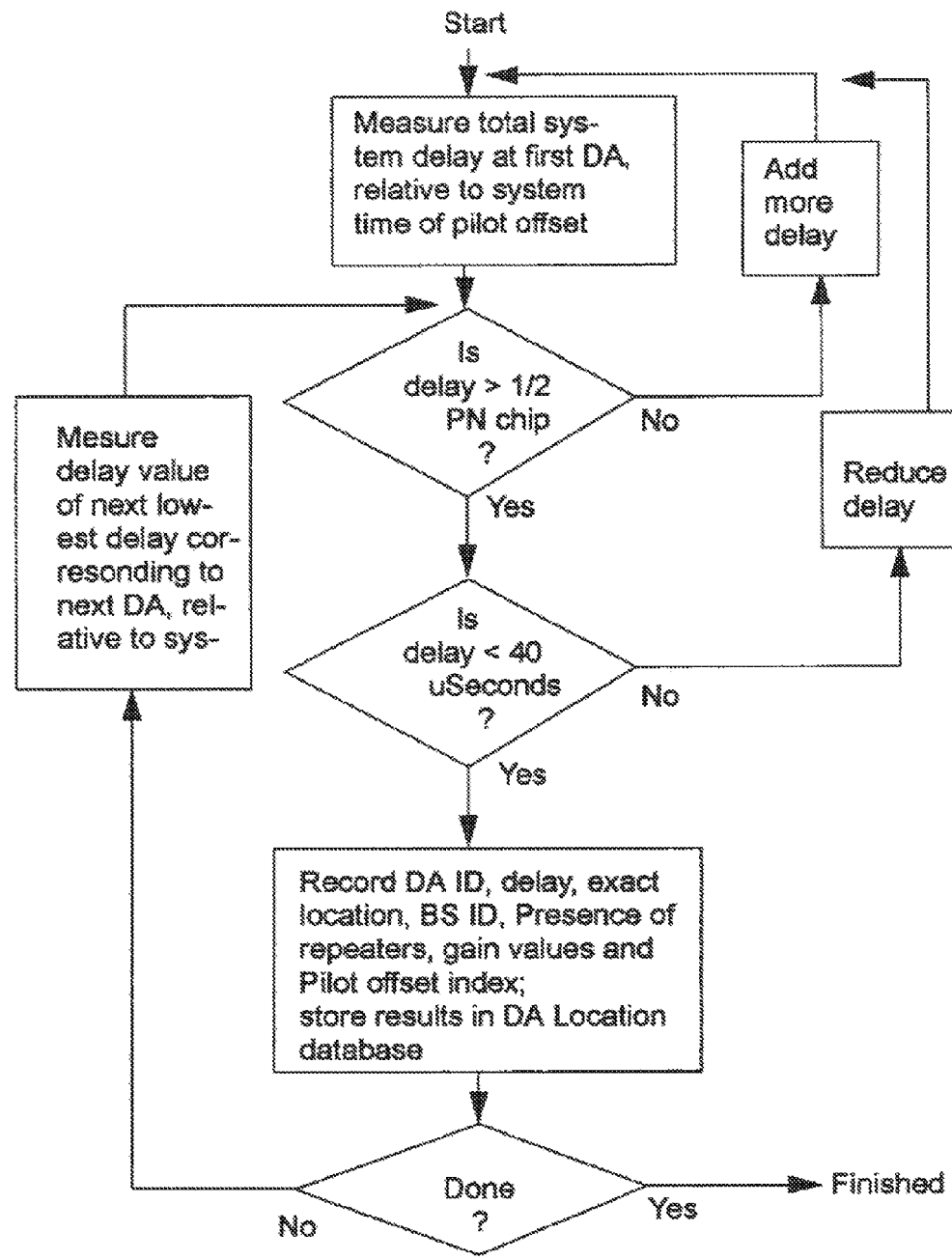
FIG. 8: DA Installation Procedure for Wireless Location

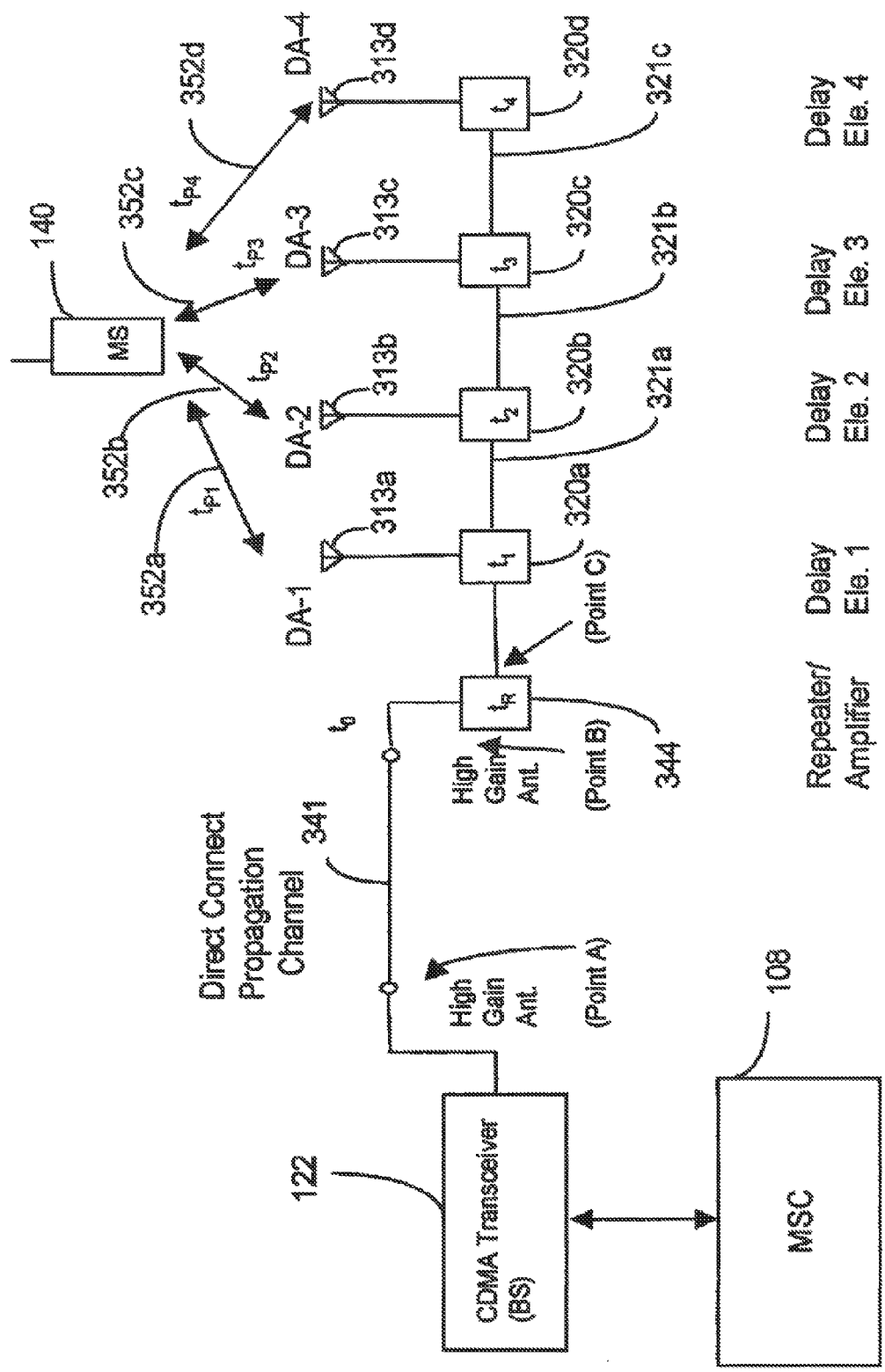
Fig. 9: A Direct-Connect Distributed Antenna System

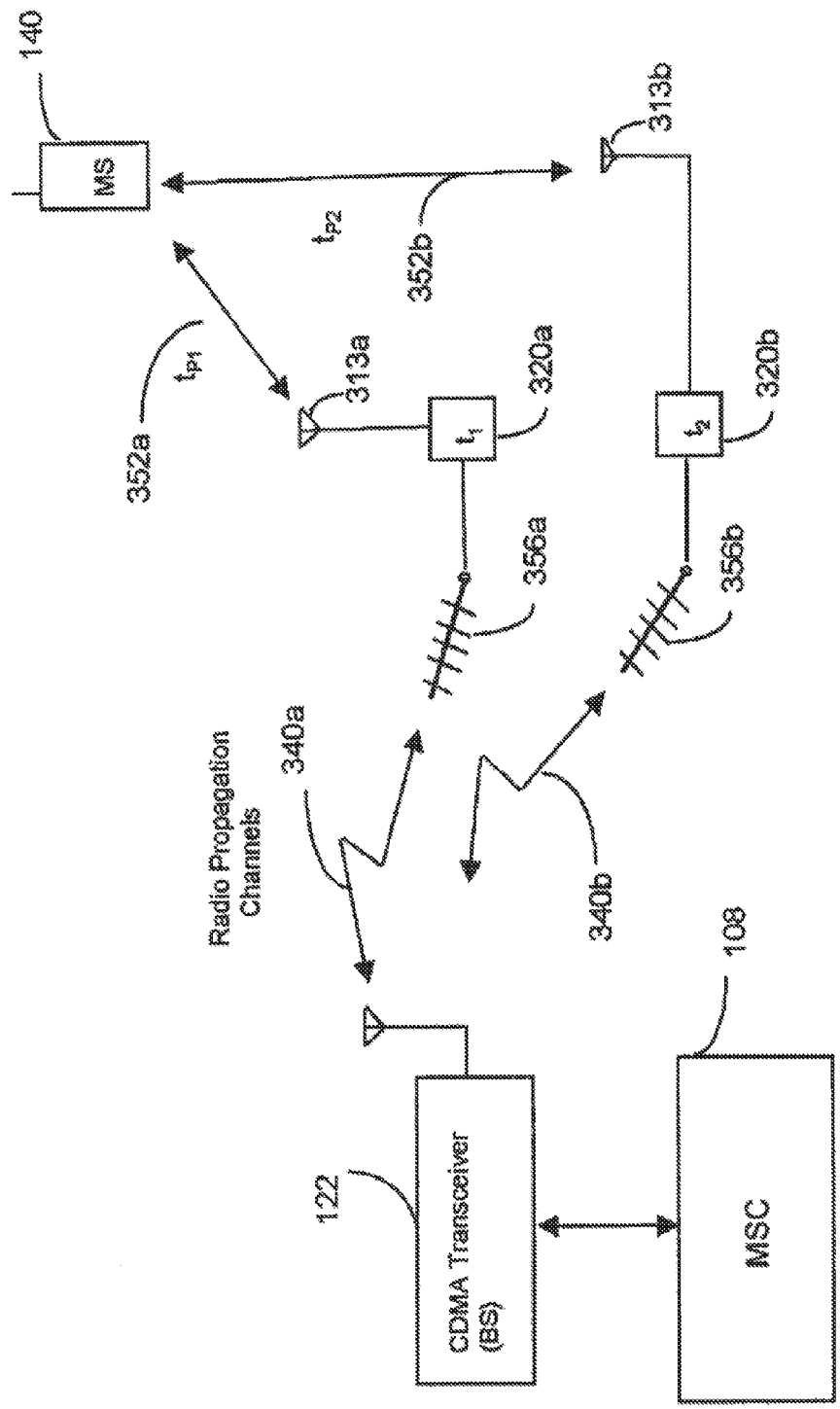
Figure 10: Multipoint Distributed Antenna System

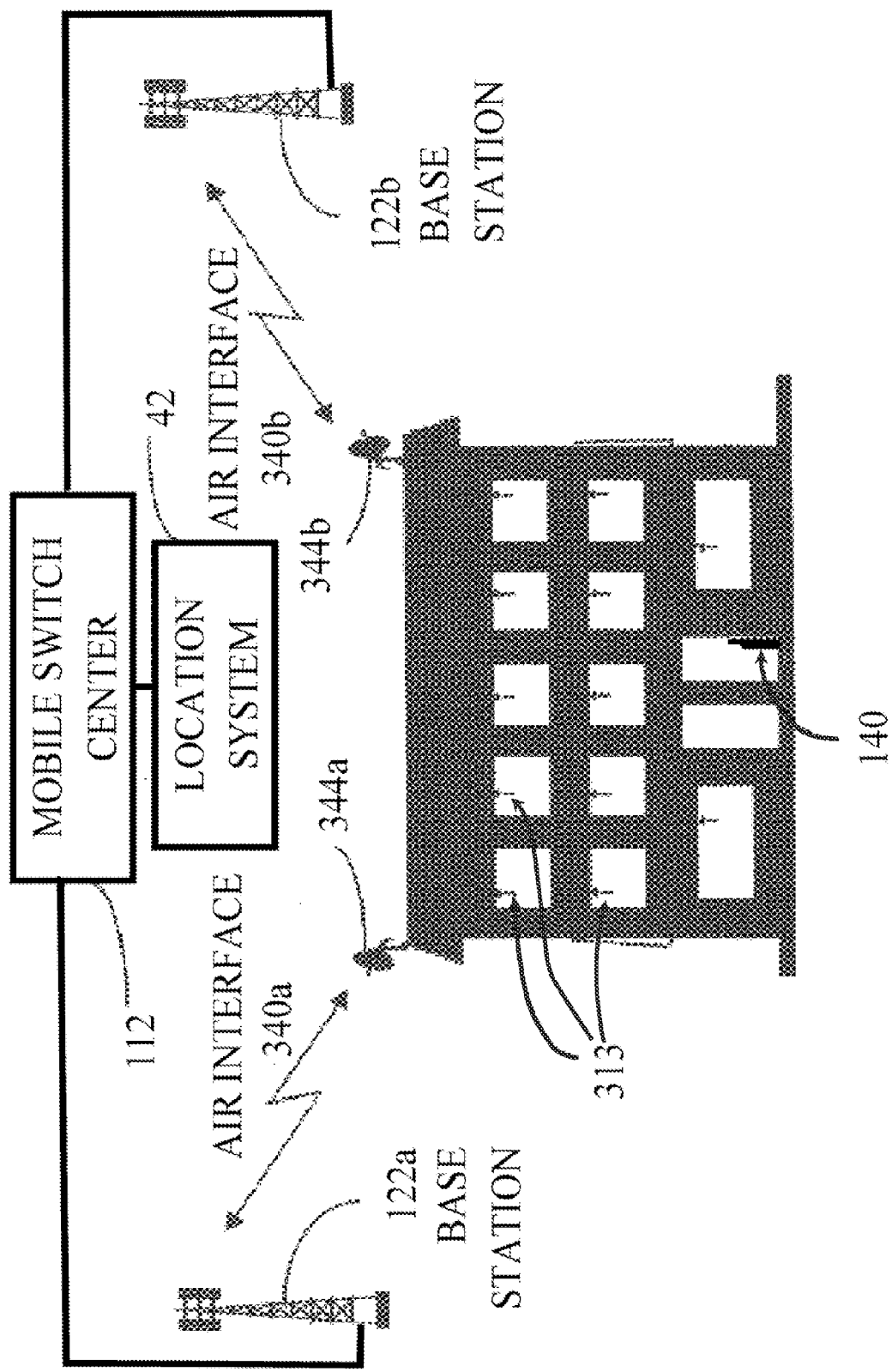
FIG. 11: Dual-Microwave Access Distributed Antenna Example

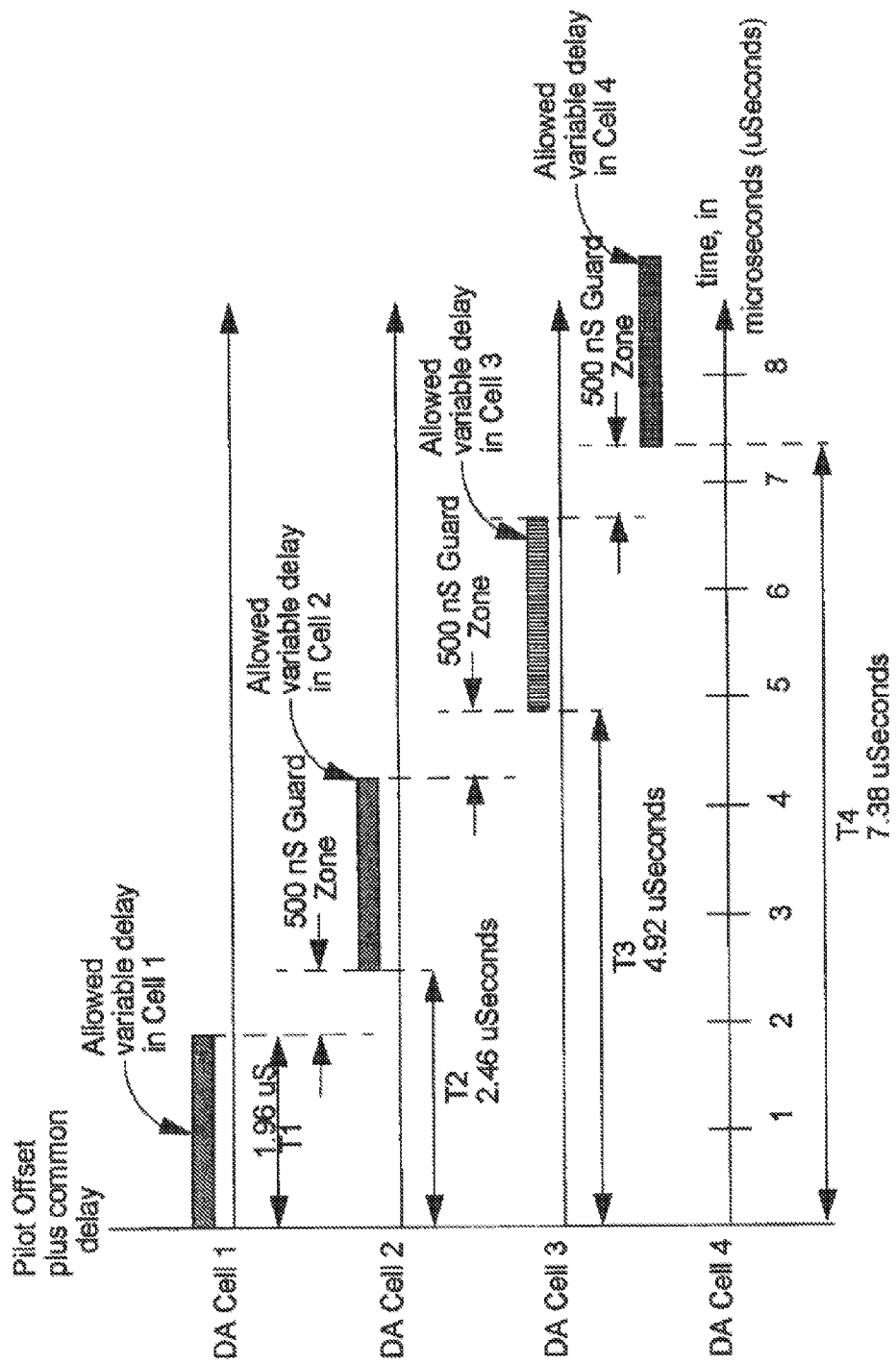
FIG. 12: ALLOWABLE DELAY SPREADS AMONG DA CELLS

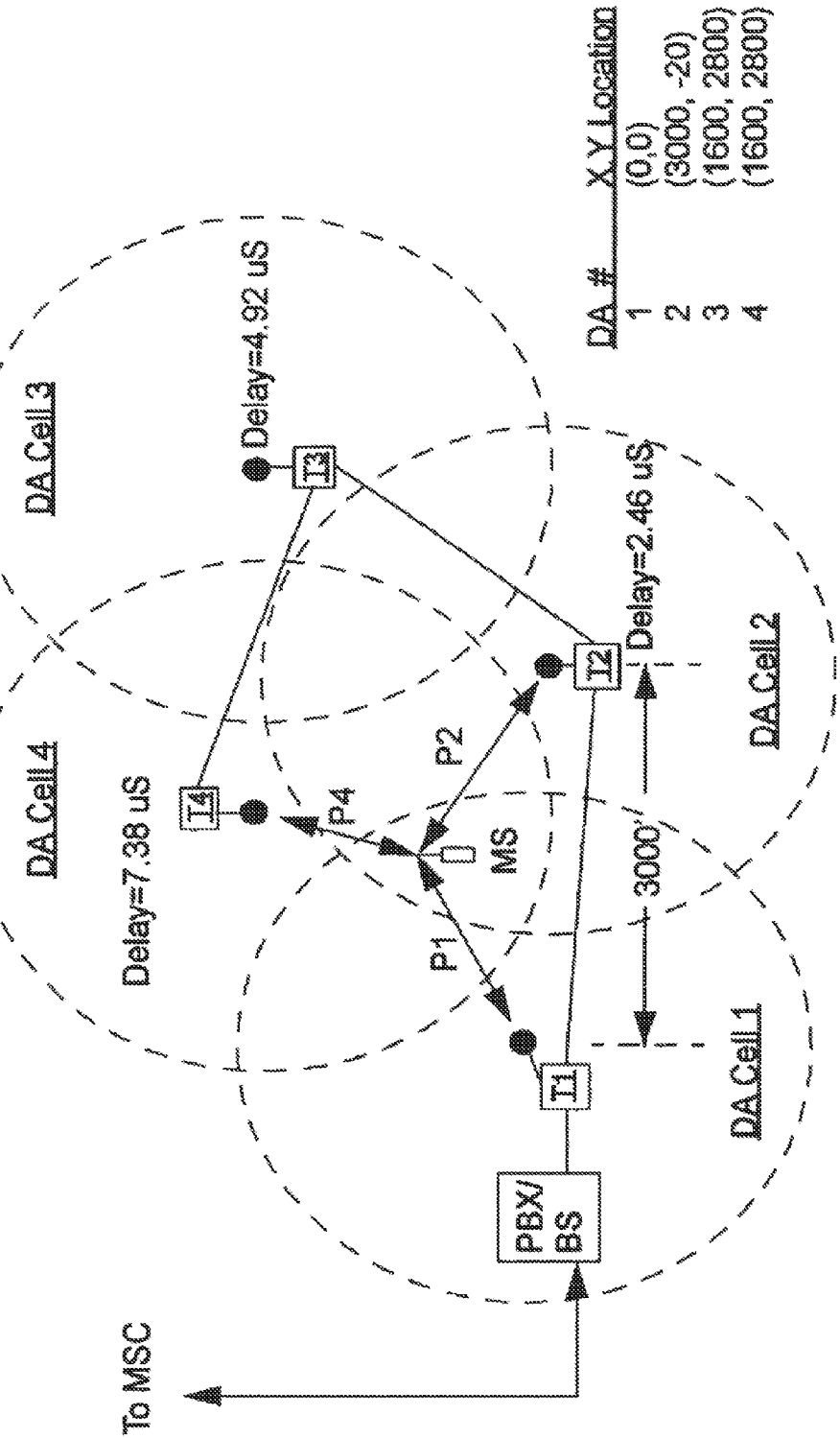
FIG. 13: DA Cell Geometry Illustration

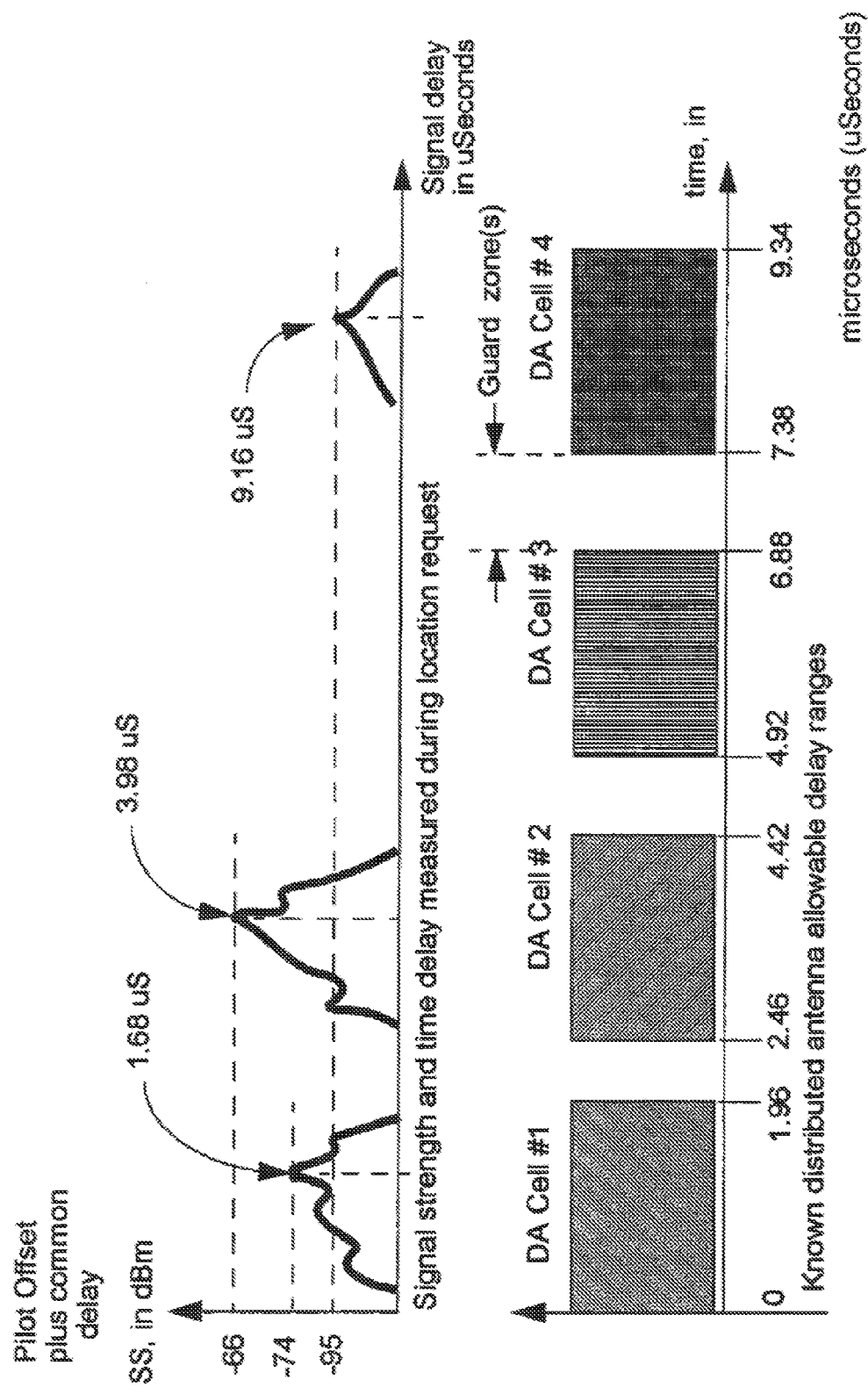
FIG. 14: LOCATION MEASUREMENTS ILLUSTRATION

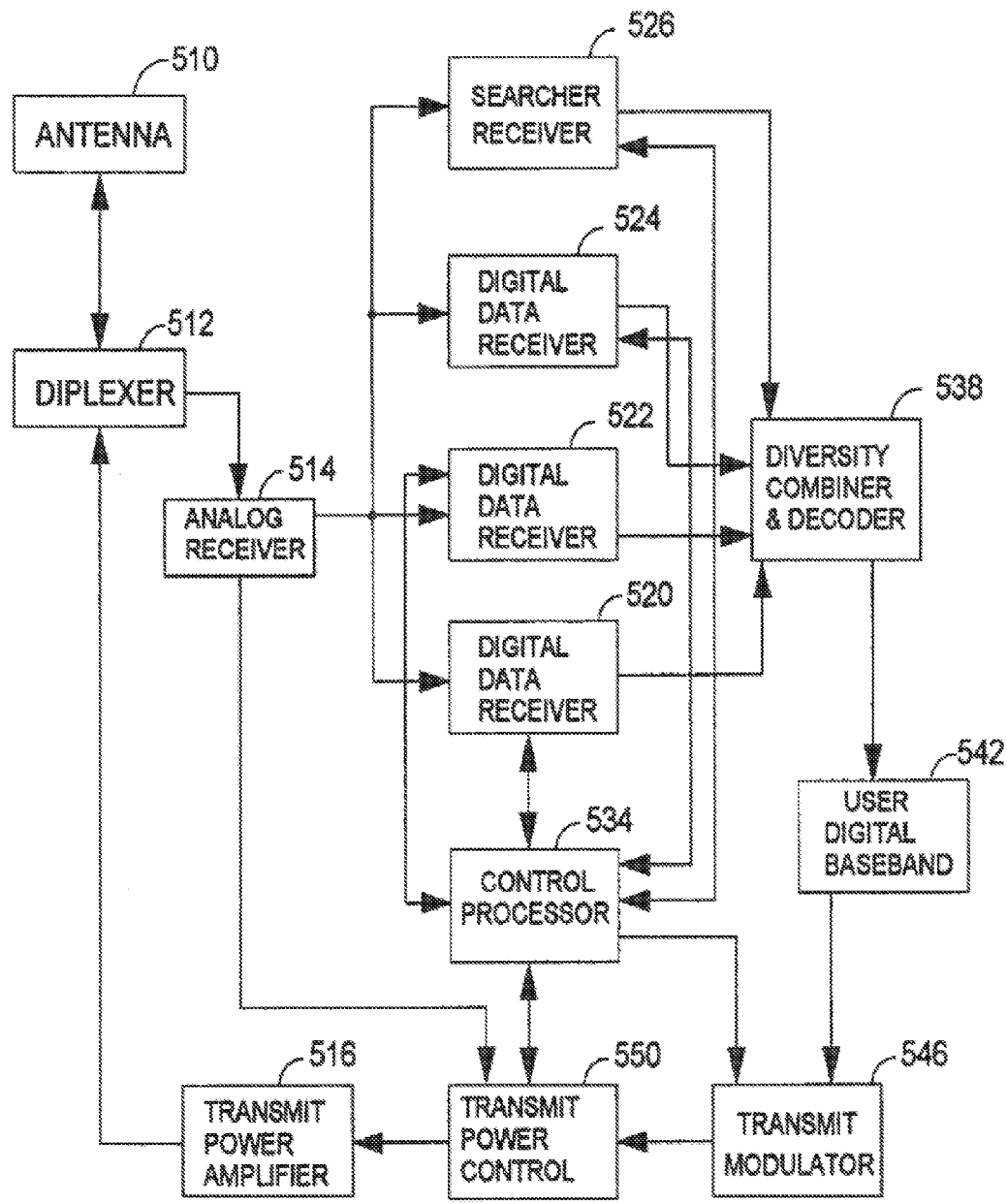
FIG. 15: CDMA Mobile Station Prior Art

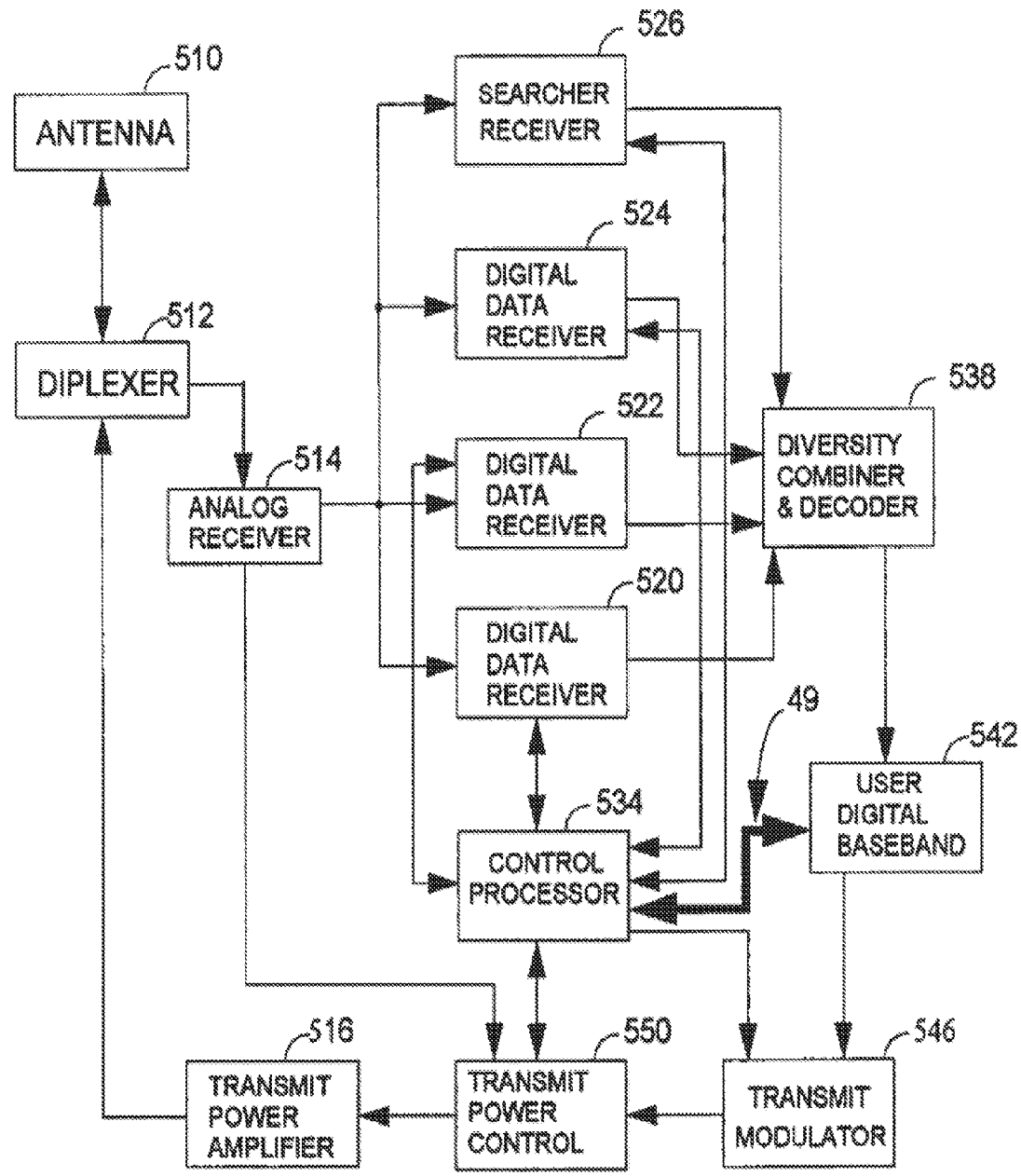
FIG. 16: MS Modification for RF Signal Telemetry

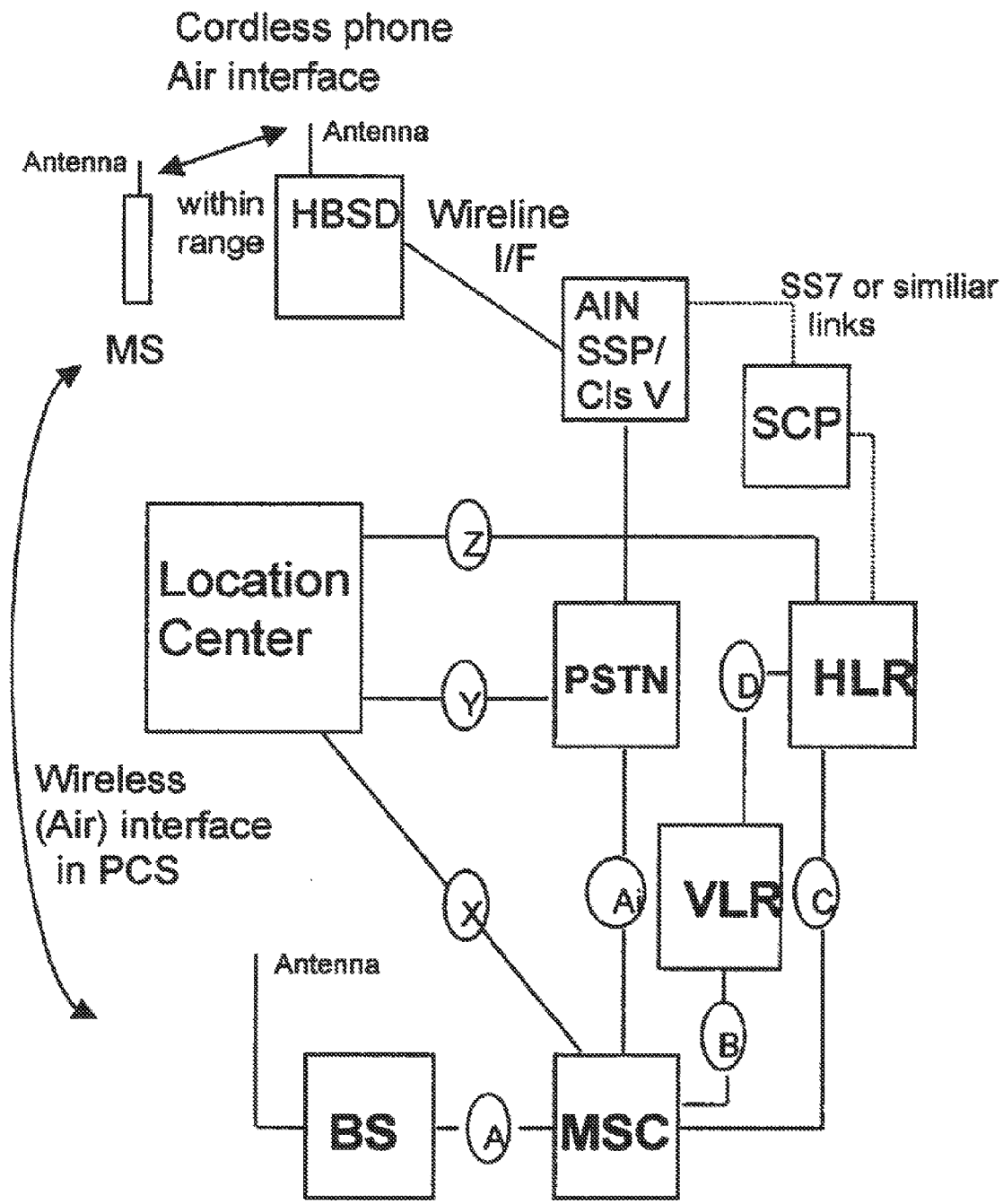
Figure 17: Location and a Home Base Station

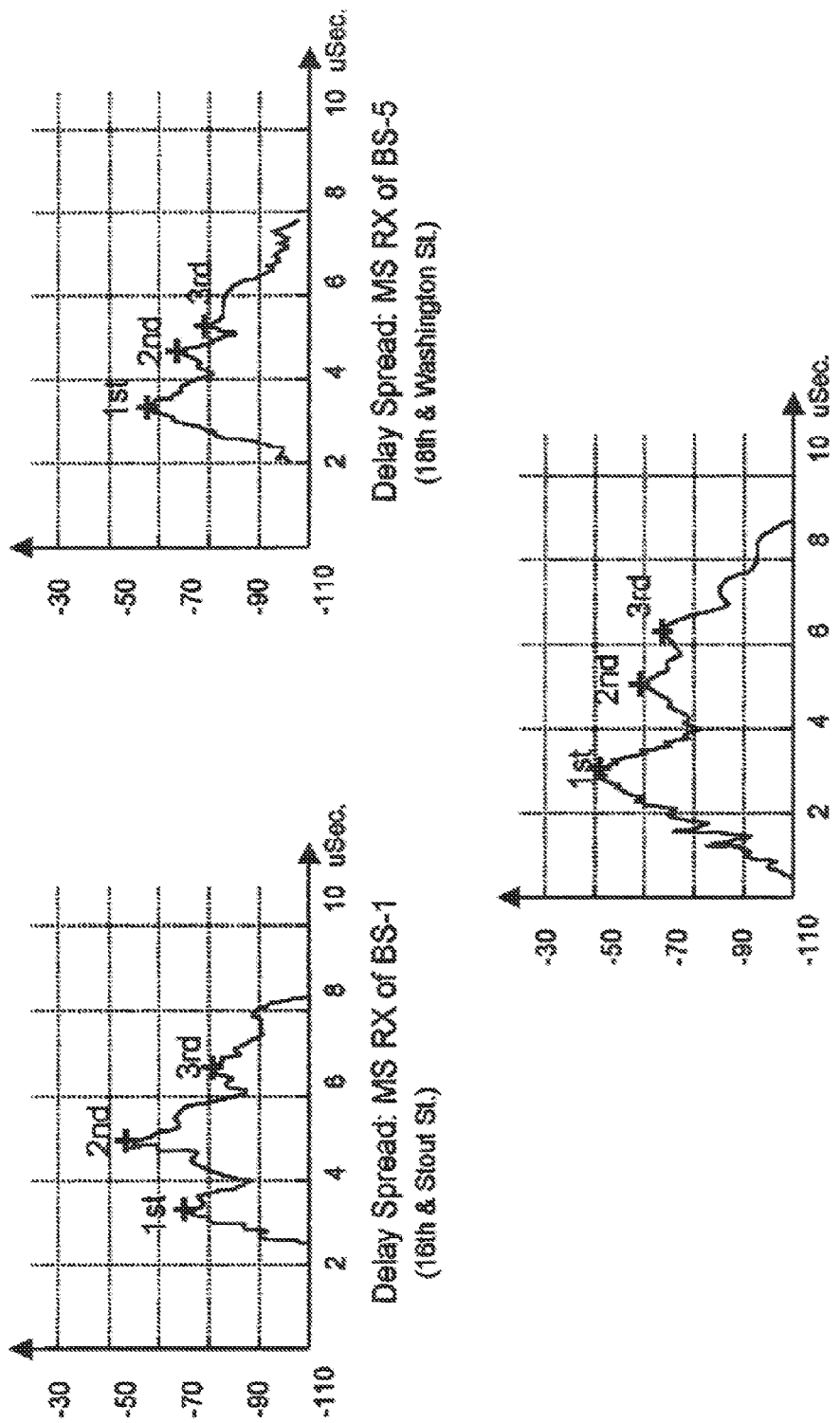
Figure 18: MS Received Delay Spreads of 3 Base Stations (Dense Urban Canyon)

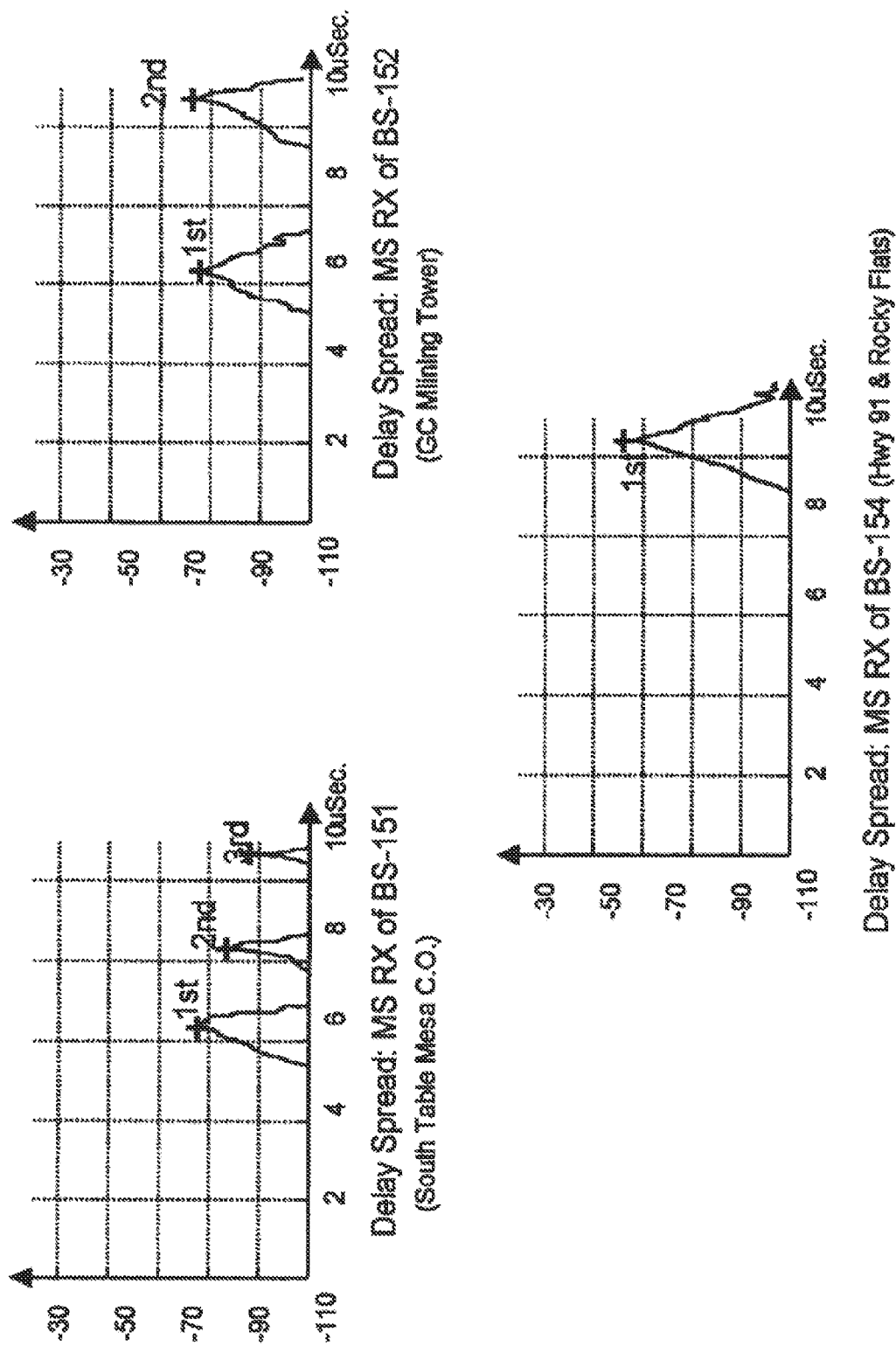
Figure 19: MS Received Delay Spreads of 3 Base Stations (Rural Setting)

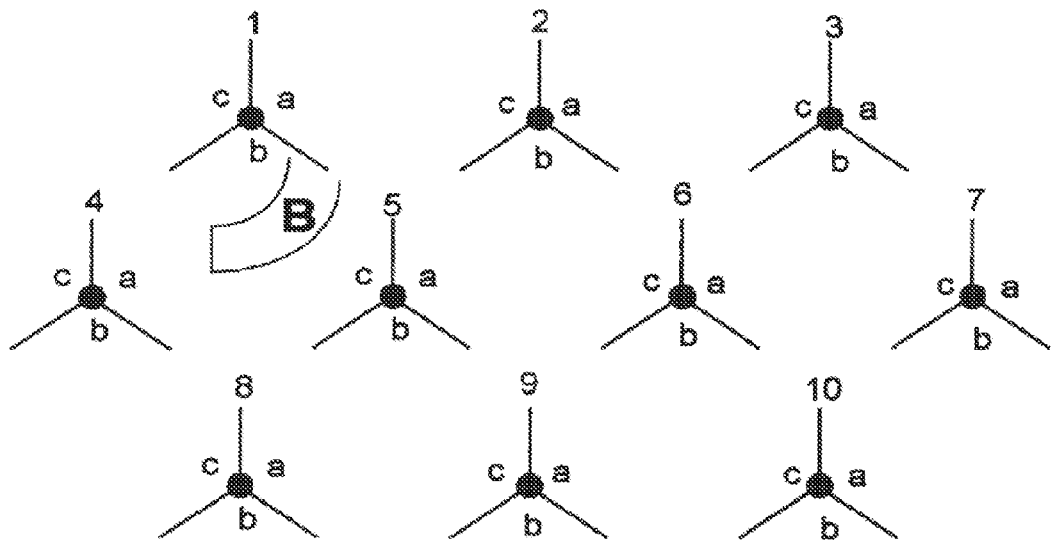
Fig. 20: MS at location B, detects BSs 1b and 2a
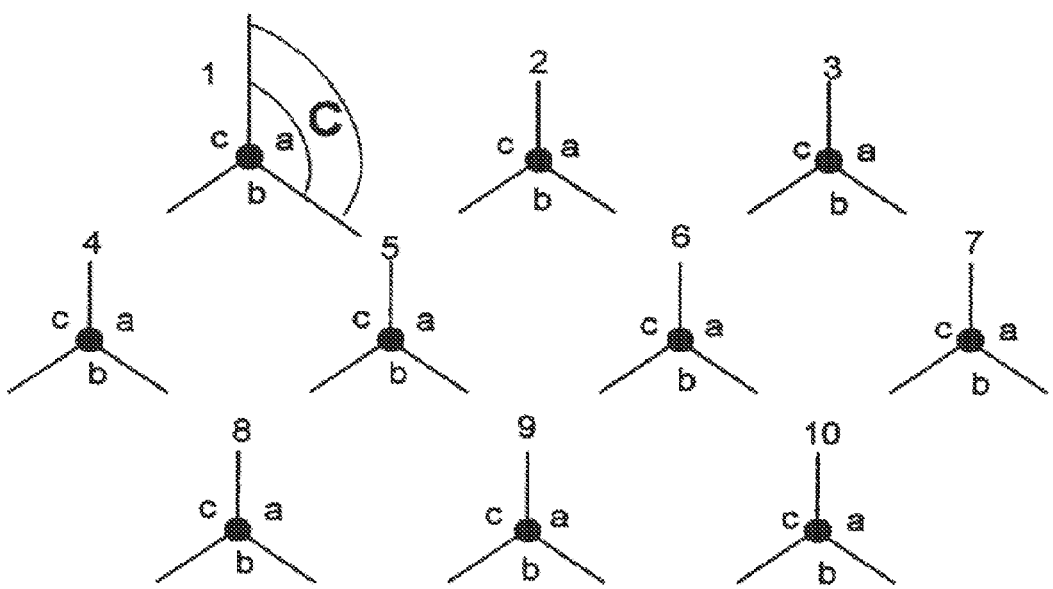
Fig. 21: MS at location C, detects only BS 1a

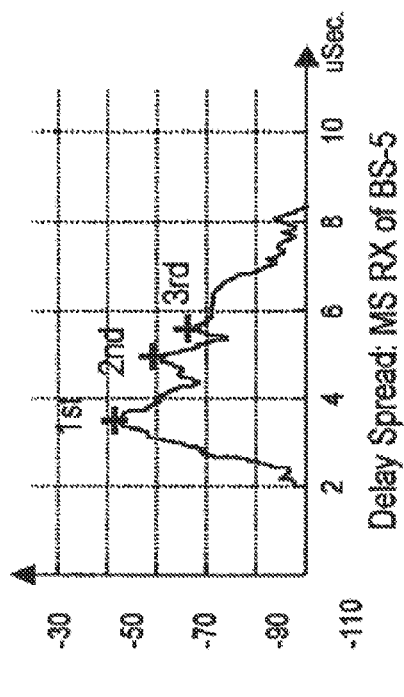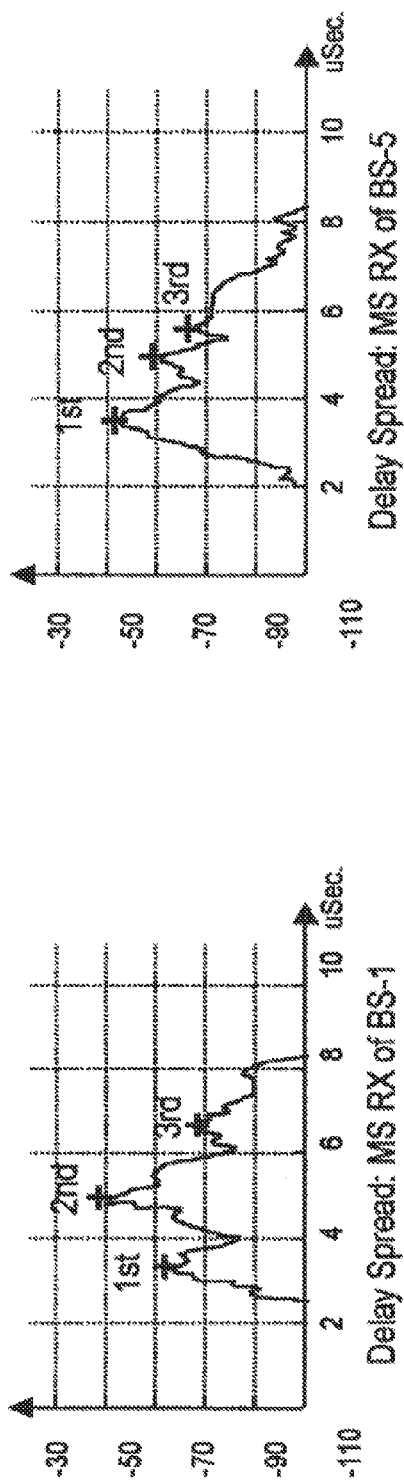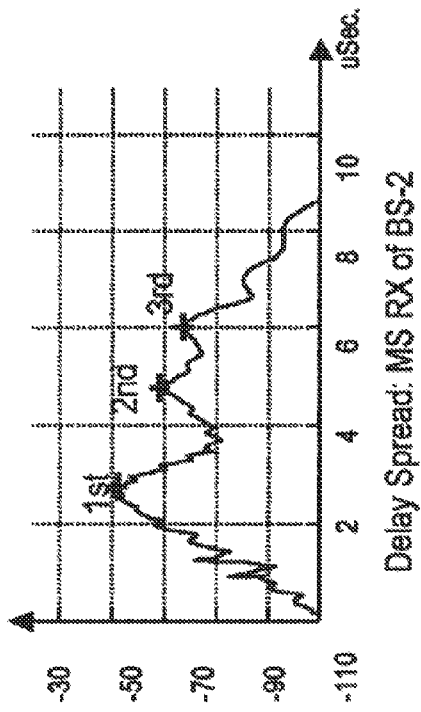
FIG. 22A
FIG. 22B
FIG. 22C
Fig. 22: MS Received Delay Spreads of 3 Base Stations (Dense Urban Canyon)

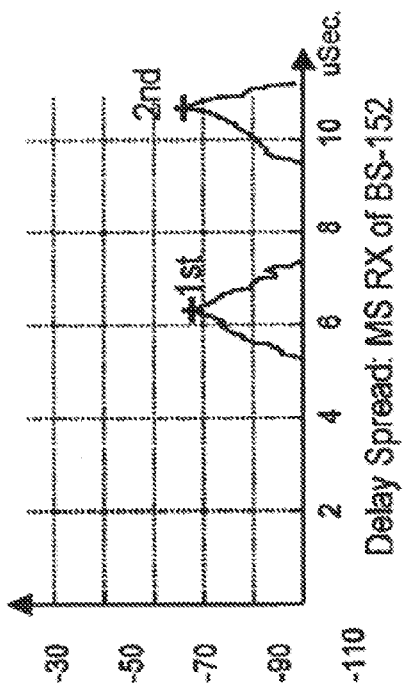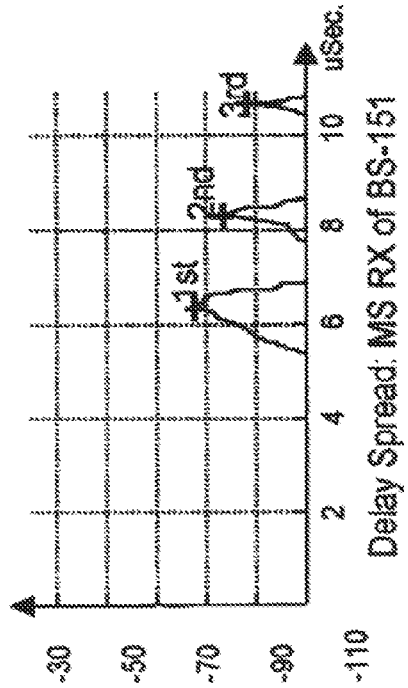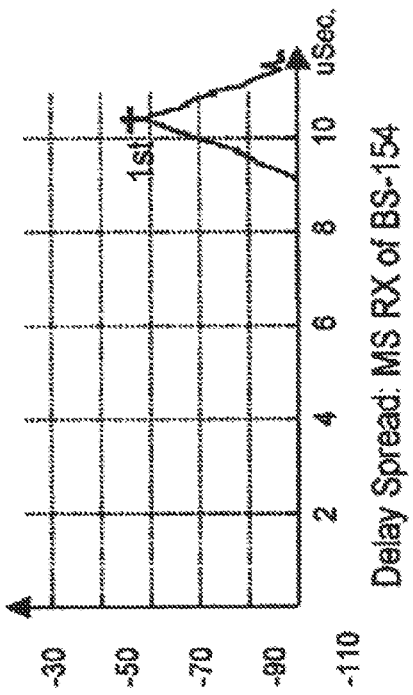
Figure 23: MS Received Delay Spreads of 3 Base Stations (Rural Setting)

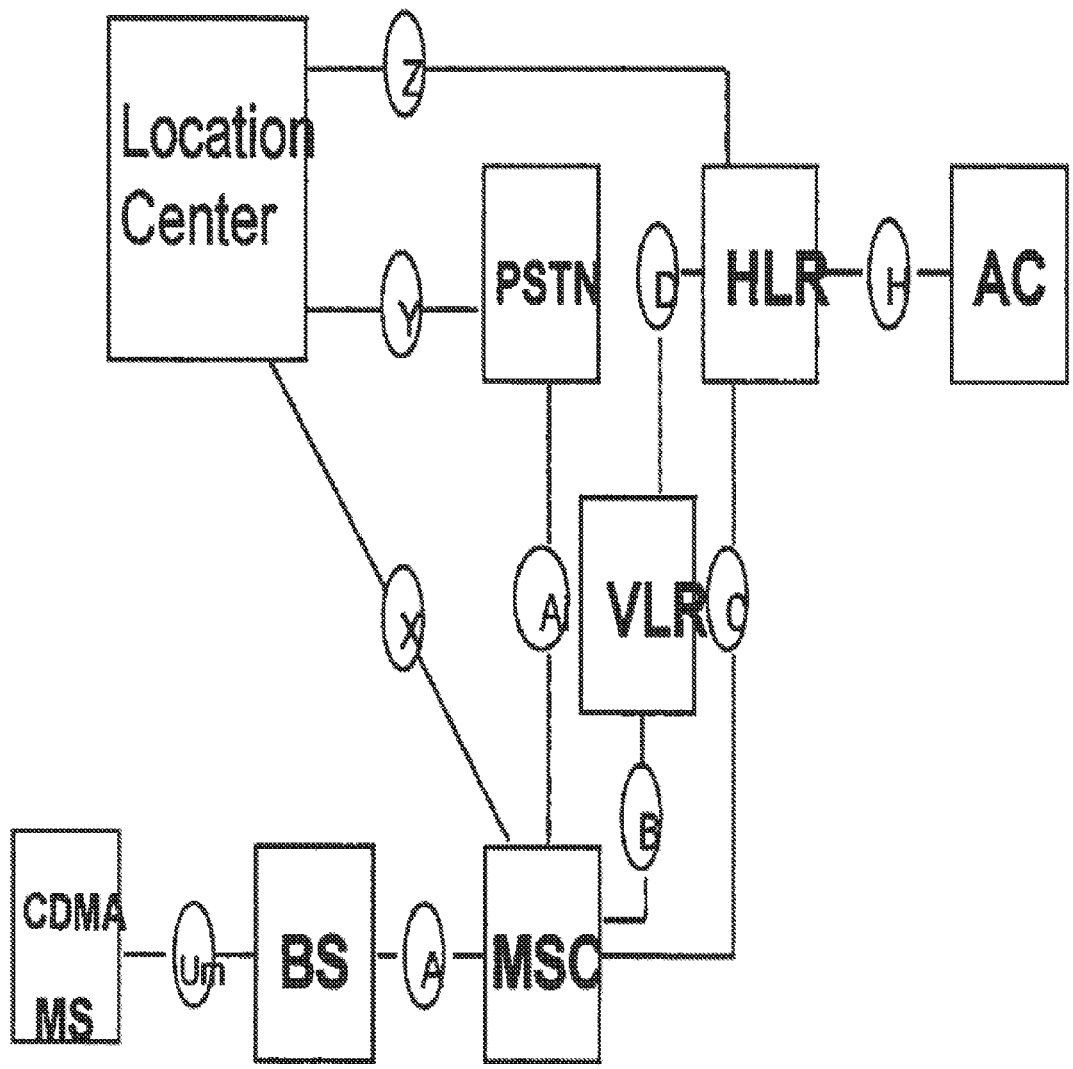
Figure 24: Location and CTIA/TR45 Network Reference Model

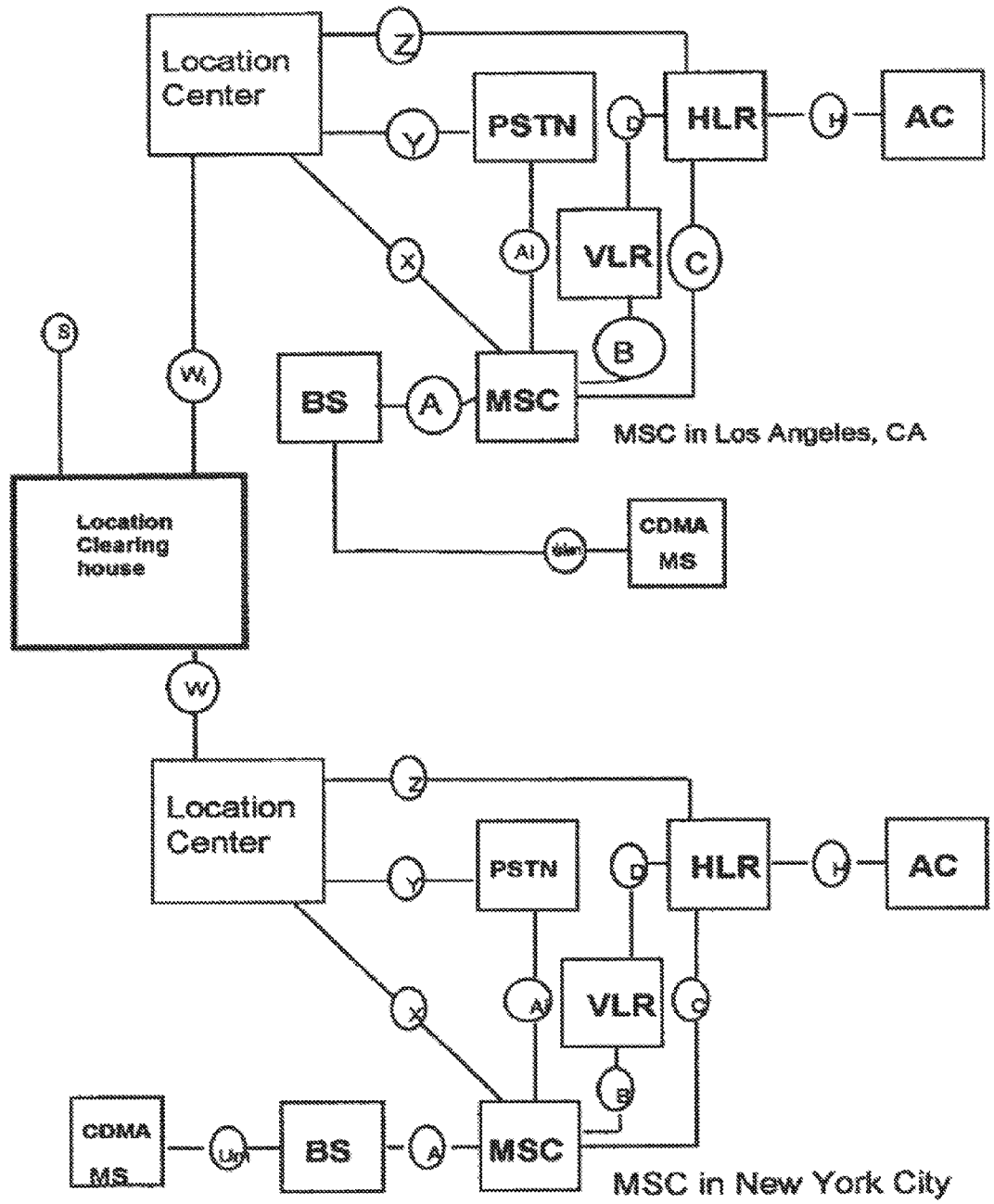
Figure 25: National Location Clearinghouse Structure

FIG. 27: Convolution of Forward and Reverse Images

Fig. 28: IMAGE AND RELIEF REPRESENTATION OF A CDMA PROFILE

Fig. 29: Signal Processing Subsystem

FIG. 32: CDMA PROFILE IMAGE BEFORE FILTERING

FIG. 33: CDMA PROFILE IMAGE AFTER INPUT CROPPING

FIG. 34: Results of Combining Input Cropping (40%) with Median Filtering (4X4)

FIG. 35: Results of Combining Input Cropping (50% clip) with Median Filtering (4X4)

| Turn # | Directions | And Go | Total Miles |
|---|---|---|---|
| Start | Head SOUTH on BROADWAY, From Start Marker (1999 Broadway, Denver) | 1.4 mi | 1.4 |
| 1 | BEAR LEFT onto E. SPEER BLVD | 0.9 mi | 2.4 |
| 2 | BEAR RIGHT onto S. DOWNING ST | 0.4 mi | 2.8 |
| 3 | TURN RIGHT onto E. CEDAR AV | 0.1 mi | 2.8 |
| 4 | TURN LEFT onto S. MARION PKY | And then | 2.9 |
| END | End Marker (255 marion Parkway, Denver, CO) | | 2.9 |

560, 564, 568

Replace this column with detailed maps for all turns

WARNING: use these directions at your own risk. Lucent Technologies is not responsible for their accuracy or for any losses resulting from their use. Obey all traffic regulations.

User Manual Sections: [Routes In General] [Turn-By-Turn Directions] [Caveats]

Fig. 41

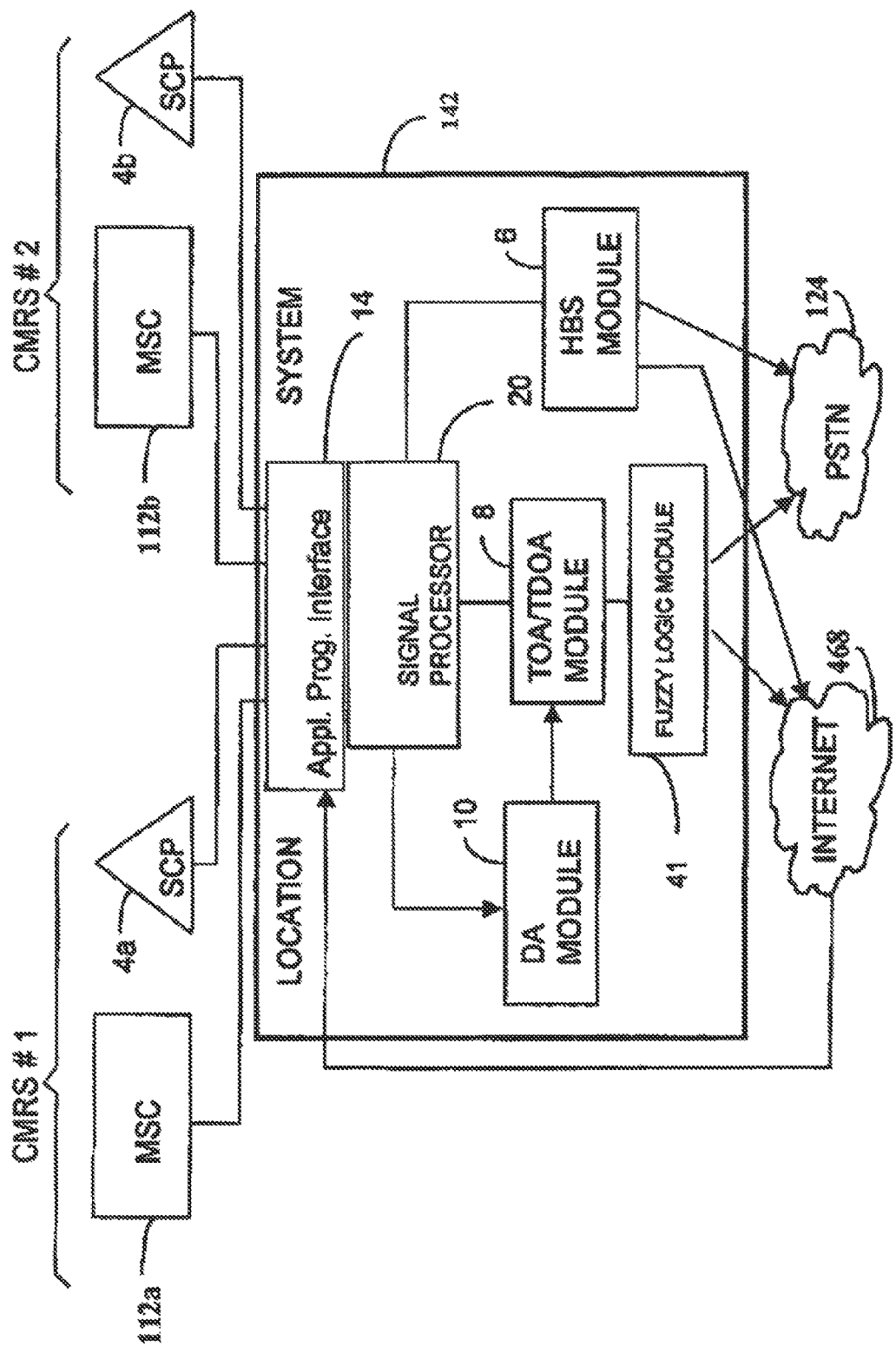
FIG. 43: WIRELESS LOCATION USING FUZZY LOGIC

Fig. 44A

1   User activates, at his/her mobile station (e.g., MS 140, or merely MS in this
2       pseudo-code), an application (APP) that provides notifications related to an
3       availability of one or more resources;
4   If not previously authorized, then the user authorizes the APP to wirelessly
5       locate his/her MS;
6   Put an identification of the user (or the MS residing therewith) on a *queue* of
7       users waiting for one of the resources;
8   The application, APP, requests periodic or repeated wireless locations of the
9       MS for tracking the MS;
10  While (wireless locations are being received for the MS, or the MS is being
11      wirelessly tracked)
12      AND
13          (the MS is in a proximity or area for seeking an available resource)
14      AND
15              (there has been no termination of the APP by the MS user in seeking
16      one of the resources) AND (a resource is not currently allocated to the user)
17      DO { /* However, whenever (all resources become unavailable
18              independently of the processing of this "While" loop), then
19              interrupt "While" loop processing in the body of this "While"
20              loop, rollback any resource allocation made in this loop to the
21              user, dequeue the user from the *queue*, and exit this "While" loop
22              immediately; */
23          For each most recent wireless location of the MS received DO {
24              AvailResources ← Obtain locations of the currently available
25              resources and not allocated, wherein these locations are updated
26              when there is a change in the status of any resource regarding its
27              availability and/or any allocation thereof ;
28          If (SIZEOF(AvailResources) is zero) then
29          {       If (there is no active timer running to prevent a notification
30                      from being transmitted to the user, e.g., the user's mobile
31                      station 140) then {
32                  Transmit a notification to the MS informing its user that no
33                      resource is currently available;
34                  If (received user input indicates the user wants APP to
35                      continue looking for a resource for the user) then
36                      Send the next user notification only when there is: (1) at

Fig. 44B

```
37                      least one available and unallocated resource, OR, (2)
38                      a predetermined elapsed time of a timer
39                      (activated/initialized in this "Send" command or the
40                      "Send" command below) has expired, e.g., a 3
41                      minute timer; for providing the user with status(es)
42                      regarding resource (un)availability;
43                  }
44              Else Exit While loop;
45      } ElseIf (all resources are allocated, but at least one is available) then
46              /* i.e., all resources have had a notification sent to some MS
47              user, but at least such resource is still available */
48      {       If (there is no active timer running to prevent the user from
49                      receiving a notification when unallocated and
50                      available resource is identified) then {
51                  Transmit a notification to the MS informing its user
52                      that a resource may be available, but all have
53                      been allocated;
54                  If (a received user input indicates the user wants APP to
55                      continue looking for a resource for the user) then
56                          Send a next user notification when there is (1) an
57                              available and unallocated resource, OR, (2) a
58                              predetermined elapsed time of a timer
59                              (activated/initialized in this "Send" command or
60                              the "Send" command above) has expired, e.g., a 3
61                              minute timer for continuing to provide the user
62                              with notifications of resource availability
63                              status(es);
64                  }
65              Else Exit While loop;
66      } /* There is an available resource, and, this resource is not allocated
67              to any MS user */
68      ElseIf (the location of the user's MS is near an available and
69              unallocated resource) AND (no other user, that has a "seek
70              time" for seeking a resource longer, is at least as near the
71              available and unallocated resource) then {
72              Allocate the resource to the user;
```

Fig. 44C

```
73          Transmit a notification to the MS informing its user of an
74              available resource, and provide directions to the
75              resource; the notification may include information for
76              navigating the user to the resource;
77          Dequeue the user from the queue, but save user's state in
78              case the user needs to be re-queued due to the resource
79              being taken by another before the user acquires it;
80          Delete any active timer for the user;
81      }
82    } ENDDO
83  } END_WHILE_LOOP;
84  LOOP (Until Exited)
85      If (the user allocated resource becomes unavailable) AND (the user's MS
86          has not acquired the allocated resource) AND (the user has not acquired
87          (or, reserved, registered at) another one of the resources) then {
88              Delete any associations made for allocating the resource to the
89          user;
90              Re-queue the user without resetting the user's resource seek
91          time;
92              GOTO the While loop above;
93          }
94      ElseIf (the user allocated resource is still available) then
95          If (the user is travelling generally along the route provided to the
96              available resource) then
97            Transmit further routing information, as deemed appropriate, to
98              the MS for navigating the user to the allocated resource;
99          ElseIf (the user acquires the allocated resource) then {
100             Identify the allocated resource as being unavailable;
101             Dequeue the user from the queue;
102             Delete any active timer for the user;
103             Exit this LOOP
104         }
105         ElseIf (the user has acquired a different available one of the
106             resources or the allocated resource) then {
107             Identify the user acquired resource as unavailable;
108             Dequeue the user from the queue;
```

Fig. 44D

| | |
|---|---|
| 109 | Delete any active timer for the user; |
| 110 | Exit this LOOP |
| 111 | } |
| 112 | Wait for at least one new and/or updated data item related to the MS user |
| 113 | acquiring the resource to be provided to the APP; |
| 114 | END_LOOP. |

LOCATING A MOBILE STATION AND APPLICATIONS THEREFOR

RELATED APPLICATIONS

The present application is a continuation-in-part of U.S. patent application Ser. No. 12/861,817 filed Aug. 23, 2010 which is fully incorporated herein by reference.

RELATED FIELD OF THE INVENTION

The present disclosure is directed generally to a system and method for wirelessly locating mobile stations and using such locations, and in particular, to a system and method for locating a wireless mobile radio station.

BACKGROUND

Wireless communications systems are becoming increasingly important worldwide. Wireless cellular telecommunications systems are rapidly replacing conventional wire-based telecommunications systems in many applications.

TERMS

The following definitions are provided for convenience. In general, the definitions here are also defined elsewhere in this document as well.

(1) The term wireless herein is, in general, an abbreviation for digital wireless, and in particular (but without limitation), wireless refers to digital radio signaling using one of standard digital protocols such as CDMA, TDMA, GSM, GPRS, as well as various other protocols such as those for WIFI and indoor wireless systems as one skilled in the art will understand.

(2) As used herein, the term mobile station (equivalently, MS) refers to a wireless device that is at least a transmitting device, and in most cases is also a wireless receiving device, such as a portable radio telephony handset. Note that in some contexts herein instead or in addition to mobile station, the following terms are also used: mobile device, mobile unit, personal station (PS), and location unit (LU). In general, these terms may be considered synonymous. However, the latter two terms may be used when referring to reduced functionality communication devices in comparison to a typical digital wireless mobile telephone.

(3) The term, infrastructure, denotes, in at least some embodiments, network of telephony communication services, and more particularly, that portion of such a network that receives and processes wireless communications with wireless mobile stations. In particular, an infrastructure may include network equipment such as telephony wireless base stations, access points or units, and/or other devices for communication with mobile stations, wherein such equipment may be based on protocols such as CDMA, TDMA, GSM, GPRS, as well as various other protocols such as those for WIFI and indoor wireless systems as one skilled in the art will understand, wherein such network equipment may provide cooperative wireless communication channels with the mobile station. Moreover, to simplify the description herein, to the extent possible, the term "base station", and/or "BS" is used herein to denote any/all of the above listed network equipment. Thus, an MS user within an area serviced by the base stations may be provided with wireless communication throughout the area by user transparent communication transfers (i.e., hand-offs) between the user's mobile station and these base stations in order to maintain effective communication service (e.g., voice service, or data service). Moreover, for at least many wireless systems, a mobile switch center provides communications and control connectivity among base stations.

(4) An example of a Parametric-driven intelligent agent-based location service follows: An intelligent agent software process monitors sets of Parametric conditions and location scenarios. When appropriate conditions and location criteria are satisfied, then a set of notifications or other actions are triggered to occur. A specific example follows: given that a certain child carrying a mobile station should be in a certain school between 8:00 A.M. and 3:00 P.M. on regular school days, then a wireless location request is invoked periodically, within the school day time frame. If a location request determines that the child's mobile station is located substantially outside of the general school area, then a parent/guardian is notified of that fact, and of the child's location via any of several methods, such as: (a.) a voice-synthesized telephone message, (b.) various extranet/internet means, such as electronic mail, netcasting, such as the product Castanet, by Marimba Software, Inc., (c.) fax to a predetermined telephone number, or (d.) alpha-numeric text paging.

(5) A commercial mobile radio service provider (CMRS) is the referenced name of a company that owns and/or operates a publicly accessible wireless system in the cellular or PCS spectrum radio bands.

(6) The term "geolocation" as used herein refers to "a representation of at least one of: a geographical location or a geographical extent". Thus, the term "GeoLocation Message" refers to a message that contains a content representative of at least one of: a geographical location or a geographical extent. Moreover, the term "geolocation result" refers to a result that represents at least one of: a geographical location or a geographical extent, and the term "geolocation related processing" is intended to mean "processing that is related to a result that represents at least one of: a geographical location or a geographical extent".

SUMMARY

Several wireless location based applications are disclosed herein, which provide the results of the location information to a variety of users in various channels and presentation schemes, for a number of useful reasons and under various conditions. The following applications are addressed: (1) providing wireless location to the originator or another, using either the digital air interface voice channel or a wireline channel, and an automatic call distributor; (2) providing wireless location to the originator, or another, using either the digital air interface voice channel or a wireline channel, and a hunt group associated with the central office or a PBS group; (3) providing wireless location to the originator or another, using either the digital air interface text paging, or short message service communications channel; (4) providing wireless location to the originator or another, using the Internet, and in one embodiment, using netcasting or "Push" technology; (5) selective group, multicast individualized directions with optional Conferencing; (6) rental car inventory control and dispatch; (7) vocalized directions and tracking; (8) wireless location and court ruling/criminal incarceration validation; (9) flexible delivery of wireless location information to public safety answering points; (10) trigger-based inventory and tracking; (11) group, e.g., family, safety and conditional notification; (12) wireless location-based retail/merchandising services; (13) location-based home/office/vehicle security management;

(13) infrastructure-supported wireless location using hand-actuated directional finding; (14) infrastructure-supported intelligent traffic and highway management; (15) Parametric-driven intelligent agent-based location services.

Additionally, a wireless location based method and is provided herein wherein an MS user may be used to enable geographic visualization applications, wherein one or more geographic areas of interest are presented as visual geographic images or maps with annotations thereon indicative of, e.g., a relative interest a mobile station user may have in such geographic areas. In particular, such geographic areas may be color coded on a map according to an expected interest the user may have in different ones of the areas. Moreover, such a visualization application may also include audio feedback as well, and in fact, in some contexts (e.g., a mountain bike rider on a trail requiring full visual attention by the rider to the trail terrain) such "visualization applications" may include an audio-only feature for providing a mobile station 140 user with only audio feedback such as directions or navigation instructions. In fact, in one embodiment, such a "visualization application" may be audio-only, wherein the audio provided is enhanced in sound quality and/or with more detailed information than would be, by default, provided if it is expected that the user could reliably and safely (at least periodically) view a graphical display on his/her mobile station 140. Accordingly, visualization applications as described herein can, in some embodiments, be audio-only applications.

It is an aspect of the present disclosure to describe a system and method for determining wireless location using one or more commercial mobile radio telecommunication systems for accurately locating people and/or objects in a cost effective manner. Related aspects for the present disclosure include providing a system and method that:

(1) can be readily incorporated into existing commercial wireless telephony systems with few, if any, modifications of a typical telephony wireless infrastructure;

(2) can use the native electronics of typical commercially available telephony wireless mobile stations (e.g., handsets) as location devices;

(3) can be used for locating people and/or objects residing indoors.

Yet another aspect is to provide a low cost location system and method, adaptable to wireless telephony systems, for using simultaneously a plurality of base stations owned and/or operated by competing commercial mobile radio service providers within a common radio coverage area, in order to achieve FCC phase 2 or other accuracy requirements, and for synergistically increasing mobile station location accuracy and consistency.

Yet another aspect is to provide a low cost location system and method, adaptable to wireless telephony systems, for using a plurality of location techniques In particular, at least some of the following mobile station location techniques can be utilized by various embodiments of the present disclosure:

(4.1) time-of-arrival wireless signal processing techniques;

(4.2) time-difference-of-arrival wireless signal processing techniques;

(4.3) adaptive wireless signal processing techniques having, for example, learning capabilities and including, for instance, neural net and genetic algorithm processing;

(4.4) signal processing techniques for matching MS location signals with wireless signal characteristics of known areas;

(4.5) conflict resolution techniques for resolving conflicts in hypotheses for MS location estimates;

(4.6) enhancement of MS location estimates through the use of both heuristics and historical data associating MS wireless signal characteristics with known locations and/or environmental conditions.

Yet another aspect is to provide a system and method for flexible delivery of location information to Public Safety Answering Points, end users, centralized dispatchers, as well as to agents (either human or mechanized) associated with trigger-based inventory and tracking systems. Flexible delivery used here indicates providing location via various two dimensional closed-form shapes, such as polygons, ellipses, etc., which bound the location probabilities. In cases where height location information is known, the bounding shape may be three-dimensional.

Yet another aspect is to provide a system and method for a variety of new location-based services for public and private group safety, including family support functions.

Yet another aspect is to provide a system and method for National Scale Wireless Location capability. Although the primary focus of this patent is to provide wireless location with accuracy to meet the FCC phase two requirements, a system and method is provided that also utilizes roaming signaling to determine in which city is a particular wireless mobile station located.

Yet another aspect is to provide and system and method for Parametric-driven, intelligent agent-based location services. Parameters may include time, location, and user-specific and/or group specific criteria.

Yet another aspect is to provide a system and method for determining and/or enhancing wireless location using one or more of the following: (a.) CDMA-based Distributed Antenna technology; (b.) Home Base Stations and AIN technology.

Yet another aspect is to provide notification messages and/or voice-synthesized call or text paging function to a plurality of other mobile station users when a mobile station user travels into, or away from, one or more zones or are within short distances of shopping malls, stores, merchandising dealers etc.

Yet another aspect is to provide notification messages and/or voice-synthesized call or text paging functions to a plurality of other mobile station users when a mobile station dials a predefined telephone number, such as 911, or a type of "mild emergency cry for help' number.

Yet another aspect is to provide notification messages and/or voice-synthesized call or text paging function to a plurality of other mobile station users when a mobile station user dials a predefined telephone number, such as 311, or a type of mild emergency cry for help number, wherein the plurality of other mobile station users are within a particular distance, or a minimum distance to the mobile station user who dialed the predefined number.

Yet another aspect is to provide notification messages and/or voice-synthesized call or text paging function to a plurality of other mobile station users when a mobile station user dials a predefined telephone number, such as 311, or a type of mild emergency cry for help number, wherein the plurality of other mobile station users are within a particular distance, or a minimum distance to the mobile station user who dialed the predefined number, and wherein the other mobile station users are provided individualized directional or navigation information from their current locations, to reach to the mobile station user who dialed the predefined number.

Yet another aspect is to provide automatic home office, vehicle and boat security functions, which are activated and deactivated based on a mobile station user's location to or away from a location associated with the security functions.

Yet another aspect is to provide notifications (e.g., via fax, page, e-mail, text paging or voice synthesized call message), or to setup a group conference call capability to a plurality of predefined individuals, based on a mobile station user's call to 911, or based on a mobile station user's traveling into or away from a location zone or area, or based upon a sensor input signal to the user's mobile station, such as a sudden change in G forces, such as falling down, having the car hit another object suddenly, air bag deployment, etc.

Yet another aspect is to provide location information to a 'searcher' mobile station user who then further refines or narrows the scope of the location/search for a 'target' mobile station, or the mobile station to be located, using a small microwave dish, in communication with, or to supplement/replace the searcher mobile station antenna, whose physical orientation is used to further determine the target mobile station location, relative to the searcher's mobile station position/orientation.

Yet another aspect is to provide a means to allow more flexible storage, inventory and enhanced user accessibility of rental vehicles, by combining location technology of rental car driver carrying his/her own mobile station, along with a mobile station which remains always active and fixed to a rental car. By maintaining accurate location records of rental car locations and automatic, remote-control of rental cars (or smart cars) which use the mobile station to telemeter control data to and from the car, whose doors, door locks, and general accessibility are controlled by a centralized computer system, rental cars can be dropped off at convenient shopping center malls, airport parking lots, hotels and at other convenient locations.

Yet another aspect is to provide location estimates to users carrying mobile stations, via voice synthesis, data circuit messaging or text paging.

Yet another aspect is to provide a mechanism whereby mobile station users may access and control their subscriber profile for location purposes. The location subscriber profile is a persistent data store which contains logic regarding under what criteria will that mobile station user allow his/her location to be made known, and to whom. The mobile station user may access the location profile via several methods, including Internet means, and mobile station handset keypad entry and voice recognition circuits.

Yet another aspect is to utilize signaling detection characteristics of other CDMA base stations and systems in a given area, owned and operated by an another commercial mobile radio service provider (CMRS provider). By including other CMRS providers' infrastructure in the location estimation analysis process, improvements in location accuracy can be realized.

The present application fully incorporates by reference U.S. Pat. No. 6,952,181), U.S. Pat. No. 7,764,231 as well as U.S. Provisional Application No. 60/056,603 filed Aug. 20, 1997, U.S. Provisional Application No. 60/044,821 filed Apr. 25, 1997; and U.S. Provisional Application No. 60/025,855 filed Sep. 9, 1996.

Further description of the advantages, benefits and patentable aspects of the present disclosure will become evident from the accompanying drawings and description hereinbelow. All novel aspects of the present disclosure, whether mentioned explicitly in this Summary section or not, are considered subject matter for patent protection either singly or in combination with other aspects of the present disclosure. Accordingly, such novel aspects of the present disclosure and/or in the drawings that may be omitted from, or less than fully described in this Summary section are fully incorporated herein by reference into this Summary. In particular, all claims of the Claims section hereinbelow are fully incorporated herein by reference into this Summary section.

BRIEF DESCRIPTION OF THE DRAWINGS

FIG. 1 illustrates an overall view of a wireless location system and method for using multiple commercial mobile radio service providers;

FIG. 2 shows is a high level wireless location architecture using the intelligent network, which illustrates aspects of the home base station and Internet connectivity for receiving location requests and for providing location estimates;

FIG. 3 illustrates how the signals from the base stations associated with various multiple commercial radio service providers can be shared with the wireless location system to provide an improved geometry and thus improved wireless location accuracy.

FIG. 4 shows how the mobile station database in the location system is updated via interfaces in communication with multiple commercial mobile radio service providers using customer care systems.

FIG. 5 shows a method of direct access to multiple CMRS base stations, from the location system perspective, thus avoiding the need to significantly modify network infrastructure systems.

FIG. 6 illustrates physical components and the effects of predetermined signal delay, and total system delay in a distributed antenna environment for purposes of wireless location;

FIG. 7 shows the timing relationships among the signals within a distributed antenna system.

FIG. 8 shows a flowchart of the methods and procedures required to implement a DA database;

FIG. 9 illustrates an exemplary DA configuration with a direct antenna connection to the base stations;

FIG. 10 illustrates an alternative DA configuration using multipoint microwave;

FIG. 11 illustrates how multiple base stations could be used via a microwave circuit to provide PCS and location service to a multilevel building via virtual pilot channels;

FIG. 12 shows the DA delay spread ranges possible for a 500 microsecond guard zone;

FIG. 13 shows DA-cell layout a geometry and how location geometries can be constructed;

FIG. 14 illustrates the realization of actual measurements and classification utilized within DA cell ranges to determine a percent range within each cell.

FIG. 15 shows the standard components of a CDMA MS.

FIG. 16 shows one embodiment for MS modification that facilities enhanced RF measurement telemetry.

FIG. 17 shows how the LC is used in a Home Base Station architecture.

FIG. 18 illustrates a typical case where signals from three base stations can be detected.

FIG. 19 illustrates a typical case where signals from four base stations (including remaining set information) can be detected.

FIG. 20 shows a MS detection scheme with a two base station geometry.

FIG. 21 illustrates a typical amorphous location area with only the signal detection of a single base station sector, by a MS.

FIGS. 22A-C shows a series of typical reverse path CDMA RF measurements in a dense urban area.

FIGS. 23A-C shows a series of typical reverse path CDMA RF measurements in a rural setting.

FIG. 24 shows a typical Location Center connection to a CTIA Model.

FIG. 25 shows a typical national Location Center and relevant network connections.

FIG. 41 illustrates how traveling instructions from two different points can be provided to an initiator.

FIG. 43 indicates the addition of a fuzzy logic module which discretizes the wireless location estimate output from the TOA/TDOA location estimator module.

FIGS. 44A-44D show illustrative pseudo-code for the performance of the visualization applications.

DETAILED DESCRIPTION

Figure 26:
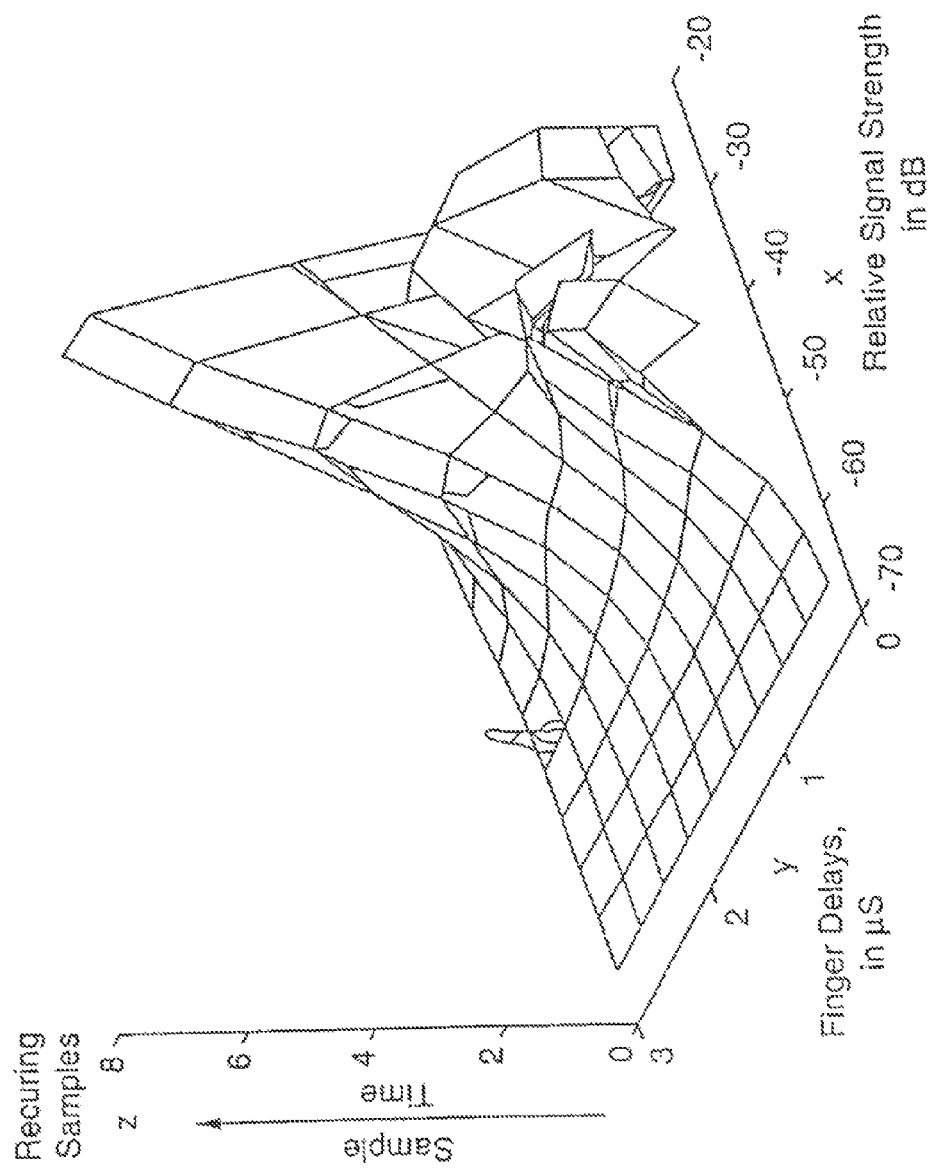
FIG. 26 illustrates a typical three dimensional delay spread profile.

Various digital wireless communication standards have been introduced such as code division multiple access (CDMA) and Time Division Multiple Access (TDMA) (e.g., Global Systems Mobile (GSM). These standards provide numerous enhancements for advancing the quality and communication capacity for wireless applications. Referring to CDMA, this standard is described in the Telephone Industries Association standard IS-95, for frequencies below 1 GHz, and in J-STD-008, the Wideband Spread-Spectrum Digital Cellular System Dual-Mode Mobile Station-Base station Compatibility Standard, for frequencies in the 1.8-1.9 GHz frequency bands.

Additionally, CDMA general principles have been described, for example, in U.S. Pat. No. 5,109,390, Diversity Receiver in a CDMA Cellular Telephone System, by Gilhousen, et al, filed Nov. 7, 1989. There are numerous advantages of such digital wireless technologies such as CDMA radio technology. For example, the CDMA spread spectrum scheme exploits radio frequency spectral efficiency and isolation by monitoring voice activity, managing two-way power control, provision of advanced variable-rate modems and error correcting signal design, and includes inherent resistance to fading, enhanced privacy, and provides for multiple "rake" digital data receivers and searcher receivers for correlation of multiple physical propagation paths, resembling maximum likelihood detection, as well as support for multiple base station communication with a mobile station, i.e., soft or softer hand-off capability. When coupled with a location center as described herein, substantial improvements in radio location can be achieved. For example, the CDMA spread spectrum scheme exploits radio frequency spectral efficiency and isolation by monitoring voice activity, managing two-way power control, provision of advanced variable-rate modems and error correcting signal design, and includes inherent resistance to fading, enhanced privacy, and provides for multiple "rake" digital data receivers and searcher receivers for correlation of multiple physical propagation paths, resembling maximum likelihood detection, as well as support for multiple base station communication with a mobile station, i.e., soft hand-off capability. Moreover, this same advanced radio communication infrastructure can also be used for enhanced radio location. As a further example, the capabilities of IS-41 and AIN already provide a broad-granularity of wireless location, as is necessary to, for example, properly direct a terminating call to a mobile station. Such information, originally intended for call processing usage, can be re-used in conjunction with the location center described herein to provide wireless location in the large (i.e., to determine which country, state and city a particular mobile station is located) and wireless location in the small (i.e., which location, plus or minus a few hundred feet within one or more base stations a given mobile station is located).

Related content to the present disclosure is provided in U.S. patent application Ser. No. 09/194,367 filed Nov. 24, 1998 now U.S. Pat. No. 7,764,231, this patent being incorporated fully herein by reference. Related content is also provided in U.S. Provisional Application No. 60/056,590 filed Aug. 20, 1997; U.S. Provisional Application No. 60/044,821 filed Apr. 25, 1997; and U.S. Provisional Application No. 60/025,855 filed Sep. 9, 1996, each of these patent applications also being fully incorporated herein by reference.

FIG. 1 illustrates a wireless location network using two commercial mobile radio service provider networks for an embodiment of the present disclosure. Accordingly, this figure illustrates the interconnections between the components of a typical wireless network configuration and various components that are specific to the embodiment. In particular, as one skilled in the art will understand, a typical wireless network includes: (a) a mobile switching center (MSC) 112a; (b) generally a service control point 4a, and base stations (not shown) which are in communication with a mobile switch center 112a. Within a typical metropolitan area it is also common for a second commercial mobile radio service (CMRS) provider to offer wireless service within essentially similar coverage areas, such systems typically including an mobile switch center 112b, service control point 4b, and associated base stations (not shown). Added to this wireless network, the present embodiment provides the following additional components:

(1) a location system or center 142 which is required for determining a location of a target mobile station using signal characteristic values as measured by the target mobile station (not shown) and nearby base stations (not shown), further including of the following modules or subsystem components:

(1.1) an application programming interface 14 (having a controller also denoted by the label "14"), for physically interfacing with and controlling the messaging to and from each CMRS mobile switch center 112a, 112b, service control points 4a and 4b, receiving location requests from either the mobile switch center 112a, or 112b, or the Internet 468, and providing connection to the signal processing subsystem 20;

(1.2) a signal processing subsystem 20, which is in communication with the application programming interface (L-API) 14. The signal processor 20 receives, queues, filters and processes signal measurement messages into various formats suitable for the location estimate modules DA 10 and TOA/TDOA 8;

(1.3) a TOA/TDOA location estimate module 8, in communication with the signal processing subsystem 20. The TOA/TDOA module 8 provides a location estimate result, using a time of arrival or a time difference of arrival technique based on conditioned signals from the signal processing subsystem 20; in addition the TOA/TDOA module may also process signals from the distributed antenna module 10, in order to provide a location estimate within environments containing distributed antenna systems;

(1.4) a distributed antenna (DA) module 10, which receives signals related to distributed antennas, from the signal processor 20 in communication a location estimating capability for utilizing one or more distributed antenna systems 168 as shown in FIG. 2, wherein each such system 168 provides wireless location information for an MS 140 within the area in communication with one or more distributed antenna system 168.

(1.5) a home base station module (HBS) 6 in FIG. 1, which receives signals from the (application programming interface) controller 14 and determines wireless location (i.e., providing a location estimate result) based on registration principles of the wireless user's mobile station when in communication with the user's home base station (not shown) in communications with a given service control point 4a or 4b, containing a home base station application (not shown).

Since home base stations and distributed antenna systems can be located on potentially each floor of a multi-story building, in such cases where infrastructure is installed, the wireless location technology described herein can be used to perform location in terms of height as well as by Latitude and Longitude.

Referring to FIG. 2, additional detail is provided of typical base station coverage areas, sectorization, and high level components used in the present disclosure's scope, including the mobile switch center 112, a mobile station 140 in communication with a home base station 160, and communication between the location system 142 and the public Internet 468, via an Internet service provider interface 472. A novel aspect of the present disclosure includes providing wireless location estimate information to various designated users via the public Internet. Although base stations may be placed in any configuration, a typical deployment configuration is approximately in a cellular honeycomb pattern, although many practical tradeoffs exist, such as site availability, versus the requirement for maximal terrain coverage area. To illustrate, such exemplary base stations (BSs) 122a through 122g are shown, each of which radiate referencing signals within their area of coverage to facilitate mobile station (MS) 140 radio frequency connectivity, and various timing and synchronization functions. A given base station may contain no sectors (not shown), thus radiating and receiving signals in a 360 degree omnidirectional coverage area pattern, or the base station may contain "smart antennas" (not shown) which have specialized coverage area patterns.

Alternatively and generally most frequent are base stations having three sector coverage area patterns. Shown in FIG. 2, each sector for base station 122a through 122g contains three sectors, labeled a, b, and c, which represent antennas that radiate and receive signals in an approximate 120 degree arc, from an overhead view. As one skilled in the art will understand, actual base station coverage areas generally are designed to overlap to some extent, thus ensuring seamless coverage in a geographical area. Control electronics within each base station are used to communicate with a given mobile station 140. Further, during communication with the mobile station the exact base station identification and sector identification information are known and are provided to the location center 142.

The base stations located at their cell sites may be coupled by various transport facilities 176 such as leased lines, frame relay, T-Carrier links, optical fiber links or by microwave communication links.

When the mobile station is powered on and in the idle state, it constantly monitors the pilot signal transmissions from each of the base stations located at nearby cell sites. As illustrated in FIG. 3, base station/sector coverage areas may often overlap both in the context of a single CMRS base station network, and also in the context of multiple CMRS base station networks, thus enabling mobile stations to detect, and, in the case of certain technologies, communicate simultaneously along both the forward and reverse paths, with multiple base stations/sectors, either with a single CMRS network or, in the case of hand-offs and roaming, multiple CMRS network equipment. In FIG. 3 the constantly radiating pilot signals from base station sectors 122a, 122b and 122c are detectable by mobile station 140 at its location. The mobile station 140 scans each pilot channel, which corresponds to a given base station/sector ID, and determines which cell it is in by comparing signals strengths of pilot signals transmitted from these particular cell-sites.

The mobile station 140 then initiates a registration request with the mobile switch center 112a, via the base station controller (not shown). The mobile switch center 112a determines whether or not the mobile station 140 is allowed to proceed with the registration process (except in the case of a 911 call, wherein no registration process is required). At this point, calls may be originated from the mobile station 140 or calls or short message service messages can be received from the mobile switch center 112a.

As shown in FIG. 2, the mobile switch center 112 communicates as appropriate, with a class 4/5 wireline telephony circuit switch or other central offices, with telephone trunks in communication with the public switch telephone network (PSTN) 124. Such central offices connect to wireline stations, such as telephones, or any communication device compatible with the line, such as a personal or home base station. The PSTN may also provide connections to long distance networks and other networks.

The mobile switch center 112 may also utilize IS/41 data circuits or trunks 522, which in turn connects to a service control point 104, using, for example, signaling system #7 (SS7) signaling link protocols for intelligent call processing, as one skilled in the art will understand. In the case of wireless advanced intelligent network (AIN) services such trunks and protocols are used for call routing instructions of calls interacting with the mobile switch center 112 or any switch capable of providing service switching point functions, and the public switched telephone network (PSTN) 124, with possible termination back to the wireless network. In the case of an mobile station 140 in communication with a corresponding home or office base station (HBS) 160, the HBS 160 controls, processes and interfaces the mobile station 140 to the PSTN 124, in a manner similar to a cordless telephone system, except that added AIN logic within, for example, the service control point (SCP) 104 is used to determine if the mobile station 140 is being controlled by the HBS 160 or a wireless base station 122. Regarding non-HBS calls, the mobile switch center 112 may direct calls between mobile stations 140 via the appropriate cell site base stations 122 a through 122h since such mobile stations 140 do not typically communicate directly with one another in such wireless standards as CDMA, TDMA NAMPS, AMPS and GSM.

Referring again to FIG. 2, the Location system 142 interfaces with the mobile switch center 112 either via dedicated transport facilities 178, using for example, any number of LAN/WAN technologies, such as Ethernet, fast Ethernet, frame relay, virtual private networks, etc., or via the PSTN 124 (not shown). The location system 142 receives autonomous (e.g., unsolicited) or command/response messages regarding, for example: (a) the wireless network states, including for example, the fact that a base station has been taken in or out of service, (b) mobile station 140 and BS 122 radio frequency (RF) signal measurements, (c) notifications from a SCP 104 indicating that an HBS 160 has detected and registered with the SCP 104 the mobile station 140 corresponding to the HBS 160, and (d) any distributed antenna systems 168. Conversely, the location system 142 provides data and control information to each of the above components in (a)-(d). Additionally, the Location system 142 may provide location information to a mobile station 140, via a BS 122, using, for example the short message service protocol, or any data communication protocol supported by the air interface between the base station and the mobile station. Interface 106 connecting the location system 142 with the service control point 104 may also be required in the event the home location register and/or the home base station AIN function is located in the SCP 104.

Assuming the wireless technology CDMA is used, each BS 122a, 122b, 122c, through 122g uses a time offset of the pilot PN sequence to identify a forward CDMA pilot channel. Furthermore, time offsets, in CDMA chip sizes, may be re-used within a PCS system, thus providing efficient use of pilot time offset chips, thus achieving spectrum efficiency.

The use of distributed antennas is another technique for improving or extending the RF coverage of a radio coverage area 120 of a wireless system. Such distributed antennas are typically used in buildings or other areas of dense clutter, such as numerous walls, partitions and/or similar structures causing substantial signal attenuation. As shown in FIGS. 6, 9, 10, 11, and 13, distributed antennas 168 are typically connected together in a serial fashion for communicating with one or more infrastructure base stations 122. Distributed antennas may be connected to the mobile switch center 112 via various air interfaces, as shown in FIGS. 10 and 11, or alternatively distributed antennas may be connected to the MSC via a directed connection to a base station 122 as shown in FIG. 9, or via a private branch exchange (PBX) as shown in FIG. 13.

Referring to FIG. 11, distributed antennas 168 are useful particularly in wireless system configurations involving microcells, and potentially indoor environments, such as wireless systems in communication with private branch exchange systems (reference FIG. 13) in business offices, and in wireless local loop applications (not shown) as one skilled in the art will understand. Additionally, a distributed antenna embodiment can provide significant improvements in decreasing location error, as compared with an indoor mobile station 140 (reference FIG. 11) user with a wireless connection to an outdoor, infrastructure base station 122, as illustrated in FIGS. 11, 12, 13 and 14.

Network Data Services

The implementation of the data services required to telemeter the necessary signal measurements may be performed in any of several embodiments. In one embodiment the location signal measurements request-response application message set utilizes the air interface services provided by the spare bits and digital control words not currently in the air interface standards IS-95 and ANSI-J-STD-008. Such bits and control words can be reserved for the purpose of requesting and providing the required location signal measurements discussed herein. Using this embodiment the base station and mobile switch center must be modified to support the interworking function required between the location center and the mobile station. In a second embodiment the location signal measurements request-response application message set is implemented using service options 4 and 12, which provides asynchronous data transmission capability, as defined in *TR45 Data Standard, Async and Fax Section*, document number TIA/EIA/IS-DATA.4. Using this second embodiment, the mobile station control processor provides, or would interface with a function emulating mobile termination 0 or 2 services at the $R_m$ network reference point. The L-API 14 then provides, or would interface with a function emulating the physical interface connecting a data circuit-terminating equipment (DCE) to the PSTN at the W network reference point, in communication with the PSTN, which is also in communication with reference point Ai, which is in communication with reference point $U_m$, which is in turn in communication with reference point $R_m$. An advantage of this embodiment is that no ASIC or circuit board modifications are needed in the mobile station.

The ANSI standards J-008 and IS-95 provide several means for the base station 122 to establish and to extend the search window size that the mobile station 140 should use in its scanning process, and to identify further pilots. For location purposes, either existing standard parameters can be extended, or a location message request from the Base station can inform the searcher receiver of the mobile station to extend its search range, as necessary, to capture all relevant base station pilots and their multipath fingers, in order to complete the location measurement sample.

The search performance criteria defined in ANSI IS-98, Recommended Minimum Performance Standards for Dual Mode, can be increased as appropriate to accommodate a larger set of potentially detectable base stations, including Location Base stations and Mobile Base stations. Additionally the search window table size for various search window values must be increased to accommodate new pilot channel pn-offsets associated with Location Base Stations and Mobile Base stations.

Existing standard parameters include, for example using the In-traffic System Parameters Message, the values SRCH_WIN_A (for active and candidate set), SRCH_WIN_N (for neighboring set), and SRCH_SIN_R (for remaining set) can be used to cause the searcher receiver to increase its search area to detect and thus measure as many pilots as can be detected in the area. Extending the range of T_ADD and T_DROP parameters can also be used to facilitate the mobile to retain data on additional pilots in the area. The extended neighbor list message is used to inform the mobile station of the necessary characteristics of neighboring pilot signals. For example if location base stations are used on a different frequency assignment, and/or utilize unique, non-public pilot PN sequence offset indices, for example, in using increments other than 64 PN chips, then the extended neighbor list message can be used to instruct the mobile station to scan for those types of base stations, accordingly.

There can be several combinations of delay spread signal strength measurements made available to the location center, from the mobile station 140. In some cases the mobile station 140 may detect up to three to four pilot channels (representing 3-4 base stations), or as few as one signal from one pilot channel.

For each pilot channel detection case, multiple, up to three to four fingers, or multipath signals may be detected per pilot channel.

Note that multiple multipath signals, or multiple "fingers" could exist from a less-strong BS pilot signal, or in any of several combinations, which can depend widely upon the mobile station's location within the base station environment.

By modifying the CDMA Base station, mobile station and controller capabilities to provide the location center 142 with data that exceeds the 1:1 fingers to data receiver correspondence, additional information can be collected and processed in order to further improve the accuracy of the location estimate. A control message from the location center 142 and carried through the network, is sent to the control processor in the mobile station, requiring the searcher receiver in the mobile station to transmit to the location center 142 via the network, all detectable delay spread fingers related to each detectable pilot channel.

In one embodiment the control message is implemented in the CDMA receiver via a multiplexing technique, including appropriate manipulation of the hand-off parameters T_ADDs, T_DROPs, search window and the active, neighbor and remaining pilot sets held within the mobile station' memory.

Although the CDMA ANSI J-STD 008 requires reporting of the pilot channel arrival time in a time period of units of one chip size, or 813.802 nanoseconds, typical CDMA receivers contain an internal Quantization interval of one eighth chip size.

Within the mobile station, by modifying the time of arrival message response message to output the delay value in unit increments of one-eighth chip size, the precision of location accuracy can be increased from about 800 feet in radius to about 110 feet. At the base station the arrival time measurement is forwarded in one-eighth units to the Location Center. A multiplier function applied to the received measurement at the base station rescales the measurement for routine CDMA control and monitoring purposes, in order to be consistent with the CDMA standard. In order to distinguish among several mobile station models which report arrival time in either one-eighth chip units or one chip unit sizes, an encoding can be used in the mobile station's hardware or software identifications, telemetered to the base station and Location Center, in order to determine the arrival time measurement units. In one embodiment the analog receiver in the mobile station utilizes a clock signal which runs eight times faster than the clock originally disclosed in the Gilhousen U.S. Pat. No. 5,109,390. In this manner the digital signal provided to the data receivers and the searcher receiver will include an improved resolution in ability to detect delay spread signals, which are directly used to improve wireless location.

Although the CDMA air interface standard only requires a 1,000 nanosecond tolerance accuracy within respect to the base station, location accuracy can be improved if manufacturing calibration precision's are held to within tighter tolerances, such as less than 250 nanoseconds. However in any given location request, as long as the base station to base station tolerances are tuned properly to an amount less than 500 nanoseconds, then very good location estimates can be performed due to the self canceling time effect geometries typically present in multi pilot channel detection found in urban and suburban areas.

Increasing the typical number of data receivers in either the mobile station or base station provide added capabilities to lock and track more delay spread fingers and respective base station pilot channels. The resulting additional information, if available in a given radio coverage area 120 in FIG. 1, can be used for enhanced location estimate accuracy due to confluence or voting methods which can be deployed at the Location system 142.

Fuzzy Logic for Vertical Location

In certain cases wireless location signals are received representing distributed antennas (or other base stations) across building floor boundaries being received from a specific floor on a multi-storied building. As a specific example, consider signals are being received from both the 40th and the $41^{st}$ floor; the objective is to resolve the ambiguity of the situation. Fuzzy logic is used to resolve this ambiguity. The determination as to which floor the user of the mobile station is on is based on the strength of the signal, S, and the past reliability of the information associated with the two antennae, R. The spaces of S and R are discretized using fuzzy sets. The strength is defined as being: (1) VERY STRONG (VS), (2) STRONG (S), (3) WEAK (W), and (4) VERY WEAK (VW) as defined by membership functions. The reliability of information is defined as being: (1) VERY RELIABLE (VR), (2) RELIABLE (R), and (3) NOT RELIABLE (NR), again as defined by membership functions. A fuzzy relation or mapping is described which descretizes how confident it is that the signal is coming for a given floor, e.g., the 40th floor, using the following notation:

|    | VS   | S    | W    | VW  |
|----|------|------|------|-----|
| VR | 1.0  | 0.85 | 0.45 | 0.2 |
| R  | 0.85 | 0.6  | 0.4  | 0.1 |
| NR | 0.6  | 0.4  | 0.3  | 0.0 |

The above relation matrix is read, for example, that when the signal information is RELIABLE and the strength is WEAK, then the confidence that the signal is coming from the 40th floor is 0.4. A similar fuzzy relation matrix is established for the distributed antenna on the 41st floor, and thus the result would be a confidence factor associated with the mobile station being located on either floor. A single solution, that is, whether the mobile station is on the 40th or 41st floor is determined using a compositional rule of inference. The compositional rule of inference is a function that prescribes a mechanism for consolidating membership function values into a single crisp function. This function can take a variety of forms including max-min composition, max-product composition. etc. The compositional rule of inference can be implemented, for example, by a summing junction which collects the results of each firing rule. The summing junction's output is then provided to a centroidal defuzzier which provides the discretized output.

FIG. 43 indicates the addition of a fuzzy logic module 41 which optionally discretizes the wireless location estimate output from the TOA/TDOA location estimator module 8. In the above case fuzzy logic rules related to the distributed antenna relation matrix would be fired or activated as a result of examining the message header data structure that indicates that the location estimate was the result of a distributed antenna case around the 40th and 41st floor of a particular building within which such fuzzy relations exist or in any other localized case wherein such fuzzy relations have been predetermined. Otherwise, in cases where no such fuzzy rules apply, the location estimate is passed to the recipient without further discretization.

Note that the confidence associated with the location of the mobile station can be considered a function of several variables, not just the two (S and R) described above. For instance, it would not be unreasonable to segregate the reliability information by time signal delay as determined within the present disclosure. The fuzzy relation is capable of handling a variety of such situations. Thus which floor the mobile station is on can be considered to be a function of numerous variables; the ultimate decision can be made based on a great deal of information.

Location Center—Network Elements API Description

A location application programming interface 14 (FIG. 1), or L-API, is required between the location system's 142 signal processor 20 and the mobile switch center 12 network element type, in order to send and receive various control, signals and data messages for wireless location purposes. The L-API 14 is implemented using a preferably high-capacity physical layer communications interface, such as IEEE standard 802.3 (10 baseT Ethernet), although other physical layer interfaces could be used, such as fiber optic ATM, frame relay, etc. Two forms of API implementation are possible. In the first case the control signals and data messages are realized using the mobile switch center 112 vendor's native operations messages inherent in the product offering, without any special modifications. In the second case the L-API 14 includes a full suite of commands and messaging content specifically optimized for wireless location purposes, which may require some, although minor development on the part of the mobile switch center vendor. A minimum set of L-API message types includes:

A first message type, an autonomous notification message from the mobile switch center 112 to the location system 142, is required in the event a wireless enhanced 9-1-1 call has been sent to the mobile switch center from a mobile station 140, including the mobile identification number (MIN), along with various CMRS identification and mobile station detected active, candidate, neighbor and remaining pilot set information, pilot strength measurements message.

A second message type, forward path request-response message, from location system 142 to mobile switch center 112, is required to request a mobile station (MS) for signal measurements and hand-off information, with a response message back from the mobile switch center 112 to the location system 142, along with various CMRS identification.

A third message type, Reverse path request-response message, from location system 142 to mobile switch center 112, to a BS for signal measurements received at the BS and hand-off information, for a given mobile station MIN, along with various CMRS identification. It is preferable for the received signal strength measurements performed at the mobile station along the forward path, and at the base station along the reverse path, to be reported in a variable-length data structure as follows: for each pilot channel offset, include the phase of the earliest arriving usable multipath component pilot PN sequence relative to the zero offset pilot PN sequence of this pilot, termed pilot PN phase or pilot arrival, in units of one-eighth PN chip, instead of units of one PN chip as stated in the standards. Furthermore, in accordance with the standards, the pilot strength shall be included, measured based on at most k usable components, where k is the number of demodulating elements supported by the receiver system. In addition the total number of each detectable multipath components shall be reported. In addition each multipath component, for a given pilot, shall be identified by both its delay component and signal strength, for inclusion in the signal measurements to the location system 142. Regarding each individual multipath component, signal strength is expressed as is commonly known, by adding the ratios of received pilot-multipath component energy per chip, $E_c$, to total received spectral density (noise and signals), $i_0$ of at most that one multipath component (i.e., k is equal to one).

A fourth message type, an autonomous notification message from the mobile switch center 112 to the location system 142 is required, in the event of a mobile station hand-off state change, along with various CMRS identification.

In order to implement additional location functions such as wide area location, wherein location is determined across roaming boundaries, out-of-coverage area conditions or mobile station 140 turned off, and home base station applications, the L-API 14 must include access to and receive data from a data store contained in the home location register (HLR) network element type associated with the mobile switch center 112.

A fifth message type is required which provides the location system 142 with the mobile station MIN, hand-off, along with various CMRS identification information (e.g., old and new state changes, old and new BS identifications, and hand-offs to another CMRS), roaming location and status changes. A typical communications protocol such as Signaling System number 7, running on a V.35 communications channel could be used for implementation, but numerous other protocols (e.g., TCIP/IP, ROSE, CMISE, etc.) could be used to implement this capability. If the home location register is local to the mobile switch center 112 then the LC-mobile switch center communications link could be used, otherwise a separate communications link is used between the location system 142 and the home location register.

A sixth message type, an autonomous notification message type issued from the location system 142 to the home location register, is required for those location applications that rely on an alert from the home location register whenever a particular mobile station state change occurs, along with various CMRS identification. Consider the case wherein an mobile station 140 whose location is to be tracked constantly. In such cases a history of locations is maintained in the location system 142. Should the mobile station 140 user turn off the power, or exit from the coverage area, then by using previous location values a vector and approximate velocity can be determined. This sixth message type provides a notification message from the home location register to the location system 142 whenever a previously identified mobile station MIN has a state change. Examples of state changes include cases where the base station 122 discovers the mobile station 140 has traveled to another base station, or that the current primary base station 122 can no longer communicate with the mobile station 140 (i.e., no power), or that a new registration has occurred. In general this message type should support the notification from the home location register to the location system 142 of all messaging and data associated with the nine types of registration, in the case of CDMA. Specifically these include power-up, power-down, timer-based, distance-based, zone-based, parameter-change, ordered, implicit and traffic channel registration. The location system 142 should also be informed of the registration enablement status of each type of registration, which can be provided to the location system 142 via a redirection of the systems parameters message. It should also be possible (in a seventh message type) for the location system 142 to initiate an ordered registration through an order message, from the location system 142 to the mobile switch center 112. The mobile switch center 112 then shall route the message to the appropriate base station, and then to the mobile station. The location system 142 should also be able to receive the results of the message.

In order to implement additional location functions such as providing users with location information and routing instructions to certain locations via the wireless short message text paging service, an L-API 14 is required between the location system 142 and the network element type used to implement the short message service. Such network elements may be termed an intelligent peripheral or a service node. A number of existing paging interfaces have been proposed in standards bodies, and one or more modifications can be made to accommodate L-API 14 content. In any case, the following L-API addition is required: an eighth message type which allows the location system 142 to send a text message containing location information or instructions to a particular mobile station MIN, and a related message to verify response. Optionally in another, ninth message type, an autonomous message may be provided to alert the location system 142 under conditions wherein a state change occurs on a previously pending text message. This last message type provides improved quality feedback to the initiating party regarding the acceptance situation of the attempted-to-send page.

Utilizing Multiple CMRS Infrastructure in a Shared Coverage Area

As a consequence in practical deployment situations that base stations are not placed in a uniform manner in a geographical area, and the fact that variable and fixed clutter introduce a variety of signal measurements which can result in the provision of an ambiguous location estimation, a novel aspect of this patent includes the utilization of the inherent ability of the wireless protocol and receiver design to request and receive signal measurements along the forward and reverse air interface communications path with a given mobile station and other commercial mobile radio service providers, in cases where multiple service providers share a common coverage area. Thus in a coverage area shared by two service providers A and B, utilization of received signal measurements from both service provider A and service provider B can be used by the location center as unique, orthogonal information to both resolve ambiguous location estimates and to further improve the location estimate accuracy.

The CDMA air interface, for example, provides a soft hand-off capability for the mobile station to hand-off a voice communication channel to another base station, and even to another CMRS provider, termed a hard hand-off.

Referring to FIG. 3, assume three sectored base stations 122*a*, 122*b*, and 122*c*, in communication with mobile switch center-A 112*a*, are owned and operated by CMRS provider A. Further, assume three sectored base stations 122*d* and 122*e*, in communication with mobile switch center-B 112*b*, are owned and operated by CMRS provider B, and that the coverage area with CMRS-A and CMRS-B substantially overlap. In order to locate a mobile station 140 whose subscriber normally does business with CMRS provider A, assume that the receiver of mobile station 140 can detect signals from base stations 122*a*, 122*b*, and 122*c*, as well as from base stations 122*d* and 122*e*, although normal mode use would preclude such measurements from being initiated. Assume further that the resulting location estimate 131 (FIG. 5), generated from the location center 142 contains either an ambiguous location estimate value pair, or otherwise cannot render a location estimate with the desired range of accuracy.

From an inspection of the overall base station geometry of base stations owned by CMRS A and CMRS B it is evident that a strong possibility exists that either 1.) the receivers in mobile station 140 have the possibility to detect the pilot channels associated with base stations 122*d* and 122*e*; 2.) the receivers in base stations 122*d* and 122*e* have the possibility to detect the transmitter signal from mobile station 140. The location system 142 contains a data store of both CMRS provider's base station geometries and is in communication with each mobile switch center—A 112*a* and mobile switch center—B 112*b*. An application in the location system 142 sends a control message to the mobile station 140, instructing the mobile station to tune its searcher receiver to listen for and report back signal measurement data regarding the pilot channel information associated with base stations 122*d* and 122*e*, in addition to a request to report of pilot signals relative to base stations 122*a*, 122*b*, and 122*c*. Similarly the application in the location system 142 sends messages to each of base stations 122*d* and 122*e*, with instructions to take signal measurements and report back the resulting information regarding the mobile stations transmitter 140. Since the signaling information from base stations 122*d* and 122*e* are based on a substantially different location geometry, the resultant information is orthogonal and thus can be used by the location center to provide enhanced location estimates.

If appropriate, a variation of the above process includes a location center initiated forced hard hand-off of the mobile station from a primary base station, e.g., 122*b* associated with CMRS-A, to a new primary base station associated with CMRS-B, e.g., 122*d*. A forced hand-off will further provide improvements in reducing systemic timing errors which may be inherent among base stations owned by different CMRS. After the appropriate signal measurements have been reported the location system 142 can revert the hand-off back to the original CMRS. Other location system components shown in FIG. 3 include the L-API 14 which includes the location applications programming interface 136 (L-API-MSC) as a communications interface with multiple CMRS mobile switching centers, via physical interfaces 176*a* and 176*b*.

In order to provide the most economically efficient and accurate wireless location service capabilities among multiple CMRS providers in a shared coverage area, a common location applications programming interface (L-API 14) is highly desirable. A common interface also supports the natural competitive behaviors among wireless consumers and CMRS by providing flexible relationships among consumers who may want to switch service providers, yet retain consistent wireless location services for public safety. This approach minimizes the L-API design and deployment costs among infrastructure vendors and location service providers in a shared coverage area. Based on a L-API between a wireless location center and the mobile switch centers of multiple CMRS, a novel aspect of the present disclosure further includes a method and process that provides account management clearing house and revenue settlement capability with appropriate security management controls. This capability is implemented as wireless location control, accounting and security mediation agent functions to compensate CMRS providers for providing various location-specific network services as described herein.

As wireless location requests are sent to the location center for a given CMRS, operated by a wireless location service provider (WLSP), the location center: 1.) assesses the appropriateness of soliciting additional signal and control measurements from another CMRS' base station in the same coverage area, in order to improve the quality of the location estimate, 2.) accesses, requests and receives signal and control information with another CMRS base station infrastructure, 3.) provides as appropriate a record of compensation entitlement between or among multiple CRMS and WLSPs, and 4.) provides security management controls that protect the privacy needs of wireless customers and the unauthorized sharing of information between or among CMRS. Security controls also include audit trails and controls regarding customer access of their location subscriber profile and the administration of network security processes and related base station parameters and inventory.

Referring to FIG. 5, Location Center-base station access, multiple CMRS, an alternative embodiment is provided to extract the wireless location signal measurement data from each base station associated with each of multiple CMRS. Given base station 122i and 122j are operated by CMRS-A and base station 122k and 122m are operated by CMRS-B, a communication circuit provides connectivity with the location application programming interface-base station (L-API-BS) (not shown). The L-API-BS is in communication with the L-API 14 in the location center 142. The communications circuit can be any of several conventional transport facilities, such as a private line circuit, a DS-1 or T-1 carrier circuit, frame relay circuit, microwave circuit, or other data communications circuit.

The advantage of this embodiment is that no modifications are required by the infrastructure vendor in terms of the embedded operations circuit, and related functions and systems which otherwise would be needed to telemeter wireless location signal measurement data from the base station to the location center 142. The termination equipment (not shown) in communication with the transport facilities, within each base station typically includes a small computer with an in-circuit connection, such as an ASIC clip-on device, with connections to the control processor circuitry with the base station in the receiver section. The small computer provides a conversion of the signals provided on the in-circuit connection to the ASIC chip, for serialization and transmission to the location center via the transport facilities.

Home Base Station Description

The Home Base station (HBS) concept in the PCS wireless network environment allows a user's mobile station to be also used as a low cost cordless phone, whenever the mobile station is physically near (generally within 700-1,000 feet) of a Home Base station Device (HBSD). This enables the user to avoid the typically higher cost air time charges associated with traditional wireless service.

The HBSD is similar to ordinary cordless phone transceiver devices in current use today, but is modified to function with a PCS wireless mobile station. Although the HBSD has been typically used at a residential consumer's home, the HBSD could also be used in business settings and other environments.

When a mobile station (MS) is near the HBSD as shown in FIG. 17, and the HBSD detects the presence of a mobile station over the cordless phone air interface, the HBSD signals the Home Location Register (HLR) software in the Service Control Point in the AIN network associated with the mobile station and mobile station's home mobile switch center. The home location register redirects mobile station terminating calls from the network away form the mobile station's mobile identification number in the mobile switch center, and to the AIN/SSP wireline class V switch which connects the wireline number associated with the HBSD. Similarly, the HBSD, upon detecting a mobile station call origination attempt, redirects the mobile station signal from a PCS network fixed base station, to the control of the HBSD. The HBSD redirects the mobile station originating call through the wireline network, similar to any other wireline network call.

A reverse scenario occurs whenever the mobile station and HBSD lose communication: the mobile station registers in a wireless PCS network fixed base station, causing redirection of calls to the wireless network. The cordless phone air interface may be of a vendor proprietary design, or it may be a similar design as the CDMA air interface.

In order to perform a location estimate in the HBS concept, a connection is used between the Location Center (LC) and the home location register/HBS application in the SCP. In addition, a new process, termed a Location Notification Process (LNP) within the home location register/SCP is used to send a message to the LC, autonomously whenever a state change occurs in the mobile station' (either via a specific list of mobile identification numbers or all mobile identification numbers) registration: registering either to a fixed Base station in the Wireless PCS network or to a HBSD.

Alternatively the process may respond to an on-demand message from the LC to the LNP within the home location register/HBS application. In either case a response message from the LNP to the LC provides the information regarding whether or not a mobile station is within range of its, or a designated HBSD. In either case the response message contains a message header information which provides the signal processing subsystem 20 (equivalently this may be known by signal filtering subsystem) with the ability to determine and distribute the information to the HBS First Order Location Estimate Model.

National Scale Wireless Location

By utilizing specific data items used in the Home Location Register in the Advanced Intelligent Network, it is possible to determine the mobile station location on a national scale, i.e., location within the context of a state, and in which city.

Referring now to FIGS. 24 and 25, network interface reference point Z is used in the embodiment wherein a gross location must be determined. A gross location is defined as an area associated with a particular mobile switch center coverage area. Mobile switch center coverage areas are typically bounded by a large metropolitan area, such as a city. The Home Location Register (HLR) contains gross location information. The Z interface allows the LC 142 to query the home location register to determine if the user is in their "home area, or whether the user is roaming to another mobile switch center coverage area, such as another city. IS-41 Cellular Radio Telecommunications intersystem operations communications protocols provide mechanisms that allow a user to roam into authorized areas outside of their "home" area.

If the user is roaming in another area, then the LC 142 can use that information to initiate location control messages toward the CDMA network currently hosting the mobile station user. FIG. 25 illustrates how a user based in Los Angeles, Calif., for example, may roam to a CDMA system in New York City, and be "located" within that metropolitan area, through a data communications network and a national Location Center Clearinghouse system.

Signal Processor Subsystem

The signal processing subsystem receives control messages and signal measurements and transmits appropriate control messages to the wireless network via the location applications programming interface referenced earlier, for wireless location purposes. The signal processing subsystem additionally provides various signal identification, conditioning and pre-processing functions, including buffering, signal type classification, signal filtering, message control and routing functions to the location estimate modules.

There can be several combinations of Delay Spread/Signal Strength sets of measurements made available to the signal processing subsystem 20 within the Location Center/System 142, shown in FIG. 3. In some cases the mobile station 140 may be able to detect up to three or four Pilot Channels representing three to four Base Stations, or as few as one Pilot Channel, depending upon the environment. Similarly, possibly more than one BS 122 can detect a mobile station 140 transmitter signal, as evidenced by the provision of cell diversity or soft hand-off in the CDMA standards, and the fact that multiple CMRS' base station equipment commonly will overlap coverage areas. For each mobile station 140 or BS 122 transmitted signal detected by a receiver group at a station, multiple delayed signals, or "fingers" may be detected and tracked resulting from multipath radio propagation conditions, from a given transmitter.

In typical spread spectrum diversity CDMA receiver design, the "first" finger represents the most direct, or least delayed multipath signal. Second or possibly third or fourth fingers may also be detected and tracked, assuming the mobile station contains a sufficient number of data receivers. Although traditional TOA and TDOA methods would discard subsequent fingers related to the same transmitted finger, collection and use of these additional values can prove useful to reduce location ambiguity, and are thus collected by the Signal Processing subsystem in the Location Center 142.

For each pilot channel detection case, multiple fingers (up to three or four) may be detected and thus reported to the Location system 142, as shown in FIGS. 22A-C and 23A-C, for dense urban and rural settings, respectively. From the mobile receiver's perspective, a number of combinations of measurements could be made available to the Location Center. Table SP-1 illustrates the available combinations for three and four receiver cases, respectively.

TABLE SP-1

Nominal CDMA Location Measurement Combinations

| No. of Receivers | No. of BSs detected | No. of Fingers Detected | No. of Fingers, BS 1-S (first strongest) | No. of Fingers, BS 2-S (second strongest) | No. of Fingers, BS 3-S (third strongest) | No. of Fingers, 4-S (fourth Strongest) |
|---|---|---|---|---|---|---|
| 3 | 1 | 1 | 1 | 0 | 0 | 0 |
| 3 | 1 | 2 | 2 | 0 | 0 | 0 |
| 3 | 1 | 3 | 3 | 0 | 0 | 0 |
| 3 | 2 | 2 | 1 | 1 | 0 | 0 |
| 3 | 2 | 3 | 2 | 1 | 0 | 0 |
| 3 | 2 | 3 | 1 | 2 | 0 | 0 |
| 3 | 3 | 3 | 1 | 1 | 1 | 0 |
| 4 | 4 | 4 | 1 | 1 | 1 | 1 |
| 4 | 3 | 4 | 1 | 2 | 1 | 0 |
| 4 | 3 | 4 | 1 | 2 | 1 | 0 |
| 4 | 3 | 4 | 2 | 1 | 1 | 0 |
| 4 | 2 | 4 | 3 | 1 | 0 | 0 |
| 4 | 2 | 4 | 2 | 2 | 0 | 0 |
| 4 | 2 | 4 | 1 | 3 | 0 | 0 |
| 4 | 1 | 4 | 4 | 0 | 0 | 0 |

The above Table SP-1 scenario assumes that the mobile station design and data collection structure only permits a 1:1 correspondence to exist between the number of base stations detected and the number of data receivers reporting multipath CDMA fingers.

Table SP-1 illustrates the potential combinations of detected CDMA signals representing multipath fingers and total number of detectable base station pilot signals in a given location within the radio coverage area 120. Due to the disperse and near-random nature of CDMA radio signals and propagation characteristics, traditional TOA/TDOA location methods have failed in the past, because the number of signals received in different locations area different. In a particularly small urban area, say less than 500 square feet, the number of RF signals and there multipath components may vary by over 100 percent.

FIGS. 18 and 19 illustrate a certain case from a location measurement perspective, of signals received for a three-data receiver and a four-data receiver configuration, in a nominal three sector honeycomb base station configuration. In FIG. 18, a mobile station at location "A" detects base stations 1b, 5c, and 4a. However although a triad of signals are received, if varying multipath signals are received from one or more base stations, then ambiguity can still result. FIG. 19 illustrates a mobile station located at position "A", detecting base stations 1b, 5c, 4a, and 2c. Although additional information is made available in this second case, traditional hyperbolic combinations taken three at a time, yield multiple location estimates. In certain cases the limit of the back-side of a "far-away" sectored antenna can be used to determine the limit of RF coverage in another base station sector area. FIG. 20 shows that normally a delay spread in sector 1b would imply a range of a 120 degree solid angle. However by using the known fact that base station sector 2a contains a coverage limit, such negative logic can be used to further restrict the apparent coverage area in sector 1b, from 120 degrees to approximately 90 degrees as shown in the illustration, in order to locate the mobile station B. Such information regarding sector 2a can be determined by collecting the remaining set information from mobile station B.

Now consider more practical, less ideal cases. Due to the large capital outlay costs associated with providing three or more overlapping base station coverage signals in every possible location, most practical digital PCS deployments result in fewer than three base station pilot channels being reportable in the majority of location areas, thus resulting in a larger, more amorphous location estimate. FIGS. 20 and 21 illustrate a typical relative error space wherein a mobile station detects only two base station pilot channels, and only one pilot channel, respectively. This consequence requires a family of location estimate location modules or models, each firing whenever suitable data has been presented to a model, thus providing a location estimate to a backend subsystem which resolves ambiguities.

In one embodiment of the present disclosure uses backend hypothesis resolution, by utilizing existing knowledge concerning base station coverage area boundaries (such as via the compilation a RF coverage database—either via RF coverage area simulations or field tests), the location error space is decreased. Negative logic Venn diagrams can be generated which deductively rule out certain location estimate hypotheses.

Base Station Cell site planning tools which utilize antenna gain radiation patterns, environmental clutter, such as buildings, dense forests, terrain heights, etc., can provide reasonable training data to bootstrap the initial operation of the LC.

An example of the types of data typically collected during field tests/runs is shown in the following database table SP-2 below:

TABLE SP-2

Typical CDMA Field Test Measurements

| Column Position | Mobile Data Test Set: Data Type Logged |
| --- | --- |
| 1 | CDMA Time (absolute, from GPS) |
| 2 | Vehicle Speed (in mph) |
| 3 | Vehicle Latitude (in deg. North) |
| 4 | Vehicle Longitude (in deg. East) |
| 5 | GPS Source (binary, e.g., GPS or Dead Reckoning) |
| 6 | GPS Data available indicator (binary states) |
| 7 | First BS-Mobile Received Power (in dBm, 1 second averages) |
| 8 | Mobile transmit Gain Adjust (in dBm, 1 second average) |
| 9 | First BS Mobile Rx Pilot $E_c/I_o$ (dB, 1 second average) |

TABLE SP-2-continued

Typical CDMA Field Test Measurements

| Column Position | Mobile Data Test Set: Data Type Logged |
| --- | --- |
| 10 | First BS Mobile received Frame Counts (integers per measurement period) |
| 11 | Mobile Finger's Average Time Separation (in nano/microseconds) |
| 12 | Mobile Fingers' Maximum Time Separation (in nano/microseconds) |
| 13 | Mobile Fingers' Number of Pilots locked (per 1 second average) |
| 14 | Mobile finger Lock Counts |
| 15 | First BS Received Frame Counts |
| 16 | First BS Eb/No set Point (in dB, 1 second average) |
| 17 | First BS cell Rx Eb/No per antenna (in dB, 1 second average) |
| 18 | Hand-off State (relative to the First, or connected-to BS) |
| 19 | First BS Traffic Channel Gain |
| 20 | First BS Power Control Subchannel Gain |
| 21 | First BS Reverse Link full Frame Error Rate, over 500 frames |
| 22 | Forward Link full Frame Error Rate, over 500 frames |
| 23 | First BS Pilot Channel Delay Spread (in nanoseconds) |
| 24 | Second BS-Ranked Pilot Delay Spread (in nanoseconds) |
| 25 | Second BS-Ranked Pilot Relative Signal Strength (in dB) |
| 26 | Third BS-Ranked Pilot Delay Spread |
| 27 | Third BS-Ranked Pilot Relative Signal Strength (in dB) |
| 28 | Mobile Antenna Identification (in the case of a multi-sectored antenna) |
| 29 | Vehicle compass orientation (bearing or heading) |
| 30 | Mobile Station Power Class (an integer, 0-7, indicating max. power capabilities of the mobile station transmitter) |

Although the forward link mobile station's received relative signal strength ($RRSS_{BS}$) of detected nearby base station transmitter signals can be used directly by the location estimate modules, the base station's reverse link received relative signal strength ($RRSS_{MS}$) of the detected mobile station transmitter signal must be modified prior to location estimate model use, since the mobile station transmitter power level changes nearly continuously, and would thus render relative signal strength useless for location purposes.

One adjustment variable and one factor value are required by the signal processing subsystem: 1.) instantaneous relative power level in dBm (IRPL) of the mobile station transmitter, and 2.) the mobile station Power Class. By adding the IRPL to the $RRSS_{MS}$, a synthetic relative signal strength ($SRSS_{MS}$) of the mobile station 140 signal detected at the BS 122 is derived, which can be used by location estimate model analysis, as shown below:

$$SRSS_{MS} = RRSS_{MS} + IRPL \qquad \text{(in dBm)}$$

$SRSS_{MS}$, a corrected indication of the effective path loss in the reverse direction (mobile station to BS), is now comparable with $RRSS_{BS}$ and can be used to provide a correlation with either distance or shadow fading because it now accounts for the change of the mobile station transmitter's power level. The two signals $RRSS_{BS}$ and $SRSS_{MS}$ can now be processed in a variety of ways to achieve a more robust correlation with distance or shadow fading.

Although Rayleigh fading appears as a generally random noise generator, essentially destroying the correlation value of either $RRSS_{BS}$ or $SRSS_{MS}$ measurements with distance individually, several mathematical operations or signal processing functions can be performed on each measurement to derive a more robust relative signal strength value, overcoming the adverse Rayleigh fading effects. Examples include averaging, taking the strongest value and weighting the strongest value with a greater coefficient than the weaker value, then averaging the results. This signal processing technique takes advantage of the fact that although a Rayleigh fade may often exist in either the forward or reverse path, it is much less probable that a Rayleigh fade also exists in the reverse or forward path, respectively. A shadow fade however, similarly affects the signal strength in both paths.

At this point a CDMA radio signal direction-independent "net relative signal strength measurement" is derived which is used to establish a correlation with either distance or shadow fading, or both. Although the ambiguity of either shadow fading or distance cannot be determined, other means can be used in conjunction, such as the fingers of the CDMA delay spread measurement, and any other TOA/TDOA calculations from other geographical points. In the case of a mobile station with a certain amount of shadow fading between its BS 122 (FIG. 2), the first finger of a CDMA delay spread signal is most likely to be a relatively shorter duration than the case where the mobile station 140 and BS 122 are separated by a greater distance, since shadow fading does not materially affect the arrival time delay of the radio signal.

By performing a small modification in the control electronics of the CDMA base station and mobile station receiver circuitry, it is possible to provide the signal processing subsystem 20 (reference FIG. 1) within the Location system 142 (FIG. 1) with data that exceed the one-to-one CDMA delay-spread fingers to data receiver correspondence. Such additional information, in the form of additional CDMA fingers (additional multipath) and all associated detectable pilot channels, provides new information which is used to enhance to accuracy of the Location Center's location estimate location estimate modules.

This enhanced capability is provided via a control message, sent from the Location system 142 to the mobile switch center 12, and then to the base station(s) 122 (FIG. 2) in communication with, or in close proximity with, mobile stations 140 to be located. Two types of location measurement request control messages are needed: one to instruct a target mobile station 140 (i.e., the mobile station to be located) to telemeter its BS pilot channel measurements back to the primary BS 122 and from there to the mobile switch center 112 and then to the location system 142. The second control message is sent from the location system 142 to the mobile switch center 112, then to first the primary BS 122, instructing the primary BS' searcher receiver to output (i.e., return to the initiating request message source) the detected target mobile station 140 transmitter CDMA pilot channel offset signal and their corresponding delay spread finger (peak) values and related relative signal strengths.

The control messages are implemented in standard mobile station 140 and BS 122 CDMA receivers such that all data results from the search receiver and multiplexed results from the associated data receivers are available for transmission back to the Location Center 142. Appropriate value ranges are required regarding mobile station 140 parameters $T\_ADD_S$, $T\_DROP_S$, and the ranges and values for the Active, Neighboring and Remaining Pilot sets registers, held within the mobile station 140 memory. Further mobile station 140 receiver details have been discussed above.

In the normal case without any specific multiplexing means to provide location measurements, exactly how many CDMA pilot channels and delay spread fingers can or should be measured vary according to the number of data receivers contained in each mobile station 140.

As a guide, it is preferred that whenever RF characteristics permit, at least three pilot channels and the strongest first three fingers, are collected and processed.

From the BS 122 perspective, it is preferred that the strongest first four CDMA delay spread fingers and the mobile station power level be collected and sent to the location system 142, for each of preferably three BSs 122 which can detect the mobile station 140.

Table SP-3 illustrates the resulting extended combinations of BS signals (pilot channels) and finger measurements potentially available, based on the above preferred conditions. The philosophy is to collect as much reasonable data as is practical, given the constraints of CDMA receivers, search times, receiver memory storage and available CPU and data transmission bandwidth, in order that sufficient orthogonal information can be processed to minimize location estimate error.

TABLE SP-3

| | | | | | | |
|---|---|---|---|---|---|---|
| Extended CDMA Location Measurement Combinations | | | | | | |
| No. of Receivers | No. of BSs detected | No. of Fingers Detected | No. of Fingers, BS 1-S (first strongest) | No. of Fingers, BS 2-S (second strongest) | No. of Fingers, BS 3-S (third strongest) | No. of Fingers, 4-S (fourth Strongest) |
| 3 | 1 | 1 | 1 | 0 | 0 | 0 |
| 3 | 1 | 2 | 2 | 0 | 0 | 0 |
| 3 | 1 | 3 | 3 | 0 | 0 | 0 |
| 3 | 2 | 2 | 1 | 1 | 0 | 0 |
| 3 | 2 | 3 | 2 | 1 | 0 | 0 |
| 3 | 2 | 3 | 1 | 2 | 0 | 0 |
| 3 | 2 | 4 | 2 | 2 | 0 | 0 |
| 3 | 2 | 5 | 2 | 3 | 0 | 0 |
| 3 | 2 | 5 | 3 | 2 | 0 | 0 |
| 3 | 2 | 4 | 3 | 1 | 0 | 0 |
| 3 | 2 | 4 | 1 | 3 | 0 | 0 |
| 4 | 2 | 5 | 4 | 1 | 0 | 0 |
| 4 | 2 | 5 | 1 | 4 | 0 | 0 |
| 3 | 3 | 3 | 1 | 1 | 1 | 0 |
| 3 | 2 | 6 | 3 | 3 | 0 | 0 |
| 3 | 3 | 3 | 1 | 1 | 1 | 0 |
| 3 | 3 | 4 | 2 | 1 | 1 | 0 |
| 3 | 3 | 4 | 1 | 2 | 1 | 0 |
| 3 | 3 | 4 | 1 | 1 | 2 | 0 |
| 3 | 3 | 5 | 2 | 2 | 1 | 0 |
| 3 | 3 | 5 | 2 | 1 | 2 | 0 |

TABLE SP-3-continued

Extended CDMA Location Measurement Combinations

| No. of Receivers | No. of BSs detected | No. of Fingers Detected | No. of Fingers, BS 1-S (first strongest) | No. of Fingers, BS 2-S (second strongest) | No. of Fingers, BS 3-S (third strongest) | No. of Fingers, 4-S (fourth Strongest) |
|---|---|---|---|---|---|---|
| 3 | 3 | 5 | 1 | 2 | 2 | 0 |
| 3 | 3 | 6 | 2 | 2 | 2 | 0 |
| 3 | 3 | 6 | 3 | 2 | 1 | 0 |
| 3 | 3 | 6 | 2 | 3 | 1 | 0 |
| 3 | 3 | 6 | 1 | 2 | 3 | 0 |
| 3 | 3 | 6 | 1 | 3 | 2 | 0 |
| 4 | 4 | 4 | 1 | 1 | 1 | 1 |
| 4 | 4 | 5 | 2 | 1 | 1 | 1 |
| 4 | 4 | 5 | 1 | 2 | 1 | 1 |
| 4 | 4 | 5 | 1 | 1 | 2 | 1 |
| 4 | 4 | 5 | 1 | 1 | 1 | 2 |
| 4 | 4 | 6 | 2 | 2 | 1 | 1 |
| 4 | 4 | 6 | 2 | 1 | 2 | 1 |
| 4 | 4 | 6 | 1 | 1 | 2 | 2 |
| 4 | 4 | 6 | 1 | 2 | 2 | 1 |
| 4 | 4 | 6 | 1 | 2 | 1 | 2 |
| 4 | 4 | 6 | 2 | 1 | 1 | 2 |
| 4 | 4 | 7 | 3 | 2 | 1 | 1 |
| 4 | 4 | 7 | 3 | 1 | 2 | 1 |
| 4 | 4 | 7 | 2 | 3 | 1 | 1 |
| 4 | 4 | 7 | 2 | 1 | 3 | 1 |
| 4 | 4 | 7 | 2 | 1 | 1 | 3 |
| 4 | 4 | 7 | 1 | 3 | 2 | 1 |
| 4 | 4 | 7 | 1 | 2 | 3 | 1 |
| 4 | 4 | 7 | 1 | 1 | 2 | 3 |
| 4 | 4 | 7 | 1 | 1 | 3 | 2 |
| 4 | 4 | 7 | 3 | 1 | 1 | 2 |
| 4 | 4 | <13 | ... | ... | ... | ... |

As can be seen from the table, a much larger combination of measurements is potentially feasible using the extended data collection capability of the CDMA receivers. In the case of the last row shown, additional combinations are also possible using a similar scheme of allocating the number of CDMA fingers detected at the first or strongest BS, followed by the second strongest base station, then the third strongest base station, etc.

Figure 29:
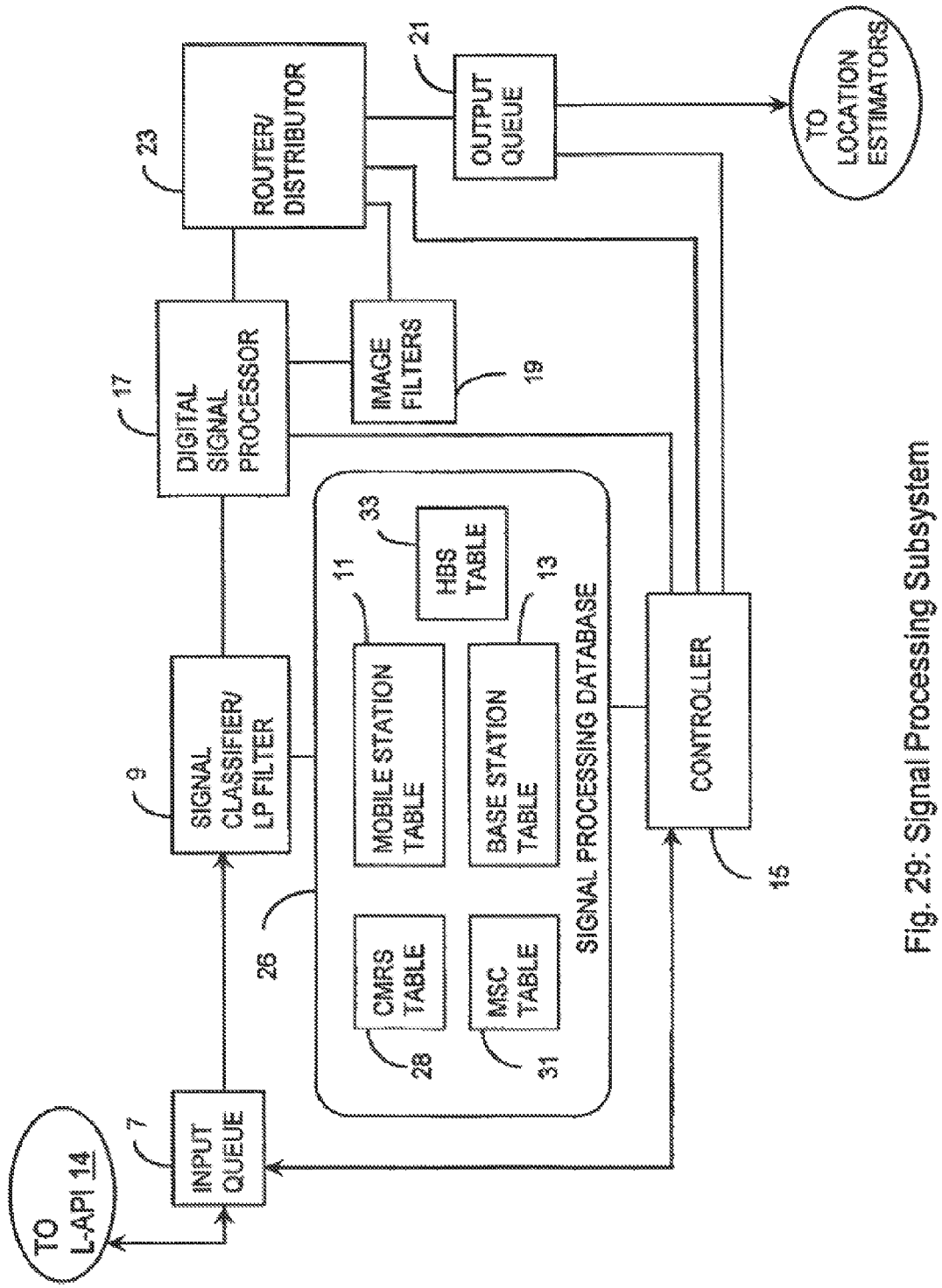
FIG. 29 illustrates the main components of the Signal Processing Subsystem 20.

FIG. 29 illustrates the components of the Signal Processing Subsystem 20. The main components consist of the input queue(s) 7, signal classifier/filter 9, digital signaling processor 17, imaging filters 19, output queue(s) 21, router/distributor 23, a signal processor database 26 and a signal processing controller 15.

Input queue(s) 7 are required in order to stage the rapid acceptance of a significant amount of RF signal measurement data, used for either location estimate purposes or to accept autonomous location data. Each location request using fixed base stations may, in one embodiment, contain from 1 to 128 radio frequency measurements from the mobile station, which translates to approximately 61.44 kilobytes of signal measurement data to be collected within 10 seconds and 128 measurements from each of possibly four base stations, or 245.76 kilobytes for all base stations, for a total of approximately 640 signal measurements from the five sources, or 307.2 kilobytes to arrive per mobile station location request in 10 seconds. An input queue storage space is assigned at the moment a location request begins, in order to establish a formatted data structure in persistent store. Depending upon the urgency of the time required to render a location estimate, fewer or more signal measurement samples can be taken and stored in the input queue(s) 7 accordingly.

The signal processing subsystem 20 supports a variety of wireless network signaling measurement capabilities by detecting the capabilities of the mobile and base station through messaging structures provided by the location application programming interface 14 in FIG. 1. Detection is accomplished in the signal classifier 9 (FIG. 29) by referencing a mobile station database table within the signal processor database 26, which provides, given a mobile station identification number, mobile station revision code, other mobile station characteristics. Similarly, a mobile switch center table 31 provides MSC characteristics and identifications to the signal classifier/filter 9. The signal classifier/filter 9 adds additional message header information that further classifies the measurement data which allows the digital signal processor and image filter components to select the proper internal processing subcomponents to perform operations on the signal measurement data, for use by the location estimate modules.

Regarding service control point messages autonomously received from the input queue 7, the signal classifier/filter 9 determines via a signal processing database 26 query that the message is to be associated with a home base station module. Thus appropriate header information is added to the message, thus enabling the message to pass through the digital signal processor 17 unaffected to the output queue 21, and then to the router/distributor 23. The router/distributor 23 then routes the message to the HBS module 6 shown in FIG. 1. Those skilled in the art will understand that associating location requests from Home Base Station configurations require substantially less data: the mobile identification number and the associated wireline telephone number transmission from the home location register are on the order of less than 32 bytes. Consequentially the home base station message type could be routed without any digital signal processing.

Output queue(s) 21 are required for similar reasons as input queues 7: relatively large amounts of data must be held in a specific format for further location processing by the location estimate modules.

The router and distributor component 23 is responsible to directing specific signal measurement data types and structures to their appropriate modules. For example, the HBS module has no use for digital filtering structures, whereas the TDOA module would not be able to process an HBS response message.

The controller 15 is responsible for staging the movement of data among the signal processing subsystem 20 components input queue 7, digital signal processor 17, router/distributor 23 and the output queue 21, and to initiate signal measurements within the wireless network, in response from an internet 468 location request message in FIG. 1, via the location application programming interface 14.

In addition the controller 15 receives autonomous messages from the MSC, via the location applications programming interface 14 (FIG. 1) or L-API and the input queue 7, whenever a 9-1-1 wireless call is originated. The mobile switch center provides this autonomous notification to the location system as follows: By specifying the appropriate mobile switch center operations and maintenance commands to surveil calls based on certain digits dialed such as 9-1-1, the location applications programming interface 14 (FIG. 1), in communication with the MSC 112a and/or 112b in FIG. 1, receives an autonomous notification whenever a mobile station user dials 9-1-1. Specifically, a bi-directional authorized communications port is configured, usually at the operations and maintenance subsystem of the MSC 112a and/or 112b in FIG. 1, or with their associated network element manager system(s), with a data circuit, such as a DS-1, with the location applications programming interface 14 in FIG. 1. Next, the "call trace" capability of the mobile switch center is activated for the respective communications port. The exact implementation of the vendor-specific man-machine or Open Systems Interface (OSI) commands(s) and their associated data structures generally vary among MSC vendors, however the trace function is generally available in various forms, and is required in order to comply with Federal Bureau of Investigation authorities for wire tap purposes. After the appropriate surveillance commands are established on the MSC, such 9-1-1 call notifications messages containing the mobile station identification number (MIN) and, in FCC phase 1 E9-1-1 implementations, a pseudo-automatic number identification (a.k.a. pANI) which provides an association with the primary base station in which the 9-1-1 caller is in communication, are communicated. In cases where the pANI is known from the onset, the signal processing subsystem 20 avoids querying the MSC in question to determine the primary base station identification associated with the 9-1-1 mobile station caller.

After the signal processing controller 15 receives the first message type, the autonomous notification message from the mobile switch center 112 to the location system 142, containing the mobile identification number and optionally the primary base station identification, the controller 15 queries the base station table 13 in the signal processor database 26 to determine the status and availability of any neighboring base stations, including those base stations of other CMRS in the area. The definition of neighboring base stations include not only those within a provisionable "hop" based on the cell design reuse factor, but also includes, in the case of CDMA, results from remaining set information autonomously queried to mobile stations, with results stored in the base station table. Remaining set information indicates that mobile stations can detect other base station (sector) pilot channels which may exceed the "hop" distance, yet are nevertheless candidate base stations (or sectors) for wireless location purposes. Although cellular and digital cell design may vary, "hop" distance is usually one or two cell coverage areas away from the primary base station's cell coverage area.

Having determined a likely set of base stations which may both detect the mobile station's transmitter signal, as well as to determine the set of likely pilot channels (i.e., base stations and their associated physical antenna sectors) detectable by the mobile station in the area surrounding the primary base station (sector), the controller 15 initiates messages to both the mobile station and appropriate base stations (sectors) to perform signal measurements and to return the results of such measurements to the signal processing system regarding the mobile station to be located. This step may be accomplished via several interface means. In a first case the controller 15 utilizes, for a given MSC, predetermined storage information in the MSC table 31 to determine which type of commands, such as man-machine or OSI commands are needed to request such signal measurements for a given MSC 112a or 112b in FIG. 1. The controller generates the mobile and base station signal measurement commands appropriate for the MSC and passes the commands via the input queue 7 and the locations application programming interface 14 in FIG. 1, to the appropriate MSC 112a and 112b, using the authorized communications port mentioned earlier. In a second case the controller 15 communicates directly with the base stations as discussed above and shown in FIG. 5, Location Center-base station access, multiple CMRS. In this second case, an alternative embodiment is provided to directly extract the wireless location signal measurement data from each base station associated with each of the multiple CMRS networks having to interface directly with the MSC for signal measurement extraction.

Upon receipt of the signal measurements, the signal classifier 9 examines location application programming interface-provided message header information from the source of the location measurement (for example, from a fixed BS 122, a mobile station 140, a distributed antenna system 168 or message location data related to a home base station), provided by the location applications programming interface (L-API 14) via the input queue 7 and determines whether or not device filters 17 or image filters 19 are needed, and assesses a relative priority in processing, such as an emergency versus a background location task, in terms of grouping like data associated with a given location request. In the case where multiple signal measurement requests are outstanding for various base stations, some of which may be associated with a different CMRS network, an additional signal classifier function includes sorting and associating the appropriate incoming signal measurements together such that the digital signal processor 17 processes related measurements in order to build ensemble data sets. Such ensembles allow for a variety of functions such as averaging, outlier removal over a time period, and related filtering functions, and further prevent association errors from occurring in location estimate processing.

Another function of the signal classifier/low pass filter component 9 is to filter information that is not useable, or information that could introduce noise or the effect of noise in the location estimate modules. Consequently low pass matching filters are used to match the in-common signal processing components to the characteristics of the incoming signals. Low pass filters match: Mobile Station, base station, CMRS and MSC characteristics, as well as to classify Home Base Station messages.

The signal processing subsystem 20 in FIG. 1 contains a base station database table 13 (FIG. 29) which captures the maximum number of CDMA delay spread fingers for a given base station, containing information structures as shown in table SP-4 below:

TABLE SP-4

Base Station Characteristics

| Primary Base Station Identification | Latitude, Longitude, elevation | Pilot Channel Offset | BS Identifier code | Maximum No. of CDMA Fingers |
|---|---|---|---|---|
| DEN-001 | x, y, z | 5 | CODENABC001 | 4 |
| DEN-002 | p, q, r | 25 | CODENABC002 | 4 |
| DEN-003 | s, t, u | 20 | CODENABC003 | 3 |
| DEN-004 | a, b, c | 15 | CODENABC004 | 4 |
| BLD-005 | d, e, f | 45 | COBLDABC005 | 4 |

The base station identification code, or CLLI or common language level identification code is useful in identifying or relating a human-labeled name descriptor to the Base Station. Latitude, Longitude and elevation values are used by other subsystems in the location system for calibration and estimation purposes. As base stations and/or receiver characteristics are added, deleted, or changed with respect to the network used for location purposes, this database table must be modified to reflect the current network configuration.

Just as an upgraded base station may detect additional CDMA delay spread signals, newer or modified mobile stations may detect additional pilot channels or CDMA delay spread fingers. Additionally different makes and models of mobile stations may acquire improved receiver sensitivities, suggesting a greater coverage capability. The table below establishes the relationships among various mobile station equipment suppliers and certain technical data relevant to the present disclosure.

Although not strictly necessary, the MIN can be populated in this table from the PCS Service Provider's Customer Care system during subscriber activation and fulfillment, and could be changed at deactivation, or anytime the end-user changes mobile stations. Alternatively, since the MIN, manufacturer, model number, and software revision level information is available during a telephone call, this information could extracted during the call, and the remaining fields populated dynamically, based on manufacturer's specifications information previously stored in the signal processing subsystem 20. Default values are used in cases where the MIN is not found, or where certain information must be estimated.

A low pass mobile station filter, contained within the signal classifier/low pass filter 9 of the signal processing subsystem 20, uses the above table data to perform the following functions: 1) act as a low pass filter to adjust the nominal assumptions related to the maximum number of CDMA fingers, pilots detectable; and 2) to determine the transmit power class and the receiver thermal noise floor. Given the detected reverse path signal strength, the required value of $SRSS_{MS}$, a corrected indication of the effective path loss in the reverse direction (mobile station to BS), can be calculated based on the SP-5 table data contained within the mobile station table 11, in the signal processing database 26.

The effects of the maximum Number of CDMA fingers allowed and the maximum number of pilot channels allowed essentially form a low pass filter effect, wherein the least common denominator of characteristics are used to filter the incoming RF signal measurements such that a one for one matching occurs. The effect of the Transmit Power Class and Receiver Thermal Noise floor values is to normalize the characteristics of the incoming RF signals with respect to those RF signals used.

FIG. 4, Location Provisioning from Multiple CMRSs, illustrates a system architecture to enable the customer care systems belonging to different CMRSs, either on an autonomous or periodic basis, to update a provisionable signal processing database 26, containing the mobile station characteristics, in communication with the signal classifier/filter 9, input queue 7, and the location applications programming interface for customer care systems (L-API-CCS) 138. The signal classifier/filter 9 is in communication with both the input queue 7 and the signal processing database 26. In the early stage of a location request the signal processing subsystem 20 in FIG. 4, will receive the initiating location request from either an autonomous 9-1-1 notification message from a given MSC, or from a location application 146 (for example, see FIG. 36), for which mobile station characteristics about the target mobile station 140 (FIG. 2) is required. Referring to FIG. 29, a query is made from the signal processing controller 15 to the signal processing database 26, specifically the mobile station table 11, to determine if the mobile station characteristics associated with the MIN to be located are available in table 11. if the data exists then there is no need for the controller 15 to query the wireless network in order to determine the mobile station characteristics, thus avoiding additional real-time processing which would otherwise be required across the air interface, in order to determine the mobile station MIN characteristics. The resulting mobile station information may be provided either via the signal processing database 26 or alternatively a query may be performed directly from the signal processing subsystem 20 to the MSC in order to determine the mobile station characteristics.

TABLE SP-5

Mobile Station Characteristics Table

| Mobile Station Identification (MIN) | Manufacturer | Model No. | Allowed S/W Revision Levels | Maximum No. of CDMA Fingers | Maximum No. of Pilots Detectable | Transmit Power Class (Max) | Rec. Thermal Noise Floor (dBm) |
|---|---|---|---|---|---|---|---|
| 3034561234567 | Sony | 5 | R1.0 | 3 | 3 | 2 | −114 |
| 3034561234568 | Qualcomm | 25 | R2.01 | 4 | 4 | 4 | −115 |
| 3034561234569 | Panasonic | 20 | R1.1 | 3 | 3 | 5 | −113 |
| 3034561234570 | Fujutshu | 15 | R2.5 | 4 | 4 | 0 | −116 |
| 3034561234571 | Sony | 45 | R1.1 | 3 | 3 | 7 | −115 |
| Default | Default | Default | R1.0 | 3 | 3 | 3 | −112 |

A location application programming interface, L-API-CCS 138 to the appropriate CMRS customer care system provides the mechanism to populate and update the mobile station table 11 within the database 26. The L-API-CCS 138 contains its own set of separate input and output queues or similar implementations and security controls to ensure that provisioning data is not sent to the incorrect CMRS. The interface 1155*a* to the customer care system for CMRS-A 1150*a* provides an autonomous or periodic notification and response application layer protocol type, consisting of add, delete, change and verify message functions in order to update the mobile station table 11 within the signal processing database 26, via the controller 15. A similar interface 1155*b* is used to enable provisioning updates to be received from CMRS-B customer care system 1150*b*.

Although the L-API-CCS application message set may be any protocol type which supports the autonomous notification message with positive acknowledgment type, the T1M1.5 group within the American National Standards Institute has defined a good starting point in which the L-API-CCS could be implemented, using the robust OSI TMN X-interface at the service management layer. The object model defined in Standards proposal number T1M1.5/96-22R9, *Operations Administration, Maintenance, and Provisioning (OAM&P)—Model for Interface Across Jurisdictional Boundaries to Support Electronic Access Service Ordering: Inquiry Function*, can be extended to support the L-API-CCS information elements as required and further discussed below. Other choices in which the L-API-CCS application message set may be implemented include ASCII, binary, or any encrypted message set encoding using the Internet protocols, such as TCP/IP, simple network management protocol, http, https, and email protocols.

Referring to the digital signal processor (DSP) 17, in communication with the signal classifier/LP filter 9, the DSP 17 provides a time series expansion method to convert non-HBS data from a format of an signal measure data ensemble of time-series based radio frequency data measurements, collected as discrete time-slice samples, to a three dimensional matrix location data value image representation. Other techniques further filter the resultant image in order to furnish a less noisy training and actual data sample to the location estimate modules.

Referring now to digital signal and image filter processing, by way of example, a forward-path CDMA mobile station delay spread RF measurement sample is illustrated in FIGS. 22A-C, for the mobile station reception of one sample of transmission signal related to BS-1, located at 16th and Stout Streets. In this sample three fingers or groups of RF energy (relative signal strength is indicated along the vertical axis) were detected. A first CDMA finger was found at a delay of about 3.4 microseconds, and relative signal strength of about −80 dBm. A second finger was found at a delay of about 5 microseconds, and peak strength of about −55 dBm, followed by a third finger at 6.5 microseconds and a strength of about −92 dBm. Two other base stations were detected, BS-5 and BS-2, along with their respective three CDMA delay spread fingers.

Figure 28:
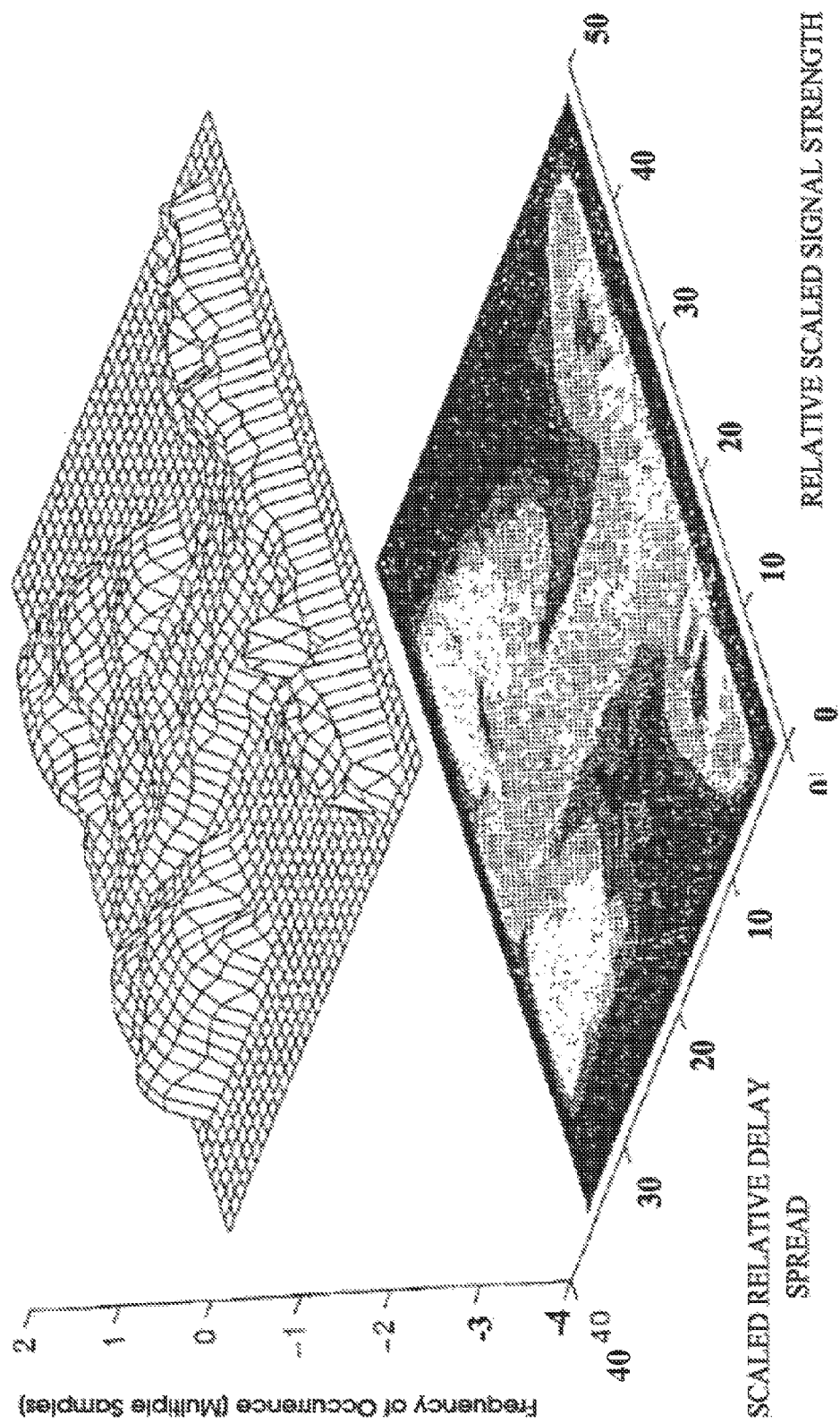
FIG. 28 illustrates an image and relief representation of a CDMA Delay Spread Profile.

Refer now to the left image shown in FIG. 26: Delay Spread Profile Image. After 128 samples of data are collected of the delay spread-relative signal strength RF data measurement sample: mobile station RX for BS-1 and grouped into a Quantization matrix, where rows constitute relative signal strength intervals and columns define delay intervals. As each measurement row, column pair (which could be represented as a complex number or Cartesian point pair) is added to their respective values to generate a Z direction of frequency of recurring measurement value pairs or a density recurrence function. By next applying a grid function to each x, y, and z value, a three-dimensional surface grid is generated, which represents a location data value or unique print of that 128-sample measurement. FIG. 28 illustrates the result of image generation when a number of data samples, or an ensemble of signal strength, delay pairs of values are added within a given bin area or matrix, to thus create a type of three-dimensional image, representing a particular RF signaling behavior at a given location.

Refer now to the right image shown in FIG. 26. In the general case where a mobile station is located in an environment with varied clutter patterns, such as terrain undulations, unique man-made structure geometries (thus creating varied multipath signal behaviors), such as a city or suburb, although the first CDMA delay spread finger may be the same value for a fixed distance between the mobile station and BS antennas, as the mobile station moves across such an arc, different finger-data are measured. In the right image for the defined BS antenna sector, location classes, or squares numbered one through seven, are shown across a particular range of line of position (LOP).

A traditional TOA/TDOA ranging method between a given BS and mobile station only provides a range along the arc, thus introducing ambiguity error. However a unique three dimensional image can be used in this method to specifically identify, with recurring probability, a particular unique location class along the same Line Of Position, as long as the multipath is unique by position but generally repeatable, thus establishing a method of not only ranging, but also of complete latitude, longitude location estimation in a Cartesian space. In other words, the unique shape of the "mountain image" enables a correspondence to a given unique location class along a line of position, thereby eliminating traditional ambiguity error.

Although man-made external sources of interference, Rayleigh fades, adjacent and co-channel interference, and variable clutter, such as moving traffic introduce unpredictability (thus no "mountain image" would ever be exactly alike), three basic types of filtering methods can be used to reduce matching/comparison error from a training case to a location request case: 1.) select only the strongest signals from the forward path (BS to mobile station) and reverse path (mobile station to BS), 2.) Convolute the forward path 128 sample image with the reverse path 128 sample image, and 3.) process all image samples through various digital image filters to discard noise components.

Figure 27:
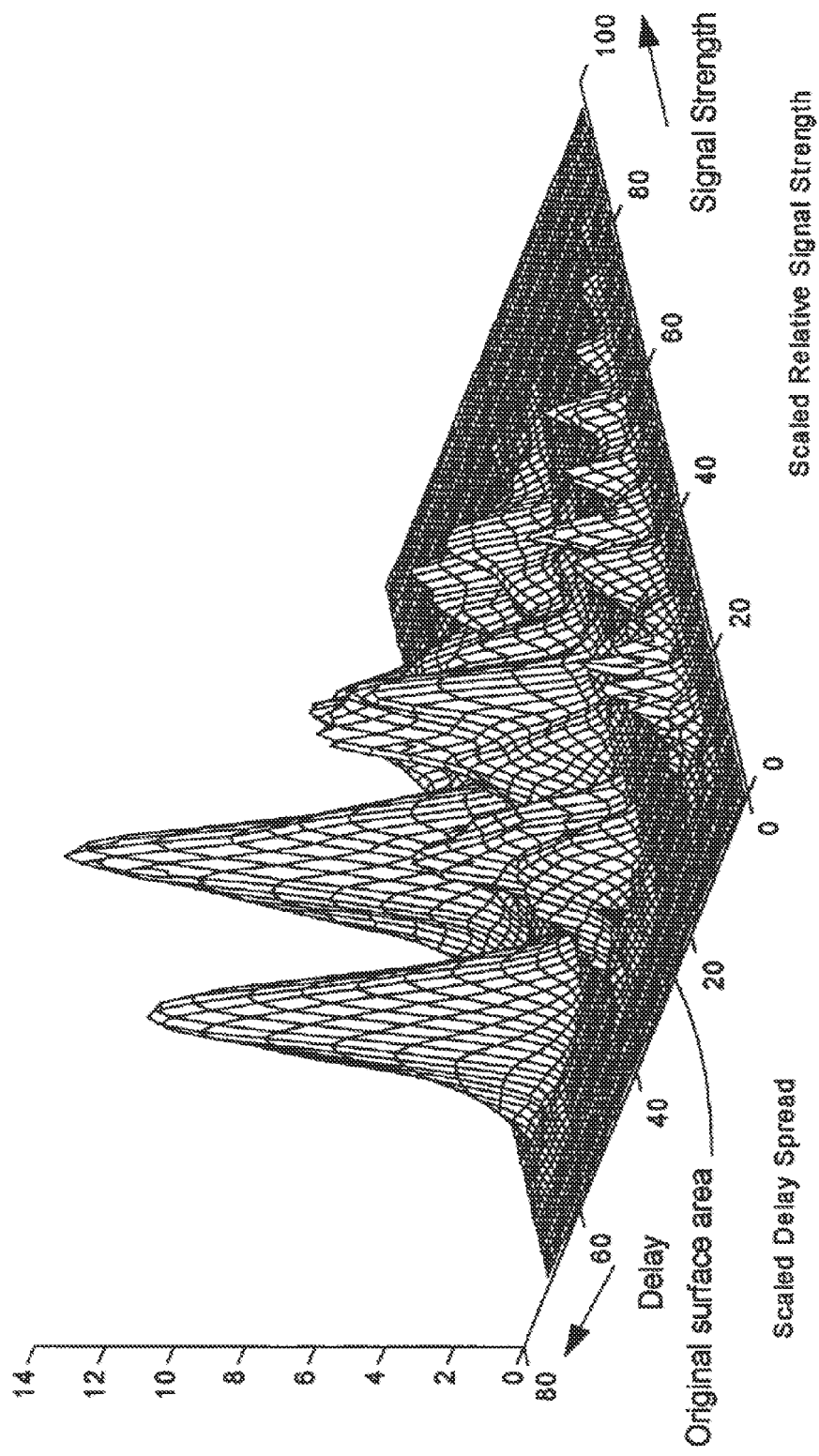
FIG. 27 shows the magnifying effects of convoluting similar-property forward and reverse path three-dimensional images.

The strongest signal technique has been discussed previously in the data filter section. FIG. 27: Convolution of Forward and Reverse Images, illustrates one method that essentially nulls noise completely, even if strong and recurring, as long as that same noise characteristic does not occur in the opposite path.

Figure 30:
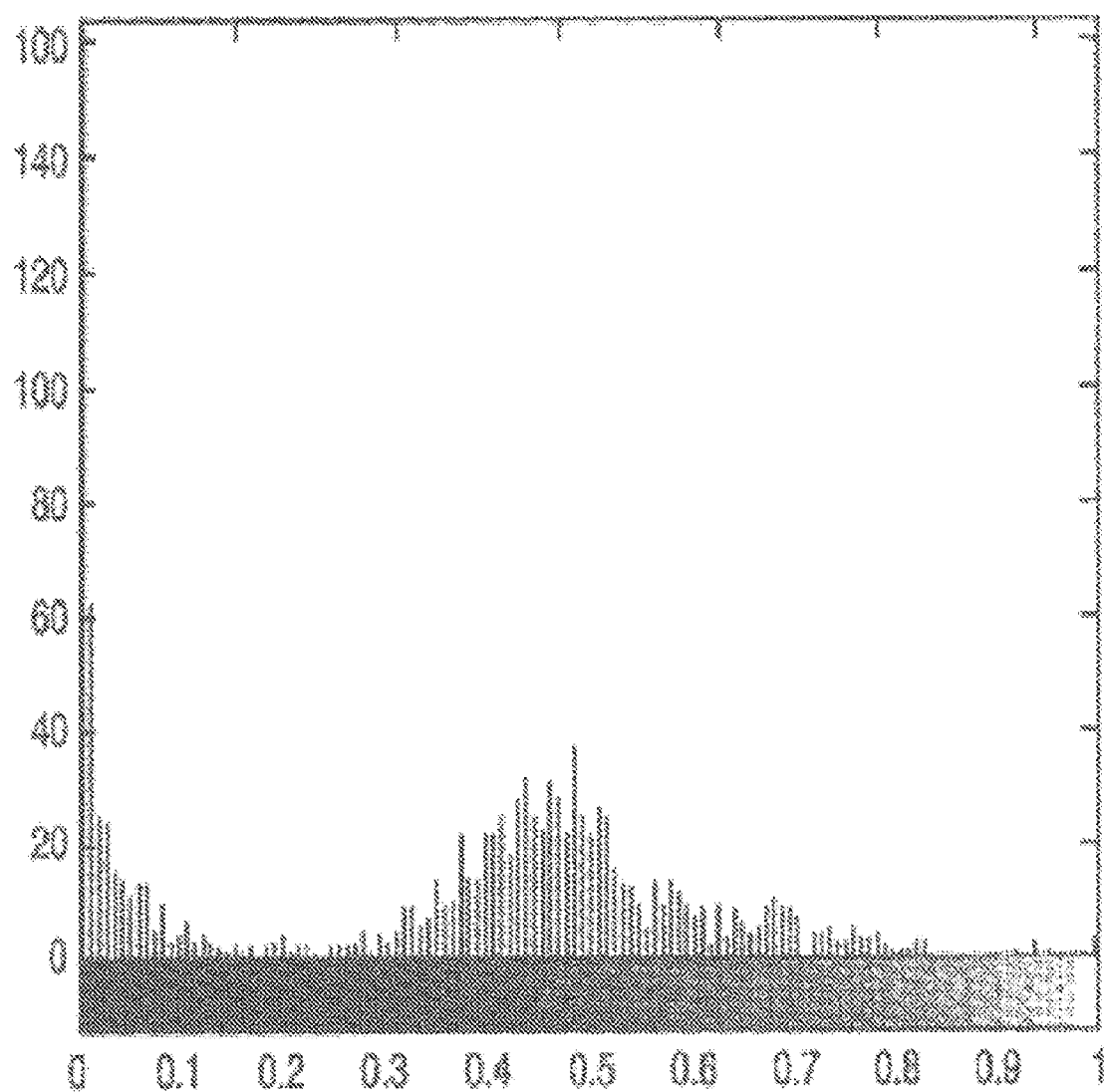
FIG. 30 illustrates an image based on an RF signal measurement sample set, before image histogram equalization filtering is applied.
Figure 31:
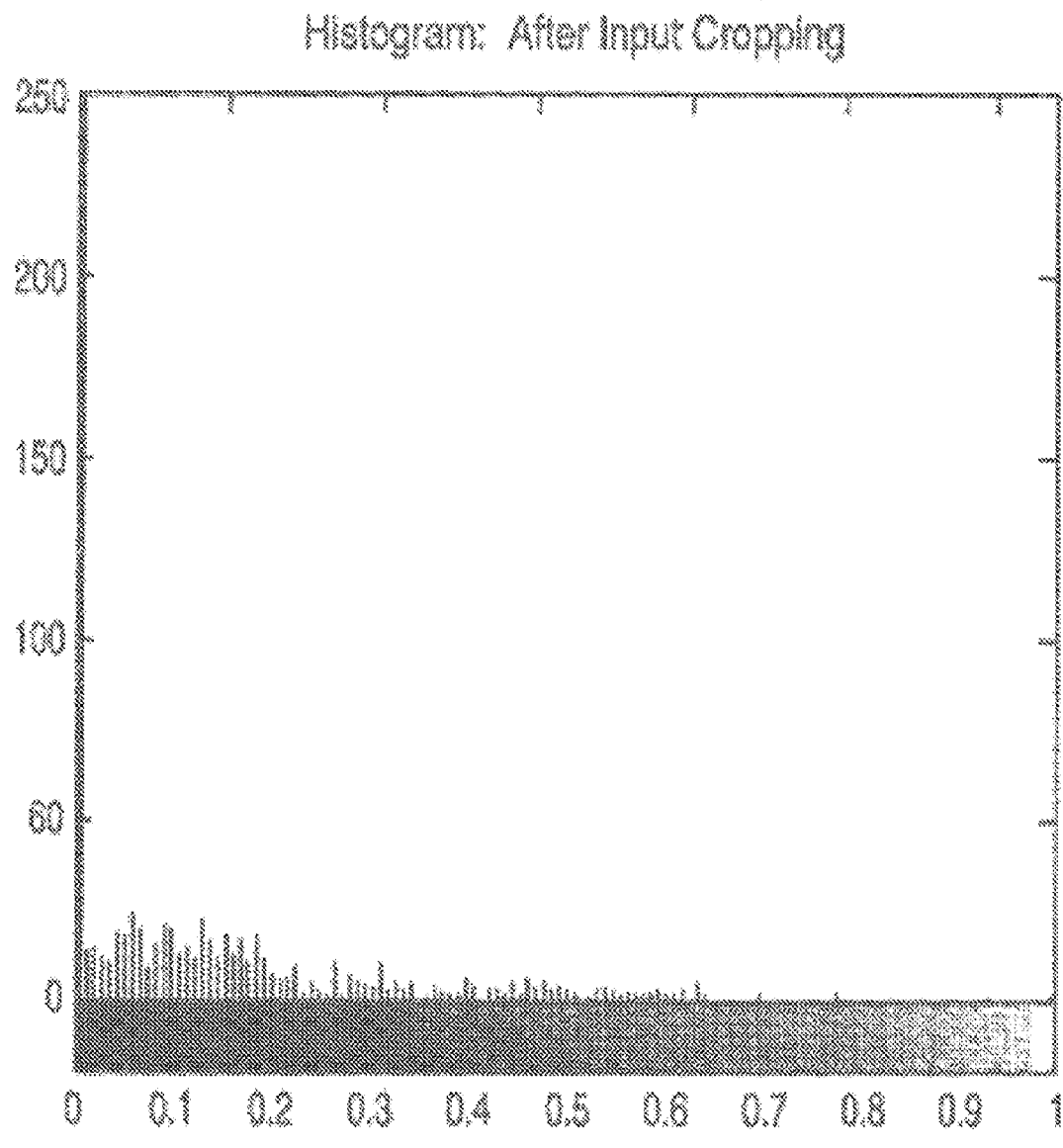
FIG. 31 illustrates an image based on an RF signal measurement sample set, after image histogram equalization input cropping filtering is applied.

The third technique of processing CDMA delay spread profile images through various digital image filters, provides a resultant "image enhancement" in the sense of providing a more stable pattern recognition paradigm to the neural net location estimate model. For example, image histogram equalization can be used, as illustrated in FIGS. 30 (before equalization) and 31 (after equalization) to rearrange the images' intensity values, or density recurrence values, so that the image's cumulative histogram is approximately linear.

Figure 32:
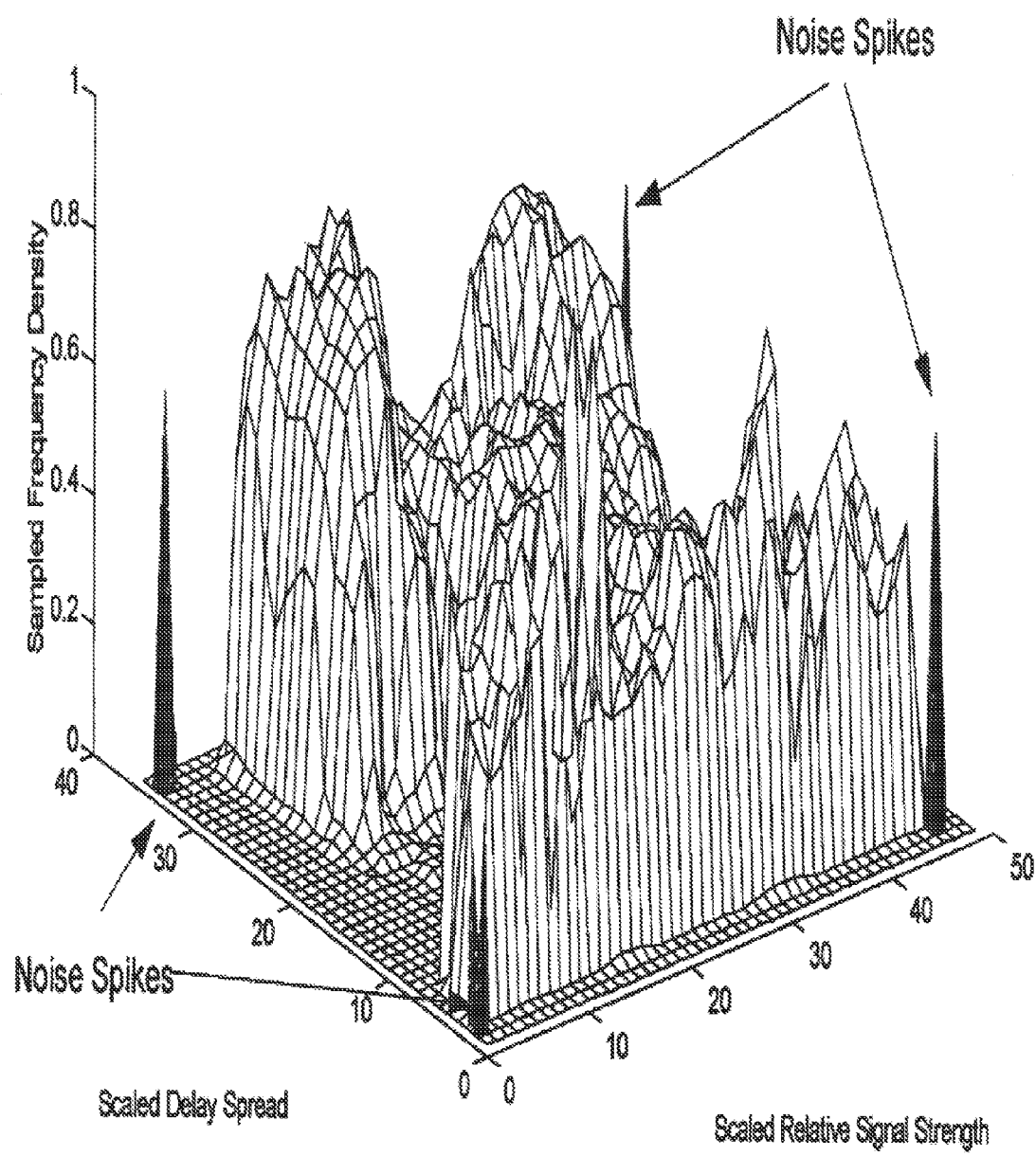
FIG. 32 illustrates an image sample grid before image filtering.
Figure 33:
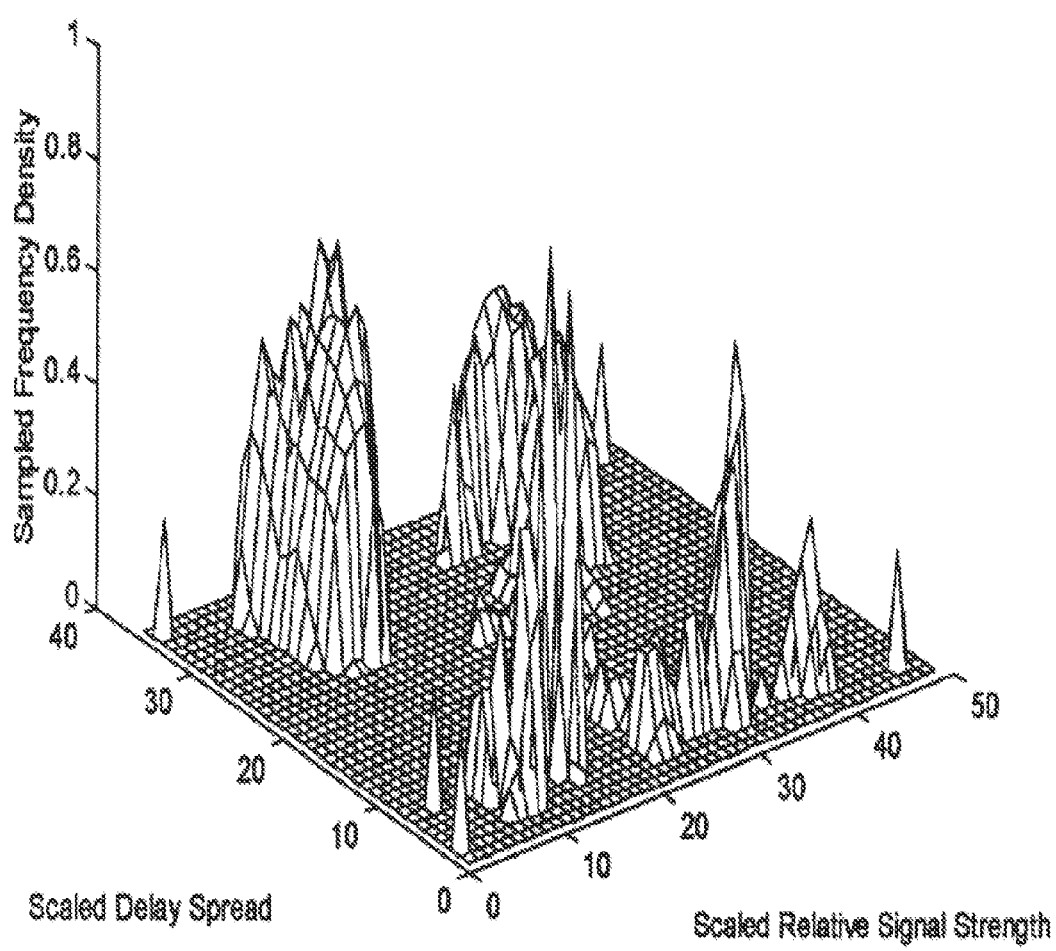
FIG. 33 shows a CDMA profile image after input cropping is used at a level of 50 percent.

Other methods which can be used to compensate for a concentrated histogram include: 1) Input Cropping, 2) Output Cropping and 3) Gamma Correction. Equalization and input cropping can provide particularly striking benefits to a CDMA delay spread profile image. FIGS. 32 and 33 illustrate the three dimensional grid images of the before and after input cropping filter example. As shown in FIG. 33, input cropping removes a large percentage of random signal characteristics that are non-recurring.

commercial mobile radio service provider at HBSD installation time, is used by the HBS model to determine location whenever the mobile station 140 is located within communication range of the HBSD:

TABLE HBS-1

| | | | HBSD Characteristics | | |
|---|---|---|---|---|---|
| Wireline MIN | Wireless MIN | HBSD Model | HBSD location Latitude, Longitude | Fixed HBSD Location | CDMA Strength/Delay Measurements? |
| 3035561234 | 3035661299 | Sony Qx-9000, Rev. 1.1 | 52.619488 N, 112.4197601 W | 727 Magnolia Drive, Boulder, CO | No |
| 3035561236 | 3035661200 | Panasonic PF-130, Rev. 5.0 | 52.645488 N, 112.4197601 W | 1401 Digit Drive, Boulder, CO | Yes |
| 3035561236 | 3035661240 | Panasonic PF-130, Rev. 3.4 | 52.779488 N, 112.4197601 W | 1698 Folsom St., Boulder, CO. | No |
| 3035561284 | 3035661205 | Panasonic PF-180, Rev. 5.0 | 51.619488 N, 111.9197601 W | 990 Nutcracker Dr., Niwot, CO. | NO |
| 3035561224 | 3035661266 | Panasonic PF-5000, Rev. 1.0 | 52.619558 N, 112.4197601 W | 5606 Bismark Circle, Denver, CO | Yes |
| ... | ... | ... | | ... | ... |

Other filters and/or filter combinations can be used to help distinguish between stationary and variable clutter affecting multipath signals. For example, it is desirable to reject multipath fingers associated with variable clutter, since over a period of a few minutes such fingers would not likely recur. Further filtering can be used to remove recurring (at least during the sample period), and possibly strong but narrow "pencils" of RF energy. A narrow pencil image component could be represented by a near perfect reflective surface, such as a nearby metal panel truck stopped at a traffic light.

Figure 34:
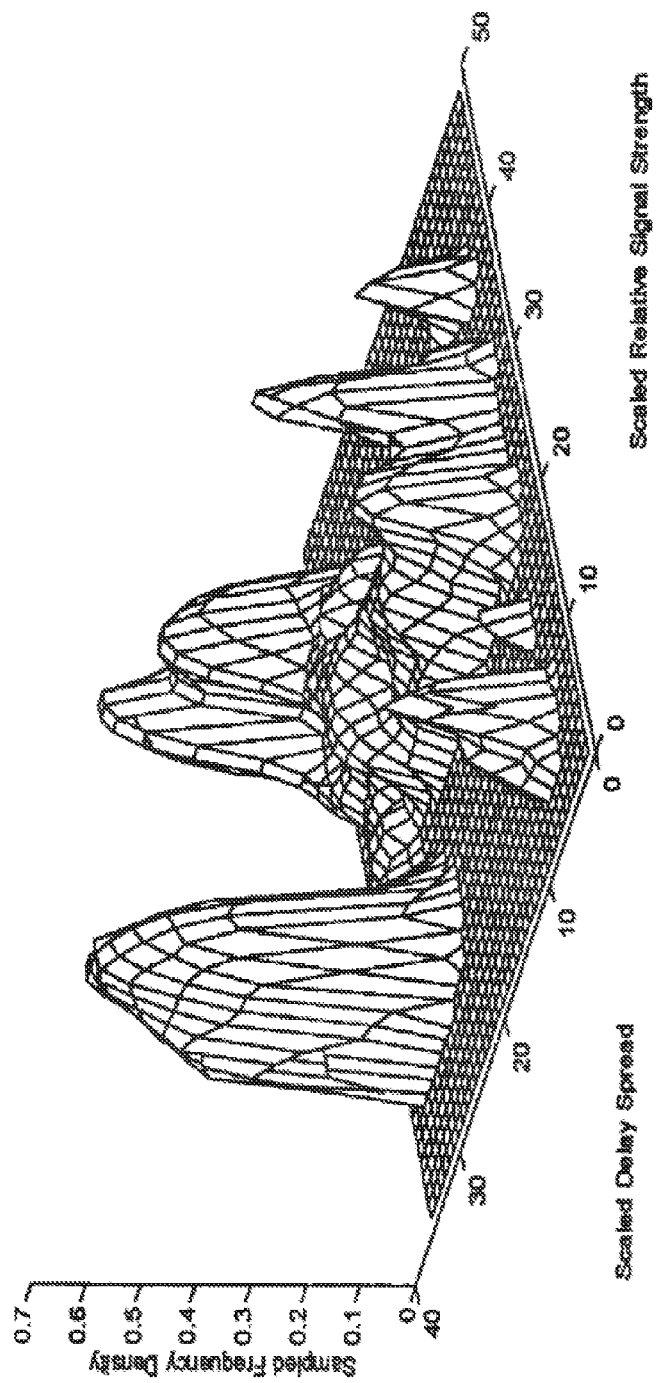
FIG. 34 illustrates the results of combining input cropping at 40 percent, then performing four by four median filtering on the resultant.
Figure 35:
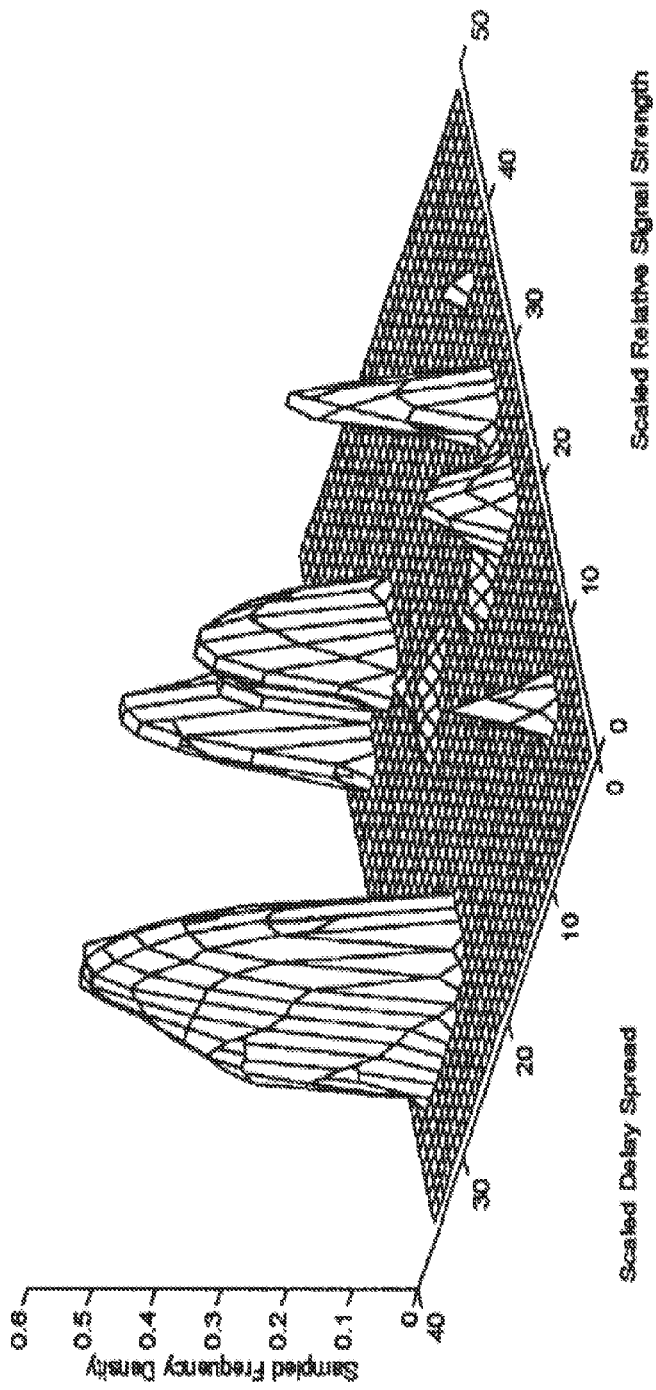
FIG. 35 shows the results of combining input cropping at 50 percent with four by four median filtering.

On the other hand, stationary clutter objects, such as concrete and glass building surfaces, adsorb some radiation before continuing with a reflected ray at some delay. Such stationary clutter-affected CDMA fingers are more likely to pass a 4×4 neighbor Median filter as well as a 40 to 50 percent Input Crop filter, and are thus more suited to neural net pattern recognition. FIG. 33 illustrate five "pencils" of CDMA finger energy that passed a simple 50 percent Input Crop filter. However, as shown in FIG. 34 when subjected to a 4×4 neighbor Median filter and 40 percent clipping, all five pencil-shaped fingers have been deleted. FIG. 35 illustrates the further simplified result of a 50 percent cropping and 4×4 neighbor median filtering. Other filtering methods include custom linear filtering, adaptive (Weiner) filtering, and custom nonlinear filtering.

The DSP 17 may provide data ensemble results, such as extracting the shortest time delay with a detectable relative signal strength, to the router/distributor 23, or alternatively results may be processed via one or more image filters 19, with subsequent transmission to the router/distributor 23. The router/distributor 23 examines the processed message data from the DSP 17 and stores routing and distribution information in the message header. The router/distributor 23 then forwards the data messages to the output queue 21, for subsequent queuing then transmission to the appropriate location estimators DA module 10, TOA/TDOA module 8 or the HBS module 6, in FIG. 1.

Home Base Station Module

Upon receiving a message from the Data Capture Gateway or the signal processing subsystem 20, the HBS location estimate model examines a Home Base Station Table which defines relationships among a wireless MIN, and wireline telephone number, characteristics of the HBSD, and the possibility to use various signal types in order to further define the location within the address area of the fixed location HBSD. The following table, populated by the In the event RF signals are available for telemetry from the HBSD to the location system, such information may be solicited from the location system to the HBSD, in the form of a request/response message scheme, using for example, a data-under-voice technique. In such cases the SSP provides a data connection with the location system 142 via the PSTN. The home base station may interact with the mobile station in the same manner as a cordless telephone transceiver interacts with a cordless telephone, when the mobile station is within an acceptable range.

The HBS module 6 in FIG. 1 outputs the Latitude and Longitude location estimates to either the PSTN 124 or to the Internet 468, depending upon the source of the originating location request.

Distributed Antenna Module

Upon receipt of one or more data ensemble messages from the signal processing subsystem 20 in FIG. 1, the distributed antenna (DA) module 10 queries a previously populated distributed antenna database to determine the locations of distributed antennas associated with the measured DA antenna "pilot delays" so that the detected signal measurement delay signal values received from the mobile station receivers and base station receivers can be input to the TOA/TDOA module. The TOA/TDOA module then utilizes the radius-radius method, or time difference method, in order to provide location estimates within the building or area containing the distributed antennas.

Daisey Chaining Base Stations

As a practical matter it may be necessary in some network conditions to add base stations in areas to permit improved estimates to be achieved in wireless location. An aspect of the present disclosure includes daisy chaining communication circuits or transport facilities between or among base stations, in order to simplify the installation and operation of such base stations. Base stations normally communicate with the mobile switch center using T-carrier transport facilities, in order to carry voice and data bearer traffic, and to transport bi-directional control signals. However for various economic or other reasons it may not be justifiable to install such transport facilities. At the base station, by essentially originating a plurality of mobile telephone calls using the data communications option, and terminating such calls at the mobile switch center appropriately, the outputs of the base station transport multiplex circuits are re-directed into the data communication circuits normally intended for use by mobile stations in establishing a data circuit communication call to the network. Circuits at the mobile switch center used to terminate these data calls, redirect the communication to those circuits normally used to terminate the T-carrier facilities from the base stations. In this manner, existing wireless channels can be used to provide transport via this daisy-chaining method between certain base stations and the mobile switch center, thus simplifying connectivity in cases where the installation of transport facilities would either be impossible or impractical.

Distance First Order Module (TOA/TDOA)

Particular distinctions over the current state of the art include utilizing essentially the native electronics, antennas and standards, and opposed to overlay solutions, supervisor functions which control a hybrid set of techniques, including Time Of Arrival (TOA), Time Difference of Arrival (TDOA) in both the forward and reverse paths, pilot signal strengths, power control, mobile stations (mobile station) state conditions, stochastic features of environmental clutter, multipath detection and mitigation, and robustness, supporting a variety of conditions including degraded/faulty equipment, distributed and SMART antennas, various registration modes, and various call processing conditions such as soft, hard and idle hand-off conditions, location during the idle state, traffic-bearing states, and location during cases of severe multipath, such as that experienced in urban canyon environments, as well as location in suburban and rural cases.

Since each base station is required to emit a constant signal-strength pilot pseudo-noise (PN) sequence on the forward link channel identified uniquely in a network system by a pilot sequence offset and frequency assignment, it is possible to use the pilot channels of active, candidate, neighboring and remaining sets of pilots, associated with neighboring base stations, stored in the mobile station, for TOA and TDOA measurements performed by the mobile station.

Based on the arrival time measurement estimates and the speed of propagation, ranges or range differences between the base stations and the mobile station can be calculated. TOA and/or TDOA measurements can then be input to either the radius-radius multilateration or the time difference multilateration algorithms.

By utilizing the known base station positions, location of the mobile station can be determined. Since measurements and base station positions can be sent either to the network or the mobile station, location can be determined in either entity.

Since not all measurements can provide accurate location results at all times and conditions, a variety of supervisory logic processes can be invoked to resolve or litigate the problem area.

As those familiar with the EIA/TIA IS-95 and T1P1/JTC CDMA standards specifications know, mobile station call processing consists of four states:

1. Initialization State—where the mobile station selects and acquires a system, a network, and timing information. This state consists of four substates: System Determination, Pilot Channel Acquisition, Sync Channel Acquisition, and Timing Change Substate;
2. Idle State—where the mobile station monitors messages on the Paging Channel, and supports procedures such as Message Acknowledgment, nine modes of Registration, Idle Hand-off, Pilot Search, and response to Overhead Information, such as System and Access Parameters (which include BS Latitude and Longitude), mobile station Message Transmission Operation (i.e., Data Burst) and Neighboring List messages;
3. System Access State—where the mobile station sends messages to the base station on the Access Channel. This state consists of six substates: Update Overhead, Origination Attempt, Page Response, mobile station Order/Message Response, Registration Access; Message Transmission Operation/Data Burst);
4. Mobile station Control on the Traffic Channel State—where the mobile station communicates with the primary base station using the forward and Reverse Traffic Channels. This state consists of five substates: TC initialization, Waiting for Order, Waiting for mobile station Answer, Conversation (which includes hand-off procedures and earliest arriving usable multipath components of pilots), and Release.

At power-up an IS-95 or T1P1 PCS CDMA compliant mobile station enters Initialization State, as described in IS-95, section 6.6.1. During the System Determination substate, the mobile station refers to its internal memory to acquire preferences for system carrier (A or B), or the preferred carrier at 1.8-2.0 GHz, and for other types of service, including advanced mobile phone service, or AMPS, as well as narrow band advanced mobile phone service, or NAMPS.

A CDMA-preferred mobile station then transfers to the Pilot Acquisition Substate. The mobile station tunes to the CDMA Channel number equal to $CDMACH_S$ then sets its Walsh code (always W0) for the Pilot channel where it begins searching for pilot energy, in terms of energy per bit, per spectral density.

Once a sufficiently strong (as defined by the T_ADD threshold parameter) pilot channel has been identified within $T_{20m}$ seconds, the mobile station enters the Sync Channel Acquisition Substate, where the mobile station receives a Sync channel Message that includes, among other information, system time and the unique PN offset index for that particular BS. In the Timing Change substate, the mobile station adjusts its internal timing to match the BS's CDMA system time. At the completion of the Timing Change substate, the mobile station is completely synchronized to the CDMA system's BS time.

After satisfactory synchronization the mobile station then enters the stable Idle State, where the paging channel begins to be monitored.

At this point at least two alternatives are possible:
1. Perform Location determination without consumption of user-perceived air time via the introduction of a new call processing state, or
2. Perform Location determination via the traffic channel (requires air time)

In cases where Distributed Antennas (DAs), and/or Home Base Stations (HBS) are used, each location of these devices can be sent to the mobile station. There are at least three format-types possible in conveying this type of location information in the GeoLocation Message. First, a unique identifier can be assigned to each DA/HBS, such as a fully distinguished name. An example of location information could be: Within the USA, State of Colorado, city of Denver, with Service Provider xyz, BS ID 129, Distributed Antenna number 8. Or more compactly, the location string is structured as, "USA.CO.DEN.xyz.129.DA8". Secondly, an easy-to-understand human style data message can be sent, such as, "You are near the 30th floor of the Sears Tower building". Third, data values for Latitude, Longitude, and possibly altitude and accuracy could be sent from the BS or Location Center to the mobile station/LU. In order to be most easily useful to and end-user, in the first and third cases, a database would be needed within the mobile station or a Personal Digital Assistant device, which performs a translation of numerical data into a form useful for human understanding.

The mobile station thus maintains a list of location pilot offsets, where the list is ranked based on a weighted combination of received signal energy and BS location. The mobile station selects the best candidate BSs for location estimate purposes, which may be slightly different from the Active, candidate and remaining lists.

Additionally the mobile station may send a Data_Burst message back to the BS or Location Center, informing that no other Pilot Channels were detected. This "negative" Venn diagram information may be useful with various heuristics for location estimate deduction, for example, to note where the mobile station is not located.

It is the difference of system time values (as opposed to their absolute values) that is important. Note that for purposes of location, any communication back to a BS 122 would require re-synchronizing onto that BS's system time. Although not specified in either IS-95 or T1P1/JTC's PCS CDMA standards, most mobile station manufacturers build correlators with resolutions of approximately ⅛ PN chip, which is about 125 nanoseconds (nS). A location equipped mobile station will provide +/−125 nS. accuracy, which is about +/−125 feet.

The mobile station or location entity can process the arrival time estimates in at least two ways. first the mobile station may difference the measurements (preferred) to form time-difference-of-arrivals (TDOA); or second, the mobile station may determine absolute time-of-arrival (TOA) by solving for the clock bias between the mobile station and other CDMA system time reports. TOA requires very well calibrated BS system clocks among each other.

The following procedure illustrates significant capabilities hidden in the CDMA standards, which provide a substantial enabling base with which to provide the measurements and data for location methods disclosed herein.

First the BS sends the Neighbor List Update Message, containing a complete list of the neighboring pilot PN sequence offset indices (i.e., via the NGHBR_PN field) associated with candidate BSs in the area, with which the mobile station could possibly scan for detecting usable earliest arriving neighboring useable BS multipath components. This list should typically be a complete list, as opposed to the presumed candidate subset. If the mobile station is not already in the Traffic/Conversation State, it could invoke this state by calling a dialable telephone number in the network, e.g., a designed "Quiet Line" This approach also allows a billing record to be generated according to routine wireless telephony practice. If the network is to determine location, then the network pages the mobile station 140, connecting the mobile station to a Quiet Line/Voice message upon mobile station answer. Note that it may be desirable to suppress the mobile station ringer sounding for certain location applications. Other methods may also be possible.

During installation, each BS 122 in a particular area is provisioned with the locations of all possible neighboring BSs in its area. The BSs 122 use this information to populate a list of all Latitudes and Longitudes which can be sent to the LUs, using the Neighbor List Update message. Second, assuming that the mobile station does not currently have this data or if unknown, then the BS shall send a series of Mobile Station Registered Messages, each message containing the latitude and Longitude values (i.e., the BASE_LAT and BASE_LONG fields) associated with a neighboring BS pilot PN offset sent with the first message. Note that the constants $N_{6m}$, Supported Traffic Channel Candidate Active Set size, normally set to 6, and $N_{7m}$, Supported Traffic Channel Candidate Set size, normally set to 5, and $N_{8m}$, the Minimum Supported Neighbor Set size, normally set to 20, should be sufficient for most location purposes, however these constants could be changed if the need arises.

Third, the BS saves the current T_ADD and T_DROP values in the BS memory, associated with the In-Traffic LU, and sends the In-Traffic System Parameters Message, which includes reduced T_ADD and T_DROP parameter values, useable for location purposes. The value for T_ADD would typically be set to a value near the lower end of the IS-98 specification, possibly below the 80 dB dynamic range requirement, close to (but not including) the thermal noise power level of the LU receiver. Note that if the LU is using restricted battery, e.g., a portable, then the time for keeping T_ADD and T_DROP at a low value for location estimates purposes, should be kept short to delay adverse consequences, such as increased current drain and noise.

Reduced T_ADD and T_DROP values sent to the mobile station will cause the LU to scan all conceivable neighboring BS pilots provided to it by the BS, and to measure the strengths of each received pilot, and to determine the pilot arrival time for each pilot offset. Note that the signal strengths now measured may not be sufficient for carrying traffic, but may be sufficient for location purposes.

Assuming the network is to determine location, then the mobile station reports the arrival time, PILOT_ARRIVAL, for each pilot reported to the base station. According to the standard the arrival time is measured relative to the mobile station's time reference (which was previously determined from the active BS), in units of PN chips (½₂₈₈) microseconds, or about 814 nanoseconds, as follows:

$$\text{PILOT\_PN-PHASE}=(\text{PILOT\_ARRIVAL}+(64\times\text{PILOT\_PN}))\bmod 2^{15},$$

where PILOT_PN is the PN sequence offset index of the pilot associated with the BS pilot indices in the neighbor list.

In order to achieve location accuracy estimates on the order of a few hundred feet (or nanoseconds) a higher resolution than 1 PN chip is required. Although not specified directly in IS-95, most mobile manufacturers use correlators with resolutions of approximately ⅛ PN chip, or about 102 nS (suggesting that if no other systemic errors are present, about 102 feet of error is expected). Note that the search window size SRCH_WIN_A$_r$ for each pilot may need to be increased if there are substantial delays experienced from the environment. It is desirable for the mobile station to report the second and third arrival time (or the second and third fingers), and their relative signal strengths, corresponding to each detectable Pilot Channel.

If more than one PILOT_ARRIVAL is available then a basic TDOA multilateration algorithm may be invoked, at either the LU, or the network. In the network case, the active BS 122 must send a Pilot Request Order for Pilot Measurement Request Order (ORDER code 010001), which causes the mobile station 140 to forward its measurements to the BS (and consequently the network, as appropriate).

At this point a minimally sufficient number of measurements are available to perform a location estimate. Thus the BS should restore the original T_ADD and T_DROP values (previously saved in the BS memory) to the mobile station, via the In-Traffic System Parameters Message.

Additional information may be desirable, such as the active BS' TOA measurement, as well as associated BS measurements of the mobile station's TOA to their BS location. This added information may be sent to the mobile station if the mobile station is to perform location, via the Data Burst Message on the Forward Traffic Channel. Since 26 combinations of data burst types have been reserved for future use in the standard, dedication of several combinations could be used to telemeter location-related data. In cases where duplicate ranging or other information is available, various supervisor techniques mentioned elsewhere in this document, could be used to refine the location estimate.

Once the location estimate has been performed, any number of means could be used to provide the results to the end user.

The IS-95 and J-STD-008 CDMA specifications require that BSs should be synchronized to within +/−3 microseconds of CDMA system time and shall be synchronized to within +/−10 microseconds. The method of the present disclosure assumes the cost of GPS receivers is relatively small, thus time calibration at a more precise calibration level at each location BS is recommended to be used by using the very accurate GPS time parameters. Preferably the absolute error deviation among surrounding or neighboring base stations should be less than 800 nanoseconds, however in most cases this should not be a fixed requirement, but rather a preference. In cases where absolute BS timing is prohibitively expensive, then the "Forced Hand-off" method discussed below can be used to overcome the preferred, or strict absolute BS timing requirements.

Three methods have been currently identified. Some of these techniques apply to other air interface types as well.
1. Use the first finger at BS (Absolute Ranging), and if detectable, invoke a "Forced Hand-off" between the mobile station and a neighboring BS, for a time sufficient to complete signal measurements between a mobile station transmitter and a BS receiver, and if possible, between a BS transmitter and a mobile station receiver, which gives access to as many BS's as can be detected either by the mobile station receiver or the surrounding BS receivers.
2. Use the first finger at mobile station (Differential Ranging) to obtain differential time readings of pilot channel from mobile station
3. Use the Pilot Power Level Measurements and Ground Clutter (Stochastic information)

Now in the general case where three or more BSs can either determine TDOA and/or the mobile station can telemeter such data to the location entity within the network, repeat this method for $BS_2$ and $BS_3$, and $BS_3$ and $BS_1$, in order to determine the remaining curves, thus yielding location within a 2D space. In the case of 3D geometry (such as a multi-story building with multi-floor pico BS cells), the process must be repeated a fourth time in order to determine altitude.

MATLAB MathWorks code to implement the above algorithms follows:

```
clear;hold off;
j = sqrt(-1);
step_size = 0.03;
# Set up BS variables
    theta = pi/3*ones(3,1);
    D = 10*ones(3,1);
    z(1) = 0;
    z(2) = D(1);
    z(3) = D(3)*exp(-j*theta(1));
# Define the distance parameters
    d = [0 6.4 -6.8]';
    location1 = [ ];
    location2 = [ ];
    location3 = [ ];
# Iterate and solve for the location with respect to the first BS (at (0,0) )
    t2 = -pi:0.05:0.05;
    for t1 = -pi/3:0.05:0.05,
        t1 = t1+0.001;
        r1 = 1./(exp(j*t1)-exp(j*t2)).*(D(1)-d(1)*exp(j*t2));
        r2 = 1./(exp(j*t1)-exp(j*t2)).*(D(1)-d(1)*exp(j*t1));
        temp = arg(r1);
        index = find(abs(temp) == min(abs(temp)));
        location1 = [location1;r1(index)*exp(j*t1)];
    end;
    for t1 = -pi/3:0.05:0.05
        t1 = t1+0.001;
        r1 = 1./(exp(j*t1)-exp(j*t2)).*(D(2)-d(2)*exp(j*t2));
        r2 = 1./(exp(j*t1)-exp(j*t2)).*(D(2)-d(2)*exp(j*t1));
        temp = arg(r1);
        index = find(abs(temp) == min(abs(temp)));
        location2 = [location2;r1(index)*exp(j*t1)];
    end;
    for t1 = -pi/3:0.05:0.05
        t1 = t1+0.001;
        r1 = 1./(exp(j*t1)-exp(j*t2)).*(D(1)-d(3)*exp(j*t2));
        r2 = 1./(exp(j*t1)-exp(j*t2)).*(D(1)-d(3)*exp(j*t1));
        temp = arg(r1);
        index = find(abs(temp) == min(abs(temp)));
        location3 = [location3;r1(index)*exp(j*t1)];
    end;
    location2 = location2*exp(j*arg(z(3)-z(2))) + z(2);
    location3 = location3*exp(j*arg(z(1)-z(3))) + z(3);
    set yrange [-10:1];
    set xrange [-1:11];
    plot([z;z(1)])
    hold on
    plot(location1)
    plot(location2)
    plot(location3)
```

Wireless Location Data Collection

It is worthwhile to discuss techniques for both obtaining the initial collection of verified location data, as well as how additional location data can be obtained for updating the data in this data base in a straightforward cost-effective manner.

Regarding both the obtaining of the initial collection of verified location data as well as gathering data updates, it is believed that some of this data can be obtained from the initial and continued engineering of the base station infrastructure by the wireless telephony service provider(s) in the radio coverage area. Additional verified location data can be obtained by trained technicians driving and/or walking certain areas and periodically, at each of a plurality of locations: (a) determining a location estimate (using, for example, GPS if possible and/or offsets from GPS readings); and (b) using an mobile station 140 at the location to generate location data communication with the wireless base station infrastructure.

Alternatively, it is a novel aspect of the present disclosure that a straightforward method and system for gathering verified location data has been discovered, wherein a conventional mobile station 140 can be used without any additional electronics or circuit modifications. One embodiment of this method and system utilizes the personnel of businesses that travel predetermined routes through the radio coverage area (e.g., a delivery and/or pickup service) to generate such data using a conventional mobile station 140 while traversing their routes through the radio coverage area. One example of such personnel is the postal workers, and in particular, the mail carriers having predetermined (likely repetitive) routes for mail pickup and/or delivery at predetermined sites (denoted hereinafter as "mail pickup/delivery sites" or simply "mail sites"). By having such mail carriers each carry a conventional mobile station 140 and periodically generate location data communication with the wireless base station infrastructure at mail sites along their routes, additional verified location data can be added to a Location Data Base (not shown) cost effectively.

To describe how this can be performed, a brief description of further features available in a typical mobile station 140 is needed. At least some modules of mobile station 140 have the following capabilities:

(27.2.1) a unique mobile station 140 identification number; in fact, every mobile station 140 must have such a number (its telephone number);

(27.2.2) the mobile station 140 has a display and a display memory for presenting stored data records having telephone numbers and related data to a user. Further, some portion of each data record is annotation and some portion is able to be transmitted to the wireless base station network. In particular, the mobile station 140 is able to store and recall data records of sufficient size such that each data record may include the following information for a corresponding mail pickup/delivery site along a mail route: (a) an address or other textual description data (e.g., an English-like description) of the mail pickup/delivery site; (b) a predetermined telephone number; and (c) a numerical code (denoted the "site code" hereinafter) associated with the mail pickup/delivery site, wherein the site code is at least unique within a set of site codes corresponding to the mail sites on the mail route. In one embodiment, the memory may store 99 or more such data records, and the display is scrollable through the data records;

(27.2.3) the mobile station 140 can have its display memory updated from either an RS232 port residing on the mobile station, or from an over-the-air activation capability of the wireless network;

(27.2.4) the mobile station 140 has a pause feature, wherein a telephone number can be dialed, and after some predetermined number of seconds, additional predetermined data can be transmitted either through additional explicit user request (e.g., a "hard pause"), or automatically (e.g., a "soft pause"). Moreover, the additional predetermined data can reside in the display memory.

Assuming these features, the following steps can be performed for acquiring additional verified location data:

(27.3.1) For (at least some of the) postal carriers having predetermined routes of addresses or locations visited, the postal carriers are each provided with an mobile station 140 having the capabilities described in (27.2.1) through (27.2.4) above, wherein the memory in each provided mobile station has a corresponding list of data records for the addresses visited on the route of the postal carrier having the mobile station. Moreover, each such list has the data records in the same sequence as the postal carrier visits the corresponding mail sites, and each data record includes the information as in (27.2.2) for a corresponding mail site the postal carrier visits on his/her mail route. More precisely, each of the data records has: (a) a description of the address or location of its corresponding mail pickup/delivery site, (b) a telephone number for dialing a data collection system for the location center 142 (or, alternatively, a reference to a memory area in the mobile station having this telephone number since it is likely to be the same number for most data records), and (c) a site code for the mail pickup/delivery site that is to be transmitted after a predetermined soft pause time-out. Note that the corresponding list of data records for a particular postal route may be downloaded from, for example, a computer at a post office (via the RS232 port of the mobile station 140), or alternatively, the list may be provided to the mobile station 140 by an over-the-air activation. Further, there are various embodiments of over-the-air activation that may be utilized by an embodiment of the present disclosure. In one embodiment, the postal carrier dials a particular telephone number associated with data collection system and identifies both him/herself by his/her personal identification number (PIN), and the postal route (via a route identifying code). Subsequently, the mail pickup and delivery sites along the identified route are downloaded into the memory of the mobile station 140 via wireless signals to the mobile station 140. However, additional over-the-air techniques are also within the scope of the present disclosure such as:

(a) If the postal carrier's route is already associated with the carrier's PIN for over-the-air activation, then the carrier may only need to enter his/her PIN.

(b) If the mobile station 140 is already associated with a particular route, then the carrier may only need to activate the mobile station 140, or alternatively, enter his/her PIN for obtaining an over-the-air download of the route.

(c) Regardless of how the initial download of mail sites is provided to the mobile station 140, it is also an aspect of the present disclosure that if there are more mail sites on a route than there is sufficient memory to store corresponding data records in the mobile station, then the data records may be downloaded in successive segments. For example, if there are 150 mail sites on a particular route and storage for only 99 data records in the mobile station, then in one embodiment, a first segment of 98 data records for the first 98 mail pickup/delivery sites on the route are downloaded together with a $99^{th}$ data record for transmitting an encoding requesting a download of the next 52 data records for the remaining mail sites. (Alternatively, the data collection system may monitor mobile station 140 requests and automatically detect the last location capture request of a downloaded segment, and subsequently automatically download the next segment of mail site data records). Accordingly, when the data records of the first segment have been utilized, a second segment may be downloaded into the mobile station 140. Moreover, at the end of the last segment, the data collection system may cause the first segment for the route to be automatically downloaded into the mobile station 140 in preparation for the next traversal of the route.

(27.3.2) Given that a download into the mobile station 140 of (at least a portion of) the data for a postal route has occurred, the postal carrier traversing the route then iteratively scrolls to the next data record on the list stored in the mobile station as he/she visits each corresponding mail pickup/delivery site, and activates the corresponding data record. That is, the following steps are performed at each mail pickup/delivery site:

(a) As the postal carrier arrives at each mail pickup/delivery site, he or she checks the scrollable mobile station 140 display to assure that the address or location of the mail pickup/delivery site is described by the data record in the portion of the mobile station display for activating associated data record instructions.

(b) The postal carrier then merely presses a button (typically a "send" button) on the mobile station 140 for concurrently dialing the telephone number of the data collection system, and initiating the timer for the soft pause (in the mobile station 140) associated with the site code for the mail pickup/delivery site currently being visited.
(c) Given that the soft pause is of sufficient length to allow for the data collection system call to be setup, the mobile station 140 then transmits the site code for the present mail pickup/delivery site.
(d) Upon receiving the telephone number of the mobile station 140 (via automatic number identification (AIN)), and the site code, the data collection system then performs the following steps:
  (d1) A retrieval of an identifier identifying the route (route id). Note this may be accomplished by using the telephone number of the mobile station. That is, when the data collection system first detects that the mobile station 140 is to be used on a particular route, the telephone number of the mobile station and the route id may be associated in a data base so that the route id can be retrieved using the telephone number of the mobile station.
  (d2) A retrieval of a location representation (e.g., latitude, longitude, and possibly height) of the mail pickup/delivery site identified by the combination of the route id and the site code is performed by accessing a data base having, for each mail site, the following associated data items: the route id for the mail site, the site code, the mail site address (or location description), and the mail site location representation (e.g., latitude, longitude, possibly height).
  (d3) A request to the location center 142 is issued indicating that the location data for the mobile station 140 (resulting from, e.g., the call being maintained between the mobile station and the data collection system) is to be retrieved from the wireless network, temporarily saved, and a location estimate for the mobile station is to be performed. Accordingly, the data collection system request to the location center 142 the following:
    (i) the telephone number of the mobile station 140;
    (ii) the retrieved location of the mobile station 140 according to the route id and site code;
    (iii) a request for the location center 142 to perform a location estimate on the mobile station 140 and return the location estimate to the data collection system;
    (iv) a request that the location center 142 retain the location for the mobile station 140 and associate with it the location of the mobile station 140 received from the data collection system.

Regarding step (iii), the location estimate may also include the steps temporarily increasing the mobile station transmitter power level (27.3.3) Subsequently, given that the location center 142 performs as requested, when the data collection system receives the mobile station 140 location estimate from the location center, the data collection system first associates the returned mobile station location estimate with the corresponding data collection system information regarding the mobile station, and secondly, performs "reasonability" tests on the information received from the mobile station 140 for detecting, filtering and/or alerting systems and personnel whenever the postal carrier appears to be transmitting (via the mobile station 140) from a location different from what the route id and site code indicate. The following are examples of such reasonability tests:

(a) If a threshold number of postal carrier transmittals disagree with the location center 142 estimate by a predetermined distance (likely dependent upon area type), then tag these particular transmittals as problematic and mark all transmittals from the mobile station 140 as suspect for "distance" inaccuracies.
  (b) If there is less than a threshold amount of time between certain postal carrier transmittals, then tag these particular transmittals as problematic and mark all transmittals from the mobile station 140 as suspect for "time" inaccuracies.
  (c) If an expected statistical deviation between a sampling of the postal carrier transmittals and the location estimates from the location center 142 vary by more than a threshold amount, then tag these particular transmittals as problematic and mark all transmittals from the mobile station 140 as suspect for "statistical" inaccuracies.
  (d) If an expected statistical deviation between a sampling of the times of the postal carrier transmittals and an expected timing between these transmittals vary by more than a threshold amount, then tag these particular transmittals as problematic and mark all transmittals from the mobile station 140 as suspect for "statistical" inaccuracies.

(27.3.4) When suspect or problematic mobile station location information is detected (e.g., incorrect site code) in step (27.3.3), the data collection system may perform any of the following actions:
  (a) Alert the postal carrier of problematic and/or suspected inaccuracies in real time, after a certain number of transmittals or at a later time. Note that such alerts as well as positive feedback at the end of the postal carrier's route (or segments thereof) may be advantageous in that it likely inhibits the postal carrier from experimenting with transmittals from locations that are purposefully inaccurate, but at the same time provides sufficiently timely feedback to encourage a conscientious postal carrier.
  (b) Alert the Postal Service of perceived discrepancies in the mobile station 140 transmittals by the postal carrier.
  (c) Dispatch location center technicians to the area to transmit duplicate signals.

(27.3.5) If the transmittal(s) from the mobile station 140 are not suspect, then the data collection system communicates with the location center 142 for requesting that each location received from the mobile station 140 be stored with its corresponding retrieved location (obtained in step (d2)) as a verified location value in the Location Data Base (not shown). Alternatively, if the transmittals from the mobile station 140 are suspect, then the data collection system may communicate with the location center 142 for requesting that at least some of the location data from the mobile station 140 be discarded.

Note that a similar or identical procedure to the steps immediately above may be applied with other services/workers such as courier services, delivery services, meter readers, street sweepers, and bus drivers having predetermined routes.

Additional Modules to Increase Location Hypothesis Accuracy

The following modules may be provided in various embodiments of the present disclosure, and in particular, as part of the location engine 139. Further modules and description directed to the location center 142 and its functionality, the location engine 139, various location enhancing techniques, and various additional embodiments are provided in U.S. Provisional Patent Application having Ser. No. 60/044,821, filed Apr. 25, 1997, by Dupray, Karr, and LeBlanc from which the present application claims priority, and which is fully incorporated herein by reference.

Path Comparison Module

The Path Comparison Module implements the following strategy: the confidence of a particular location hypothesis is be increased (decreased) if it is (not) predicting a path that lies along a known transportation pathway (and the speed of the target MS is sufficiently high). For instance, if a time series of target MS location hypotheses for a given FOM is predicting a path of the target MS that lies along an interstate highway, the confidence of the currently active location hypothesis for this FOM should, in general, be increased. Thus, at a high level the following steps may be performed:

(a) For each FOM having a currently active location hypothesis in a Run-time Location Hypothesis Storage Area, determine a recent "path" obtained from a time series of location hypotheses for the FOM. This computation for the "path" is performed by stringing together successive "center of area" (COA) or centroid values determined from the most pertinent target MS location estimate in each location hypothesis (recall that each location hypothesis may have a plurality of target MS area estimates with one being the most pertinent). The information is stored in, for example, a matrix of values wherein one dimension of the matrix identifies the FOM and the a second dimension of the matrix represents a series of COA path values. Of course, some entries in the matrix may be undefined.

(b) Compare each path obtained in (a) against known transportation pathways in an area containing the path. A value, path_match(i), representing to what extent the path matches any known transportation pathway is computed. Such values are used later in a computation for adjusting the confidence of each corresponding currently active location hypothesis.

Velocity/Acceleration Calculation Module

The Velocity/Acceleration Calculation Module computes velocity and/or acceleration estimates for the target MS using currently active location hypotheses and previous location hypothesis estimates of the target MS. In one embodiment, for each FOM having a currently active location hypothesis (with positive confidences) and a sufficient number of previous (reasonably recent) target MS location hypotheses, a velocity and/or acceleration may be calculated. In an alternative embodiment, such a velocity and/or acceleration may be calculated using the currently active location hypotheses and one or more recent "most likely" locations of the target MS output by the Location Center. If the estimated velocity and/or acceleration corresponding to a currently active location hypothesis is reasonable for the region, then its confidence value is incremented; if not, then its confidence is decremented. The algorithm may be summarized as follows:

(a) Approximate speed and/or acceleration estimates for currently active target MS location hypotheses may be provided using path information related to the currently active location hypotheses and previous target MS location estimates in a manner similar to the description of the Path Comparison Module. Accordingly, a single confidence adjustment number may be determined for each currently active location hypothesis for indicating the extent to which its corresponding velocity and/or acceleration calculations are reasonable for its particular target MS location estimate. This calculation is performed by retrieving information from an Area Characteristics Data Base. Since each location hypothesis includes timestamp data indicating when the MS location signals were received from the target MS, the velocity and/or acceleration associated with a path for a currently active location hypothesis can be straightforwardly approximated. Accordingly, a confidence adjustment value, vel_ok(i), indicating a likelihood that the velocity calculated for the $i^{th}$ currently active location hypothesis (having adequate corresponding path information) may be appropriate for the environmental characteristics of the location hypothesis' target MS location estimate. Thus, if the target MS location estimate includes a portion of an interstate highway, then an appropriate velocity might correspond to a speed of up to 100 miles per hour, whereas if the target MS location estimate includes only rural dirt roads and tomato patches, then a likely speed might be no more than 30 miles per hour with an maximum speed of 60 miles per hour (assuming favorable environmental characteristics such as weather). Note that a list of such environmental characteristics may include such factors as: area type, time of day, season. Further note that more unpredictable environmental characteristics such as traffic flow patterns, weather (e.g., clear, raining, snowing, etc.) may also be included, values for these latter characteristics coming from an Environmental Data Base which receives and maintains information on such unpredictable characteristics. Also note that a similar confidence adjustment value, acc_ok(i), may be provided for currently active location hypotheses, wherein the confidence adjustment is related to the appropriateness of the acceleration estimate of the target MS.

Attribute Comparison Module

The Attribute Comparison Module compares attribute values for location hypotheses generated from different FOMs, and determines if the confidence of certain of the currently active location hypotheses should be increased due to a similarity in related values for the attribute. That is, for an attribute A, an attribute value for A derived from a set $S_{FOM[1]}$ of one or more location hypotheses generated by one FOM, FOM[1], is compared with another attribute value for A derived from a set $S_{FOM2}$ of one or more location hypotheses generated by a different FOM, FOM[2] for determining if these attribute values cluster (i.e., are sufficiently close to one another) so that a currently active location hypothesis in $S_{FOM[1]}$ and a currently active location hypothesis in $S_{FOM2}$ should have their confidences increased. For example, the attribute may be a "target MS path data" attribute, wherein a value for the attribute is an estimated target MS path derived from location hypotheses generated by a fixed FOM over some (recent) time period. Alternatively, the attribute might be, for example, one of a velocity and/or acceleration, wherein a value for the attribute is a velocity and/or acceleration derived from location hypotheses generated by a fixed FOM over some (recent) time period.

In a general context, the Attribute Comparison Module operates according to the following premise:

(37.1) for each of two or more currently active location hypotheses (with positive confidences) if:

(a) each of these currently active location hypotheses, H, was initially generated by a corresponding different $FOM_H$;

(b) for a given MS estimate attribute and each such currently active location hypothesis, H, there is a corresponding value for the attribute (e.g., the attribute value might be an MS path estimate, or alternatively an MS estimated velocity, or an MS estimated acceleration) wherein the attribute value is derived without using a FOM different from $FOM_H$, and;

(c) the derived attribute values cluster sufficiently well, then each of these currently active location hypotheses, H, will have their corresponding confidences increased. That is, these confidences will be increased by a confidence adjustment value or delta.

Note that the phrase "cluster sufficiently well" above may have a number of technical embodiments, including performing various cluster analysis techniques wherein any clusters (according to some statistic) must satisfy a system set threshold for the members of the cluster being close enough to one another. Further, upon determining the (any) location hypotheses satisfying (37.1), there are various techniques that may be used in determining a change or delta in confidences to be applied. For example, in one embodiment, an initial default confidence delta that may be utilized is: if "cf" denotes the confidence of such a currently active location hypothesis satisfying (37.1), then an increased confidence that still remains in the interval [0, 1.0] may be: $cf+[(1-cf)/(1+cf)]^2$, or, $cf*[1.0+cf^n]$, $n=>2$, or, $cf*[a$ constant having a system tuned parameter as a factor]. That is, the confidence deltas for these examples are: $[(1-cf)/(1+cf)]^2$ (an additive delta), and, $[1.0+cf^n]$ (a multiplicative delta), and a constant. Additionally, note that it is within the scope of the present disclosure to also provide such confidence deltas (additive deltas or multiplicative deltas) with factors related to the number of such location hypotheses in the cluster.

Moreover, note that it is an aspect of the present disclosure to provide an adaptive mechanism for automatically determining performance enhancing changes in confidence adjustment values such as the confidence deltas for the present module. That is, such changes are determined by applying an adaptive mechanism, such as a genetic algorithm, to a collection of "system parameters" (including parameters specifying confidence adjustment values as well as system parameters) in order to enhance performance of an embodiment of the present disclosure. More particularly, such an adaptive mechanism may repeatedly perform the following steps:

(a) modify such system parameters;

(b) consequently activate an instantiation of the Location Center (having the modified system parameters) to process, as input, a series of MS signal location data that has been archived together with data corresponding to a verified MS location from which signal location data was transmitted (e.g., such data as is stored in a Data Base); and (c) then determine if the modifications to the system parameters enhanced Location Center performance in comparison to previous performances.

Assuming this module adjusts confidences of currently active location hypotheses according to one or more of the attributes: target MS path data, target MS velocity, and target MS acceleration, the computation for this module may be summarized in the following steps:

(a) Determine if any of the currently active location hypotheses satisfy the premise (37.1) for the attribute. Note that in making this determination, average distances and average standard deviations for the paths (velocities and/or accelerations) corresponding to currently active location hypotheses may be computed.

(b) For each currently active location hypothesis (wherein "i" uniquely identifies the location hypothesis) selected to have its confidence increased, a confidence adjustment value, path_similar(i) (alternatively, velocity_similar(i) and/or acceleration_similar(i)), is computed indicating the extent to which the attribute value matches another attribute value being predicted by another FOM.

Note that such confidence adjustment values are used later in the calculation of an aggregate confidence adjustment to particular currently active location hypotheses.

Extrapolation Module

The Extrapolation Module works on the following premise: if for a currently active location hypothesis there is sufficient previous related information regarding estimates of the target MS (e.g., from the same FOM or from using a "most likely" previous target MS estimate output by the Location Center), then an extrapolation may be performed for predicting future target MS locations that can be compared with new location hypotheses. Note that interpolation routines (e.g., conventional algorithms such as Lagrange or Newton polynomials) may be used to determine an equation that approximates a target MS path corresponding to a currently active location hypothesis.

Subsequently, such an extrapolation equation may be used to compute a future target MS location. For further information regarding such interpolation schemes, the following reference is incorporated herein by reference: Mathews, 1992, *Numerical methods for mathematics, science, and engineering*. Englewood Cliffs, N.J.: Prentice Hall.

Accordingly, if a new currently active location hypothesis is received, then the target MS location estimate of the new location hypothesis may be compared with the predicted location. Consequently, a confidence adjustment value can be determined according to how well if the location hypothesis "i". That is, this confidence adjustment value will be larger as the new MS estimate and the predicted estimate become closer together.

Note that in one embodiment of the present disclosure, such predictions are based solely on previous target MS location estimates output by Location Center. Thus, in such an embodiment, substantially every currently active location hypothesis can be provided with a confidence adjustment value by this module once a sufficient number of previous target MS location estimates have been output. Accordingly, a value, extrapolation_chk(i), that represents how accurately the new currently active location hypothesis (identified here by "i") matches the predicted location is determined.

Analytical Reasoner Controller

Given one or more currently active location hypotheses for the same target MS input to a controller (denoted the Analytical Reasoner Controller herein), this controller activates, for each such input location hypothesis, the other submodules (denoted hereinafter as "adjustment submodules") with this location hypothesis. Subsequently, the Analytical Reasoner Controller receives an output confidence adjustment value computed by each adjustment submodule for adjusting the confidence of this location hypothesis. Note that each adjustment submodule determines:

(a) whether the adjustment submodule may appropriately compute a confidence adjustment value for the location hypothesis supplied by the controller. (For example, in some cases there may not be a sufficient number of location hypotheses in a time series from a fixed FOM.);

(b) if appropriate, then the adjustment submodule computes a non-zero confidence adjustment value that is returned to the Analytical Reasoner Controller.

Subsequently, the controller uses the output from the adjustment submodules to compute an aggregate confidence adjustment for the corresponding location hypothesis. In one particular embodiment of the present disclosure, values for the eight types of confidence adjustment values (described in sections above) are output to the present controller for computing an aggregate confidence adjustment value for adjusting the confidence of the currently active location hypothesis presently being analyzed. As an example of how such confidence adjustment values may be utilized, assuming a currently active location hypothesis is identified by "i", the outputs from the above described adjustment submodules may be more fully described as:

| | | |
|---|---|---|
| path_match(i) | 1 | if there are sufficient previous (and recent) location hypotheses for the same target MS as "i" that have been generated by the same FOM that generated "i", and, the target MS location estimates provided by the location hypothesis "i" and the previous location hypotheses follow a known transportation pathway. |
| | 0 | otherwise. |
| vel_ok(i) | 1 | if the velocity calculated for the $i^{th}$ currently active location hypothesis (assuming adequate corresponding path information) is typical for the area (and the current environmental characteristics) of this location hypothesis' target MS location estimate; |
| | 0.2 | if the velocity calculated for the $i^{th}$ currently active location hypothesis is near a maximum for the area (and the current environmental characteristics) of this location hypothesis' target MS location estimate; |
| | 0 | if the velocity calculated is above the maximum. |
| acc_ok(i) | 1 | if the acceleration calculated for the $i^{th}$ currently active location hypothesis (assuming adequate corresponding path information) is typical for the area (and the current environmental characteristics) of this location hypothesis' target MS location estimate; |
| | 0.2 | if the acceleration calculated for the $i^{th}$ currently active location hypothesis is near a maximum for the area (and the current environmental characteristics) of this location hypothesis' target MS location estimate; |
| | 0 | if the acceleration calculated is above the maximum. |
| similar_path(i) | 1 | if the location hypothesis "i" satisfies (37.1) for the target MS path data attribute; |
| | 0 | otherwise. |
| velocity_similar(i) | 1 | if the location hypothesis "i" satisfies (37.1) for the target MS velocity attribute; |
| | 0 | otherwise. |
| acceleration_similar(i) | 1 | if the location hypothesis "i" satisfies (37.1) for the target MS acceleration attribute; |
| | 0 | otherwise. |
| extrapolation_chk(i) | 1 | if the location hypothesis "i" is "near" a previously predicted MS location for the target MS; |
| | 0 | otherwise. |

Additionally, for each of the above confidence adjustments, there is a corresponding Location Center system settable parameter whose value may be determined by repeated activation of an Adaptation Engine. Accordingly, for each of the confidence adjustment types, T, above, there is a corresponding system settable parameter, "alpha_T", that is tunable by the Adaptation Engine. Accordingly, the following high level program segment illustrates the aggregate confidence adjustment value computed by the Analytical Reasoner Controller.

```
target_MS_loc_hyps <--- get all currently active location hypotheses,
H, identifying the present target;
    for each currently active location hypothesis, hyp(i), from
    target_MS_loc_hyps do
    {
        for each of the confidence adjustment submodules, CA,
            do activate CA with hyp(i) as input;
    /* now compute the aggregate confidence adjustment using the
        output from the confidence adjustment submodules. */
        aggregate_adjustment(i) <--- alpha_path_match *
        path_match(i)
            + alpha_velocity * vel_ok(i)
            + alpha_path_similar * path_similar(i)
            + alpha_velocity_similar * velocity_similar(i)
            + alpha_acceleration_similar*
            acceleration_similar(i)
            + alpha_extrapolation * extrapolation_chk(i);
        hyp(i).confidence <--- hyp(i).confidence +
        aggregate_adjustment(i);
    }
```

Wireless Location Applications

After having determined wireless location from a base technology perspective, several applications are detailed below, which provide the results of the location information to a variety of users in various channels and presentation schemes, for a number of useful reasons and under various conditions. The following applications are addressed: (1.) providing wireless location to the originator or another, using either the digital air interface voice channel or a wireline channel, and an automatic call distributor; (2.) providing wireless location to the originator, or another, using either the digital air interface voice channel or a wireline channel, and a hunt group associated with the central office or a PBS group; (3.) providing wireless location to the originator or another, using either the digital air interface text paging, or short message service communications channel; (4.) providing wireless location to the originator or another, using the Internet, and in one embodiment, using netcasting or "Push" technology; (5.) selective group, multicast individualized directions with optional Conferencing; (6.) rental car inventory control and dispatch; (7.) vocalized directions and tracking; (8.) wireless location and court ruling/criminal incarceration validation; (9.) flexible delivery of wireless location information to public safety answering points; (10.) trigger-based inventory and tracking; (11.) group, e.g., family, safety and conditional notification; (12.) wireless location-based retail/merchandising services; (13.) location-based home/office/vehicle security management; (13.) infrastructure-supported wireless location using hand-actuated directional finding; (14.) infrastructure-supported intelligent traffic and highway management; (15.) Parametric-driven intelligent agent-based location services. Each of these wireless location applications is discussed in detail below.

Providing Wireless Location Using an ACD Application

Figure 36:
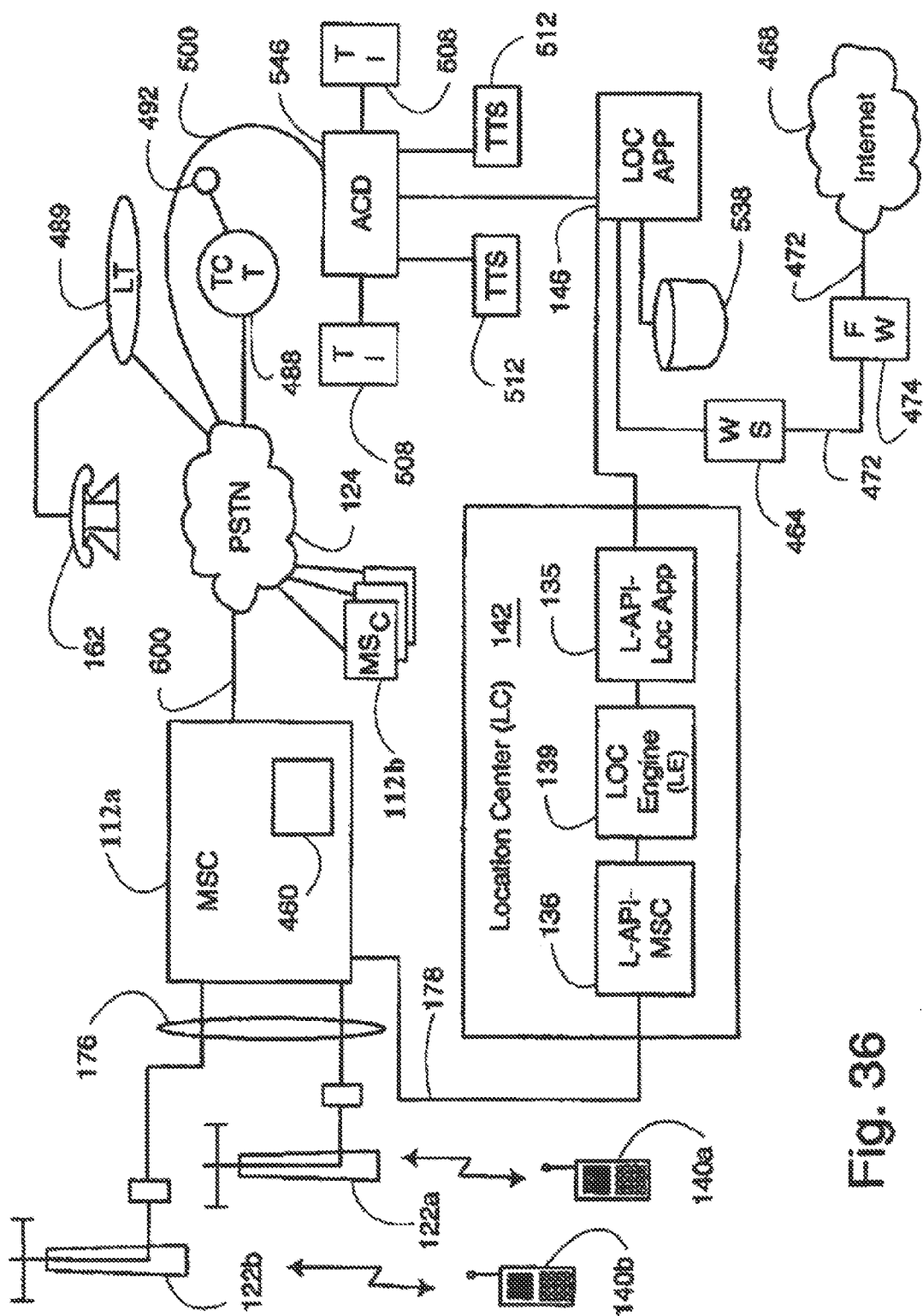
FIG. 36 illustrates how location estimates can be provided using voice channel connections via an ACD and Internet technology.

Referring to FIG. 36, a user (the initiating caller) desiring the location of a target mobile station 140a, such as a user at a telephone station 162 which is in communication with a tandem switch 489 or a user of an mobile station 140b, or any other telephone station user, such as a computer program, dials a publicly dialable telephone number which terminates on the automatic call distributor 546 (ACD), associated with the location center 142. If the caller originated the call from a mobile station 140*b*, then the call is processed via a base station 122*b* to a mobile switch center 112*a*. The mobile switch center 112*a* recognizes that the call is to be routed to the PSTN 124 via an interoffice trunk interface 600. The PSTN 124 completes the call to the ACD 546, via a trunk group interface 500. Note that the initiating caller could access the ACD 546 in any number of ways, including various Inter-LATA Carriers 492, via the public switched telephone network (PSTN) 124. The ACD 546 includes a plurality of telephone network interface cards 508 which provide telephony channel associated signaling functions, such as pulse dialing and detection, automatic number identification, winking, flash, off-hook voice synthesized answer, dual tone multi frequency (DTMF) detection, system intercept tones (i.e., busy, no-answer, out-of-service), disconnected, call progress, answer machine detection, text-to-speech and automatic speech recognition. Note that some of these functions may be implemented with associated digital signal processing cards connected to the network cards via an internal bus system. An assigned telephone network interface card 508 detects the incoming call, provides an off-hook (answer signal) to the calling party, then provides a text to speech (TTS) message, via an assigned text-to-speech card 512 indicating the nature of the call to the user, collects the automatic number identification information if available (or optionally prompts the caller for this information), then proceeds to collect the mobile identification number (MIN) to be located. MIN collection, which is provided by the initiating caller through keypad signaling tones, can be achieved in several methods. In one case the network card 508 can request a TTS message via text-to-speech card 512, which prompts the initiator to key in the MIN number by keypad DTMF signals, or an automatic speech recognition system can be used to collect the MIN digits. After the MIN digits have been collected, a location request message is sent to a location application 146. The location application 146, in concert with location application interface 14 (more particularly, L-API-Loc 135, see FIG. 36), in the location system 142, is in communication with the location engine 139. Note that the location engine 139 includes the signal processing subsystem 20, and one or more location estimate modules, i.e., DA module 10, TOA/TDOA module 8 or HBS module 6. The location engine 139 initiates a series of messages, using the location application programming interface (L-API-MSC 136) to the mobile switch center 112*a*. The location application programming interface 136 then communicates with one or more mobile switch centers 112*b*, to determine whether or not the mobile station 140*a* to be located can be located. Conditions affecting the locateability of the mobile station 140*a* include, for example: the mobile station 140*a* being powered off, the mobile station 140*a* not being in communication range, the mobile station 140*a* roaming state not being known, the mobile station 140*a* not being provisioned for service, and related conditions. If the mobile station 140*a* cannot be located then an appropriate error response message is provided to the initiating caller, via e-mail, using the web server 464 in communications with the Internet 468 via an Internet access channel 472 or alternatively the error response message may be sent to a text to speech card 512, which is in communications with the initiating caller via the telephone interface card 508 and the ACD 546, which is in communication via telephony interface circuits 500 to the PSTN 124.

Note that in cases where rendering location estimate information is required on the Internet, the web server 464 can include the provision of a digital certificate key, thus enabling a secure, encrypted communication channel between the location web server 464 and the receiving client. One such digital encryption key capability is a web server provided by Netscape Communications, Inc. and a digital certificate key provided by Verisign, Inc. both located in the state of California, U.S.A.

The PSTN 124 completes routing of the response message to the initiating caller via routine telephony principles, as one skilled in the art will understand. Otherwise the mobile station 140*a* is located using methods described in greater detail elsewhere herein. At a high level, the mobile switch center 112*a* is in communication with the appropriate base stations 122, and provides the location system 142 with the necessary signal and data results to enable a location estimation to be performed by the location engine 139. Once the location has been determined by the location engine 139 in terms of Latitude, Longitude and optionally height if known (in the form of a text string), the result is provided by to the initiator by inputting the location text string to a text-to-speech card 512, which in turn is in communication with the assigned telephone interface card 508, via the automatic control distributor 546, for completing the communication path and providing the location response back to the initiating user via the telephone interface 500 to the PSTN 124, and from the PSTN 124 to the initiating user.

Alternatively the location results from the location application 146 (e.g., FIGS. 37 and 38) could be provided to the initiating caller or Internet user via a web server 464 in communication with the Internet 468, via an Internet access channel 472 and a firewall 474 (e.g., FIG. 36). In another embodiment, the location results determined by the location application 146 may be presented in terms of street addresses, neighborhood areas, building names, and related means familiar to human users. The alternative location result can be achieved by previously storing a relationship between location descriptors familiar to humans and Latitude and Longitude range values in a map database 538 (FIG. 36). During the location request, the location application 146 accesses the map database 538, providing it with the Latitude and Longitude information in the form of a primary key which is then used to retrieve the location descriptor familiar to humans. Note that to those skilled in the art, the map database 538 and associated messaging between the map database 538 and the location application 146 can be implemented in any number of techniques. A straightforward approach includes defining a logical and physical data model using a relational database and designer environment, such as "ORACLE 2000" for the design and development, using a relational database, such as the "ORACLE 7.3" database.

In an alternative embodiment, the location application 146 may be internal to the location system 142 (e.g. FIG. 37), as one skilled in the art will understand.

Providing Wireless Location Via Hunt Groups Application

Figure 37:
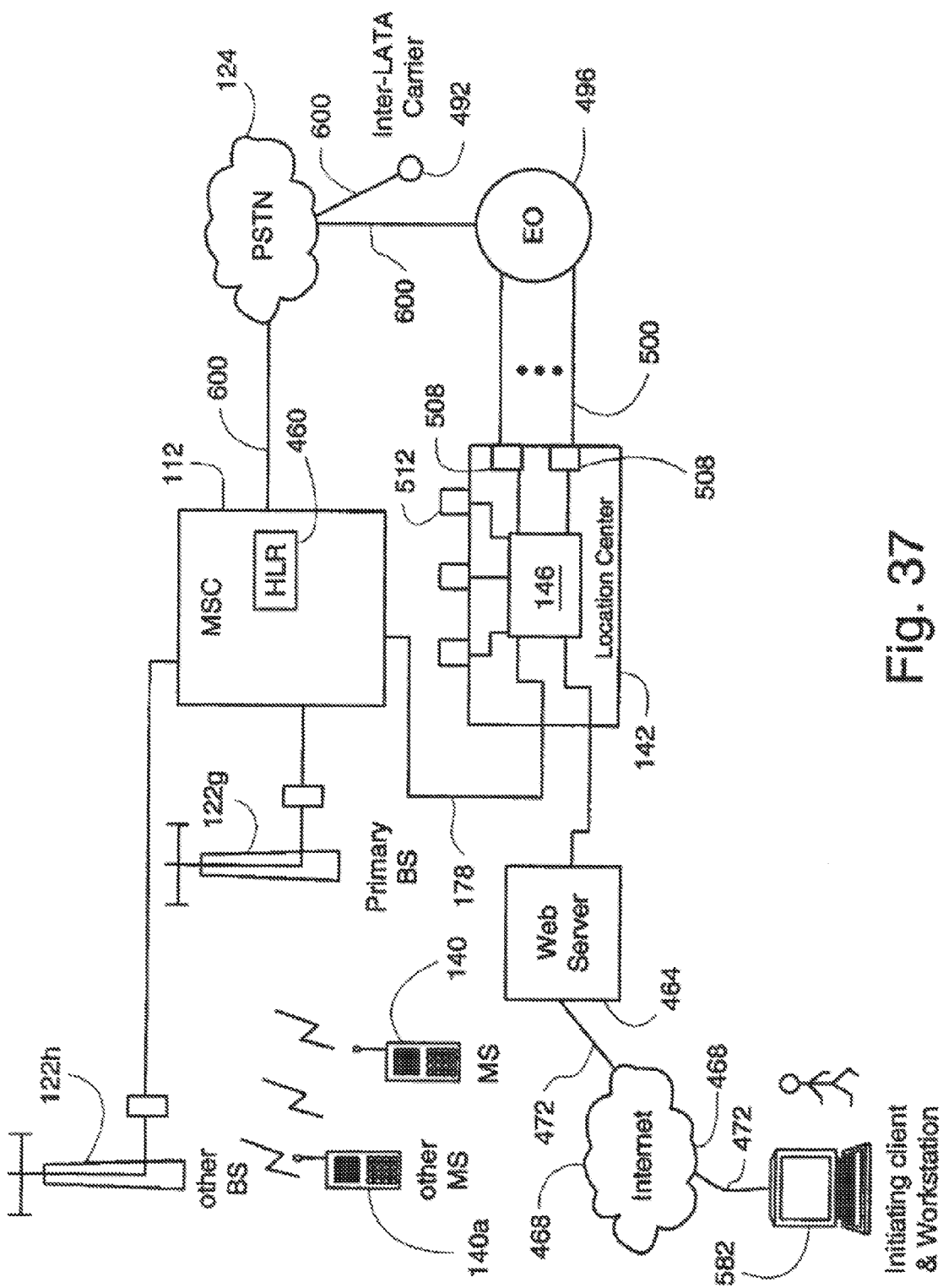
FIG. 37 shows wireless Location of a MS using the Voice Channel from a Hunt Group.
Figure 38:
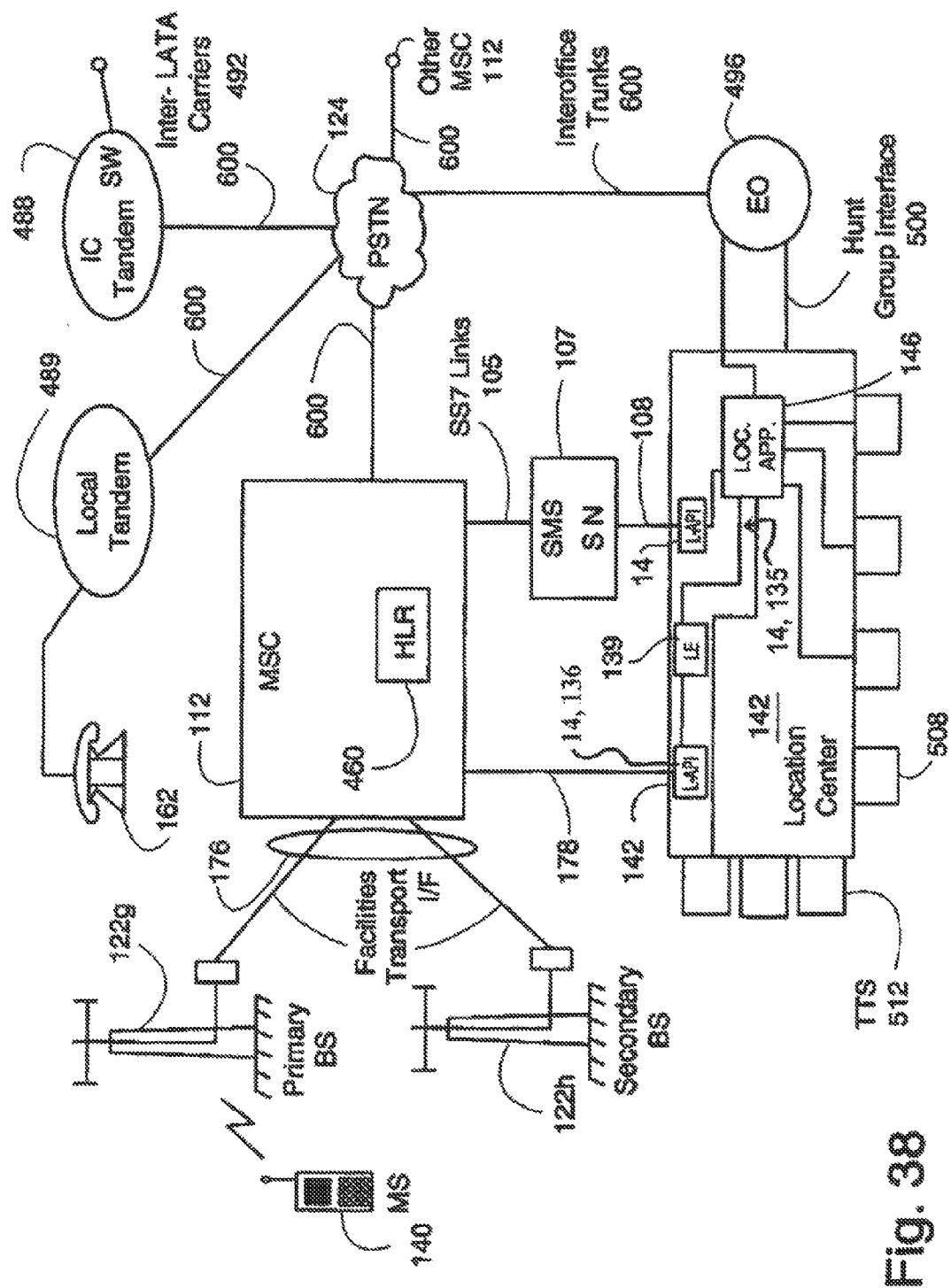
FIG. 38 illustrates how location information can be provided via Text paging or short message service messaging.

Referring to FIGS. 37 and 38, a user—the initiating caller, such as a mobile station 140*a* desiring the location of a mobile station 140, signals to the primary base station 122*g*, in connection with the mobile switch center 112 via transport facilities 176. The mobile switch center 112 is connected to the PSTN 124, via interoffice trunks 600. The initiating user dials a publicly dialable telephone number which is then routed through an end office 496, to a telephone interface card 508, via a telephone hunt group 500. The hunt group 500 provides a telephony connection to the interface card 247 associated with the location system 142. The hunt group trunk interface 500 is provided from an end office telephone switch 496. Note that the initiating caller could access the telephony interface card 508, via hunt group trunk interface 500 in any number of ways, including an InterLATA Carrier 492, via the public switched telephone network (PSTN) 124. The hunt group trunk interface 500 is in communication with a plurality of telephone interface cards 508. The interface cards 508 provide telephony channel associated signaling functions, such as pulse dialing and detection, automatic number identification, winking, flash, off-hook voice synthesized answer, dual tone multi frequency (DTMF) detection, system intercept tones (i.e., busy, no-answer, out-of-service), disconnected, call progress, answer machine detection, text-to-speech and automatic speech recognition. An assigned network interface card 508 detects the incoming call, provides an off-hook (answer signal) to the calling party, then provides a text to speech (TTS) message indicating the nature of the call to the user, collects the automatic number identification information if available (or optionally prompts the caller for this information), then proceeds to collect the mobile identification number (MIN) to be located. MIN collection can be achieved in several methods. In one case the network card 508 can request a TTS message, generated by a voice synthesizer or text to speech card 512, which prompts the initiator to key in the MIN number by keypad tone signals, or an automatic speech recognition system can be used to collect the MIN digits. After the MIN digits have been collected, a location request message is sent to an application 146 in the location system 142. The application 146 in location system 142 initiates a series of messages to the mobile switch center 112, and optionally to the home location register 460, to determine whether or not the mobile station 140 to be located can be located. If the mobile station 140 cannot be located then an appropriate error response message is provided to the initiating caller, via e-mail, test to speech card 512, web server 464 in communications with the public Internet 468, or similar means. Alternatively the last known location can be provided, along with the time and date stamp of the last location, including an explanation that the current location is not attainable. Otherwise the mobile station 140 is located using methods described in greater detail elsewhere in this patent. At a high level, the mobile switch center 112 is in communication with the appropriate base stations 122g and 122h, and provides the location system 142 with the necessary signal and data results to enable a location estimation to be performed by the location system 142. Once the location has been determined by the location system 142 in terms of Latitude, Longitude and optionally height if known (in the form of a text string), the result is provided back to the initiator by inputting the location text string to a text-to-speech card 512, in communication with the assigned telephone interface card 508. The interface card 508 then provides the audible, synthesized message containing the location estimate to the initiating caller. Alternatively the location results could be provided to the initiating caller via a web server 464 in communication with the Public Internet 468, using standard client request-response Internet protocols and technology. location system 142 access to a geographical information system or other mapping system could also be used to further enhance the user understanding of the location on a map or similar graphical display.

Providing Wireless Location Via Text Paging Application

Referring to FIG. 38, a user (the initiating caller) desiring the location of an mobile station 140, such as a wireless user using mobile station 140 who has text paging service provisioned, dials a publicly dialable telephone number, carried to the PSTN 124 which terminates on an end office 496 based hunt group interface 500, which in turn is in communication with the location system 142. The mobile switch center 112, local tandem 317 and interLATA Carrier tandem 362 are in communication with the PSTN 124, as those skilled in the art will understand. Note that the initiating caller could also be a wireline user with an ordinary telephone station 162 in communication with a local tandem 489, connected to the PSTN 124. The initiating location request user could access the telephony interface cards 512 via the hunt group 500. In other embodiments, including various Inter-LATA Carriers 492, via the public switched telephone network (PSTN) 124. The hunt group interface 500 is in communication with a plurality of telephone network interface cards 512, which are in communication with the location application 146. The telephone interface cards 512 provide telephony channel associated signaling functions, such as pulse dialing and detection, automatic number identification, winking, flash, off-hook voice synthesized answer, dual tone multi frequency (DTMF) detection, system intercept tones (i.e., busy, no-answer, out-of-service), disconnected, call progress, answer machine detection, text-to-speech and automatic speech recognition. Note that some of these functions may be implemented with associated digital signal processing cards connected to the network cards via an internal bus system. An assigned telephony interface card 508 detects the incoming call, provides an off-hook (answer signal) to the calling party, then provides, if appropriate, a text to speech (TTS) message indicating the nature of the call to the user, collects the automatic number identification information if available (or optionally prompts the caller for this information), then proceeds to collect the mobile identification number (MIN) to be located by sending a location request message to an application 146 in the location system 142. The mobile station MIN collection, provided through the communications channel established, is sent by the initiating caller through keypad signaling tones. This MIN collection process can be achieved in several methods. In one case the telephony interface card 512 can request a text-to-speech message, generated by a text-to-speech card 512, which prompts the initiator to key in the MIN number by keypad tone signals. In another case an automatic speech recognition system can be used to collect the MIN digits. In either case, after the MIN digits have been collected, a location request message is sent to the location system 142. The location system 142 initiates a series of messages to the mobile switch center 112, via the location applications programming interface (L-API-MSC 136), and optionally to the home location register 460, to determine whether or not the mobile station 140 to be located can in fact be located. Alternatively the last known location can be provided, along with the time and date stamp of the last location, including an explanation that the current location is not attainable. Conditions regarding the locateability of a mobile station include, for example: mobile station 140 powered off, mobile station not in communication range, mobile station roaming state not known, mobile station 140 not provisioned for service, and related conditions. If the mobile station 140 cannot be located then an appropriate error response message is provided to the initiating caller, via the service node (SN) 107 for short messaging service (SMS). The service node is in communication with the location system 142 using a common text paging interface 108. The service node 107 accepts the location text paging message from the location system 142 and communicates a request to page the initiating caller via a typical signaling system 7 link for paging purposes, to the mobile switch center 112. The mobile switch center 112 forwards the location text page information to the initiating caller via the appropriate base stations, to the initiating mobile station caller. Otherwise the mobile station 140 is located using methods described in greater detail elsewhere in this patent. At a high level, the mobile switch center 112 is in communication with the appropriate base stations, and provides the location system 142 with the necessary signal and data results to enable a location estimation to be performed by the location system 142. Once the location has been determined by the location system 142 in terms of Latitude, Longitude and optionally height if known (in the form of a text string). The location result is provided to the initiator by inputting the location text string to the service node 107 for short messaging service (SMS). The service node 107 is in communication with the location system 142 using a common text paging interface 108. The service node 107 accepts the location text paging message from the location system 142 and communicates a request to page the initiating caller via a typical signaling system 7 link 105 for paging purposes, to the mobile switch center 112. The mobile switch center 112 forwards the location text page information to the initiating caller via the appropriate-base stations 122a or 122b (not shown in FIG. 38), to the initiating caller, via a text-to-speech card 512, in communication with the assigned telephone interface card 508.

Providing Wireless Location Using Internet Push Technology Application

Figure 39:
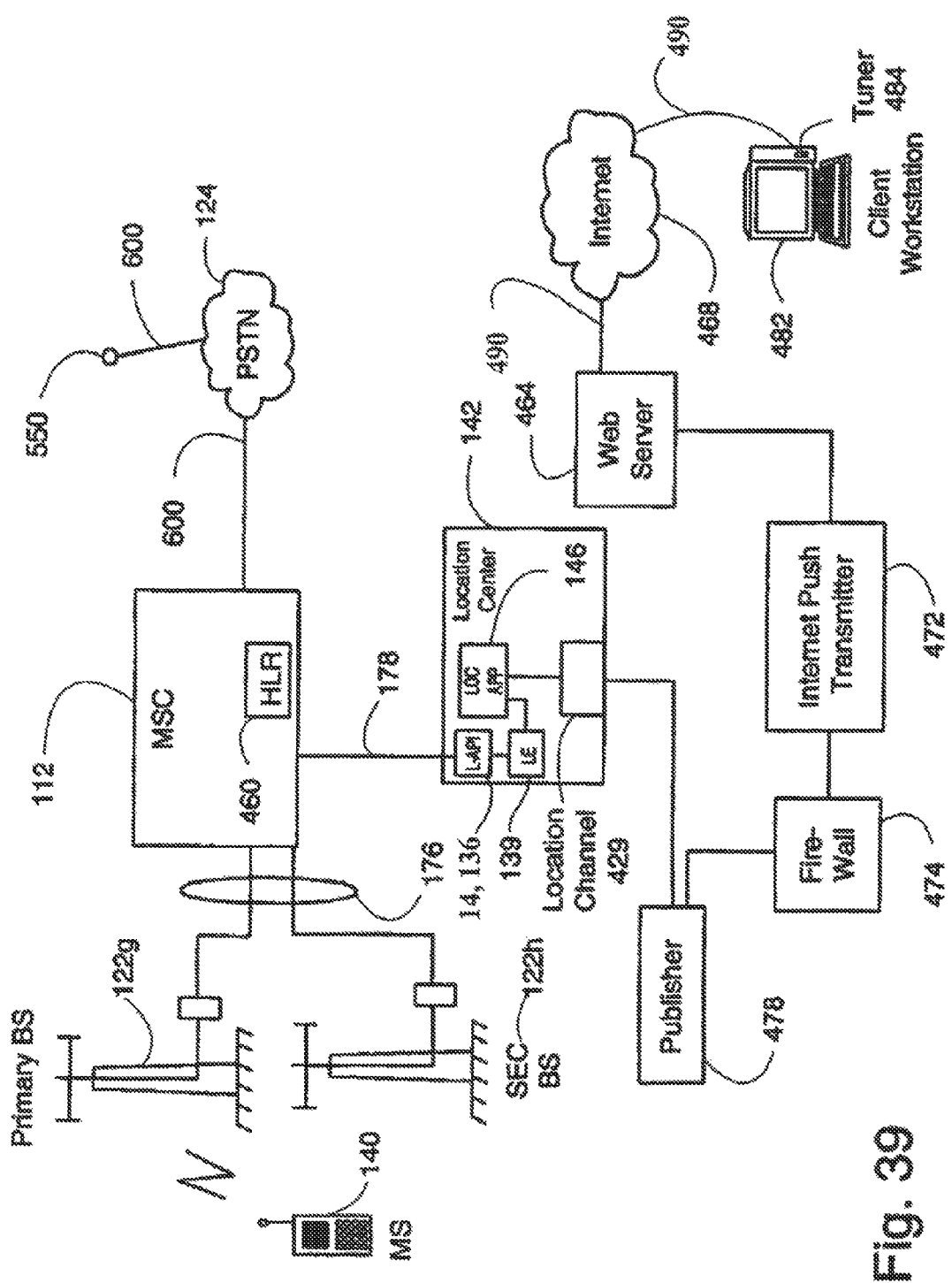
FIG. 39 shows how location information of an MS can be provided via Internet via "Push" technology.

Referring to FIG. 39, a user (the initiating user) desiring the location of an mobile station 140, who has a push technology tuner 484 associated with the user's client workstation 482, selects the location channel in the area, and further specifies the mobile station(s) 140 to be located, with what frequency should the location estimate be provided, and other related parameters, such as billing information. The user's client workstation 482 is in communication with the Internet, optionally via an encrypted communications channel (e.g. channel 490) using, for example, Netscape's SSL 3 encryption/decryption technology. A push transmitter 472, connected to the Internet 468 via a web server 464, detects the client workstation 482 user's request. The transmitter 472 requests location update information for specified mobile identification numbers through a firewall 474 and a publisher 478, in communication with a location channel application 429 in the location system 142. The location system 142 initiates location requests for all mobile station mobile identification numbers for which location information has been subscribed to, then provides the location results to the location channel application 429.

The location system 142 initiates a series of messages to the mobile switch center 112, via the location applications programming interface (L-API-MSC 136), and optionally to the home location register (HLR) 460, to determine whether or not the mobile station 140 or others, to be located can in fact be located. Alternatively the last known location can be provided, along with the time and date stamp of the last location, including an explanation that current location is not attainable. Conditions regarding the locateability of a mobile station 140 include, for example: mobile station 140 powered off, mobile station not in communication range, mobile station 140 roaming state not known, mobile station 140 not provisioned for service, and related conditions. If the mobile station 140 cannot be located then an appropriate error response message is provided to the initiating client workstation 482, via the push technology components location channel application 429, publisher 478, firewall 474, transmitter 472, web server 464, public Internet 468, to the client workstation 482. A similar communication mechanism is used to provide the client's workstation 482 with attained location information.

Note that the location channel 429 could in fact provide a collection of mobile station 140 mobile identification numbers for location purposes that are grouped by a particular market and/or customer organization segment. for example, location channel number 1 could provide enhanced wireless 9-1-1 service to specific public safety answering points, channel number 2 could provide periodic wireless location information of a fleet of taxi cabs belonging to a particular company, to their dispatch operator, channel 3 could provide wireless location to a control center of a military organization, channel 4 could provide wireless location information of vehicles carrying hazardous materials, to a control center, and so forth.

The location channel application 429 provides the location results to the publisher 478, which provides a method of adding the new location results to the transmitter 472, via firewall 474. The firewall 474, provides protection services between certain systems and the Internet 468, such as preventing malicious users from accessing critical computing systems.

Selective Group, Multicast, Individualized Directions Conferencing Application

The group multicast help, with individualized directions, is an application wherein for members of a group that are authorized and nearest a distressed caller, these members are given text paging message instructions on how to drive or navigate, to reach the initiating distressed caller. Alternatively optional voice synthesis technology could be used to aid one or more members to have spoken instruction giving directions and/or instructions for each member, to help them reach the distressed caller.

Figure 40:
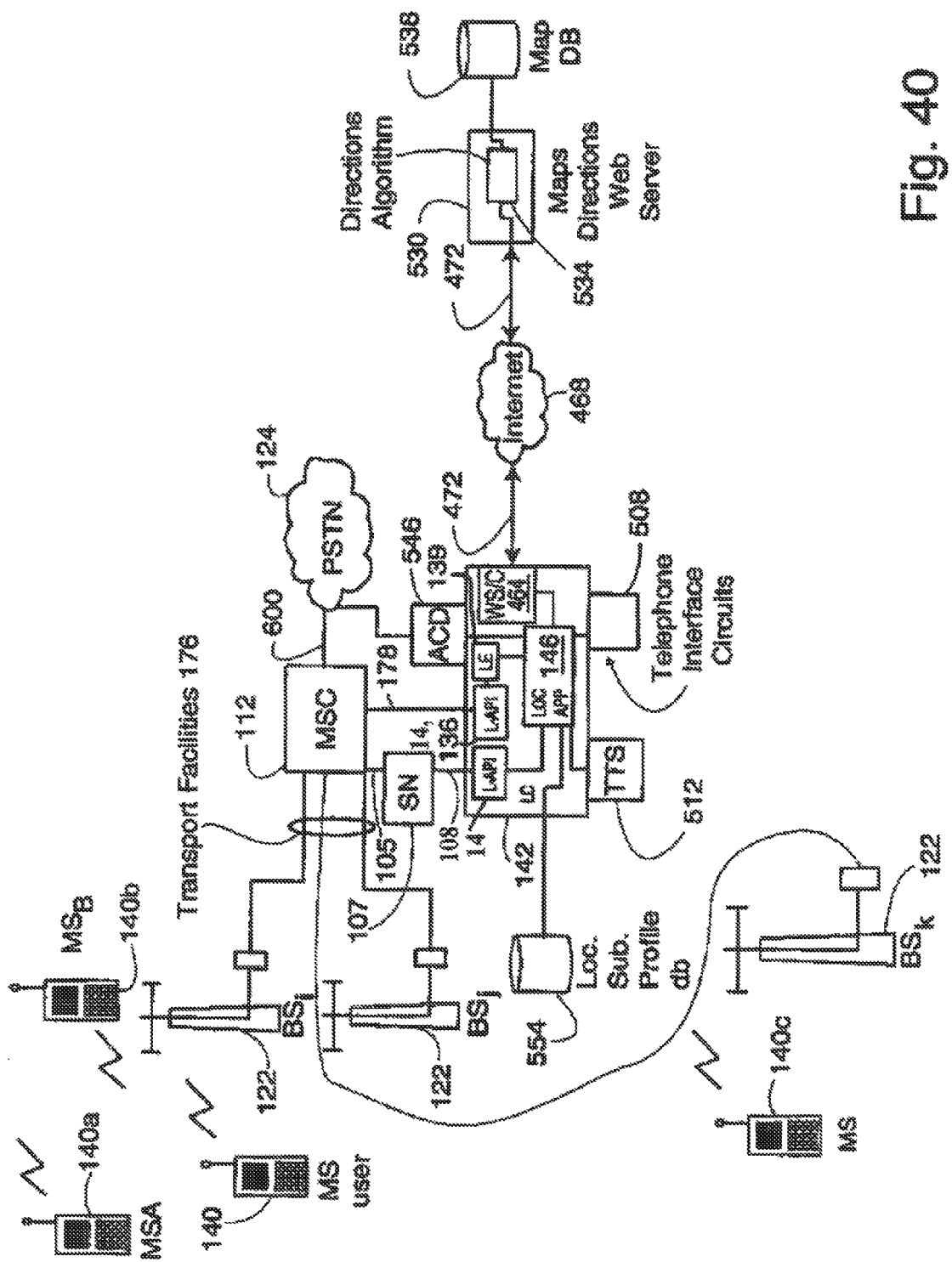
FIG. 40 illustrates how location directions can be provided to nearest members, regarding directions for each individual member to reach a distressed MS caller.

Referring to FIG. 40, an individual having a mobile station 140 desires to make a distress call for help, or for some other reason. The distressed caller with mobile station 140 dials a special telephone number, received by base station 122, which then sends the originating call setup request to the mobile switch center 112. The mobile switch center 112 routes the originating call through the PSTN 124 to an automatic call distributor (ACD) 546. The ACD 546 selects an available telephony interface circuit 508, which answers the call and provides introductory information to the caller, such as a greeting message, progress of service, etc., using a voice synthesizer circuit card 512. Note that circuits 508 and 512 may be combined as voice response units. The telephony interface circuit 508 collects the automatic number identification information if available in the call setup message or optionally prompts the caller for this information. This MIN collection process can be achieved in several methods. In one case the network telephony interface card 508 can request a TTS (text to speech) message, generated by a voice synthesizer card 512, which prompts the initiator to key in their MIN number by keypad tone signals. In another case an automatic speech recognition system can be used to collect the MIN digits. In either case after the MIN digits have been collected, a location request message is sent to the location system 142. The location system or location center (LC) 142 initiates a series of messages to the mobile switch center 112, via the location applications programming interface (L-API-MSC 136), to determine whether or not the mobile station 140 to be located can in fact be located. If the mobile station 140 cannot be located then an appropriate error response message is provided to the initiating caller. Otherwise the LC 142 determines the caller's location via methods discussed elsewhere in this patent. While this event is proceeding an application in the LS 142 references the initiating caller's location subscriber profile database (554, FIG. 40) to determine if the caller allows others to locate him or her, and specifically which individuals are allowed to be informed of the caller's location.

Assuming the caller allows location information to be sent out to a select group, then the list of member's mobile station identification numbers (MIN)s are extracted from the profile database, and an application in the LC 142 initiates a series of messages to the mobile switch center 112, via the location applications programming interface (L-API-MSC 136), to determine the locations of each of the users' mobile station mobile identification numbers associated with the member list. Regarding those mobile station mobile identification numbers nearest the distress caller, each member's mobile station is dialed via a control message sent from an application in the LC 142 to the telephony interface card 508. A voice synthesizer card 512 or text to speech circuit is also patched in the calling circuit path, to announce the purpose of the automated call to each member. The ACD 546 initiates the call request to each member via the PSTN 124, which connects to the mobile switch center 112, that ultimately rings the member mobile station 140 and 148 via base stations 122. An application in the LC 142 identifies a start and finish location destination location for a member, based on his/her current location as being the start location, and the finish location being the distress caller's location at mobile station MIN. The application in the LC 142 initiates a http or similar Internet compatible protocol universal resource locator (URL) request via the web server/client 530 to the public Internet 468, which terminates on a maps, directions web server 534. One such URL known to the authors is Lucent Technologies' http://www.mapsOnUs.com, which is provided for public use. The map/directions server 534 queries the map base 536 via a directions algorithm, and returns to the initiating http request, the location web server 530, with a list of instructions to enable a user to navigate between a start location and end location. Referring to FIG. 41, the information shown in the columns labeled "Turn #", "Directions", "And Go", and/or "Total Miles", can then be parsed from the http response information. Referring now to FIG. 40, this information can then be sent as a short text message, to the relevant mobile station 148 or 140 via the service node 107, using interface 105 to the mobile switch center 112, and relevant base stations 122, assuming each member mobile station has short message service provisioned. If this is not the case, the service node 107 will inform the application within the LS 142, which then initiates an alternative method of sending the start-finish location navigation instructions information via an appropriate voice synthesizer card 512 and associated telephony interface card 508. The interface card 508 initiates an automated call to each appropriate member's mobile station 148 and 140, via the telephony path including components ACD 546 in communication with the PSTN 124, which is in communication with the mobile switch center 112. The mobile switch center 112 completes the routing of the automated call to the appropriate mobile station 140 using base stations 122. The above process is repeated for each nearby member's mobile station, thus allowing all nearby members to be notified that the distressed caller needs help, with navigation instructions to each member, which enables the member to reach the distressed caller. Variations of this application include putting each relevant party in communication with each other via a conference call capability in the ACD 546, with or without providing location information and/or start-finish navigation instructions.

Rental Car Inventory, Tracking and Control Application

An application in the location system utilizes periodic wireless location of appropriate rental cars, control circuits and control communications within the rental car, and secured transactions across the Internet, or similar means, in order to provide various tracking and control functions. Such functions allow rental car agencies to remotely control and operate their rental cars in order to reduce operating costs such as storage and maintenance, as well as provide additional conveniences and services to rental car agency customers.

Figure 42:
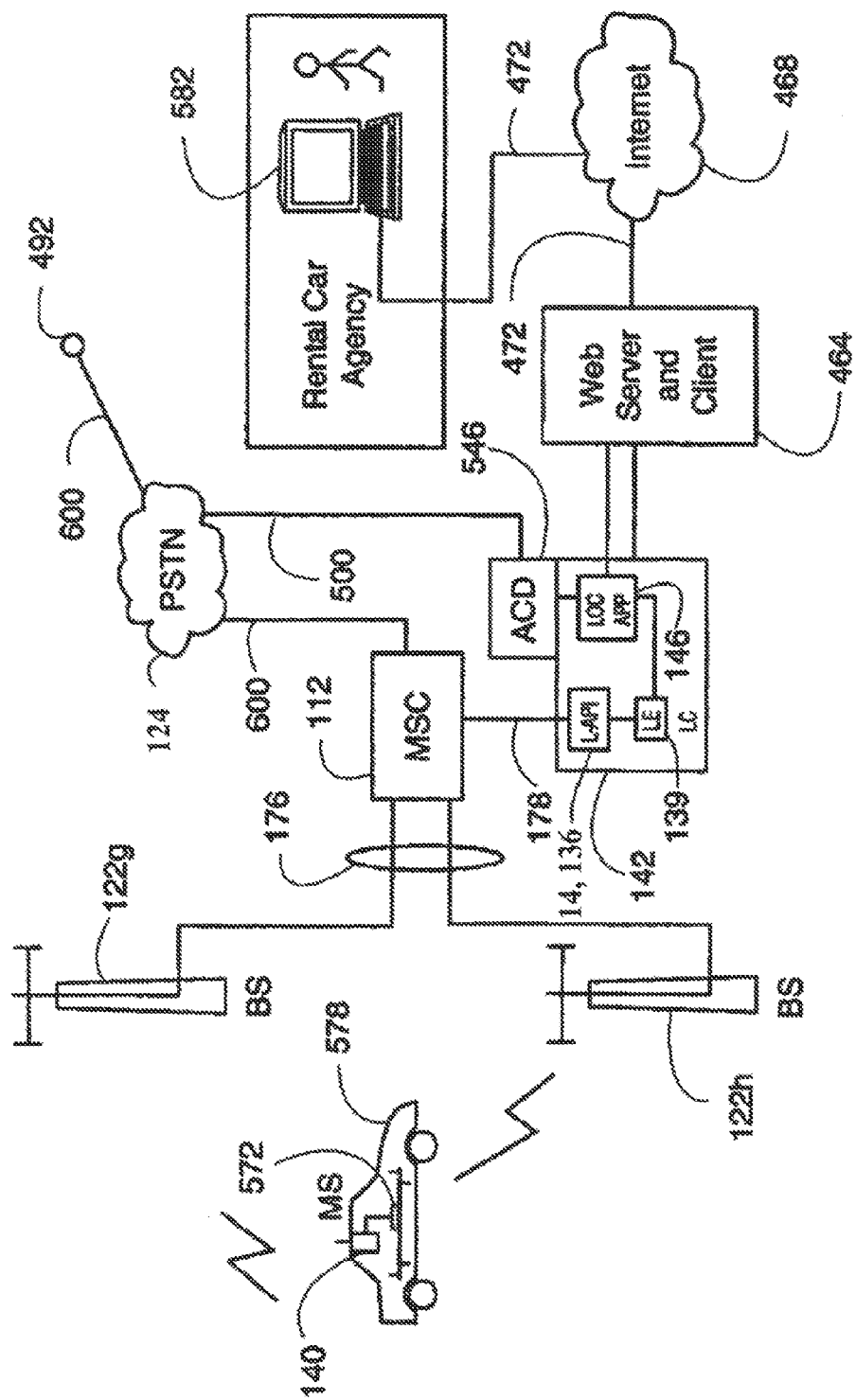
FIG. 42 illustrates how wireless location services can be used to facilitate automotive rental car tracking and control.

Referring to FIG. 42, a vehicle 578 containing various sensors and actuators (not shown) used to, for example, lock and unlock car doors, sense door position, keypad depressions, sense the condition of the engine and various subsystems, such as brakes, electrical subsystems, sense the amount of various fluid levels, etc., is in communication with a vehicle-based local area network 572, which is in turn connected to a mobile station 140 containing asynchronous data communications capability. The vehicle-based local area network may optionally contain a computer (not shown) for control and interfacing functions. The mobile station 140 is always in communication, using the radio air interface with at least one base station 122g, and possibly other base stations 122h. The base stations 122g and 122h are in communication with the mobile switch center 112 via transport facilities 176. The mobile switch center 112 is in communication with the location system 142 and the public switched telephone network 124 via interoffice trunks 600. In addition the mobile switch center 112 is also in communication with the location system 142 via the location system-mobile switch center physical interface 178. The physical interface provides two-way connections to the location applications programming interface (i.e., L-API-MSC 136), which is in communication with a location engine 139, which performs wireless location estimations for the mobile station, which is permanently mounted in the vehicle 578. The location engine 139 represents key components within the location system 142 which together comprise the capability to perform wireless location estimations. The rental car location application 146 is in communications with the location engine 139 for purposes of initiating wireless location requests regarding the mobile station 140, as well as for receiving wireless location responses from the location engine 139. The application 146 is in communications with the automatic call distributor 546 for purposes of initiating and receiving telephone calls to and from the public switch telephone network 124, via hunt group interface 500. As one skilled in the art will appreciate, other interfaces (not shown) beyond hunt groups 500, can alternatively be used, such as ISDN interface circuits, T-carrier and the like. The application 146 is in communication with a web server and client 464, which in turn is in communication with the Internet 468 via an Internet access interface 472. As those in the art will understand, an Internet access interface is typically provided by an Internet service provider, also there are other methods which could be used to complete the Internet connection. The rental car agency contains a workstation or personal computer 582 with an Internet access interface 472 to the Internet 468. The application 146 requests of the location engine 139 to perform a location request periodically regarding the mobile station 140, with the location response information provided the web server and client, 464. For each rental car or vehicle containing a mobile station 140, the location, as well as various information about the rental car or vehicle can be ascertained via the above described infrastructure.

911 Application with Wireless Location of the Caller Reporting an Incident

An application in the location system operates in conjunction with an application in each public safety answering point (PSAP) that together provides various call handling functions to enable the PSAP to perform its work load efficiently and effectively toward unique emergency events unique to a given location. The application pair measures the number of emergency 9-1-1 wireless calls originating from a particular geographical area or location. Upon exceeding a provisional threshold value "X", the application pair traps the next incoming call from the same location and provides a call screening function via a play announcement and collect digits activity. This activity alerts the originating caller that if their call relates to an incident at a particular location, then they are the "X+1 th" caller who has already notified the PSAP, and that no further caller discussion is required. However, if the caller's intent does not relate to the incident described above, then the caller is requested to press or say "one", or some similar keypad number, which then is collected and causes the caller to be re-routed to the next available PSAP call taker. Alternatively if the originating caller does not respond within a short time period, then the call is also re-routed to the next available PSAP call taker. The voice announcement may either be synthesized by a text-to-speech card, or an PSAP operator may store a voice message which describes the incident at the above-referenced location.

Visualization Applications Using Wireless Location

An application of the wireless location system disclosed herein may be used to enable geographic visualization applications, wherein one or more geographic areas of interest are presented as visual geographic images or maps with annotations thereon indicative of, e.g., a relative interest a mobile station user may have in such geographic areas. In particular, such geographic areas may be color coded on a map according to an expected interest the user may have in different ones of the areas. Moreover, such a visualization application may also include audio feedback as well, and in fact, in some contexts (e.g., a mountain bike rider on a trail requiring full visual attention by the rider to the trail terrain) such "visualization applications" may include an audio-only feature for providing a mobile station 140 user with only audio feedback such as directions or navigation instructions. In fact, in one embodiment, such a "visualization application" may be audio-only, wherein the audio provided is enhanced in sound quality and/or with more detailed information than would be, by default, provided if it is expected that the user could reliably and safely (at least periodically) view a graphical display on his/her mobile station 140. Accordingly, visualization applications as described herein can, in some embodiments, be audio-only applications.

In one embodiment, upon attending an event (e.g., electronics convention, a gun show, a western stock show, a trade show, a concert, a volleyball tournament, a theme park, etc.) a user may be unable to visit all portions of interest of the event due to, e.g., time and/or physical constraints on the user. Accordingly, an application may be downloaded and installed on the user's mobile station 140 (e.g., an Iphone® of Apple Corp. or other smart phone, perhaps in conjunction with other mobile devices, e.g., Google glasses where displays are imaged to the user on the eye pieces thereof while the user wears such glasses) which provides the user with one or more of the following:

(a) Identifications of geolocation sites within the event (or surroundings thereof) that may be of interest to the user. Such identifications may be presented to the user (at his/her mobile station, MS 140) in various ways, including a graphical (and/or audio) presentation for: (i) identifying such sites on a map of the event premises, (ii) identifying such sites in a list, (iii) identifying such sites that are most closely related according to, e.g., one or more conditions or criteria, e.g., of likely interest to the user (e.g., due to a user's personal interests, site geographical proximity to the user, site availability/accessibility by the user, and/or expected financial by the user at the site), and/or (iv) identifying event sites that have been (or are being) identified on a social network site (e.g., Facebook™ via the Internet) as of most interest to event attendees or others.

Regarding such identifications on a map of the event premises, the identifications may be provided on a plurality of layers of the map. For example, food providing sites and bathrooms may be provided on one layer that is overlaid on a map of the event premises while exhibits of likely interest to the user are overlaid on another layer onto the map of the event premises. Thus, the information content and clutter on an event premises map can be reduced for ease of understanding and navigating by the user.

Regarding listings output to the user, such outputs displayed (on the user's mobile station 140) as in (ii) above may be, e.g.: (1) information on theme park rides with rider restrictions, e.g., where the rider must taller (or weigh more or be older) than a particular value, (2) information on site access (e.g., hours the site is open, wait time, e.g., restaurant wait time), (3) resources available at the site (e.g., food items available, lodging rooms available, etc.).

Regarding graphical output to the user as in (iii) above, such graphs may show the relatedness of particular event presentations/sites. For example, for such a graph of event presentations and sites related to a particular classification (classified according topic, time of accessibility/availability, expense, others who may attend, etc.), each node of the graph may identify a distinct or unique class of the classification. Accordingly, such a graph may have one or more hub nodes identifying such presentations/sites wherein such a hub nodes has, e.g., at least a threshold number of graph edges ending at the hub node, and wherein the opposite ends of these edges connect to additional graph nodes having identifications of such presentations/sites (in the classification) that are related to class of the hub node. For instance, each edge of the graph may be indicative of data (e.g., user profile data stored in an electronic database) identifying the user's perception of how closely the edge end point nodes are perceived to be related. In one embodiment, such data may indicate ratings according to other event attendees' behavior or input if the user finds such a graph of ratings of interest, e.g., such ratings could be for ratings of presentations on the topic of global warming. Thus, for some one or more presentations or sites, they may be represented in the graph as by a single node which is directly connected to a hub node by a single edge while other event presentations/sites that are less related (e.g., according to the user's profile data)

may be represented by a graph node that is connected to such a hub only via a corresponding plurality of nodes thereby indicating a lesser relatedness/interest by the user.

(b) Information related to the user's likely interest in the event. Such information can be presented to the user and include data indicative of the starting, ending and/or duration time of particular event presentations of likely interest to the user. Additionally, the opening and/or closing of event sites of likely interest to the user may be provided. In one embodiment, a user may input to his/her mobile station 140 selections of one or more such particular presentations to attend and/or sites to visit, and the application may can then present to the user only event presentations and event sites that the user can visit/attend in the time not already allocated by the selected particular presentations and/or sites to visit. In one embodiment, the application may output (on the user's mobile station 140) information on presentations in a list according to start time.

Note that such events and/or presentations may be more generally considered as resources that such visualization applications allow a mobile station user: (i) to attend, (ii) view or interact with (perhaps remotely on the user's mobile station 140), or generally "consume" in the sense that such at least a part of such a resource is allocated for utilization by the user. Further note that this framework of resources being consumed by mobile station users can be apply in other contexts as well. For example, such a framework can also apply to providing a mobile station 140 user reservations at a user desired type of restaurant. Additionally, such a framework can also be used to assign or allocate a mobile station 140 user such resources as hotel rooms, parking spaces, etc. In particular, regarding such dynamic applications as the allocation of parking spaces, the use of wireless location information obtained from, e.g., a location system 142 (in communication with a wireless network that mobile station 140 is wirelessly communicating thereon) to timely route (and potentially re-route) a mobile station 140 user and his/her vehicle can be a particularly challenging visualization application. The section hereinbelow provides a novel wireless location based solution to dynamically and in substantially real-time identifying parking spaces to which mobile station 140 users can be routed and/or re-routed as necessary.

In one embodiment such a wireless location based visualization application may be for routing vehicles (and their mobile station users) to parking spaces, a mobile station user may be desirous of finding a parking space in a large parking facility such as at an airport parking facility, municipal parking (on, e.g., downtown streets or parking garages), or a shopping mall. If the parking facility has electronic monitoring for monitoring parking spaces therein, then parking spaces (e.g., for automobiles or other modes of transportation) can be readily identified as being occupied or available via such electronic monitoring so that a mobile station user can view (via an appropriate wireless location based visualization application) on his/her mobile station, a map of the parking facility with a designated color (e.g., bright green) identifying one or more nearby available parking spaces, and optionally providing a route to one of the parking spaces (such visualization of a map may, as discussed above, be replaced or enhanced by varying amounts of audio quality and/or audio navigation detail). Of course, there may be no guarantee that the user will arrive at one of the parking spaces prior to it being taken by someone else. However, if another takes the parking space, then the user can be notified of the parking space's unavailability potentially substantially before the user navigated to the un available parking space. Note that notifications of available parking spaces in real time (or nearly so) can be provided by, e.g., marking a center of each parking space with a distinctive insignia or design that can be readily identified via video input from one or more electronic monitoring devices that view the parking spaces. In particular, when a parking space is available, the insignia or design on the parking space is visible to one of the video monitors, and when an automobile (or other vehicle) is parked in the parking space, the insignia or design on the parking space is at least partially occluded (more preferably, substantially occluded). Accordingly, such video input can be provided to computational equipment (a computer system) for automatically recognizing the predetermined insignia(s) or design(s) painted, taped or otherwise attached to the parking spaces, e.g., without manual intervention. Such symbol recognition computational devices may be modified versions of bar code readers, or, e.g., techniques as disclosed in U.S. Pat. No. 7,274,823 by Lane, which is fully incorporated herein by reference, wherein symbols embedded in digital video signals are recognized.

Of course, in providing parking space information to the user, both the location of an empty parking space and the user's location preferably should be known or determined so that the user may be navigated to an empty parking space. In addition to a service for locating such empty parking spaces for users in, e.g., parking garages, shopping malls, street parking in downtown areas, etc., other services may also be provided which rely on wirelessly locating mobile station users and/or resources for such users. In particular, such users may request notifications for assisting in locating other resources such as a nearby restaurant having a reduced (or no) wait time for service, a hotel or motel having a vacancy, a campsite at a campground, a theme park (or other) attraction having a reduced (or no) wait time. However, routing to parking spaces and other services where the resource utilized (or consumed) by the mobile station user cannot be (or is not) reserved exclusively for the user is particularly challenging to address.

In one embodiment such a wireless location based visualization application may be for routing mobile station 140 users to appropriate transportation capabilities. For example, in large transportation facilities such as a bus station or subway station, people enter vehicles typically on a first-come-first-serve basis. Thus, such a visualization application embodiment could be used in conjunction with a computer system for estimating the number of people wishing to enter a transportation vehicle, and then provide such information along with the capacity of the vehicle to the visualization application embodiment for notifying a mobile station user of which vehicle the user has a better chance of obtaining transportation to his/her desired destination, and route the user to the vehicle loading area.

The high level pseudo-code shown in FIG. 44 is a simplified illustration of the processing performed regarding user notification of: (1) available resources that cannot be typically reserved prior to actual use, such as available parking spaces, available campsites, available gaming locations (at a gaming machine or gaming table) in a casino, and/or (2) resources (e.g., restaurants, theme park attractions, convention presentations) that are determined to require less user time to access than other similar resources.

The following provides a description of the pseudo-code of FIGS. 44A-44D which discloses one embodiment of the method for interacting with mobile station 140 users and providing such users with notifications related to obtaining and/or utilizing resources, e.g., by such users physically travelling to such a resource such as a parking space as one such resource. The line numbers to the left of the pseudo-code of FIGS. 44A-44C are referred to hereinbelow for identifying the portions of the pseudo-code being referenced.

In FIG. 44A, lines 1-3 provide a step of the mobile station (140) user activating an application (denoted an "APP" herein) on his/her mobile station (e.g., an Apple® Iphone™, an Android™ based smart phone, or a Blackberry® smart phone), wherein the APP provides notifications related to an availability of one or more resources of interest to the user, e.g., at one or more geographical locations of interest to the user, and wherein such notifications may include information for accessing one or more of the resources, e.g., by providing directions for routing or navigating the user to an available one of the resources via communications with the user via his/her mobile station 140.

Lines 4-5 (FIG. 44A) disclose a step of determining whether the APP can obtain user location information from wirelessly locating the user's mobile station 140 (merely "MS" hereinbelow). In some embodiments, such a determination is dependent upon the user authorizing the APP to request such location information, and upon the ability of the wireless network (and/or components attached thereto) to determine both (i) an appropriately reliable and accurate wireless location of the MS for obtaining the user location information, and (ii) communicate such user location information to the APP. Note that such authorization may be not just for the APP, but instead, may be for a group of mobile station applications that are contractually obligated to maintain certain confidentiality provisions regarding user location information. If the user cannot or will not authorize the use of his/her wireless location information (related to the position of his/her mobile station 140), then the process described in the pseudo-code terminates.

Lines 6-7 (FIG. 44A) disclose a further step of putting or entering user and/or MS identification data on a queue (or other dynamic computing machine data repository) accessible by the APP. This queue retains the data for identifying each MS whose user requested activation of the APP and wherein the APP has been authorized to obtain and use user location information as described above. The queue may also retain additional information such an identification of the user, how the user is currently travelling (e.g., via car, bicycle, or walking), the type of presentations the user requires/requests the APP to provide on the user's mobile station 140 (e.g., visual only, audio only, haptic feedback (e.g., provided in the event that the user takes an incorrect direction and thereby deviates from a route, e.g., provided by the APP, to one of the resources, or provided when an APP notification is available to the user, or a hybrid of two of more of visual, audio and haptic). Additionally, financial user information may be also retained in certain embodiments, e.g., when the APP assists in identifying gaming machines for users, the APP may be incorporated into a computer system that also manages the users' winnings and loses at various games. Additionally, the queue may assist in prioritizing how MS each user is to be allocated processing time for identifying an available resource to which the user is to be notified. For example, this queue may be a "queue" in the technical sense of, e.g., a "first in first out" data repository (possibly a "round robin first in first out" data repository) with associated procedures/methods as one of skill will understand. However, the queue may also allocate APP computational time and/or machinery according to various priorities of the users requesting notification of resources (e.g., parking spaces). For example, such priorities may be determined according to a time or distance each user is from likely available resources, wherein the further away users are, their priorities are reduced.

Line 8 and higher numbered lines disclose an embodiment of the processing performed for each user (and/or his/her MS) when it is allocated APP computer processing time for providing the user with notifications related to available resources (e.g., parking spaces). In particular, once a user's data in the queue is selected for notification processing, such data would be then re-prioritized to a lower priority so that any next activation of the APP on the user's data would be of a lower priority than such data for other users in the queue. Thus, in lines 8-9, the APP requests periodic or repeated wireless locations of the MS. In some embodiments, the resulting MS location information may be iteratively determined according to fixed time period. However, a preferred technique for iteratively obtaining a user's location information (e.g., for tracking the user's MS in a manner effective for the APP to provide reliable available resource notification(s)) is to request such user location information instances at a frequency dependent upon, e.g., an expected or appropriate speed of the MS (e.g., the greater the speed the greater the frequency), MS distance and/or direction of travel relative to the resources (e.g., an MS travelling away from the resources, and not following an assigned route to the resources, may be wirelessly tracked at a lower frequency), and/or a change in direction of the MS (e.g., repeated short time period changes in user direction may be indicative of user frustration or dissatisfaction, and accordingly, wireless tracking frequency may be increased), and an expected change in the availability of one or more of the resources (e.g., if it is determined that an available resource is near the user, then the wireless tracking frequency may be increased for routing the user to the resource). Note such wireless tracking frequency of a user's MS may not be lowered just because the user's data is only in the queue and not being currently processed. In particular, it may be assumed that each user having user data in the queue is actively requesting an available one of the resources and there is a reasonable likelihood of the user being notified of an available such resource by the APP.

In lines 10-93, a "while loop" is provided that "allocates" one of the resources (e.g., parking space) to the user, wherein such allocation is an initial determination that one of the resources has been identified as appropriate to notify the user thereof. In lines 10-16, conditions are disclosed for entering this "while loop" (and continuing to loop therethrough), wherein these conditions are evaluated by computer machinery. In particular, these conditions state that whenever:

(a) the wireless locations for the user's MS are timely provided so that each such wireless location is approximately indicative of the MS's current location (e.g., within 50 feet even though the MS may be moving at, e.g., 50 miles per hour), (b) the MS is in a proximity or geographic area (or expected to be currently or shortly) for seeking an available one of the resources (e.g., the MS is within an eight of a mile of a predetermined vehicle parking area (such as a parking garage) for which the APP notifies the MS user of a parking space(s) therein, or the MS is within the confines of a particular facility or event for which the APP notifies the MS user of the availability of a user desired transport to board, a presentation or entertainment to attend, a ride or attraction to experience, wherein the user may walk to an available one of the resources.

(c) there is no resource currently allocated to the MS (i.e., there is no wireless transmission to the MS of a notification from the APP of an available resource for the MS user, wherein this resource is still both available and designated as allocated to the MS or its user; note that when the "while loop" entered during an initial activation for allocating a resource to the user, there is no resource allocated to the user.

Regarding (b) immediately above, in one embodiment, a distance between the MS user's most recent wireless location and a location for at least one of the resources may be determined, and if this distance is less than a particular threshold, then the MS would be deemed to be in a proximity or geographic area of the resources. Of course, other techniques for determining whether the MS is within a proximity or geographic area of the resources may also be used, such as:

An MS distance from a particular location such as an entry to access the resources.

An expected time of travel a particular location such as an entry to access the resources.

An expected time of travel to (at least one) of the resources.

In lines 17-22, conditions are identified for exiting the "while loop" under circumstances wherein the MS user cannot be allocated one of the (predetermined) resources. In particular, there may circumstances that occur where all of the resources become unavailable substantially independently of what resources have been acquired by various MS users. For example, for the resources being parking spaces in a parking facility (e.g., at a large airport), if the entire parking facility had to be closed down (e.g., due to a potential dangerous situation), then APP processing for finding MS users parking spaces would cease.

In lines 23-92, a "For" loop is provided, wherein this loop allocates an unavailable resource (if possible) to the MS user, and transmits one or more notifications to the MS, as appropriate, regarding navigating the MS user to an available one of the resources for acquiring the same (note, the term "acquiring", as used in the context of an MS user "acquiring" a resource, can have various interpretations depending on the service the APP provides; for example, if the service is to provide the MS user with a parking space, then indeed the MS may acquire a parking space; however, if the service is to assist the MS user in boarding an appropriate bus or subway then "acquiring" may be interpreted as "acquiring a seat or standing room" on the bus or subway; thus, in such embodiments, "acquiring" may be interpreted as providing an actual spatial or physical extent to the user. for his/her own use).

As will be described further hereinbelow, this "For" loop attempts to determine an available one of the resources that is closest or at least near to the MS. Accordingly, wireless location(s) of the MS are used to determine such a proximity of the (any) available resources to the MS.

In lines 24-27, the locations of the currently available and not allocated resources are obtained. Note that the terms "available" and "availability", when referring to a resource in the present context, may be interpreted as: (1) indicative of an output providing a binary (e.g., yes/no or true/false) result as to whether the resource can be currently acquired by an MS user, and in some embodiments, may also have an interpretation including (2) the use of a threshold number of users that can be effectively supported by the resource (e.g., up to a predetermined threshold number of users can be appropriately supported by the resource simultaneously or during a time interval, but the resource degrades, fails, and/or is not appropriately effective when the number of users for the resource exceeds the predetermined threshold number (e.g., the resource is a bus having a maximum occupancy as the predetermined threshold).

Regarding the locations of the resources, data for such location may be maintained in a persistent electronic data repository (e.g., a database management system by anyone of various vendors such as Oracle® or Microsoft®). Such a data repository may be substantially static where the resources have fixed locations such as parking spaces. However, in other embodiments of the APP, the resources may not be stationary. For example, an embodiment of the APP may be provided where each resource is a taxi, and the MS users are each seeking to acquire one of the taxis. In this later embodiment, the current location of each of the taxis is preferably maintained in the data repository, and such locations may be determined by wirelessly locating each taxi so that each taxi's location is maintained (in the data repository) to within, e.g., 50 feet of its actual location.

In lines 29-44, a determination is made as to whether there is any resource available, and in the event that there is none, then a notification may be wirelessly transmitted to the MS for informing the MS user that there are currently no available resources. Further, if the MS responds and indicates that he/she wishes to wait until an appropriate resource becomes available, then a next notification is sent to the MS user when:

(1) there is at least one becomes available and is also unallocated resource. In one embodiment, an "availability threshold" of the number (greater than one) of the resources must be available and unallocated must be attained before such a next notification would be output to the MS user for providing the MS user with the identity and/or directions for navigating to one of these resources. Note that when such a resource(s) become available and unallocated, APP processing of the MS user's request for one of the resources may commence at line 67 of the pseudo-code in FIG. 44; or (2) a predetermined elapsed has expired (e.g., three minutes), wherein such a next notification ("status notification" herein) is to inform the MS user that no resources (or an insufficient number thereof) is available which have been not already allocated to others. Accordingly, the APP may activate a timer associated with the MS user (or the MS) for determining when such an elapsed time has expired. Note that such status notifications may be repeatedly output to the MS user, e.g., when the MS associated timer expires, this timer may be reset for a further elapsed time to provide another status notification in the event that the MS user is still waiting for one of the resources when this further elapsed time period expires.

Note that if the MS user responds indicating that he/she does not wish to wait to be notified of an available resource, then the APP terminates the MS user's execution of an instance of the pseudo-code (line 44).

In one embodiment, when a threshold number (greater than one) of available and allocateable resources is required before a notification according to (1) immediately above is output to the MS user, such a threshold may be determined according to a likelihood or expectation of the available and unallocated resources being unavailable to the MS user by the time the MS user travels to a location for acquiring any one of these resources. For instance, each such available and unallocated resource may have an MS user travel time thereto that is too long for the MS user to travel to such the resource and acquire it since, e.g., there may be high expectation/probability that another person (whether an APP user or otherwise) may acquire the resource before the MS user arrives at the resource, and such acquisition would be to the exclusion of the MS user acquiring the resource. As an illustrative example, for the resources being parking spaces, the available and unallocated parking spaces may take too lengthy of an expected time for the MS user to travel any one of them for there to be a reasonable expectation that the resource would be acquireable by the MS user on arrival thereat. In one embodiment, an expected "acquireability time" may be computed for each available and unallocated resource for determining if information on any of the available and unallocated resources should be communicated to the MS user for the purpose of the MS user acquiring the resource. Such an acquireability time may be determined accordingly to historical data, e.g., having measurements of the lengths of time that (each or an aggregation of) the resources remains continuously available. Such an acquireability time may be dependent upon various characteristics ("availability characteristics" herein) affecting resource availability such characteristics being, e.g., a given day of the week and/or a time of day, a number indicative of entities seeking to acquire the resources, the locations or the acquireability time of such other entities relative to the available resources, the weather about the available resources, etc. Various statistical analyses may be used to compute such acquireability times (for each resource or for an aggregate of resources). Such acquireability times may be determined by a statistical technique such as principle decomposition, partial least squares, or another regression technique a regression as one of skill will understand, wherein such times may depend upon one or more availability characteristics.

Applying the immediately above discussion to an APP for MS users seeking parking spaces, the availability characteristics may any or all of the above identified characteristics for which there is statistically significant historical data for computing the acquireability times. In particular, for parking spaces, such an acquireability time for a parking space may be the a time that the parking space is expected to be continuously vacant for a given set of availability characteristics.

For an embodiment of the APP provided for services other than the resources being parking spaces, different ones of the above identified availability characteristics may become more important than others. For example, for a substantially indoor event at a large facility, crowd congregation and average travel time between event buildings may be the most important characteristics for determining an acquireability time for a particular event attraction or presentation, e.g., having limited seating capacity.

When an embodiment of the APP is provided to assist MS users in acquiring taxis (as the resources), such availability characteristics may also depend on obtaining near real-time or current locations of the taxis as well.

Assuming there are resources available (e.g., as determined at line 28, FIG. 44A), in lines 45-66 (FIG. 44B), a determination is made as to whether all (or substantially all) of the resources are allocated but at least one resource remains available. In such a case, the APP processing may be substantially the same as in lines 29-44 discussed above.

Assuming the determination in line 45 is negative, and thus, there is at least one resource that is both available and unallocated (more generally, the availability threshold is met), a determination is made in lines 68-71 as to whether:
(a) the location of the MS user (as wirelessly determined) is sufficiently near one of the available and unallocated resources, R, for potential allocation to the MS user; and
(b) there is no other MS user of the APP wherein this other MS user is known to the APP to have been (and still is) seeking one of the resources, wherein this other MS user is at least as near (or approximately so) to the resource R, and who is known to the APP as seeking one of the resources a longer amount of time.

When this determination yields as positive result, then the MS user is allocated the resource R, and if necessary (or desired by the MS user), navigation directions are transmitted to the user's MS for directing the user to the resource R. Note that providing the MS user with navigation to the resource R may require interactive communications with the user's MS and possibly the MS user as well. For example, in the case that the MS user does not fully follow the navigation directions, an alternative route to the resource R may need to be determined and provided to the MS user. Additionally, the MS user may need to confirm that a proposed route to the resource R having stairs is acceptable (e.g., the MS user may be wheelchair bound). Further, the MS user may desire an alternative route to the resource R that, e.g., goes by (or does not go by) a particular location. Accordingly, the processing performed for providing the MS user with navigation instructions to the resource R may occur over an extended period of time. However, remaining APP processing of lines 68-81 does not, in general, wait on the navigation process to complete. Instead, such remaining APP process of lines 68-81 may be performed concurrently therewith (and indeed, substantially all further APP processing may be performed currently with navigating the MS user to the resource R. However, as will be described below, at some of the steps of the pseudo-code of FIG. 44 (e.g., lines 95-96, and more generally in the loop of lines 84-123) monitor whether the MS user appears to be attempting to travel to the resource R. Note that processes for generating and providing such navigation instructions to the MS user are known in the art, and may be provided (at least for some APP services by Google Maps™ by Google Corporation).

In one embodiment, in order to effectively evaluate condition (b) above for line 45, for each MS user actively (and generally continuously) seeking a resource with the assistance of the APP, the APP maintains data indicative of the total length of time the MS user has been seeking (or has an active request input to the APP for acquiring) one of the resources (such data identified herein as "seek time", and electronically stored and associated with the MS user in a persistent data storage). Accordingly, the condition (b) above may be evaluated by comparing the seek time of the MS user in condition (b) with such seek times of the other MS users also seeking resource (via the APP), wherein such comparisons are used to determine one or more of the MS users who have been actively and continuously seeking one of the resources for the longest time(s). Thus, if another MS user has a seek time data indicative of seeking the resources longer than the MS user (in condition (b) above), then this another MS user may be allocated the resource R instead of the MS user. In one embodiment, when the MS user can travel to the resource R in an expected shorter time than another MS user, but the another MS user has seek time data indicative of a longer time seeking or requesting a resource, then a preference between the MS user and the another MS user is determined. In one embodiment, such a preference may be determined by:

(i)   determining the difference ("travel_diff" herein) between (1) an expected time of travel to the resource R of the MS user, and (2) an expect time of travel to the resource R of the another MS user;
(ii)  determining the difference ("seek_diff" herein) between (1) the length of time the MS user has been seeking one of the resources, and (2) the length of time the another MS user has been seeking one of the resources;
(iii) compute a resulting MS user preference value that is dependent upon the difference of (i) and the difference of (ii); note various functions of travel_diff and seek_diff may be used to obtain the preference value, e.g.,
        if (only the absolute value of one of the travel_diff's is above a predetermined "travel time" threshold)
            then
                prefer the one of the MS user and the another MS user that has the greatest travel_diff;
        elseif (only the absolute value of one of the seek_diff's is above a predetermined "seek time" threshold)
            then
                prefer the one of the MS user and the another MS user that has the greatest seek_diff;
        elseif (the absolute value of both of the travel_diff's are above the predetermined threshold) then
            in one embodiment, compute the following:
                travel_norm ← normalize (to the range 0 to 1) the travel_diff to the travel time threshold
                    (e.g., travel_diff/(travel time threshold);
                seek_norm ← normalize (to the range 0 to 1) the seek_diff to the seek time threshold
                    (e.g., seek_diff/(seek time threshold);
                if (travel_norm > seek_norm) then
                    prefer the one of the MS user and the another MS user that has the greatest
                        travel_diff;
                elseif (seek_norm > travel_norm) then
                    prefer the one of the MS user and the another MS user that has the greatest
                        seek_diff;
                else prefer the MS user.

Note, however, that in at least one embodiment, the order of the last two programmatic comparisons may be switched.

Subsequently, if the MS user is allocated the resource R, then in lines 77-80, the APP removes (de-queues) the MS user from the queue and deletes any active timer for the MS user. Subsequently, the "For" loop (commenced in line 23) reevaluates its loop conditions to determine whether this loop's internal steps should be performed again, and assuming the "For" loop is not performed again, the "While" loop (commenced in line 10) and reevaluates its loop conditions to determine whether this loop's internal steps should be performed again.

Assuming the resource R has been allocated to the MS user and the MS user is receiving navigation instructions to R, in lines 84-123, a further programmatic loop, identified as "LOOP", is performed continuously until it is explicitly exited by a step performed in the body of this loop. This loop firstly, in lines 85-87, makes a determination as to whether the resource R: (i) becomes unavailable; (ii) the MS user did not acquire the resource R (and so could not have been the cause of the resource R becoming unavailable), and (iii) the MS user has not acquired another of the resources (e.g., the MS user did not come upon another of the resources (e.g., another unoccupied parking space) and decide to acquire it instead of the allocated resource R. If all the conditions (i)-(iii) immediately above are true, then the resource R was acquired by another, e.g., during the MS user's traveling to the resource R. Accordingly, lines 88-93 are performed, wherein all associations the APP may have for associating the MS user with the resource R are deleted, and the MS user is re-queued in the queue. However, in performing the re-queuing of the MS user, in at least some embodiments, the APP does not reset the MS user's stored seek time data. Thus, such seek time continues to accrue until the MS user: (1) is identified as no longer interested in acquiring one of the resources (e.g., the MS user is wirelessly located outside of a predetermined area for the resources, or the MS user is persistently headed away from the resources, or the MS user has responded to the APP with an indication of disinterest/termination in his/her request for APP assistance in acquiring one of the resources, or (2) the MS user acquires one of the resources.

Assuming at least one of the conditions of lines 85-87 are not satisfied, then in line 94, a determination is made as to whether the MS user's allocated resource R remains available (note, in this case, the MS user has been allocated the resource R, but has not acquired it), then a further determination is made (lines 95-96) as to whether the MS user is travelling generally along a route for acquiring the resource R. In one embodiment, such a determination may be made by determining whether the MS user (i) follows a route to the resource R provided, (ii) is proceeding along some alternative route to the resource R that has an expected time of arrival at the resource R that is "reasonable" (e.g., along some route that wherein the MS user would have an expected travel time to the resource R of not more than, e.g., 1.5 times of the expected travel time via the route provided to the MS user via the APP.

Accordingly, if the determination in lines 95-96 indicates that the MS user appears to be proceeding to the resource R, then if appropriate (for continuing to navigate the MS user to the resource R), continue to transmit further navigation information to the MS user. However, if the result of lines 95-96 indicates that the resource R has been acquired by the MS user, then (lines 100-103) mark the data for the resource R (residing in a persistent electronic data storage along with similar status data for all the other resources) as being unavailable for allocation (line 100), de-queue the MS user from the queue, delete any MS user associated active APP timer (as well as other associated MS user data specially to be used only for allowing the MS user to acquire the resource R), and then end the APP processing of FIG. 44.

However, if it is determined (lines 105-106) that the MS user has acquired one of the resources different from R (e.g., along the way in travelling to R), then (lines 107-110) mark the data for this different resource (residing in a persistent electronic data storage along with similar status data for all the other resources) as being unavailable for allocation (line 107), de-queue the MS user from the queue, delete any MS user associated active APP timer (as well as other associated MS user data specially to be used only for allowing the MS user to acquire the resource R), and then end the APP processing of FIG. 44.

Referring to lines 112-113, the APP waits for some new information to be stored in a persistent electronic database accessed by the APP, wherein such information is related to the MS user acquiring the resource R. For example, such new information can be, e.g.: (1) data indicative of the MS user's disinterest in acquiring the resource R, (2) the MS user has acquired the resource R or another resource, and/or (3) the resource R has been acquired by another. Accordingly, whenever such new information is detected, the loop commencing at line 84 is again entered.

Of course, a location system for performing the above wireless location applications is also an aspect of the present disclosure. In particular, regarding the geographic visualization applications the following computational machinery (e.g., hardware/software components) is contemplated by the present disclosure:

(i) A database for persistently storing each MS users' status, identity data and wireless contact information for the acquiring of one of the resources.

(ii) A database for persistently storing a status of each of the resources, including each resources location (or current location if the resource moves), whether it is available, whether it has been allocated, etc.

(iii) A subsystem for providing notifications to the MS users regarding the acquiring of one of the resources.

(iv) A system for providing MS users with navigation instructions for proceeding to an allocated resource.

(v) An interface for receiving wireless location information providing locations of the MS users and, if the resources move, the locations of such moving resources.

(vi) An electronic mapping system for providing the MS users with graphical displays of maps with, e.g., at least one route to a corresponding allocated one of the resources.

(vii) A hardware/software configuration for enabling the APP to execute on such a configuration together with various communication network(s) interfaces for receiving and transmitting information related to the MS users acquiring resources. Note the APP may communicate with the MS users via wireless Internet communications as one of skill will understand. However, in some embodiments, the APP may communicate with the MS users via a wireless LAN (which may or may not be accessible via the Internet).

(viii) In some embodiments, a subsystem for selecting and presenting appropriate information to the MS users via graphical display presentations, audio presentations, or a combination thereof, wherein such presentations may also therewith haptic MS user output to assist the MS users in, e.g., detecting resource notification from the APP.

Note that machine instructions for embodying variations of the above pseudo-code may be used for routing users to available gaming machines in a casino, routing user's to available attractions in an amusement or theme park, and/or routing user's to the most sparely populated ski lifts at a ski resort.

The present disclosure has been presented for purposes of illustration and description. Further, the description herein is not intended to limit the present disclosure to the form disclosed herein. Consequently, variation and modification commiserate with the above teachings, within the skill and knowledge of the relevant art, are within the scope of the present disclosure. The present disclosure is further intended to explain the best mode presently known of practicing the invention as recited in the claims, and to enable others skilled in the art to utilize the present disclosure, or other embodiments derived therefrom, e.g., with the various modifications required by their particular application or uses of the present disclosure.

What is claimed is:

1. A method for providing for each mobile unit (M) of more than one of a plurality of wireless mobile units, corresponding one or more notifications for a condition related to a user of the mobile unit M utilizing one of a plurality of resources, wherein there is a network having a plurality of geographically spaced apart stationary network access units for receiving wireless signals from the mobile unit M, comprising performing, for each mobile unit, M, of the mobile units, the following steps by computational equipment:

(a) receiving input from a user of a service, the service for providing the corresponding one or more notifications to M;

wherein the input includes: a user request for receiving at M a wireless transmission of the notifications when an occurrence of the condition is identified, wherein one or more notification criteria are available whose evaluation is for identifying the occurrence of the condition;

(b) subsequently, receiving geolocation data for the mobile unit M, the geolocation data indicative of a location, L, for the mobile unit M, wherein the geolocation data is obtained using location indicative data having measurements of signals, S, communicated wirelessly to or from the mobile unit M, at least some of the signals S having corresponding different locations for (i) being transmitted to the mobile unit M, or (ii) being received by one of the access units from the mobile unit M;

wherein for each of the different locations, the geolocation data includes data indicative of a geographic position of the different location; and (c) evaluating a portion of the notification criteria using the geolocation data, the evaluation for determining whether one of the resources is (i) available for utilization by the user, and (ii) in a predetermined proximity of the mobile unit M, and wherein the evaluation is dependent upon a priority for the user to utilize one of the resources; and (d) when the portion of the notification criteria evaluates to a first result, a step is performed of notifying the user by a wireless network transmission of at least one of the notifications, the at least one notification including location information for routing the mobile unit M to one of the resources, R, wherein the location information is obtained using the geolocation data;

(e) determining a further result indicative of the one resource R being unavailable before the mobile unit M is identified as being at the resource R; and (f) performing the steps (b), (c), and (d) again for identifying another resource for the user to utilize when the further result is determined, wherein the priority for the user increases with each performance of step (d).

2. The method of claim 1, wherein one or more additional notifications for corresponding one or more additional conditions related to events or circumstances for the mobile unit M or a user thereof is provided, each of the additional conditions includes one of: a user emergency or distress call, or a vehicle sensor input signal to the mobile unit M;

wherein each of the additional notifications has a corresponding notification condition for evaluation for determining whether an occurrence of the corresponding additional condition, for the additional notification, has occurred, wherein a location estimate of the mobile unit M is provided to an authorized entity when the evaluation results in at least one result.

3. The method of claim 1, wherein the step of notifying includes providing routing or direction information to the mobile unit M for navigating the user to the resource R.

4. The method of claim 1, wherein the data corresponding to a geographic position of one of the different locations includes one or more signal characteristics used for determining the location L, the signal characteristics used includes one of: a signal strength, a signal transmission time, and a characteristic for identifying signal multipath.

5. The method of claim 1, wherein for at least one mobile unit (M1) of the plurality of mobile units, further including:
   obtaining a second status information for the mobile unit M1, wherein the second status information includes second geolocation data indicative of a location, L1, for the mobile unit M1, wherein the second geolocation data is obtained from second location indicative measurements of a plurality of second wireless signals communicated to or from the mobile unit M1, each of the second wireless signals having a different corresponding location for (i) being transmitted to the mobile unit M1, or (ii) being received from the mobile unit M1;
   wherein there are one or more corresponding measurements of the second location indicative measurements for each of the different corresponding locations; and wherein for each of the different corresponding locations, the corresponding measurements therefor are indicative of a geographic position of the different corresponding location;
   a step of evaluating second one or more notification criteria using the second status information for the mobile unit M1, for determining an availability of one or more resources, which a user of the mobile unit M1 desires to utilize, and
   a step of transmitting to the mobile unit M1 a corresponding notification related to the availability of one of the resources according to a result from the evaluation of the second notification criteria.

6. The method of claim 5, further including transmitting at least one navigation instruction to the mobile unit M1, the navigation instruction for navigating the user of the mobile unit M1 to the one resource.

7. The method of claim 6, wherein the one resource is one of a single parking space to be utilized for parking a user vehicle, and a gaming station.

8. A method, for each mobile unit (M) of more than one of a plurality of wireless mobile units, of providing for a condition related to a user of the mobile unit M utilizing one of a plurality of resources, wherein there is a network having a plurality of spaced apart stationary network access units, the access units selectively available for receiving wireless signals from the mobile unit M as it moves in an area having wireless coverage provided by the network, comprising performing the following steps by computational equipment:
   (a) receiving input from a first user for a wireless service to the mobile unit M, wherein the input is used for establishing a data content of a persistent data storage, the data content including an authorization by the first user for providing the service with one or more wireless locations of the mobile unit M;
   wherein one or more notification criteria are available whose evaluation is for determining whether there is an occurrence of the condition;
   (b) receiving, from the mobile unit M, a communication via one of the access units of the network, the communication including geolocation data for the mobile unit M, the geolocation data indicative of a location, L, for the mobile unit M, wherein the geolocation data is obtained from location indicative measurements of a plurality of wireless signals communicated to or from the mobile unit M, each of the wireless signals having a different location for being transmitted to or received from the mobile unit M, the measurement for each of the different locations being indicative of a geographic position of the different location;
   (c) evaluating at least a portion of the notification criteria for determining (i) whether one of the resources is available for utilization by the user, and (ii) whether the geolocation data identifies that the mobile unit M is in a predetermined proximity of the resources, and wherein the evaluation is dependent upon a priority for the user to utilize one of the resources;
   when the portion of the notification criteria evaluates to a first result, a step is performed of notifying the user by a wireless network transmission, the transmission including location information for routing the mobile unit M to one of the resources, R, wherein the location information is obtained using the geolocation data;
   (d) determining a further result indicative of the one resource R being unavailable before the user of the mobile unit M utilizes the resource R; and
   (e) performing the steps (b) and (c) again for identifying another resource for the user to utilize when the further result is determined, wherein the priority for the user increases with each performance of step (d).

9. The method of claim 8, wherein an instance of a notification includes location information for identifying the location L, the location information determined using the geolocation data.

10. The method of claim 9, wherein the location information includes a confidence value, wherein the confidence value provides an indication of the reliability or accuracy of the at least one location estimate.

11. The method of claim 9, wherein at least one of the geolocation data and the location information is dependent upon one of triangulation, a trilateration and a multilateration wireless location determining process that uses the measurements.

12. The method of claim 9, wherein the measurements include one or more of a signal strength, a signal time delay, and a characteristic for identifying signal multipath.

13. The method of claim 8, further including a step of determining that at least one entity is nearer for reaching the mobile unit M than another entity.

* * * * *